(12) United States Patent
Mitchell et al.

(10) Patent No.: US 12,533,080 B2
(45) Date of Patent: Jan. 27, 2026

(54) SYSTEMS, DEVICES, AND METHODS FOR ANALYTE MONITORING

(71) Applicant: ABBOTT DIABETES CARE INC., Alameda, CA (US)

(72) Inventors: Steven Mitchell, Pleasant Hill, CA (US); Matthew Simmons, Pleasanton, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 1031 days.

(21) Appl. No.: 17/566,667

(22) Filed: Dec. 30, 2021

(65) Prior Publication Data

US 2022/0202366 A1  Jun. 30, 2022

Related U.S. Application Data

(60) Provisional application No. 63/182,511, filed on Apr. 30, 2021, provisional application No. 63/132,075, filed on Dec. 30, 2020.

(51) Int. Cl.
*A61B 5/00* (2006.01)
*A61B 5/145* (2006.01)
(Continued)

(52) U.S. Cl.
CPC ........ *A61B 5/6833* (2013.01); *A61B 5/14503* (2013.01); *C09J 121/00* (2013.01);
(Continued)

(58) Field of Classification Search
CPC .............. A61B 5/6833; A61B 5/14503; A61B 2560/0406; A61B 2560/0468;
(Continued)

(56) References Cited

U.S. PATENT DOCUMENTS

| 5,786,439 A | 7/1998 | Van Antwerp et al. |
| 6,175,752 B1 | 1/2001 | Say et al. |

(Continued)

FOREIGN PATENT DOCUMENTS

| EP | 2 393 417 B1 | 12/2011 |
| EP | 2 713 879 B1 | 4/2014 |

(Continued)

OTHER PUBLICATIONS

Heinemann et al., "Adhesives Used for Diabetes Medical Devices: A Neglected Risk with Serious Consequences?" Journal of Diabetes Science and Technology, 10(6), 1211-1215, XP055908940.

(Continued)

*Primary Examiner* — Linda C Dvorak
*Assistant Examiner* — Abigail Bock
(74) *Attorney, Agent, or Firm* — ONE LLP

(57) ABSTRACT

Sensor control device for analyte monitoring comprising electronics housing having shell defining top surface and mount defining bottom surface of the electronics housing. Adhesive patch coupled to the bottom surface defines central opening, and includes first layer facing the mount and second layer facing skin of user. The first layer has first aperture, second layer has second aperture, and the first aperture and second aperture align with central opening along vertical axis of the sensor control device. First layer or second layer includes laser cut slots or laser cut holes configured for drainage of fluid or breathability of skin.

24 Claims, 131 Drawing Sheets

(51) Int. Cl.
   *C09J 121/00* (2006.01)
   *C09J 133/04* (2006.01)
(52) U.S. Cl.
   CPC ..... *C09J 133/04* (2013.01); *A61B 2560/0406* (2013.01); *A61B 2560/0468* (2013.01); *C09J 2301/208* (2020.08); *C09J 2301/30* (2020.08)
(58) Field of Classification Search
   CPC .... C09J 121/00; C09J 133/04; C09J 2301/30; C09J 2301/208
   See application file for complete search history.

(56) References Cited

U.S. PATENT DOCUMENTS

| | | | |
|---|---|---|---|
| 9,241,631 | B2 | 1/2016 | Valdes et al. |
| 10,827,954 | B2 | 11/2020 | Hoss et al. |
| 10,945,647 | B2 | 3/2021 | Mazza et al. |
| 10,973,443 | B2 | 4/2021 | Funderburk et al. |
| 10,980,461 | B2 | 4/2021 | Simpson et al. |
| 11,000,213 | B2 | 5/2021 | Kamath et al. |
| 11,064,917 | B2 | 7/2021 | Simpson et al. |
| 11,141,084 | B2 | 10/2021 | Funderburk et al. |
| 2005/0143636 | A1 | 6/2005 | Zhang et al. |
| 2006/0094945 | A1 | 5/2006 | Barman et al. |
| 2006/0258929 | A1 | 11/2006 | Goode, Jr. et al. |
| 2007/0299617 | A1 | 12/2007 | Willis |
| 2008/0172205 | A1 | 7/2008 | Breton et al. |
| 2009/0247857 | A1 | 10/2009 | Harper et al. |
| 2010/0230285 | A1 | 9/2010 | Hoss et al. |
| 2013/0150691 | A1 | 6/2013 | Pace et al. |
| 2014/0171771 | A1 | 6/2014 | Feldman et al. |
| 2016/0331283 | A1 | 11/2016 | Rao et al. |
| 2018/0235520 | A1 | 8/2018 | Rao et al. |
| 2019/0274598 | A1 | 9/2019 | Scott et al. |
| 2020/0196919 | A1 | 6/2020 | Rao et al. |
| 2021/0204841 | A1 | 7/2021 | Thomas et al. |

FOREIGN PATENT DOCUMENTS

| | | |
|---|---|---|
| EP | 3 626 158 A1 | 3/2020 |
| EP | 3 831 283 B1 | 6/2021 |
| WO | WO 2006/042811 A2 | 4/2006 |
| WO | WO 2010/091005 A1 | 8/2010 |
| WO | WO 2018/136898 A1 | 7/2018 |
| WO | WO 2019/222615 A1 | 11/2019 |
| WO | WO 2019/236850 A1 | 12/2019 |
| WO | WO 2019/236859 A1 | 12/2019 |
| WO | WO 2019/239258 A1 | 12/2019 |

OTHER PUBLICATIONS

Partial search Report corresponding to PCT/US2021/065791 mailed Apr. 14, 2022.
International Search Report and Written Opinion corresponding to PCT/US2021/065791 mailed Jun. 8, 2022.
Oppel et al., "The Dexcom glucose monitoring system—An isobornyl acrylate-free alternative for diabetic patients," Contact Dermatitis, 81(1), 32-36 (2019) XP071454418.
FreeStyle Navigator Continuous Glucose Monitoring System, Dept of Health & Human Services, Food and Drug Administration, Mar. 12, 2008, 8 pages.
Knobbe et al., Symposium Paper, "The Extended Kalman Filter for Continuous Glucose Monitoring," Diabetes Technology & Therapeutics, 7, 1, 15-27 (2005).
Annex B1—The Patent—EP 2 393 417 B1—Dec. 14, 2011, 48 pgs.
Annex C1—GS1 User Guide, Nov. 2023, 26 pgs.
Annex C2—GS1 Product Insert, Nov. 2023, 4 pgs.
Annex C3—GS1 Quick Start Guide, (Nov. 1, 2023), 3 pgs.
Annex C4—GS1 App User Guide, Oct. 2023, 49 pgs.
Annex F2—Announcement on website of the Defendants, Mar. 5, 2024, 7 pgs.
Cather, CGM Frustrations Survey, Dexcom, dated Jun. 2020, 37 pages.
Certified U.S. Pat. No. 11,000,216, issued on May 11, 2021, 86 pages.
Clinical Trials Competitor and Ecosystem Players, Abbott, dated Jun. 25, 2020, 29 pages.
Declaration of Karl R. Leinsing, MSME, PE, in Support of Abbott's Motion for Summary Judgment, executed on May 19, 2023, 81 pages.
Design Concepts, Project Status Update for Glucose Sensor Applicator, Dexcom, dated Apr. 21, 2014, 6 pages.
Email from Christopher Dougherty with slides re. Global Commercial Insights Meeting, Abbott, sent on Dec. 17, 2019 (69 pages).
Exhibit S8—Program—Diabetes Convention—Hamburg, Oct. 2-6, 2023, 326 pgs.
FreeStyle Libre 2 HCP Pulse, Mar. 2021 Report, Abbott, dated Apr. 13, 2021, 14 pages.
Seagrove Partners, GlobeviewTM, International Diabetes Device 2022 Blue Book, 143 pages.
"Abbott Received CE Mark for Freestyle® Libre, A Revolutionary Glucose Monitoring System for People with Diabetes," 8 pages (2023).
ATTD Program, 4 pages (2009).
Boise, Interview with Dexcom CEO, Dexcom CEO Kevin Sayer Explains G6, 9 pages (2018).
Dexcom G6 Continuous Glucose Monitoring System User Guide, 7 pages (2020).
Dexcom (DXCM) Company Profile, 2017 /Q4 Earnings call transcript, 12 pages (2017).
Email communication from Sophie Hood, Jan. 24, 2023, 6 pages.
Hall, Interview with Kevin Sayer, President and CEO of Dexcom About The New Dexcom G6, College Diabetes Network, 6 pages (2021).
Hoss et al., "Continuous glucose monitoring in the tissue: Do we really need to calibrate in-vivo?," Diabetes Technology & Therapeutics, vol. 11, No. 2, (2009).
Sayer, CGMS Changing Diabetes Management: Kevin Sayer, DIC Interview Transcript, Featuring Steve Freed, 11 pages (2019).
S&P Global Market Intelligence "DexCom, Inc. NasdaqGS:DXCM, Company Conference Presentation," 17 pages (2021).
S&P Global Market Intelligence "DexCom, Inc. NasdaqGS:DXCM, Company Conference Presentation," 10 pages (2020).
S&P Global Market Intelligence "DexCom, Inc. NasdaqGS:DXCM, Company Conference Presentation," 11 pages (2019).
Sonix, Dexcom CEO—Prime Position in Our Market—Mad Money—CNBC.mp4, 4 pages (2023).
U.S. Food & Drug Administration, "Deciding When to Submit a 510(k) for a Change to an Existing Device, Guidance for Industry and Food and Drug Administration Staff," 78 pages (2017).
U.S. Food & Drug Administration, "Deciding When to Submit a 510(k) for a Change to an Existing Device, Guidance for Industry and Food and Drug Administration Staff," 32 pages (2017).
Watkin, "An Introduction to Flash Glucose Monitoring," 16 pages (2013).
*Abbott Diabetes Care Inc. f/k/a TheraSense, Inc et al v. DexCom, Inc.*, 1-21-cv-00977, Exhibit 182 to Dkt. No. 433 (Jun. 23, 2023).

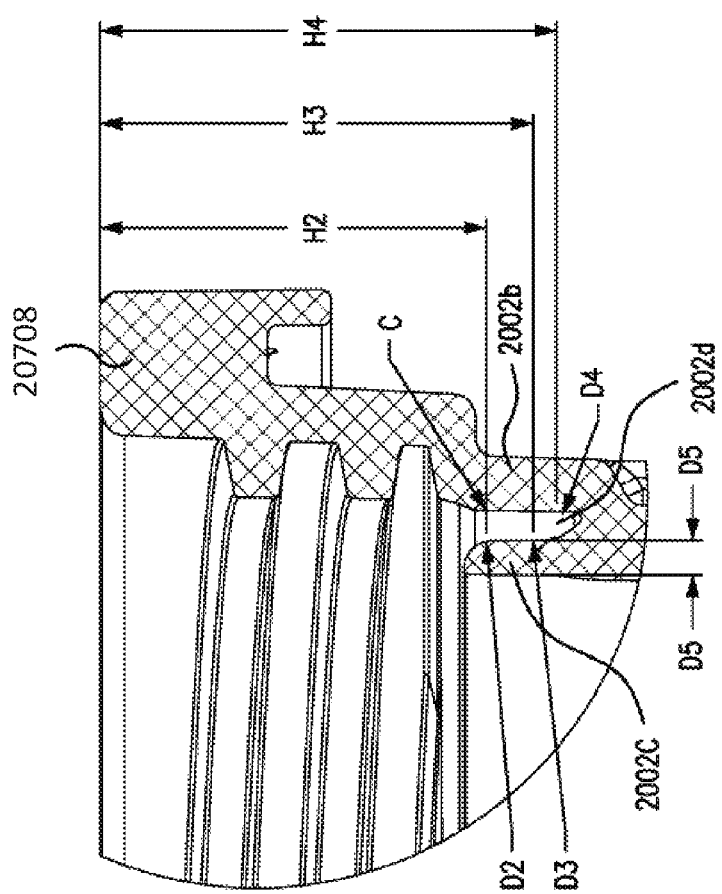

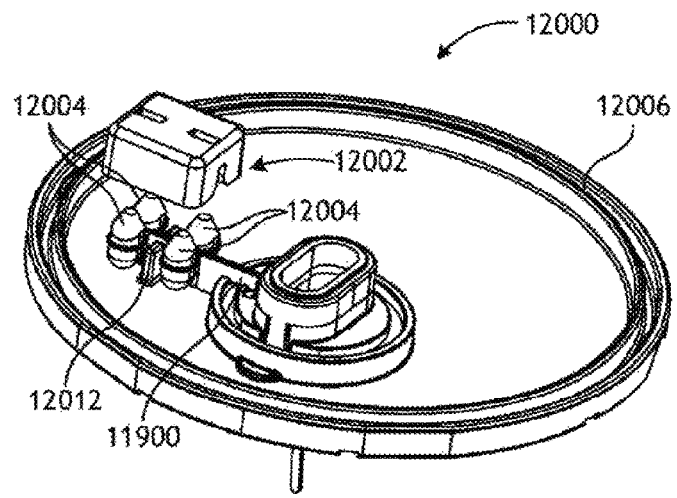
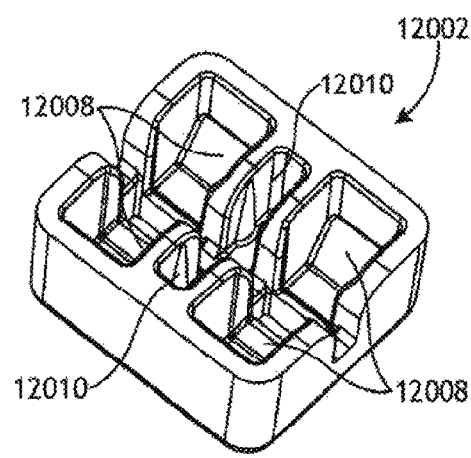
FIG. 16B
FIG. 16C
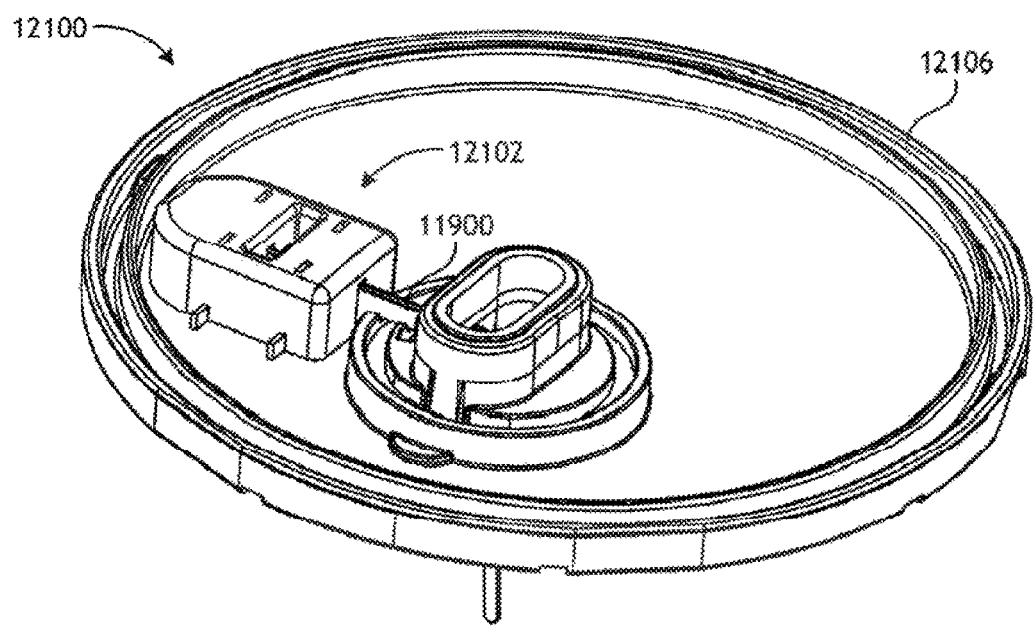
FIG. 16D

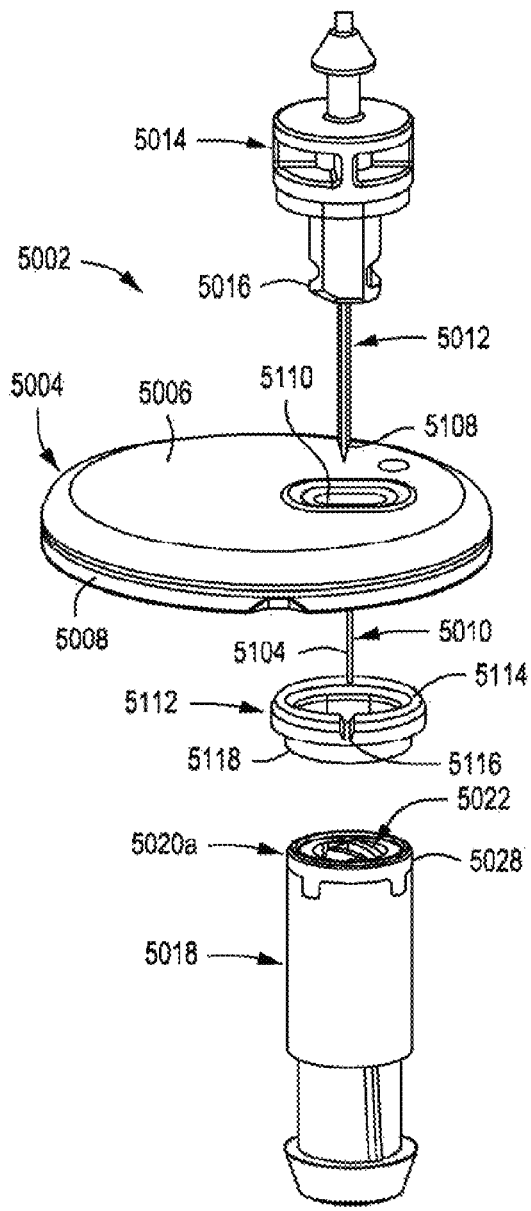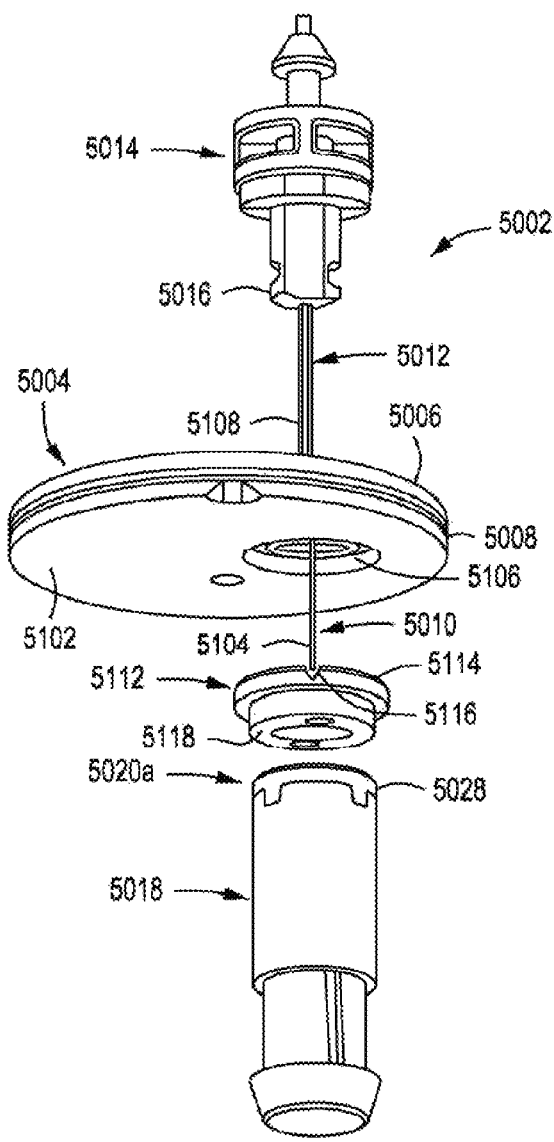
FIG. 19A
FIG. 19B

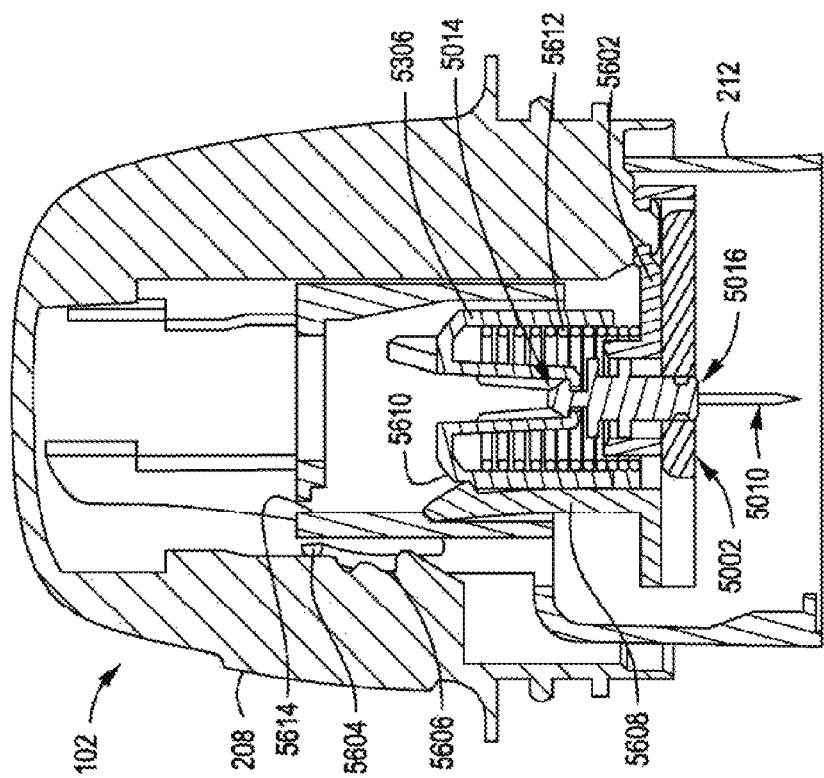
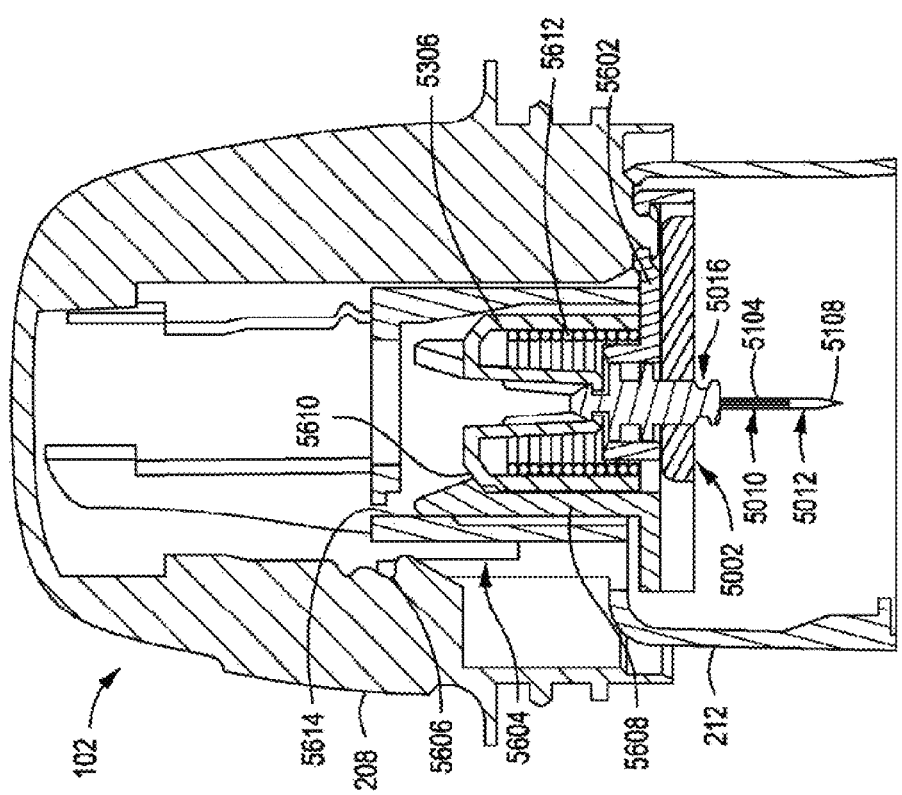

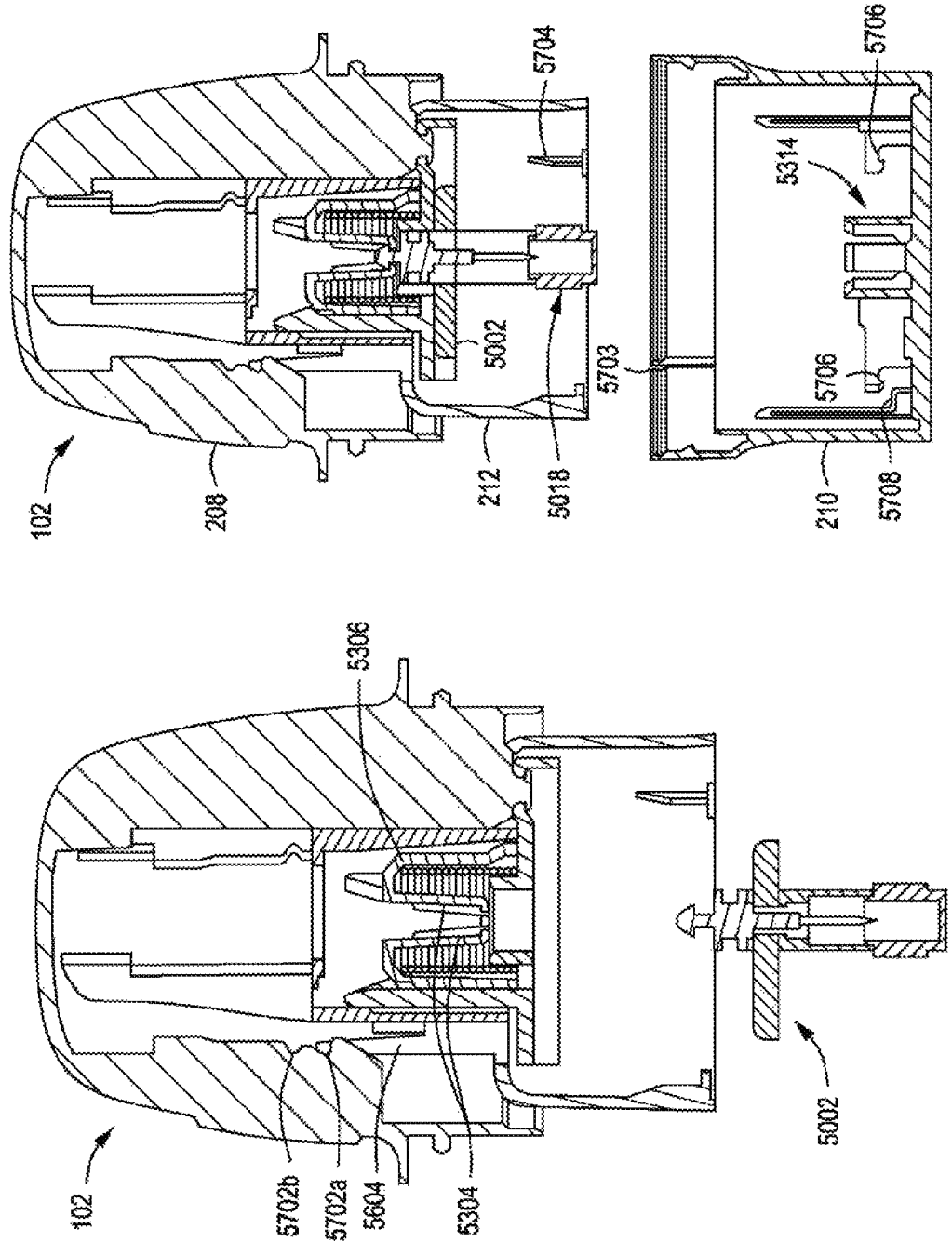

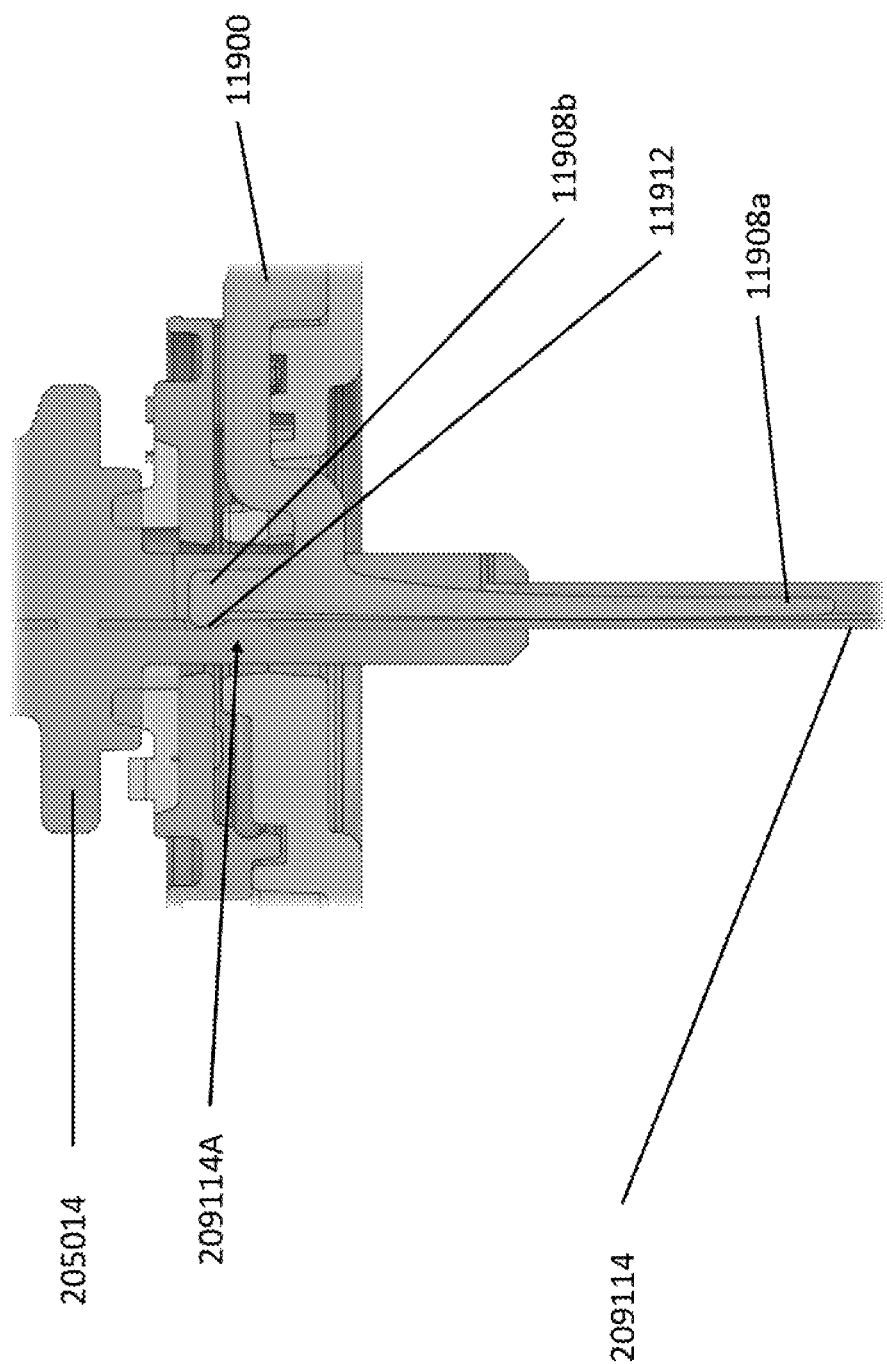

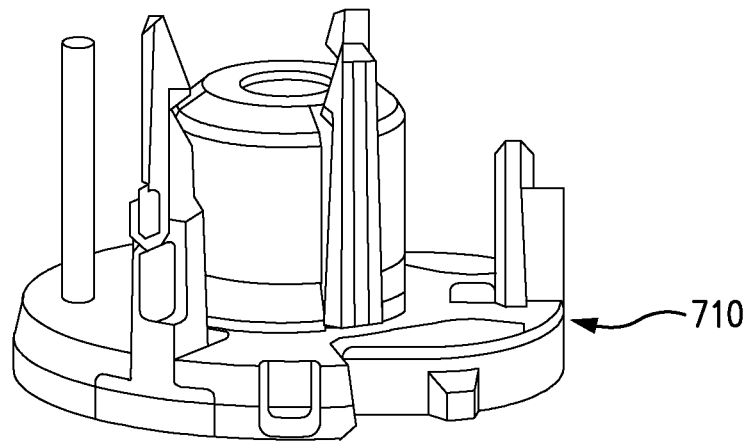
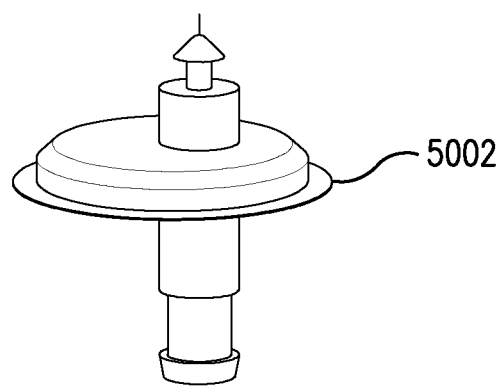
FIG. 45C
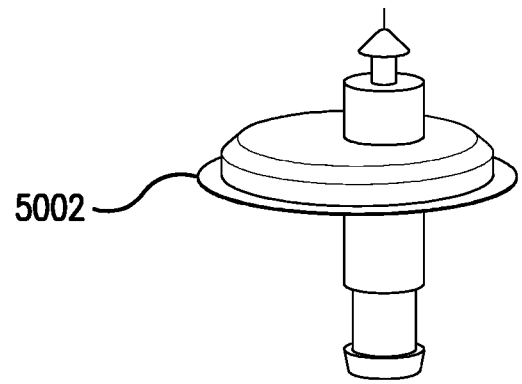
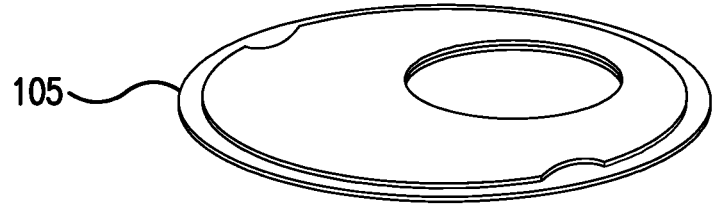
FIG. 45D

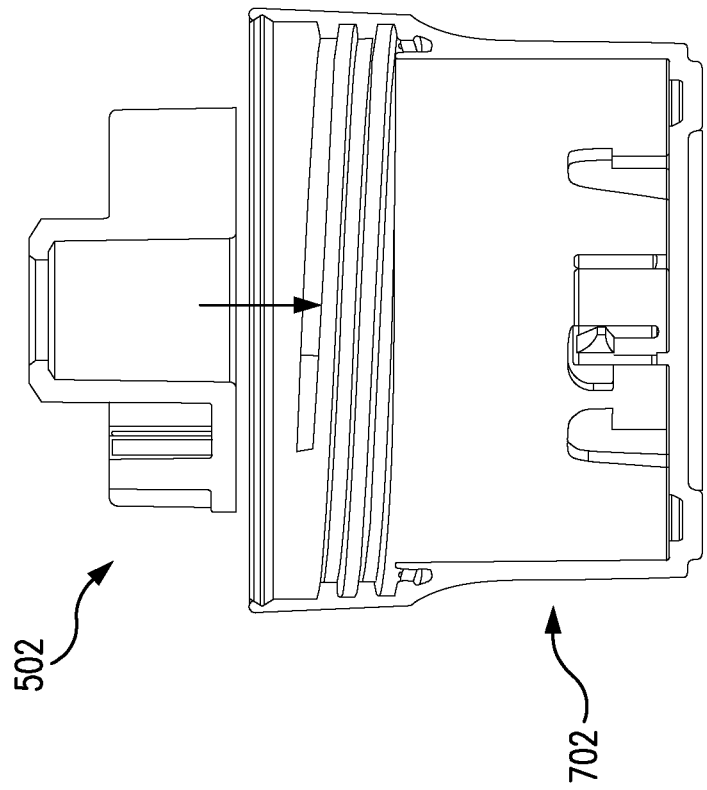
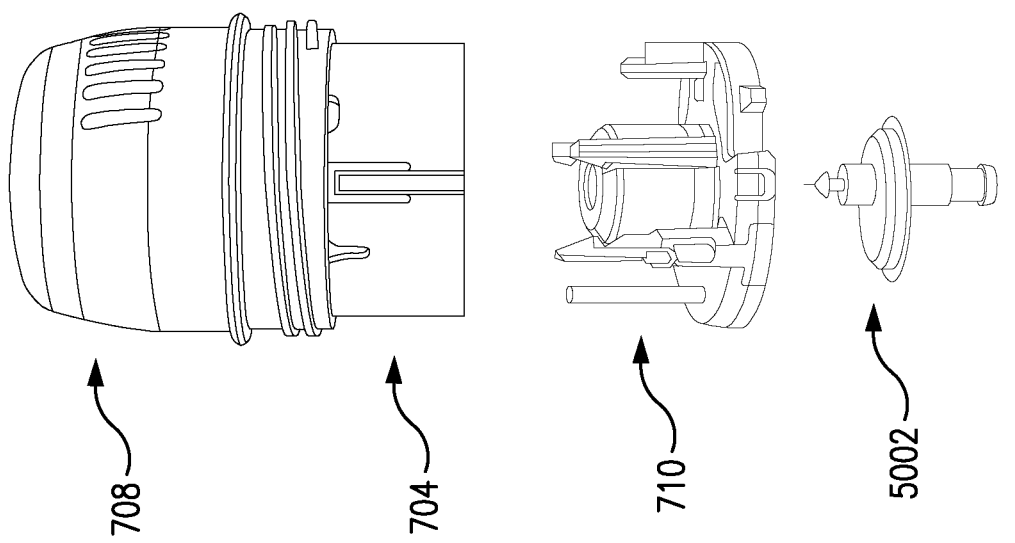
FIG. 45H
FIG. 45G

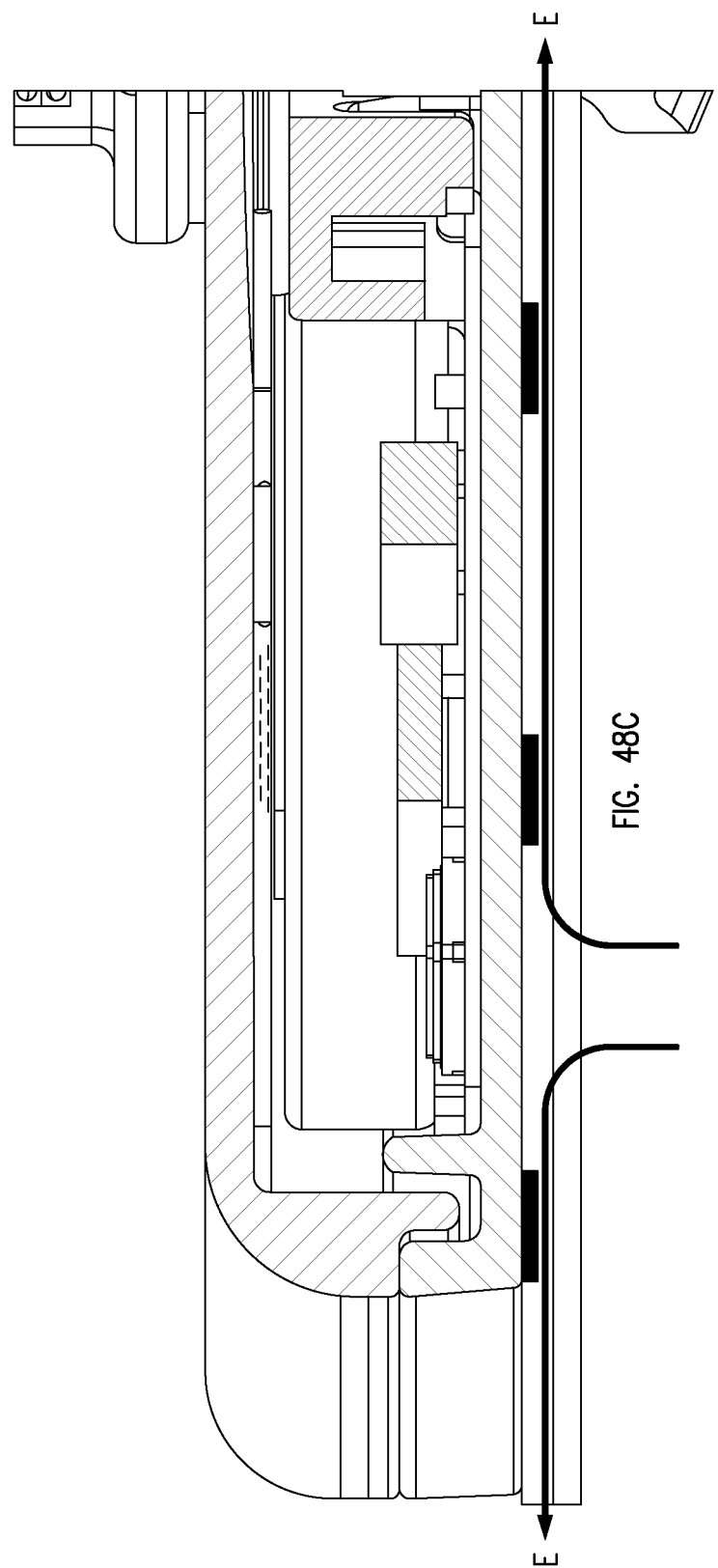

SYSTEMS, DEVICES, AND METHODS FOR ANALYTE MONITORING

CROSS-REFERENCE TO RELATED APPLICATIONS

This application claims priority to U.S. Provisional Application No. 63/132,075, filed Dec. 30, 2020, and U.S. Provisional Application No. 63/182,511, filed Apr. 30, 2021, the contents of each of which are incorporated herein by reference in their entireties, and to each of which priority is claimed.

FIELD

The subject matter described herein relates generally to systems, devices, and methods for in vivo analyte monitoring.

BACKGROUND

The detection and/or monitoring of analyte levels, such as glucose, ketones, lactate, oxygen, hemoglobin AlC, or the like, can be vitally important to the health of an individual having diabetes. Patients suffering from diabetes mellitus can experience complications including loss of consciousness, cardiovascular disease, retinopathy, neuropathy, and nephropathy. Diabetics are generally required to monitor their glucose levels to ensure that they are being maintained within a clinically safe range, and may also use this information to determine if and/or when insulin is needed to reduce glucose levels in their bodies, or when additional glucose is needed to raise the level of glucose in their bodies.

Growing clinical data demonstrates a strong correlation between the frequency of glucose monitoring and glycemic control. Despite such correlation, however, many individuals diagnosed with a diabetic condition do not monitor their glucose levels as frequently as they should due to a combination of factors including convenience, testing discretion, pain associated with glucose testing, and cost.

To increase patient adherence to a plan of frequent glucose monitoring, in vivo analyte monitoring systems can be utilized, in which a sensor control device may be worn on the body of an individual who requires analyte monitoring. To increase comfort and convenience for the individual, the sensor control device may have a small form-factor, and can be assembled and applied by the individual with a sensor applicator. The application process includes inserting a sensor, such as a dermal sensor that senses a user's analyte level in a bodily fluid located in the dermal layer of the human body, using an applicator or insertion mechanism, such that the sensor comes into contact with a bodily fluid. The sensor control device may also be configured to transmit analyte data to another device, from which the individual or her health care provider ("HCP") can review the data and make therapy decisions.

While current sensors can be convenient for users, they are also susceptible to malfunctions due to improper insertion. These malfunctions can be caused by user error, lack of proper training, poor user coordination, overly complicated procedures, and other issues. This can be particularly true for analyte monitoring systems having dermal sensors, which are typically of smaller scale relative to sensors used to measure an analyte level in an interstitial fluid ("ISF"), and which are inserted using sharps (also known as "introducers" or "needles") that are shorter than those used for ISF sensors. Some prior art systems, for example, may rely too much on the precision assembly and deployment of a sensor control device and an applicator by the individual user. Other prior art systems may utilize sharp insertion and retraction mechanisms that are susceptible to premature withdrawal before the sensor can be properly implanted. In addition, with respect to dermal sensors, some prior art systems may utilize sharps that are not optimally configured to create an insertion path in the dermal layer without creating trauma to surrounding tissue. These challenges and others described herein can lead to improperly inserted or damaged sensors, and consequently, a failure to properly monitor the patient's analyte level.

Current sensor control devices are available as wearable skin-adhesive patches. Such wearable devices must be sufficiently durable to survive repeated performance of everyday activities for the wear time of the sensor. Many glucose sensors are used and worn for 7-10 days, though sensors can be used and worn for up to 14 days. Some users experience adverse skin reactions at the site of sensor placement. Such skin reactivity is a serious consequence and may lead to a person with diabetes discontinuing use of the wearable skin-adhesive patch. One such way of decreasing reactivity of the skin is by removing moisture from underneath the adhesive patch, and increasing permeability of moisture through the adhesive patch. In particular, the sensor control device includes an adhesive patch which can be constructed to drain fluid and/or enhance breathability of the skin directly underneath the adhesive patch of the sensor control device. Skin of the human body continually excretes fluids, in particular perspiration from sweat glands and oils from sebaceous glands. Furthermore, during regular washing of the human body, a user can trap external water or debris beneath the adhesive patch, or within an internal keyhole opening of the electronics housing for extended periods of time. For example, water may become trapped within a central opening of the adhesive patch. The central opening of the adhesive patch is configured to receive a sharp protruding from the electronics housing and completely covered by a bottom surface of the electronics housing. Accumulation of water or debris beneath the electronics housing and/or adhesive patch can lead to maceration of the skin underneath the patch, and reduce wear time of the sensor control device. Thus, a need exists for sensor control devices, systems and methods, that provide for drainage of fluid and/or breathability of the skin.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter is directed to a sensor control device for analyte monitoring. The sensor control device includes an electronics housing having a shell defining a top surface of the electronics housing and a mount defining a bottom surface of the electronics housing. The sensor control device further includes an adhesive patch defining a central opening coupled to the bottom surface of the electronics housing. The adhesive patch includes a first layer facing the mount and a second layer configured to face a skin of a user. The first layer includes a first aperture and the second layer includes a second aperture. The first aperture aligned with the second aperture forming the central opening along a vertical axis of the sensor control device. The first layer or the second layer includes laser cut slots or laser cut holes configured for drainage of fluid or breathability of the skin. In certain embodiments, the first layer and/or the second layer can include an adhesive.

The first layer of the adhesive patch can have a top surface directly in contact with an underside of the mount of the electronics housing. The underside of the mount can be generally smooth. The first layer can include a top surface and a bottom surface each comprising an adhesive. The first layer can comprise three films including a synthetic rubber adhesive blend, a scrim, and an acrylic adhesive. The top surface of the first layer can include the synthetic rubber adhesive blend. The bottom surface of the first layer can include the acrylic adhesive. The scrim can be sandwiched between the synthetic rubber adhesive blend and the acrylic adhesive.

In certain embodiments, the adhesive does not include isobornyl acrylate (IBOA) or an acrylate. In certain embodiments, the adhesive that does not include IBOA can include an oligomer, a monomer, a photoinitiator and an additive. For example, but not by way of limitation, the additive can include a stabilizer, a tackifier, a color pigment, a dye, a defoamer, an adhesion promoter, a flatting agent, a filler, an antioxidant, a plasticizer, a silane coupling agent, a rheological control agent, a wetting agent, a slip aid or a combination thereof. In certain embodiments, the adhesive has a glass transition temperature of about 40° C. or greater.

The first layer can include laser cut slots extending from the first aperture to an outer periphery of the first layer. The laser cut slots can penetrate completely through the first layer and be continuous with the first aperture in the first layer.

In accordance with another aspect of the disclosed subject matter, the first layer or second layer can include laser cut holes configured so that fluid in an area of the skin underneath the adhesive patch can evaporate directly through the laser cut holes in the first layer or second layer. The laser cut holes can be evenly spaced apart over an entirety of the first layer and an entirety of the second layer. The laser cut holes can be evenly spaced apart over only a portion of the first layer, and a remaining portion of the first layer may not include laser cut holes. The laser cut holes can be evenly spaced apart over only a portion of the first layer between the first aperture and an outer periphery of the first layer. The second layer can comprise two films, the two films can be an adhesive and a nonwoven material. The sensor control device can further include a mesh forming a gap between the mount and the adhesive patch thereby allowing fluid in an area of the skin underneath the adhesive patch to evaporate directly from the skin. The first layer or second layer includes laser cut holes. The mesh can be in direct contact with an underside of the mount of the electronics housing. The mesh can include a first array of hydrophobic threads and a second array of hydrophobic threads. The first array of hydrophobic threads can be perpendicular to the second array of hydrophobic threads. The mesh can include a first mesh portion and a second mesh portion, the first mesh portion can be discontinuous from the second mesh portion. The first aperture, second aperture and central opening can be configured to receive a sharp protruding from the electronics housing. The first aperture, second aperture and central opening can be configured to receive an analyte sensor protruding from the electronics housing.

In accordance with another aspect of the disclosed subject matter, an adhesive patch for a sensor control device is provided. The adhesive patch includes a first layer facing a sensor control device. A second layer is configured to face a skin of a user. The first layer has a first aperture and the second layer has a second aperture. The first aperture is aligned with the second aperture forming the central opening of the adhesive patch along a vertical axis of the sensor control device. The first layer or second layer includes laser cut slots and/or laser cut holes configured for drainage of fluid or breathability of the skin.

The first layer can include three films such as a first film comprising an adhesive forming a top surface of the first layer, a second film comprising a scrim, and a third film forming a bottom surface of the first layer. The third film can include an adhesive different from the adhesive of the first film. The second layer can include two films such as an adhesive and a nonwoven material.

The present disclosure further provides a sensor control device for analyte monitoring that includes an electronics housing including a shell and a mount mated to the shell. The sensor device further includes a circuit board disposed within the electronics housing and including a plurality of electronics modules and an analyte sensor coupled with the circuit board and configured to measure an analyte level. In certain embodiments, the sensor control device further includes an adhesive patch attached to an underside of the mount and configured to secure the sensor control device on a user's skin. The adhesive patch further includes an adhesive that does not include IBOA or an acrylate.

In certain embodiments, a sensor control device for analyte monitoring comprises an electronics housing including a shell and a mount. In certain embodiments, the sensor control device further includes a circuit board disposed within the electronics housing and including a plurality of electronics modules and an analyte sensor coupled with the circuit board and configured to measure an analyte level. In certain embodiments, the sensor control device further includes an adhesive patch attached to an underside of the mount and configured to secure the sensor control device on a user's skin. In certain embodiments, (i) the mount is mated to the shell with an adhesive that does not include IBOA or an acrylate, (ii) the circuit board is mated to the mount with an adhesive that does not include IBOA or an acrylate, (iii) the circuit board is mated to the electronic housing with an adhesive that does not include IBOA or an acrylate and/or (iv) the circuit board is mated to the shell with an adhesive that does not include IBOA or an acrylate.

It is to be understood that both the foregoing general description and the following detailed description are exemplary and are intended to provide further explanation of the disclosed subject matter claimed. The accompanying drawings, which are incorporated in and constitute part of this specification, are included to illustrate and provide a further understanding of the systems and methods of the disclosed subject matter. Together with the description, the drawings serve to explain the principles of the disclosed subject matter.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 7R-S are enlarged cross-sectional side views of the housing and cap, respectively, in accordance with the disclosed subject matter.

FIG. 8I is a close-up view of a rib of the sheath of FIG. 8I and the rib's engagement with a sensor carrier, in accordance with the disclosed subject matter.

FIGS. 16A and 16B are isometric and partially exploded isometric views of an example connector assembly, according to one or more embodiments.

FIG. 16C is an isometric bottom view of the connector of FIGS. 16A-16B.

FIGS. 16D and 16E are isometric and partially exploded isometric views of another example connector assembly, according to one or more embodiments.

FIGS. 19A and 19B are exploded isometric top and bottom views, respectively, of the sensor control device of FIGS. 18A-18B.

FIGS. 24A and 24B are cross-sectional side views of the sensor applicator ready to deploy the sensor control device to a target monitoring location.

FIGS. 25A-25C are progressive cross-sectional side views showing assembly and disassembly of an example embodiment of the sensor applicator with the sensor control device of FIGS. 18A-18B.

FIG. 38B is a side cross-sectional view of a sharp hub, sharp, and sensor, with the sensor in an unbiased position, in accordance with the disclosed subject matter.

FIGS. 45A-45K illustrate steps of a process for assembling an applicator.

FIG. 48C is the side cross-sectional view of the exemplary adhesive patch and example sensor control device of FIG. 48A.

FIGS. 49A-49C illustrate isometric top views of components of the adhesive patch of FIG. 46.

FIGS. 50A-50C illustrate isometric top views of an alternative arrangement of components of the adhesive patch of FIG. 46.

FIGS. 51A and 51B are isometric exploded top and bottom views, respectively, of an exemplary sensor control device.

FIG. 52A-52C are assembly and cross-sectional views of an on-body device including an integrated connector for the sensor assembly.

FIGS. 53A and 53B are side and cross-sectional side views, respectively, of an example embodiment of the sensor applicator of FIG. 1A with the cap of FIG. 2C coupled thereto.

FIG. 54 is a graph depicting an example of an in vitro sensitivity of an analyte sensor.

FIG. 55 is a diagram illustrating example operational states of the sensor according to exemplary embodiments of the disclosed subject matter.

FIG. 56 is a diagram illustrating an example operational and data flow for over-the-air programming of a sensor according to the disclosed subject matter.

FIG. 57 is a diagram illustrating an example data flow for secure exchange of data between two devices according to the disclosed subject matter.

DETAILED DESCRIPTION

Figure 1A:
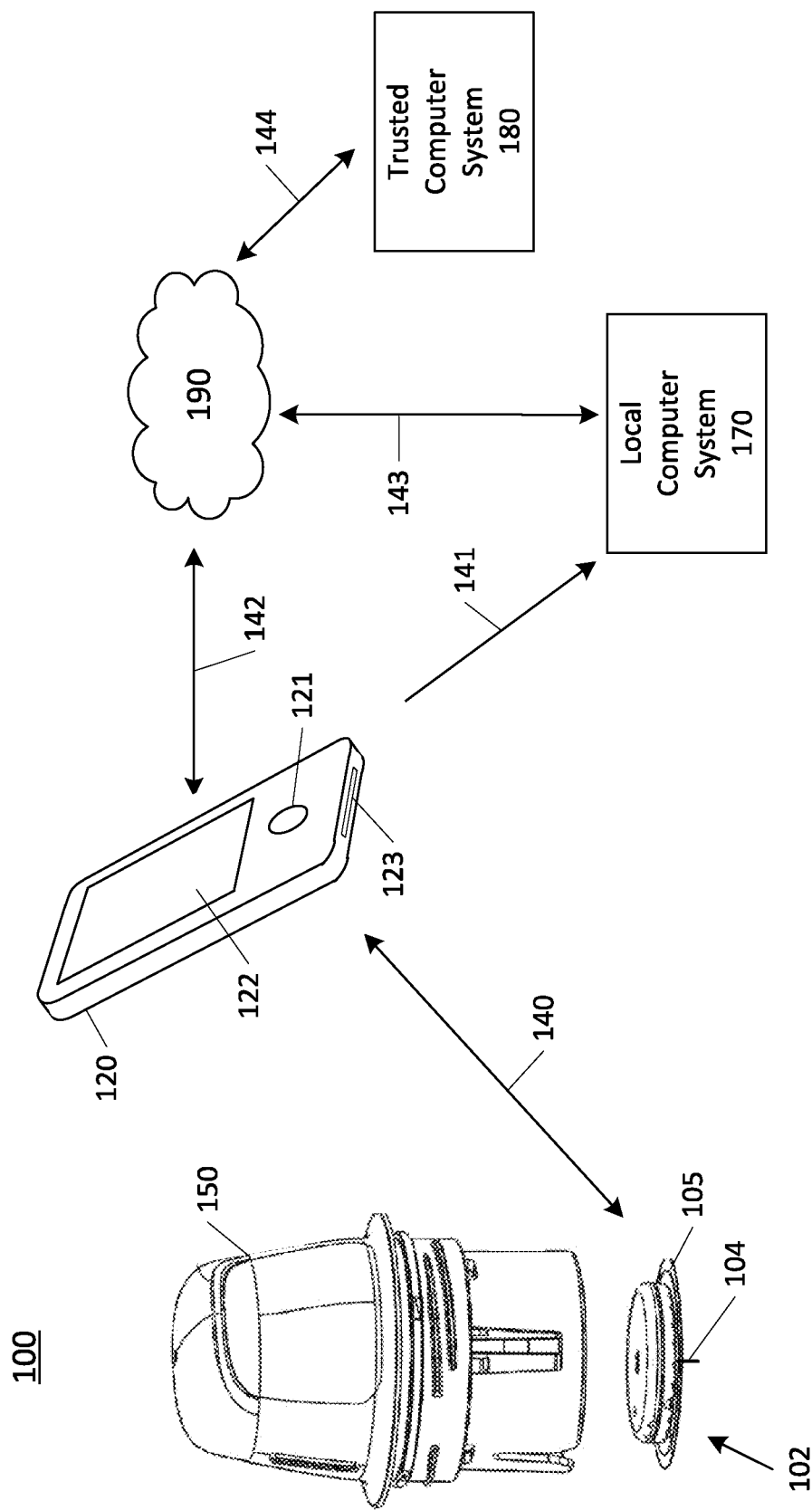
FIG. 1A is a system overview of a sensor applicator, reader device, monitoring system, network, and remote system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

Generally, embodiments of the present disclosure include systems, devices, and methods for the use of analyte sensor insertion applicators for use with in vivo analyte monitoring systems. An applicator can be provided to the user in a sterile package with an electronics housing of the sensor control device contained therein. According to some embodiments, a structure separate from the applicator, such as a container, can also be provided to the user as a sterile package with a sensor module and a sharp module contained therein. The user can couple the sensor module to the electronics housing, and can couple the sharp to the applicator with an assembly process that involves the insertion of the applicator into the container in a specified manner. In other embodiments, the applicator, sensor control device, sensor module, and sharp module can be provided in a single package. The applicator can be used to position the sensor control device on a human body with a sensor in contact with the wearer's bodily fluid. The embodiments provided herein are improvements to reduce the likelihood that a sensor is improperly inserted or damaged, or elicits an adverse physiological response. Other improvements and advantages are provided as well. The various configurations of these devices are described in detail by way of the embodiments which are only examples.

Furthermore, many embodiments include in vivo analyte sensors structurally configured so that at least a portion of the sensor is, or can be, positioned in the body of a user to obtain information about at least one analyte of the body. It should be noted, however, that the embodiments disclosed herein can be used with in vivo analyte monitoring systems that incorporate in vitro capability, as well as purely in vitro or ex vivo analyte monitoring systems, including systems that are entirely non-invasive.

Furthermore, for each and every embodiment of a method disclosed herein, systems and devices capable of performing each of those embodiments are covered within the scope of the present disclosure. For example, embodiments of sensor control devices are disclosed and these devices can have one or more sensors, analyte monitoring circuits (e.g., an analog circuit), memories (e.g., for storing instructions), power sources, communication circuits, transmitters, receivers, processors and/or controllers (e.g., for executing instructions) that can perform any and all method steps or facilitate the execution of any and all method steps. These sensor control device embodiments can be used and can be capable of use to implement those steps performed by a sensor control device from any and all of the methods described herein.

Furthermore, the systems and methods presented herein can be used for operations of a sensor used in an analyte monitoring system, such as but not limited to wellness, fitness, dietary, research, information or any purposes involving analyte sensing over time. As used herein, "analyte sensor" or "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors, or any other sensors for collecting physical or biological information. Analytes measured by the analyte sensors can include, by way of example and not limitation, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, etc. As mentioned, a number of embodiments of systems, devices, and methods are described herein that provide for the improved assembly and use of dermal sensor insertion devices for use with in vivo analyte monitoring systems. In particular, several embodiments of the present disclosure are designed to improve the method of sensor insertion with respect to in vivo analyte monitoring systems and, in particular, to prevent the premature retraction of an insertion sharp during a sensor insertion process. Some embodiments, for example, include a dermal sensor insertion mechanism with an increased firing velocity and a delayed sharp retraction. In other embodiments, the sharp retraction mechanism can be motion-actuated such that the sharp is not retracted until the user pulls the applicator away from the skin. Consequently, these embodiments can reduce the likelihood of prematurely withdrawing an insertion sharp during a sensor insertion process; decrease the likelihood of improper sensor insertion; and decrease the likelihood of damaging a sensor during the sensor insertion process, to name a few advantages. Several embodiments of the present disclosure also provide for improved insertion sharp modules to account for the small scale of dermal sensors and the relatively shallow insertion path present in a subject's dermal layer. In addition, several embodiments of the present disclosure are designed to prevent undesirable axial and/or rotational movement of applicator components during sensor insertion. Accordingly, these embodiments can reduce the likelihood of instability of a positioned dermal sensor, irritation at the insertion site, damage to surrounding tissue, and breakage of capillary blood vessels resulting in fouling of the dermal fluid with blood, to name a few advantages. In addition, to mitigate inaccurate sensor readings which can be caused by trauma at the insertion site, several embodiments of the present disclosure can reduce the end-depth penetration of the needle relative to the sensor tip during insertion.

Before describing these aspects of the embodiments in detail, however, it is first desirable to describe examples of devices that can be present within, for example, an in vivo analyte monitoring system, as well as examples of their operation, all of which can be used with the embodiments described herein.

There are various types of in vivo analyte monitoring systems. "Continuous Analyte Monitoring" systems (or "Continuous Glucose Monitoring" systems), for example, can transmit data from a sensor control device to a reader device continuously without prompting, e.g., automatically according to a schedule. "Flash Analyte Monitoring" systems (or "Flash Glucose Monitoring" systems or simply "Flash" systems), as another example, can transfer data from a sensor control device in response to a scan or request for data by a reader device, such as with a Near Field Communication (NFC) or Radio Frequency Identification (RFID) protocol. In vivo analyte monitoring systems can also operate without the need for finger stick calibration.

In vivo analyte monitoring systems can be differentiated from "in vitro" systems that contact a biological sample outside of the body (or "ex vivo") and that typically include a meter device that has a port for receiving an analyte test strip carrying bodily fluid of the user, which can be analyzed to determine the user's blood sugar level.

In vivo monitoring systems can include a sensor that, while positioned in vivo, makes contact with the bodily fluid of the user and senses the analyte levels contained therein. The sensor can be part of the sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This device, and variations thereof, can be referred to as a "handheld reader device," "reader device" (or simply a "reader"), "handheld electronics" (or simply a "handheld"), a "portable data processing" device or unit, a "data receiver," a "receiver" device or unit (or simply a "receiver"), or a "remote" device or unit, to name a few. Other devices such as personal computers have also been utilized with or incorporated into in vivo and in vitro monitoring systems.

Exemplary in Vivo Analyte Monitoring System

FIG. 1A is a conceptual diagram depicting an example embodiment of an analyte monitoring system 100 that includes a sensor applicator 150, a sensor control device 102, and a reader device 120. Here, sensor applicator 150 can be used to deliver sensor control device 102 to a monitoring location on a user's skin where a sensor 104 is maintained in position for a period of time by an adhesive patch 105. Sensor control device 102 is further described in FIGS. 2B and 2C, and can communicate with reader device 120 via a communication path 140 using a wired or wireless technique. Example wireless protocols include Bluetooth, Bluetooth Low Energy (BLE, BTLE, Bluetooth SMART, etc.), Near Field Communication (NFC) and others. Users can monitor applications installed in memory on reader device 120 using screen 122 and input 121 and the device battery can be recharged using power port 123. More detail about reader device 120 is set forth with respect to FIG. 2A below. Reader device 120 can communicate with local computer system 170 via a communication path 141 using a wired or wireless technique. Local computer system 170 can include one or more of a laptop, desktop, tablet, phablet, smartphone, set-top box, video game console, or other computing device and wireless communication can include any of a number of applicable wireless networking protocols including Bluetooth, Bluetooth Low Energy (BTLE), Wi-Fi or others. Local computer system 170 can communicate via communications path 143 with a network 190 similar to how reader device 120 can communicate via a communications path 142 with network 190, by wired or wireless technique as described previously. Network 190 can be any of a number of networks, such as private networks and public networks, local area or wide area networks, and so forth. A trusted computer system 180 can include a server and can provide authentication services and secured data storage and can communicate via communications path 144 with network 190 by wired or wireless technique.

Figure 1B:
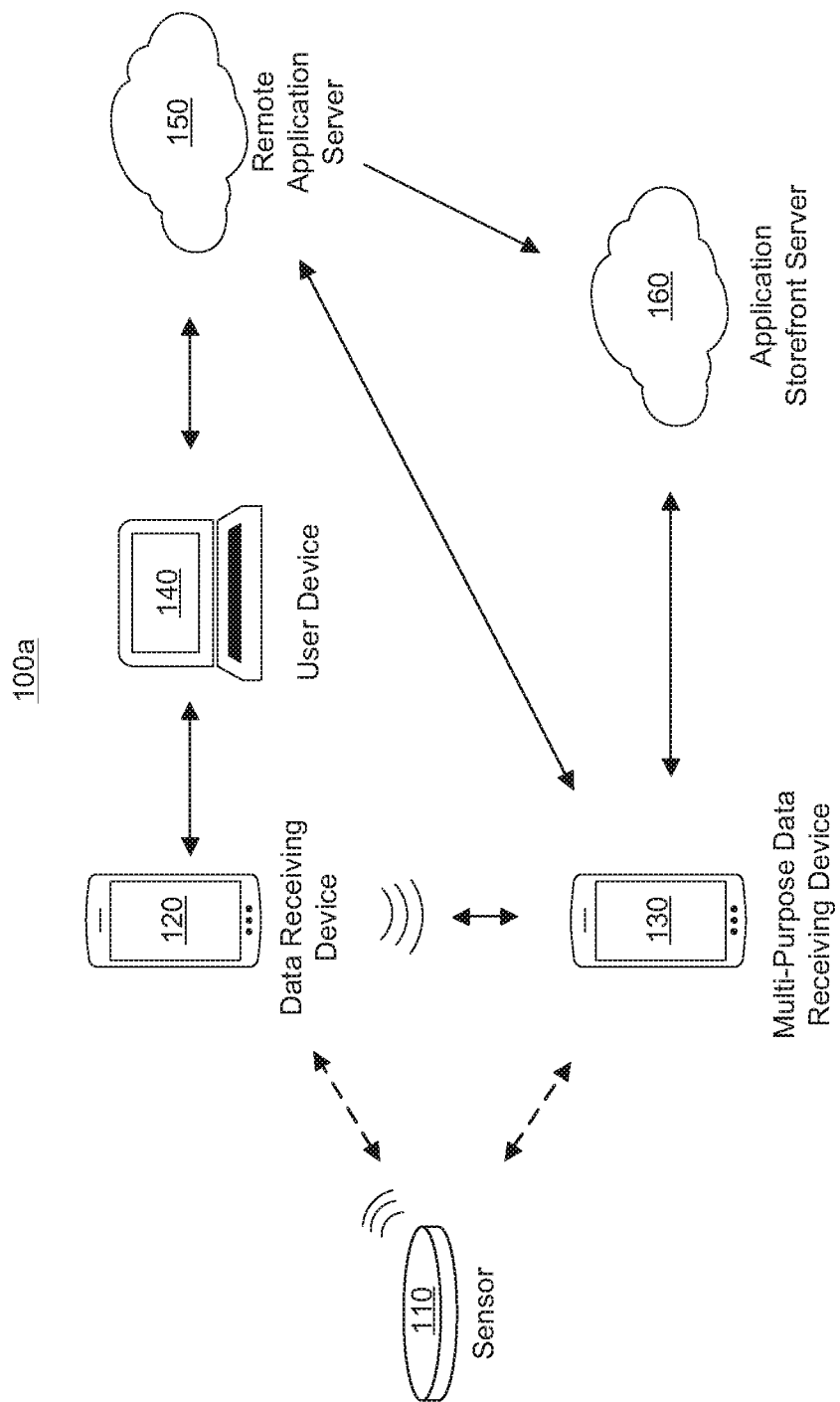
FIG. 1B is a diagram illustrating an operating environment of an example analyte monitoring system for use with the techniques described herein.

FIG. 1B illustrates an operating environment of an analyte monitoring system 100a capable of embodying the techniques described herein. The analyte monitoring system 100a can include a system of components designed to provide monitoring of parameters, such as analyte levels, of a human or animal body or can provide for other operations based on the configurations of the various components. As embodied herein, the system can include a low-power analyte sensor 110, or simply "sensor" worn by the user or attached to the body for which information is being collected. As embodied herein, the analyte sensor 110 can be a sealed, disposable device with a predetermined active use lifetime (e.g., about 1 day, about 14 days, about 20 days, about 25 days, about 30 days, etc.). In certain embodiments, components of an analyte sensor disclosed herein can improve the lifetime of the sensor, e.g., by use of a breathable patch. Sensors 110 can be applied to the skin of the user body and remain adhered over the duration of the sensor lifetime or can be designed to be selectively removed and remain functional when reapplied. The low-power analyte monitoring system 100a can further include a data reading device 120 or multi-purpose data receiving device 130 configured as described herein to facilitate retrieval and delivery of data, including analyte data, from the analyte sensor 110.

As embodied herein, the analyte monitoring system 100a can include a software or firmware library or application provided, for example via a remote application server 150 or application storefront server 160, to a third-party and incorporated into a multi-purpose hardware device 130 such as a mobile phone, tablet, personal computing device, or other similar computing device capable of communicating with the analyte sensor 110 over a communication link. Multi-purpose hardware can further include embedded devices, including, but not limited to insulin pumps or insulin pens, having an embedded library configured to communicate with the analyte sensor 110. Although the illustrated embodiments of the analyte monitoring system 100a include only one of each of the illustrated devices, this disclosure contemplates the analyte monitoring system 100a incorporate multiples of each components interacting throughout the system. For example, and without limitation, as embodied herein, data reading device 120 and/or multi-purpose data receiving device 130 can include multiples of each. As embodied herein, multiple data receiving devices 130 can communicate directly with sensor 110 as described herein. Additionally or alternatively, a data receiving device 130 can communicate with secondary data receiving devices 130 to provide analyte data, or visualization or analysis of the data, for secondary display to the user or other authorized parties.

Exemplary Reader Device

Figure 2A:
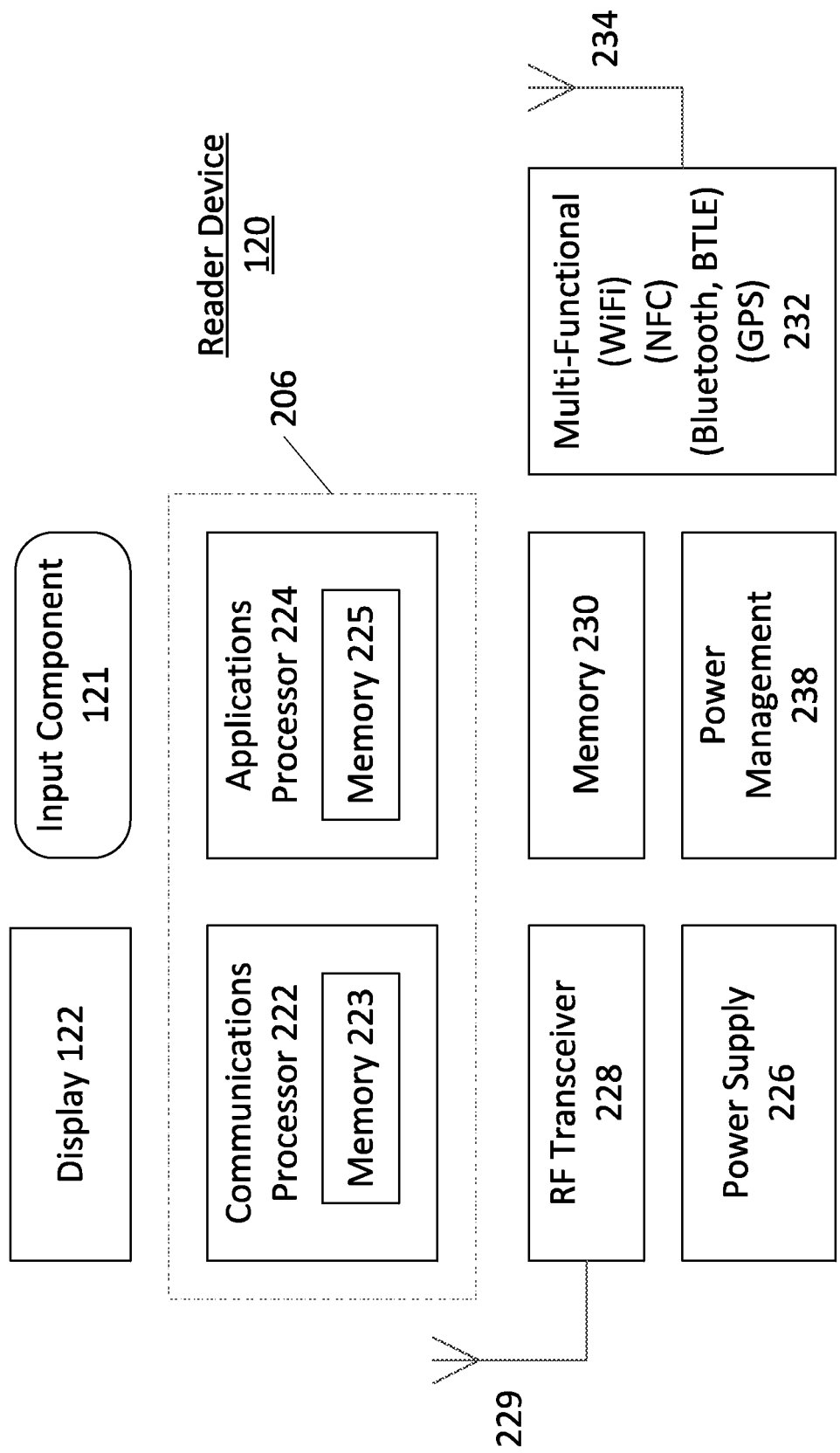
FIG. 2A is a block diagram depicting an example embodiment of a reader device.

FIG. 2A is a block diagram depicting an example embodiment of a reader device configured as a smartphone. Here, reader device 120 can include a display 122, input component 121, and a processing core 206 including a communications processor 222 coupled with memory 223 and an applications processor 224 coupled with memory 225. Also included can be separate memory 230, RF transceiver 228 with antenna 229, and power supply 226 with power management module 238. Further included can be a multi-functional transceiver 232 which can communicate over Wi-Fi, NFC, Bluetooth, BTLE, and GPS with an antenna 234. As understood by one of skill in the art, these components are electrically and communicatively coupled in a manner to make a functional device.

Exemplary Data Receiving Device Architecture

Figure 2B:
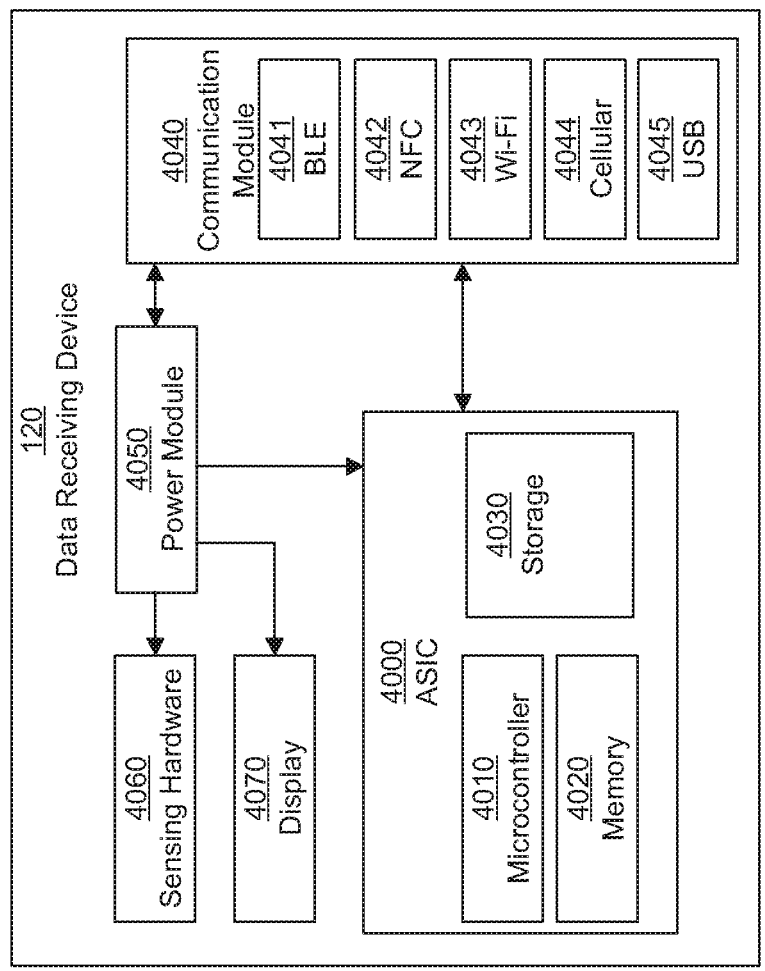
FIG. 2B is a block diagram illustrating an example data receiving device for communicating with the sensor according to exemplary embodiments of the disclosed subject matter.

For purpose of illustration and not limitation, reference is made to the exemplary embodiment of a data receiving device 120 for use with the disclosed subject matter as shown in FIG. 2B. The data receiving device 120, and the related multi-purpose data receiving device 130, includes components germane to the discussion of the analyte sensor 110 and its operations and additional components can be included. In particular embodiments, the data receiving device 120 and multi-purpose data receiving device 130 can be or include components provided by a third party and are not necessarily restricted to include devices made by the same manufacturer as the sensor 110.

As illustrated in FIG. 2B, the data receiving device 120 includes an ASIC 4000 including a microcontroller 4010, memory 4020, and storage 4030 and communicatively coupled with a communication module 4040. Power for the components of the data receiving device 120 can be delivered by a power module 4050, which as embodied herein can include a rechargeable battery. The data receiving device 120 can further include a display 4070 for facilitating review of analyte data received from an analyte sensor 110 or other device (e.g., user device 140 or remote application server 150). The data receiving device 120 can include separate user interface components (e.g., physical keys, light sensors, microphones, etc.).

The communication module 4040 can include a BLE module 4041 and an NFC module 4042. The data receiving device 120 can be configured to wirelessly couple with the analyte sensor 110 and transmit commands to and receive data from the analyte sensor 110. As embodied herein, the data receiving device 120 can be configured to operate, with respect to the analyte sensor 110 as described herein, as an NFC scanner and a BLE end point via specific modules (e.g., BLE module 4042 or NFC module 4043) of the communication module 4040. For example, the data receiving device 120 can issue commands (e.g., activation commands for a data broadcast mode of the sensor; pairing commands to identify the data receiving device 120) to the analyte sensor 110 using a first module of the communication module 4040 and receive data from and transmit data to the analyte sensor 110 using a second module of the communication module 4040. The data receiving device 120 can be configured for communication with a user device 140 via a Universal Serial Bus (USB) module 4045 of the communication module 4040.

As another example, the communication module 4040 can include, for example, a cellular radio module 4044. The cellular radio module 4044 can include one or more radio transceivers for communicating using broadband cellular networks, including, but not limited to third generation (3G), fourth generation (4G), and fifth generation (5G) networks. Additionally, the communication module 4040 of the data receiving device 120 can include a Wi-Fi radio module 4043 for communication using a wireless local area network according to one or more of the IEEE 802.11 standards (e.g., 802.11a, 802.11b, 802.11g, 802.11n (aka Wi-Fi 4), 802.11ac (aka Wi-Fi 5), 802.11ax (aka Wi-Fi 6)). Using the cellular radio module 4044 or Wi-Fi radio module 4043, the data receiving device 120 can communicate with the remote application server 150 to receive analyte data or provide updates or input received from a user (e.g., through one or more user interfaces). Although not illustrated, the communication module 5040 of the analyte sensor 120 can similarly include a cellular radio module or Wi-Fi radio module.

As embodied herein, the on-board storage 4030 of the data receiving device 120 can store analyte data received from the analyte sensor 110. Further, the data receiving device 120, multi-purpose data receiving device 130, or a user device 140 can be configured to communicate with a remote application server 150 via a wide area network. As embodied herein, the analyte sensor 110 can provide data to the data receiving device 120 or multi-purpose data receiving device 130. The data receiving device 120 can transmit the data to the user computing device 140. The user computing device 140 (or the multi-purpose data receiving device 130) can in turn transmit that data to a remote application server 150 for processing and analysis. As embodied herein, the data receiving device 120 can further include sensing hardware 4060 similar to, or expanded from, the sensing hardware 5060 of the analyte sensor 110. In particular embodiments, the data receiving device 120 can be configured to operate in coordination with the analyte sensor 110 and based on analyte data received from the analyte sensor 110. As an example, where the analyte sensor 110 glucose sensor, the data receiving device 120 can be or include an insulin pump or insulin injection pen. In coordination, the compatible device 130 can adjust an insulin dosage for a user based on glucose values received from the analyte sensor.

Exemplary Sensor Control Devices

Figure 2C:
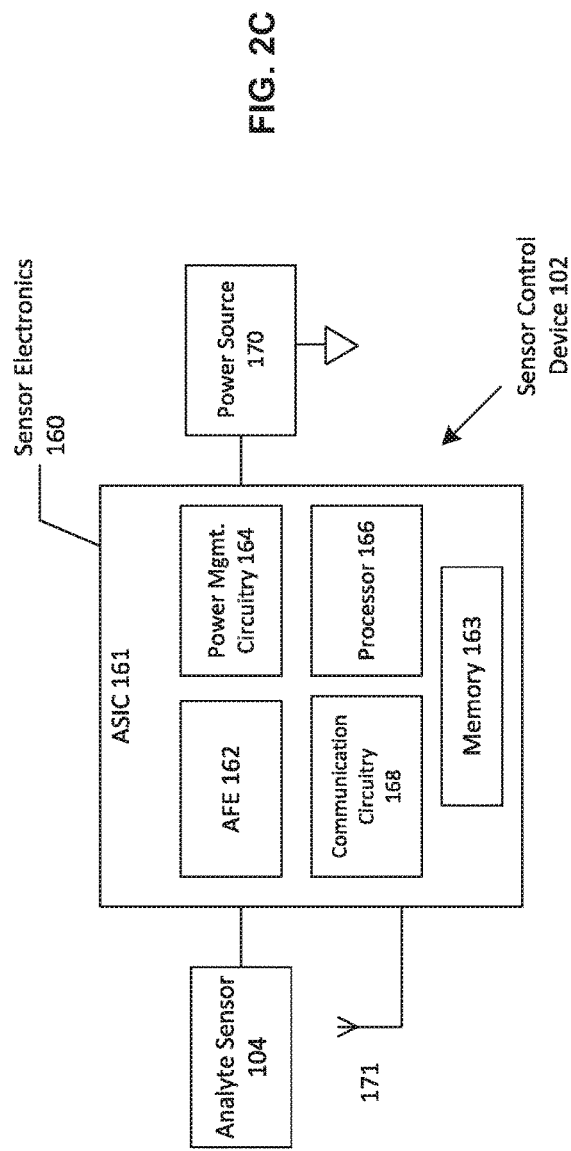
FIGS. 2C and 2D are block diagrams depicting example embodiments of sensor control devices.
Figure 2D:
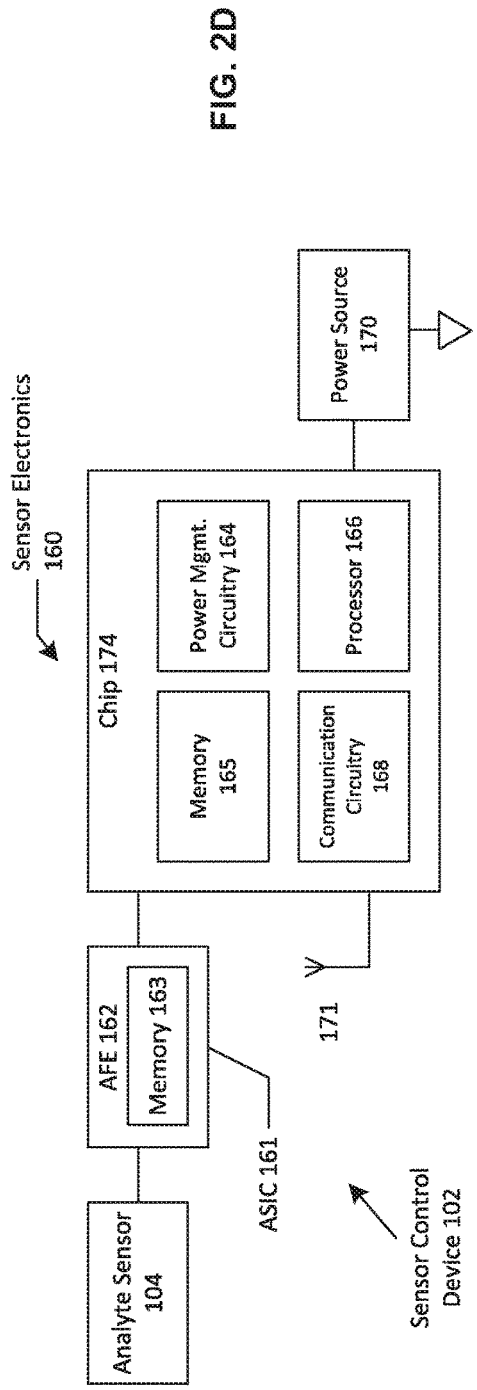

FIGS. 2C and 2D are block diagrams depicting example embodiments of sensor control device 102 having analyte sensor 104 and sensor electronics 160 (including analyte monitoring circuitry) that can have the majority of the processing capability for rendering end-result data suitable for display to the user. In FIG. 2C, a single semiconductor chip 161 is depicted that can be a custom application specific integrated circuit (ASIC). Shown within ASIC 161 are certain high-level functional units, including an analog front end (AFE) 162, power management (or control) circuitry 164, processor 166, and communication circuitry 168 (which can be implemented as a transmitter, receiver, transceiver, passive circuit, or otherwise according to the communication protocol). In this embodiment, both AFE 162 and processor 166 are used as analyte monitoring circuitry, but in other embodiments either circuit can perform the analyte monitoring function. Processor 166 can include one or more processors, microprocessors, controllers, and/or microcontrollers, each of which can be a discrete chip or distributed amongst (and a portion of) a number of different chips.

A memory 163 is also included within ASIC 161 and can be shared by the various functional units present within ASIC 161, or can be distributed amongst two or more of them. Memory 163 can also be a separate chip. Memory 163 can be volatile and/or non-volatile memory. In this embodiment, ASIC 161 is coupled with power source 170, which can be a coin cell battery, or the like. AFE 162 interfaces with in vivo analyte sensor 104 and receives measurement data therefrom and outputs the data to processor 166 in digital form, which in turn processes the data to arrive at the end-result glucose discrete and trend values, etc. This data can then be provided to communication circuitry 168 for sending, by way of antenna 171, to reader device 120 (not shown), for example, where minimal further processing is needed by the resident software application to display the data.

FIG. 2D is similar to FIG. 2C but instead includes two discrete semiconductor chips 162 and 174, which can be packaged together or separately. Here, AFE 162 is resident on ASIC 161. Processor 166 is integrated with power management circuitry 164 and communication circuitry 168 on chip 174. AFE 162 includes memory 163 and chip 174 includes memory 165, which can be isolated or distributed within. In one example embodiment, AFE 162 is combined with power management circuitry 164 and processor 166 on one chip, while communication circuitry 168 is on a separate chip. In another example embodiment, both AFE 162 and communication circuitry 168 are on one chip, and processor 166 and power management circuitry 164 are on another chip. It should be noted that other chip combinations are possible, including three or more chips, each bearing responsibility for the separate functions described, or sharing one or more functions for fail-safe redundancy.

Figure 2E:
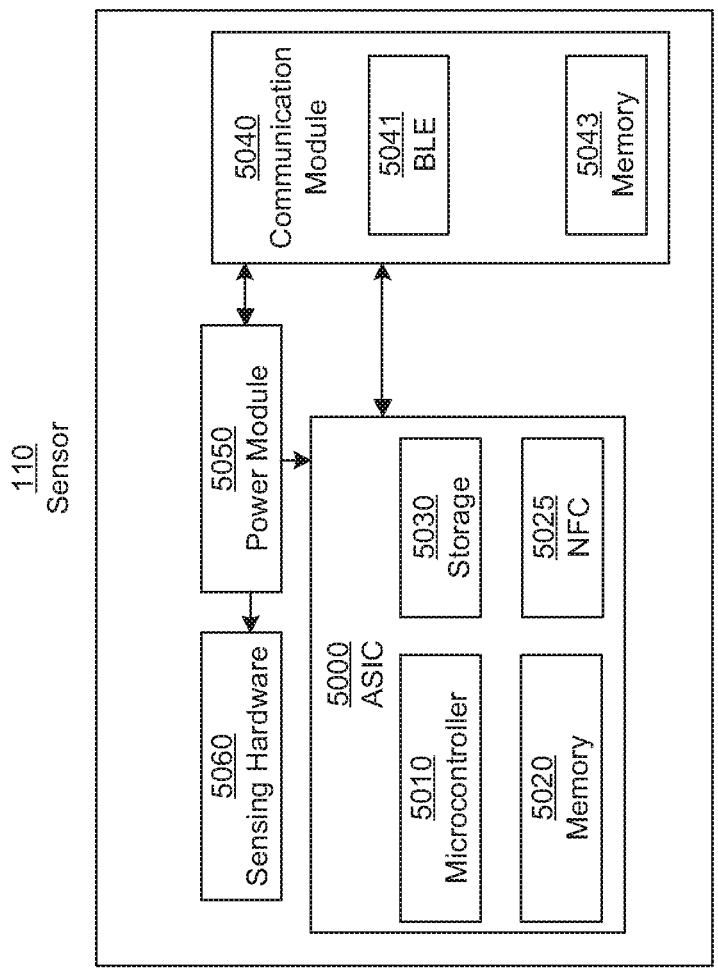
FIG. 2E is a block diagram illustrating an example analyte sensor according to exemplary embodiments of the disclosed subject matter.

For purpose of illustration and not limitation, reference is made to the exemplary embodiment of an analyte sensor 110 for use with the disclosed subject matter as shown in FIG. 2E. FIG. 2E illustrates a block diagram of an example analyte sensor 110 according to exemplary embodiments compatible with the security architecture and communication schemes described herein.

As embodied herein, the analyte sensor 110 can include an Application-Specific Integrated Circuit ("ASIC") 5000 communicatively coupled with a communication module 5040. The ASIC 5000 can include a microcontroller core 5010, on-board memory 5020, and storage memory 5030. The storage memory 5030 can store data used in an authentication and encryption security architecture. The storage memory 5030 can store programming instructions for the sensor 110. As embodied herein, certain communication chipsets can be embedded in the ASIC 5000 (e.g., an NFC transceiver 5025). The ASIC 5000 can receive power from a power module 5050, such as an on-board battery or from an NFC pulse. The storage memory 5030 of the ASIC 5000 can be programmed to include information such as an identifier for the sensor 110 for identification and tracking purposes. The storage memory 5030 can also be programmed with configuration or calibration parameters for use by the sensor 110 and its various components. The storage memory 5030 can include rewritable or one-time programming (OTP) memory. The storage memory 5030 can be updated using techniques described herein to extend the usefulness of the sensor 110.

As embodied herein, the communication module 5040 of the sensor 100 can be or include one or more modules to support the analyte sensor 110 communicating with other devices of the analyte monitoring system 100. As an example only and not by way of limitation, example communication modules 5040 can include a Bluetooth Low-Energy ("BLE") module 5041 As used throughout this disclosure, Bluetooth Low Energy ("BLE") refers to a short-range communication protocol optimized to make pairing of Bluetooth devices simple for end users. The communication module 5040 can transmit and receive data and commands via interaction with similarly-capable communication modules of a data receiving device 120 or user device 140. The communication module 5040 can include additional or alternative chipsets for use with similar short-range communication schemes, such as a personal area network according to IEEE 802.15 protocols, IEEE 802.11 protocols, infrared communications according to the Infrared Data Association standards (IrDA), etc.

To perform its functionalities, the sensor 100 can further include suitable sensing hardware 5060 appropriate to its function. As embodied herein, the sensing hardware 5060 can include an analyte sensor transcutaneously or subcutaneously positioned in contact with a bodily fluid of a subject. The analyte sensor can generate sensor data containing values corresponding to levels of one or more analytes within the bodily fluid.

Exemplary Assembly Processes for Sensor Control Devices

The components of sensor control device 102 can be acquired by a user in multiple packages requiring final assembly by the user before delivery to an appropriate user location. FIGS. 3A-3D depict an example embodiment of an assembly process for sensor control device 102 by a user, including preparation of separate components before coupling the components in order to ready the sensor for delivery. FIGS. 3E-3F depict an example embodiment of delivery of sensor control device 102 to an appropriate user location by selecting the appropriate delivery location and applying device 102 to the location.

Figure 3A:
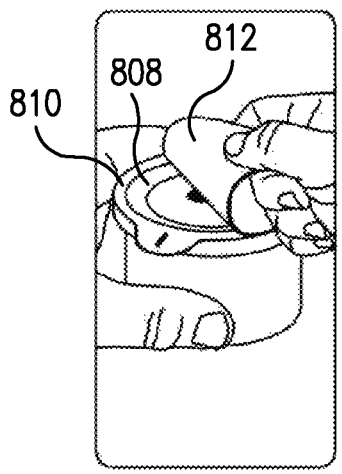
FIG. 3A is a proximal perspective view depicting an example embodiment of a user preparing a tray for an assembly.

FIG. 3A is a proximal perspective view depicting an example embodiment of a user preparing a container 810, configured here as a tray (although other packages can be used), for an assembly process. The user can accomplish this preparation by removing lid 812 from tray 810 to expose platform 808, for instance by peeling a non-adhered portion of lid 812 away from tray 810 such that adhered portions of lid 812 are removed. Removal of lid 812 can be appropriate in various embodiments so long as platform 808 is adequately exposed within tray 810. Lid 812 can then be placed aside.

Figure 3B:
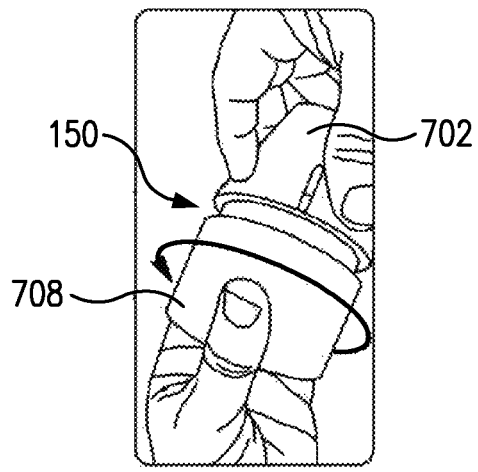
FIG. 3B is a side view depicting an example embodiment of a user preparing an applicator device for an assembly.
Figure 3C:
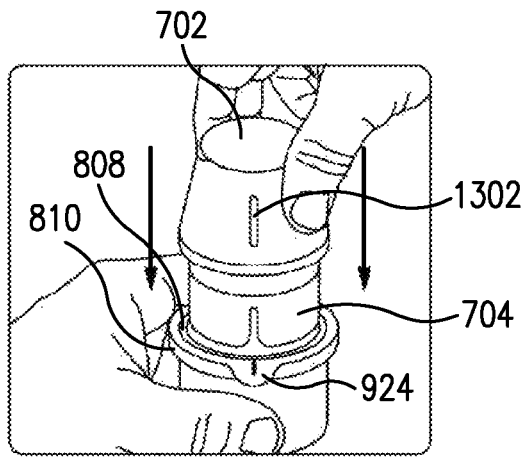
FIG. 3C is a proximal perspective view depicting an example embodiment of a user inserting an applicator device into a tray during an assembly.

FIG. 3B is a side view depicting an example embodiment of a user preparing an applicator device 150 for assembly. Applicator device 150 can be provided in a sterile package sealed by a cap 708. Preparation of applicator device 150 can include uncoupling housing 702 from cap 708 to expose sheath 704 (FIG. 3C). This can be accomplished by unscrewing (or otherwise uncoupling) cap 708 from housing 702. Cap 708 can then be placed aside.

FIG. 3C is a proximal perspective view depicting an example embodiment of a user inserting an applicator device 150 into a tray 810 during an assembly. Initially, the user can insert sheath 704 into platform 808 inside tray 810 after aligning housing orienting feature 1302 (or slot or recess) and tray orienting feature 924 (an abutment or detent). Inserting sheath 704 into platform 808 temporarily unlocks sheath 704 relative to housing 702 and also temporarily unlocks platform 808 relative to tray 810. At this stage, removal of applicator device 150 from tray 810 will result in the same state prior to initial insertion of applicator device 150 into tray 810 (i.e., the process can be reversed or aborted at this point and then repeated without consequence).

Sheath 704 can maintain position within platform 808 with respect to housing 702 while housing 702 is distally advanced, coupling with platform 808 to distally advance platform 808 with respect to tray 810. This step unlocks and collapses platform 808 within tray 810. Sheath 704 can contact and disengage locking features (not shown) within tray 810 that unlock sheath 704 with respect to housing 702 and prevent sheath 704 from moving (relatively) while housing 702 continues to distally advance platform 808. At the end of advancement of housing 702 and platform 808, sheath 704 is permanently unlocked relative to housing 702. A sharp and sensor (not shown) within tray 810 can be coupled with an electronics housing (not shown) within housing 702 at the end of the distal advancement of housing 702. Operation and interaction of the applicator device 150 and tray 810 are further described below.

Figure 3D:
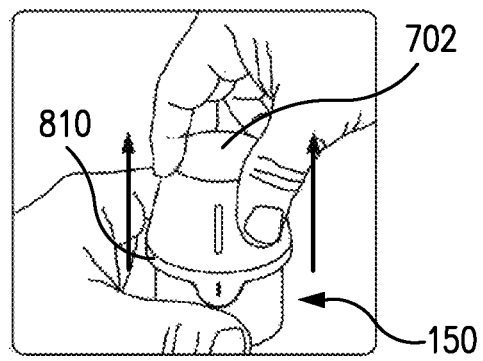
FIG. 3D is a proximal perspective view depicting an example embodiment of a user removing an applicator device from a tray during an assembly.
Figure 3E:
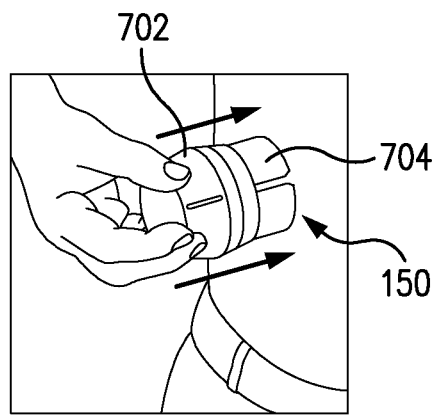
FIG. 3E is a proximal perspective view depicting an example embodiment of a patient applying a sensor using an applicator device.
Figure 3F:
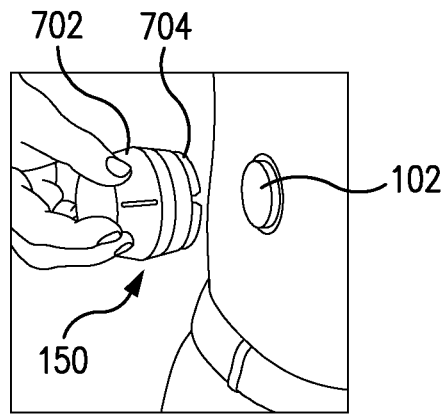
FIG. 3F is a proximal perspective view depicting an example embodiment of a patient with an applied sensor and a used applicator device.

FIG. 3D is a proximal perspective view depicting an example embodiment of a user removing an applicator device 150 from a tray 810 during an assembly. A user can remove applicator 150 from tray 810 by proximally advancing housing 702 with respect to tray 810 or other motions having the same end effect of uncoupling applicator 150 and tray 810. The applicator device 150 is removed with sensor control device 102 (not shown) fully assembled (sharp, sensor, electronics) therein and positioned for delivery.

FIG. 3E is a proximal perspective view depicting an example embodiment of a patient applying sensor control device 102 using applicator device 150 to a target area of skin, for instance, on an abdomen or other appropriate location. Advancing housing 702 distally collapses sheath 704 within housing 702 and applies the sensor to the target location such that an adhesive layer on the bottom side of sensor control device 102 adheres to the skin. The sharp is automatically retracted when housing 702 is fully advanced, while the sensor (not shown) is left in position to measure analyte levels.

FIG. 3F is a proximal perspective view depicting an example embodiment of a patient with sensor control device 102 in an applied position. The user can then remove applicator 150 from the application site.

System 100, described with respect to FIGS. 3A-3F and elsewhere herein, can provide a reduced or eliminated chance of accidental breakage, permanent deformation, or incorrect assembly of applicator components compared to prior art systems. Since applicator housing 702 directly engages platform 808 while sheath 704 unlocks, rather than indirect engagement via sheath 704, relative angularity between sheath 704 and housing 702 will not result in breakage or permanent deformation of the arms or other components. The potential for relatively high forces (such as in conventional devices) during assembly will be reduced, which in turn reduces the chance of unsuccessful user assembly.

Exemplary Sensor Applicator Devices

Figure 4C:
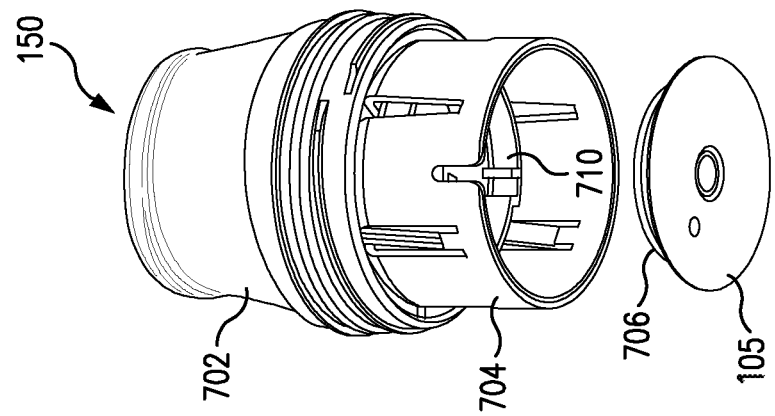
FIG. 4C is a perspective view depicting an example embodiment of a distal end of an applicator device and electronics housing.
Figure 4B:
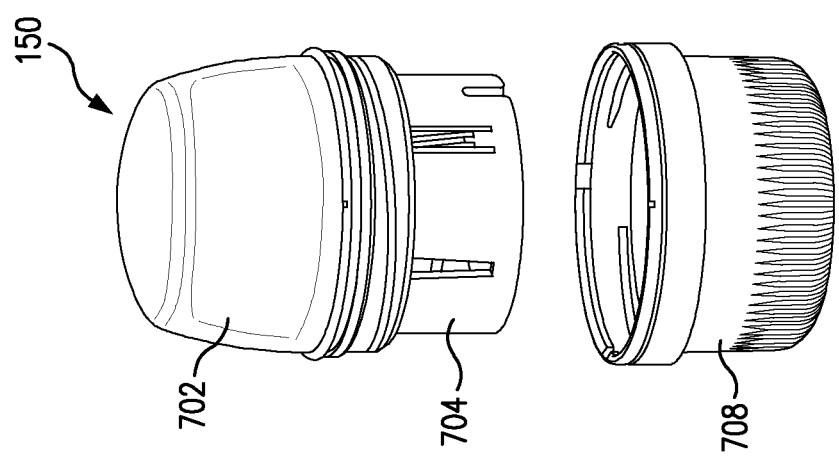
FIG. 4B is a side perspective view depicting an example embodiment of an applicator device and cap decoupled.
Figure 4A:
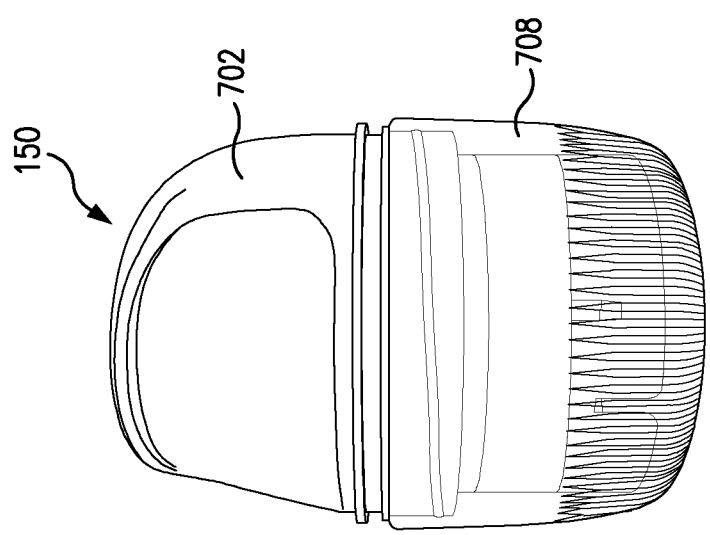
FIG. 4A is a side view depicting an example embodiment of an applicator device coupled with a cap.

FIG. 4A is a side view depicting an example embodiment of an applicator device 150 coupled with screw cap 708. This is an example of how applicator 150 is shipped to and received by a user, prior to assembly by the user with a sensor. FIG. 4B is a side perspective view depicting applicator 150 and cap 708 after being decoupled. FIG. 4C is a perspective view depicting an example embodiment of a distal end of an applicator device 150 with electronics housing 706 and adhesive patch 105 removed from the position they would have retained within sensor carrier 710 of sheath 704, when cap 708 is in place.

Figure 4E:
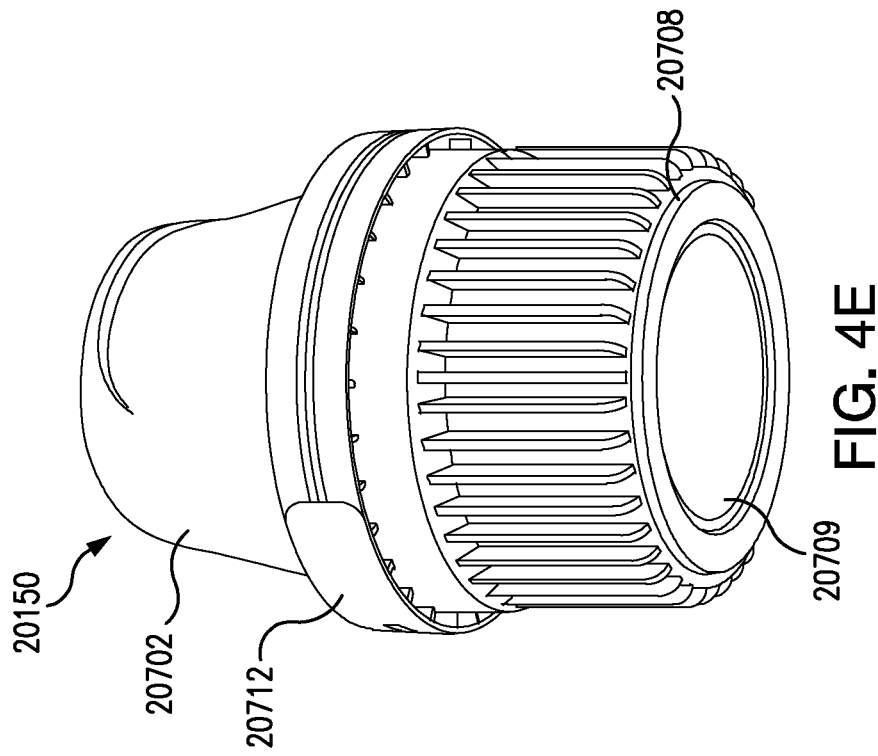
FIG. 4E is a bottom perspective view of the applicator device of FIG. 4D.
Figure 4D:
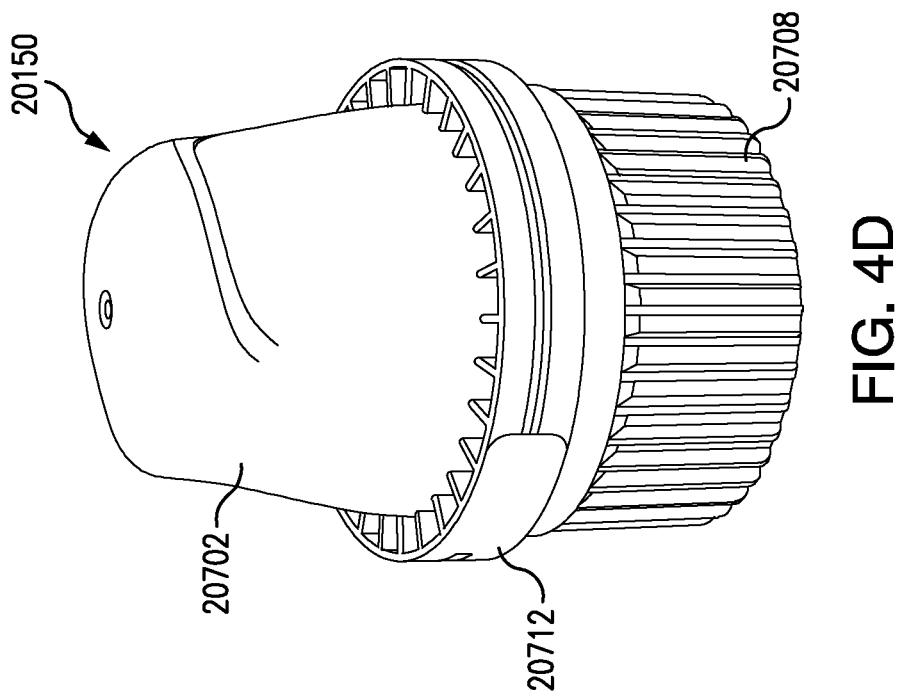
FIG. 4D is a top perspective view of an exemplary applicator device in accordance with the disclosed subject matter.
Figure 4F:
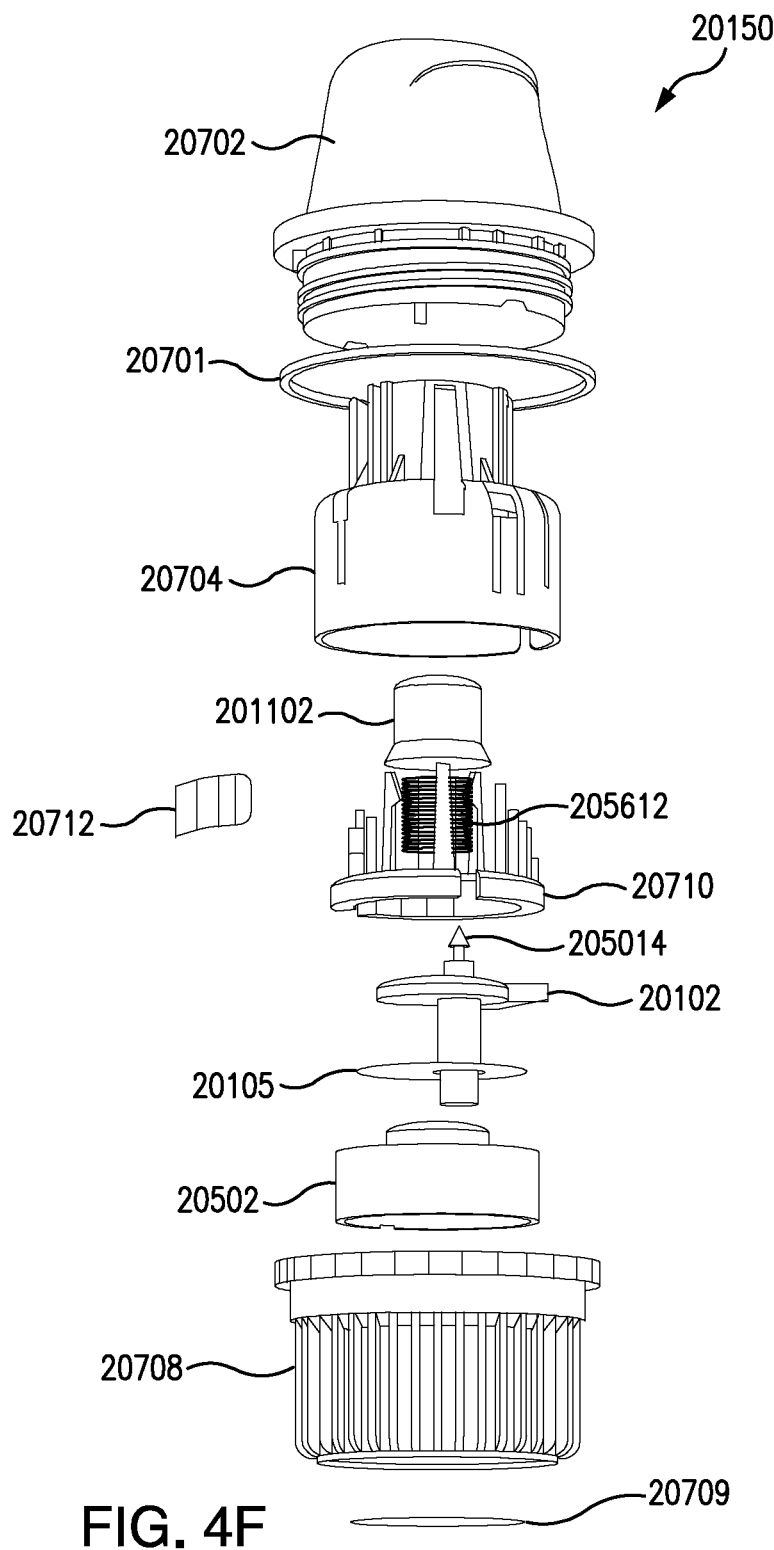
FIG. 4F is an exploded view of the applicator device of FIG. 4D.
Figure 4G:
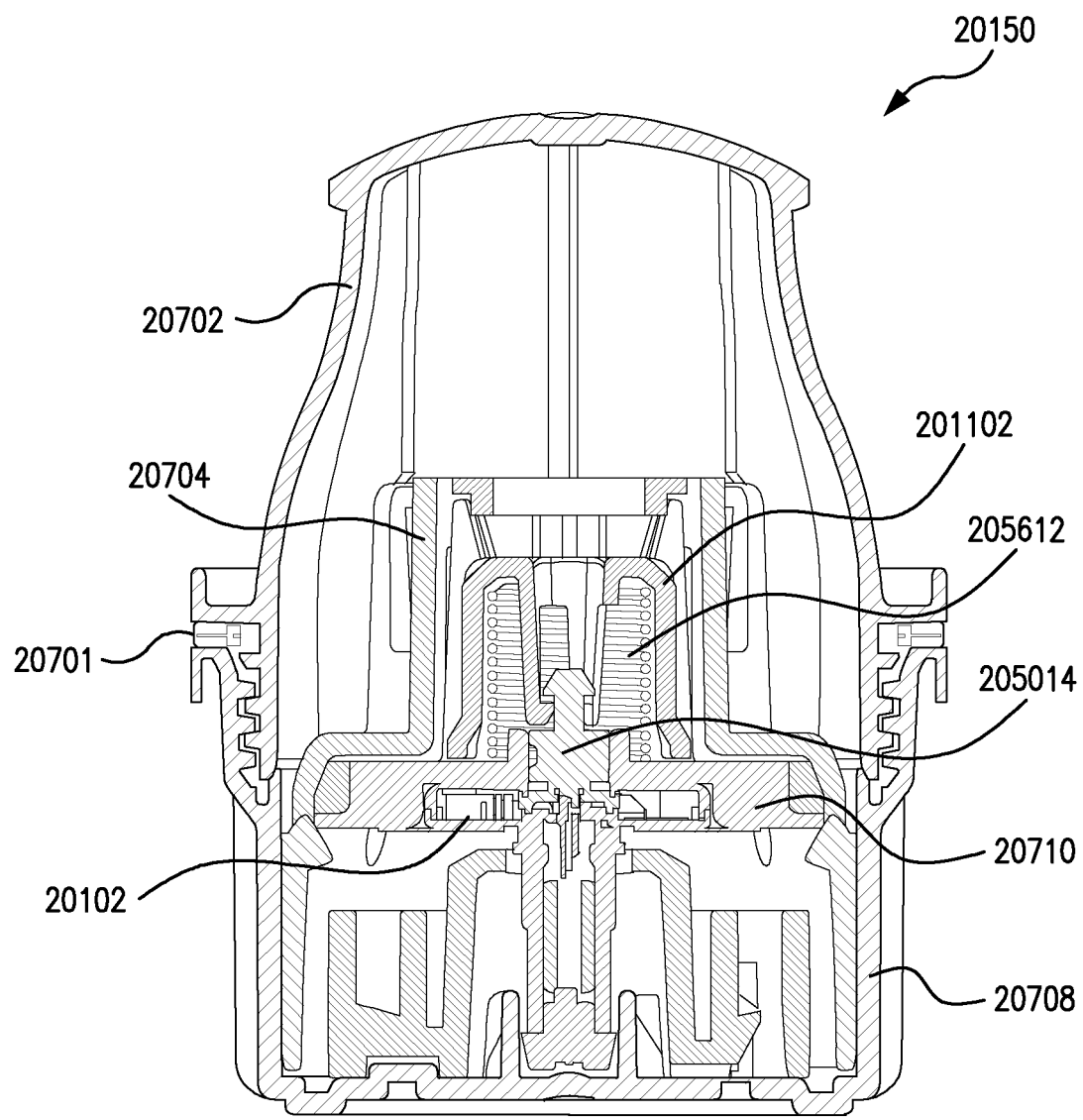
FIG. 4G is a side cutaway view of the applicator device of FIG. 4D.

Referring to FIG. 4D-G for purpose of illustration and not limitation, the applicator device 20150 can be provided to a user as a single integrated assembly. FIGS. 4D and 4E provide perspective top and bottom views, respectively, of the applicator device 20150, FIG. 4F provides an exploded view of the applicator device 20150 and FIG. 4G provides a side cut-away view. The perspective views illustrate how applicator 20150 is shipped to and received by a user. The exploded and cut-away views illustrate the components of the applicator device 20150. The applicator device 20150 can include a housing 20702, gasket 20701, sheath 20704, sharp carrier 201102, spring 205612, sensor carrier 20710 (also referred to as a "puck carrier"), sharp hub 205014, sensor control device (also referred to as a "puck") 20102, adhesive patch 20105, desiccant 20502, cap 20708, serial label 20709, and tamper evidence feature 20712. As received by a user, only the housing 20702, cap 20708, tamper evidence feature 20712, and label 20709 are visible. The tamper evidence feature 20712 can be, for example, a sticker coupled to each of the housing 20702 and the cap 20708, and tamper evidence feature 20712 can be damaged, for example, irreparably, by uncoupling housing 20702 and cap 20708, thereby indicating to a user that the housing 20702 and cap 20708 have been previously uncoupled. These features are described in greater detail below.

Exemplary Tray and Sensor Module Assembly

Figure 5:
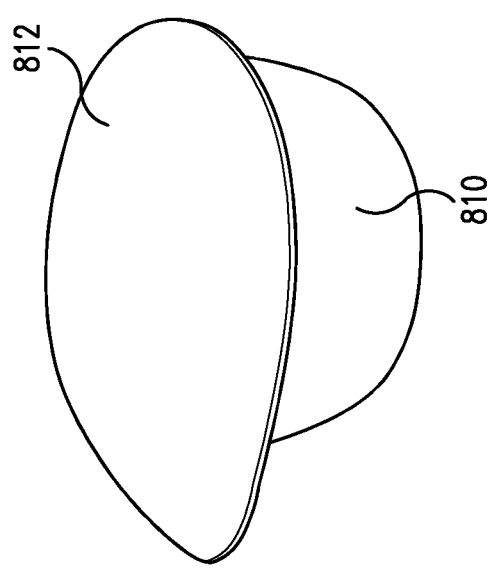
FIG. 5 is a proximal perspective view depicting an example embodiment of a tray with sterilization lid coupled.

FIG. 5 is a proximal perspective view depicting an example embodiment of a tray 810 with sterilization lid 812 removably coupled thereto, which may be representative of how the package is shipped to and received by a user prior to assembly.

Figure 6A:
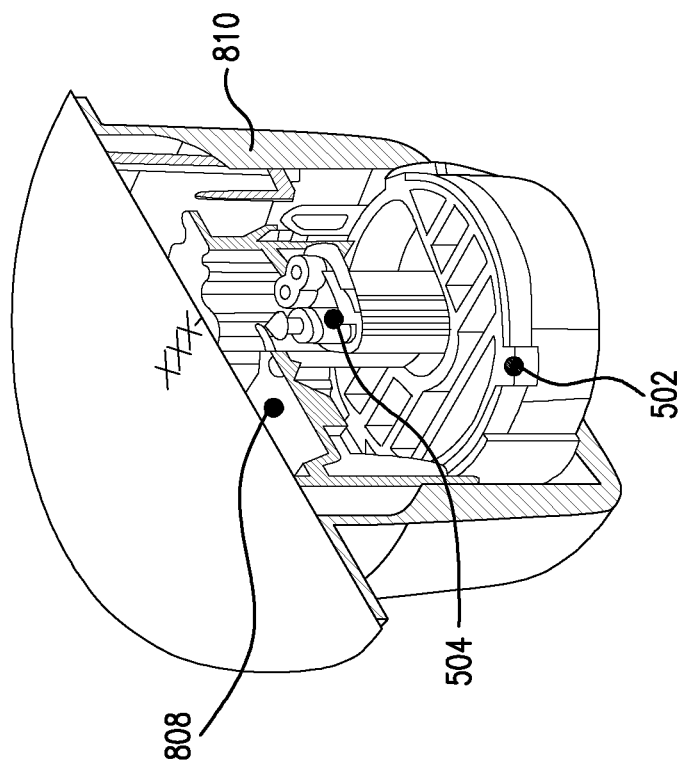
FIG. 6A is a proximal perspective cutaway view depicting an example embodiment of a tray with sensor delivery components.

FIG. 6A is a proximal perspective cutaway view depicting sensor delivery components within tray 810. Platform 808 is slidably coupled within tray 810. Desiccant 502 is stationary with respect to tray 810. Sensor module 504 is mounted within tray 810.

Figure 6B:
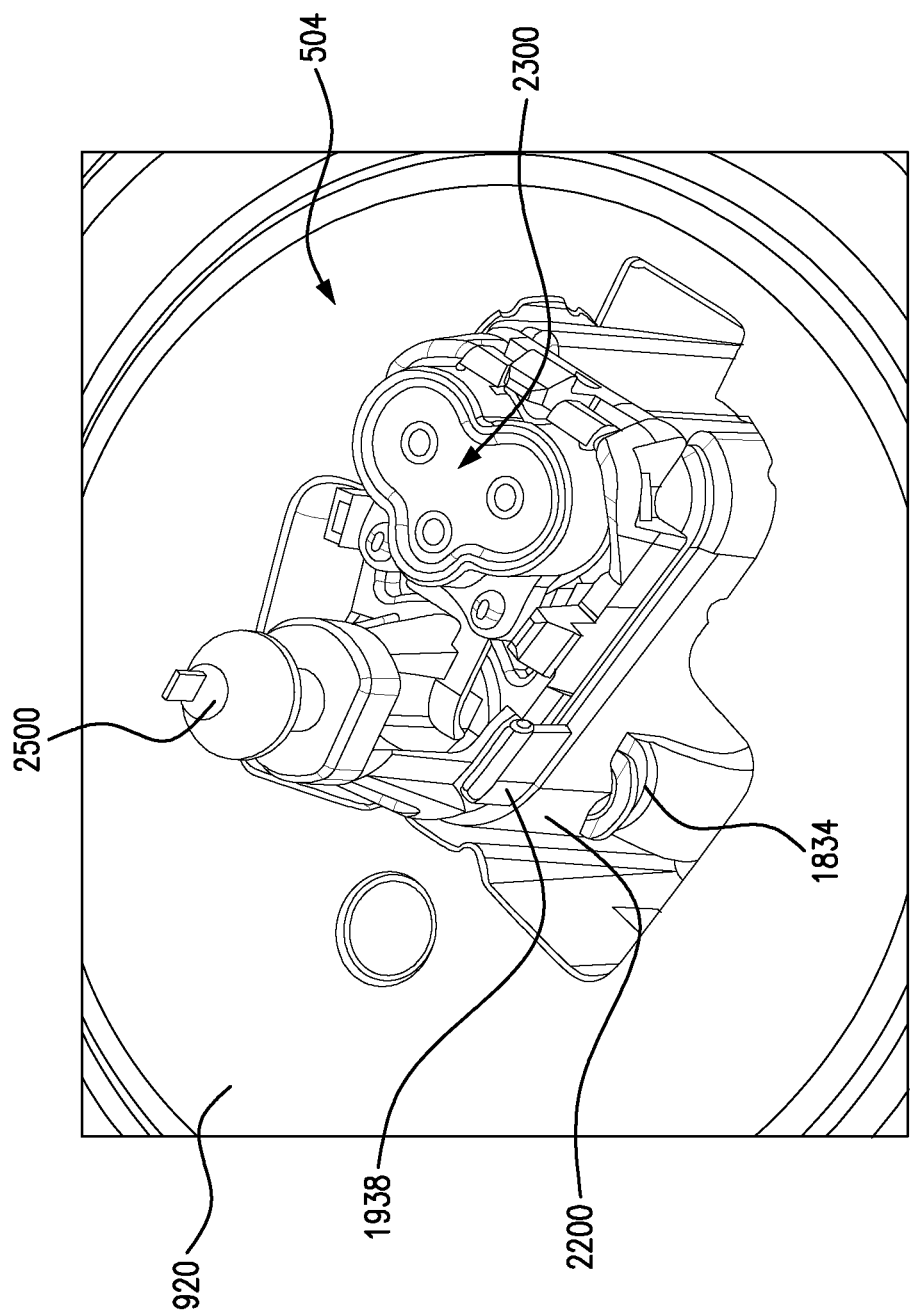
FIG. 6B is a proximal perspective view depicting sensor delivery components.

FIG. 6B is a proximal perspective view depicting sensor module 504 in greater detail. Here, retention arm extensions 1834 of platform 808 releasably secure sensor module 504 in position. Module 2200 is coupled with connector 2300, sharp module 2500 and sensor (not shown) such that during assembly they can be removed together as sensor module 504.

Exemplary Applicator Housings and Caps

Figure 7A:
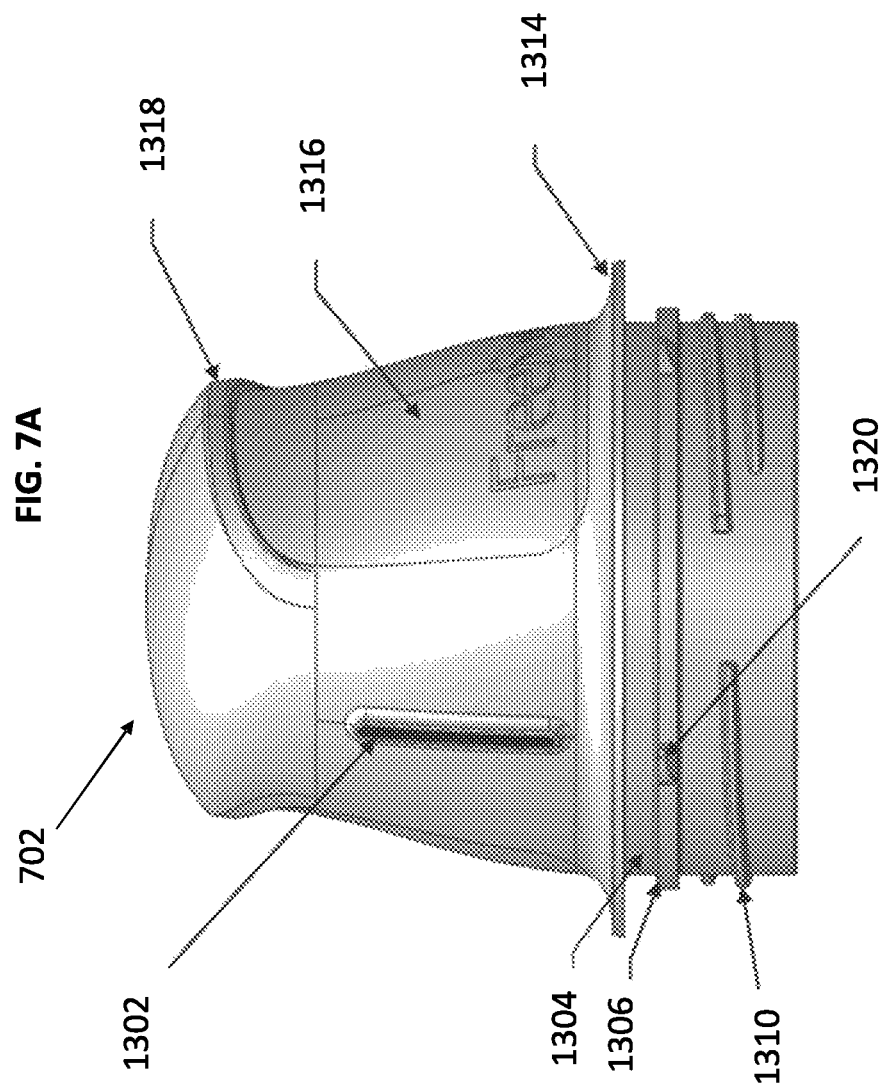
FIG. 7A is side view depicting an example embodiment of a housing.

FIG. 7A is side view depicting an example embodiment of the applicator housing 702 that can include an internal cavity with support structures for applicator function. A user can push housing 702 in a distal direction to activate the applicator assembly process and then also to cause delivery of sensor control device 102, after which the cavity of housing 702 can act as a receptacle for a sharp. In the example embodiment, various features are shown including housing orienting feature 1302 for orienting the device during assembly and use. Tamper ring groove 1304 can be a recess located around an outer circumference of housing 702, distal to a tamper ring protector 1314 and proximal to a tamper ring retainer 1306. Tamper ring groove 1304 can retain a tamper ring so users can identify whether the device has been tampered with or otherwise used. Housing threads 1310 can secure housing 702 to complimentary threads on cap 708 (FIGS. 4A and 4B) by aligning with complimentary cap threads and rotating in a clockwise or counterclockwise direction. A side grip zone 1316 of housing 702 can provide an exterior surface location where a user can grip housing 702 in order to use it. Grip overhang 1318 is a slightly raised ridge with respect to side grip zone 1316 which can aid in ease of removal of housing 702 from cap 708. A shark tooth 1320 can be a raised section with a flat side located on a clockwise edge to shear off a tamper ring (not shown) and hold tamper ring in place after a user has unscrewed cap 708 and housing 702. In the example embodiment four shark teeth 1320 are used, although more or less can be used as desired.

Figure 7B:
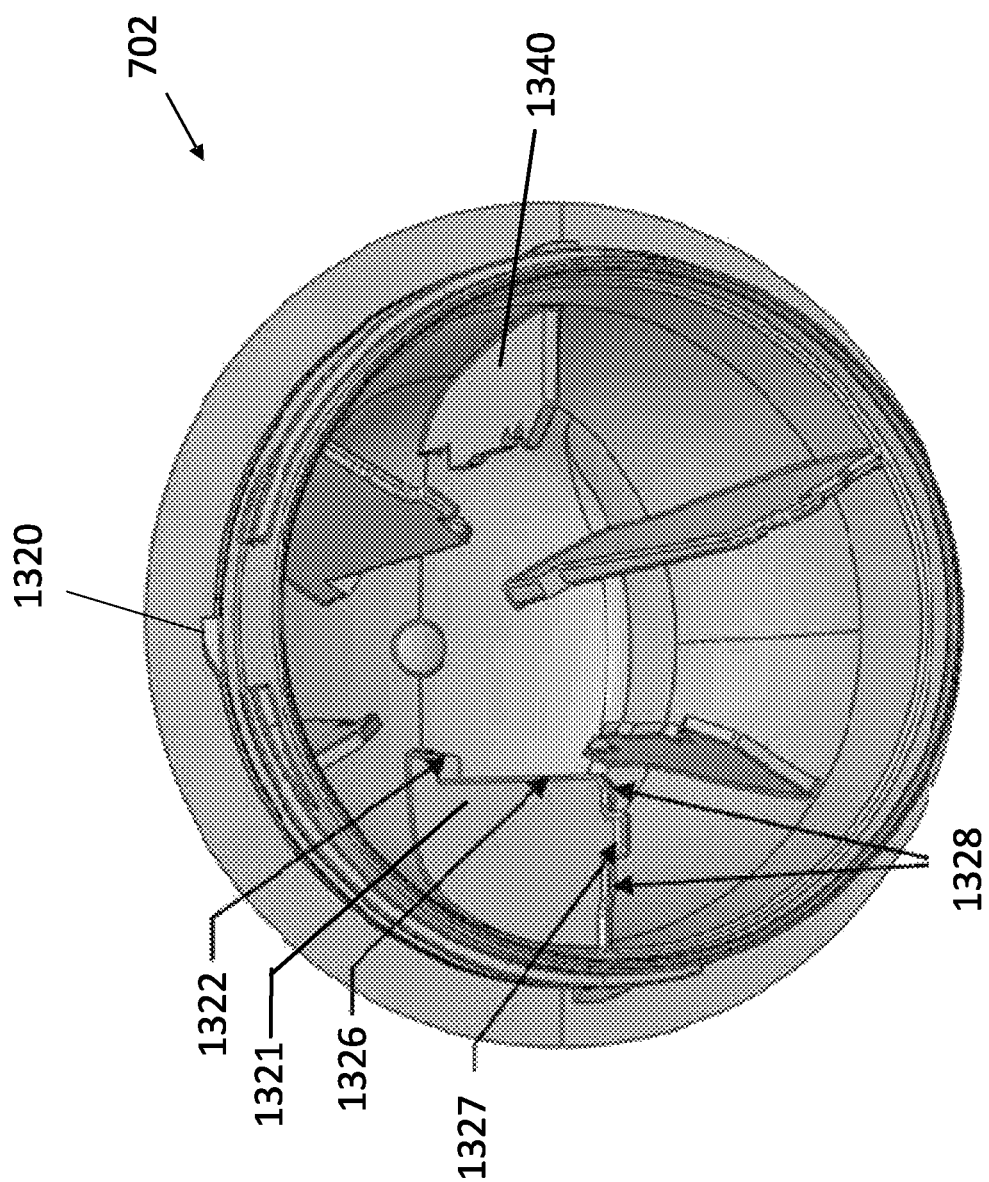
FIG. 7B is a perspective view depicting an example embodiment of a distal end of a housing.

FIG. 7B is a perspective view depicting a distal end of housing 702. Here, three housing guide structures (or "guide ribs") 1321 are located at 120 degree angles with respect to each other and at 60 degree angles with respect to locking structures (or "locking ribs") 1340, of which there are also three at 120 degree angles with respect to each other. Other angular orientations, either symmetric or asymmetric, can be used, as well as any number of one or more structures 1321 and 1340. Here, each structure 1321 and 1340 is configured as a planar rib, although other shapes can be used. Each guide rib 1321 includes a guide edge (also called a "sheath guide rail") 1326 that can pass along a surface of sheath 704 (e.g., guide rail 1418 described with respect to FIG. 8A). An insertion hard stop 1322 can be a flat, distally facing surface of housing guide rib 1321 located near a proximal end of housing guide rib 1321. Insertion hard stop 1322 provides a surface for a sensor carrier travel limiter face 1420 of a sheath 704 (FIG. 8B) to abut during use, preventing sensor carrier travel limiter face 1420 from moving any further in a proximal direction. A carrier interface post 1327 passes through an aperture 1510 (FIG. 9A) of sensor carrier 710 during an assembly. A sensor carrier interface 1328 can be a rounded, distally facing surface of housing guide ribs 1321 which interfaces with sensor carrier 710.

Figure 7C:
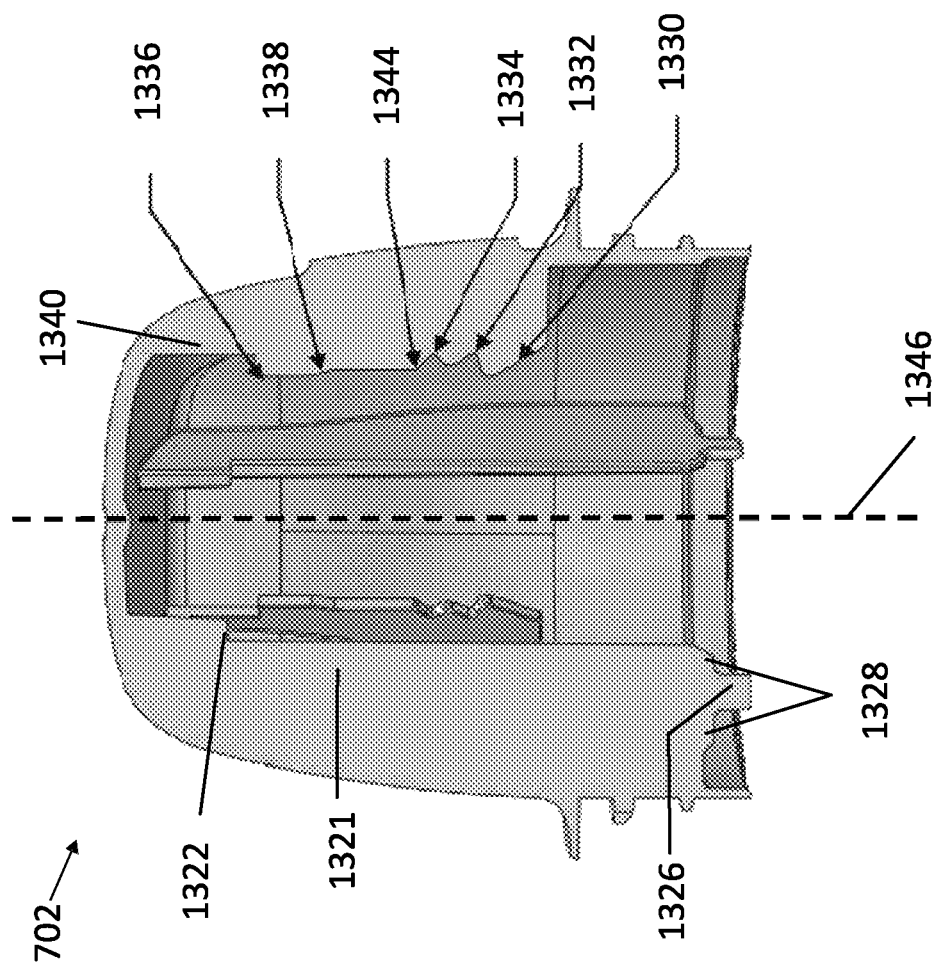
FIG. 7C is a side cross-sectional view depicting an example embodiment of a housing.

FIG. 7C is a side cross-section depicting an example embodiment of a housing. In the example embodiment, side cross-sectional profiles of housing guide rib 1321 and locking rib 1340 are shown. Locking rib 1340 includes sheath snap lead-in feature 1330 near a distal end of locking rib 1340 which flares outward from central axis 1346 of housing 702 distally. Each sheath snap lead-in feature 1330 causes detent snap round 1404 of detent snap 1402 of sheath 704 as shown in FIG. 8C to bend inward toward central axis 1346 as sheath 704 moves towards the proximal end of housing 702. Once past a distal point of sheath snap lead-in feature 1330, detent snap 1402 of sheath 704 is locked into place in locked groove 1332. As such, detent snap 1402 cannot be easily moved in a distal direction due to a surface with a near perpendicular plane to central axis 1346, shown as detent snap flat 1406 in FIG. 8C.

As housing 702 moves further in a distal direction toward the skin surface, and as sheath 704 advances toward the proximal end of housing 702, detent snaps 1402 shift into the unlocked grooves 1334, and applicator 150 is in an "armed" position, ready for use. When the user further applies force to the proximal end of housing 702, while sheath 704 is pressed against the skin, detent snap 1402 passes over firing detent 1344. This begins a firing sequence (as described, for example, with respect to FIGS. 12A-12D) due to release of stored energy in the deflected detent snaps 1402, which travel in a proximal direction relative to the skin surface, toward sheath stopping ramp 1338 which is slightly flared outward with respect to central axis 1346 and slows sheath 704 movement during the firing sequence. The next groove encountered by detent snap 1402 after unlocked groove 1334 is final lockout groove 1336 which detent snap 1402 enters at the end of the stroke or pushing sequence performed by the user. Final lockout recess 1336 can be a proximally-facing surface that is perpendicular to central axis 1346 which, after detent snap 1402 passes, engages a detent snap flat 1406 and prevents reuse of the device by securely holding sheath 704 in place with respect to housing 702. Insertion hard stop 1322 of housing guide rib 1321 prevents sheath 704 from advancing proximally with respect to housing 702 by engaging sensor carrier travel limiter face 1420.

Figure 7D:
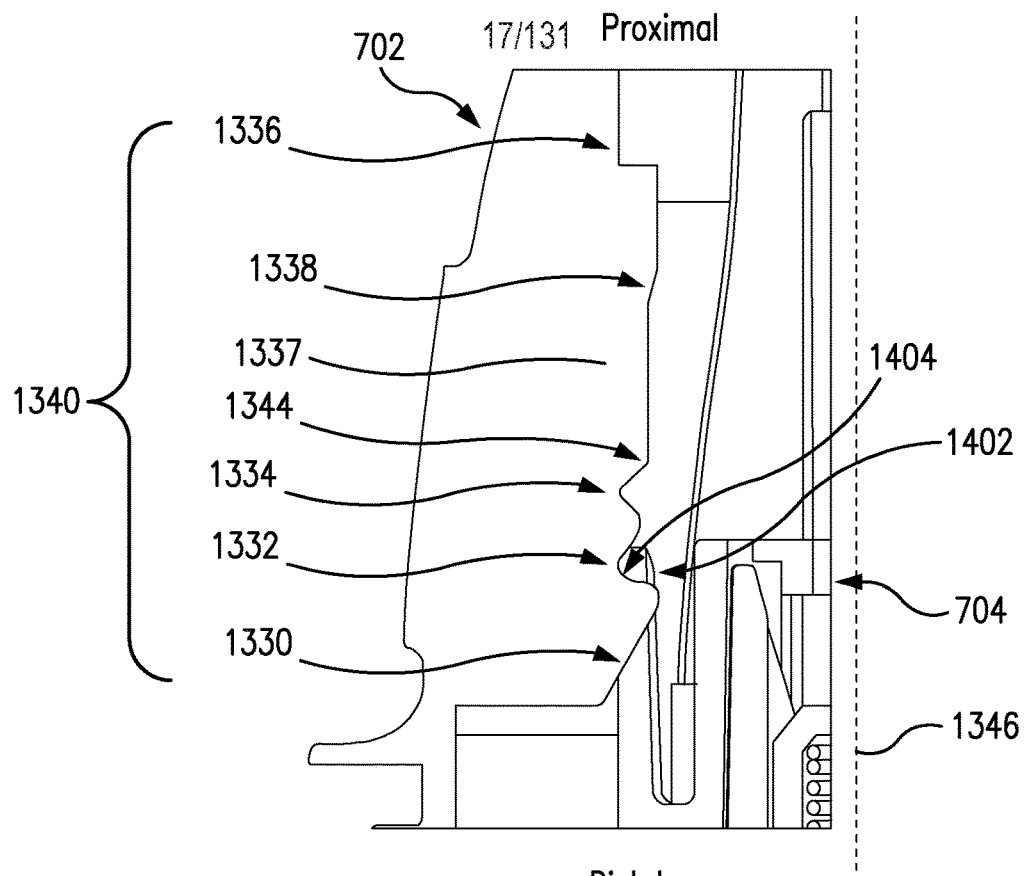
FIGS. 7D and 7E are side cross-sectional views depicting a locking rib portion of an example embodiment of a housing with a portion of a sheath.
Figure 7E:
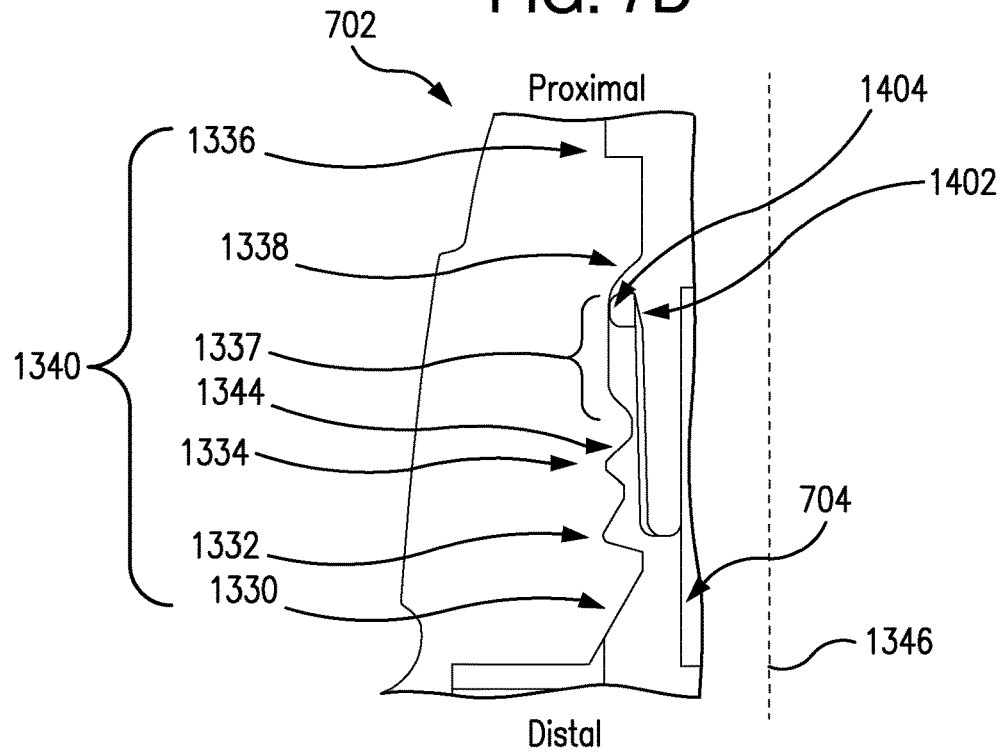

FIGS. 7D and 7E are close-up side views of an example embodiment of locking rib 1340 of applicator housing 702, as detent snap 1402 of sheath 704 moves toward the proximal end of housing 702. FIG. 7D shows sheath 704 in a "locked" state, in which detent round 1404 of detent snap 1402 has already passed over sheath snap lead-in feature 1330 and is positioned in locked groove 1332 of locking rib 1340. As force is applied to the proximal end of housing 702, detent round 1404 is advanced proximally into unlocked groove 1334, placing applicator 150 into an "armed" position. When force is further applied to the proximal end of housing 702, applicator 150 is "fired," as detent round 1404 is advanced proximally from the unlocked groove 1334 and passes over firing detent 1344. Thereafter, sheath 704 is further advanced proximally such that detent round 1404 is slidably advanced over firing surface 1337, as shown in FIG. 7E. In this embodiment, firing surface 1337 is substantially parallel to central axis 1346. As sheath 704 continues to advance proximally, detent round 1404 reaches sheath stopping ramp 1338 which slows the movement of sheath 704.

Upon detent round 1404 reaching final lockout recess 1336, detent snap flat 1406 (not shown) is engaged and securely holds sheath 704 in place with respect to housing 702.

Figure 7F:
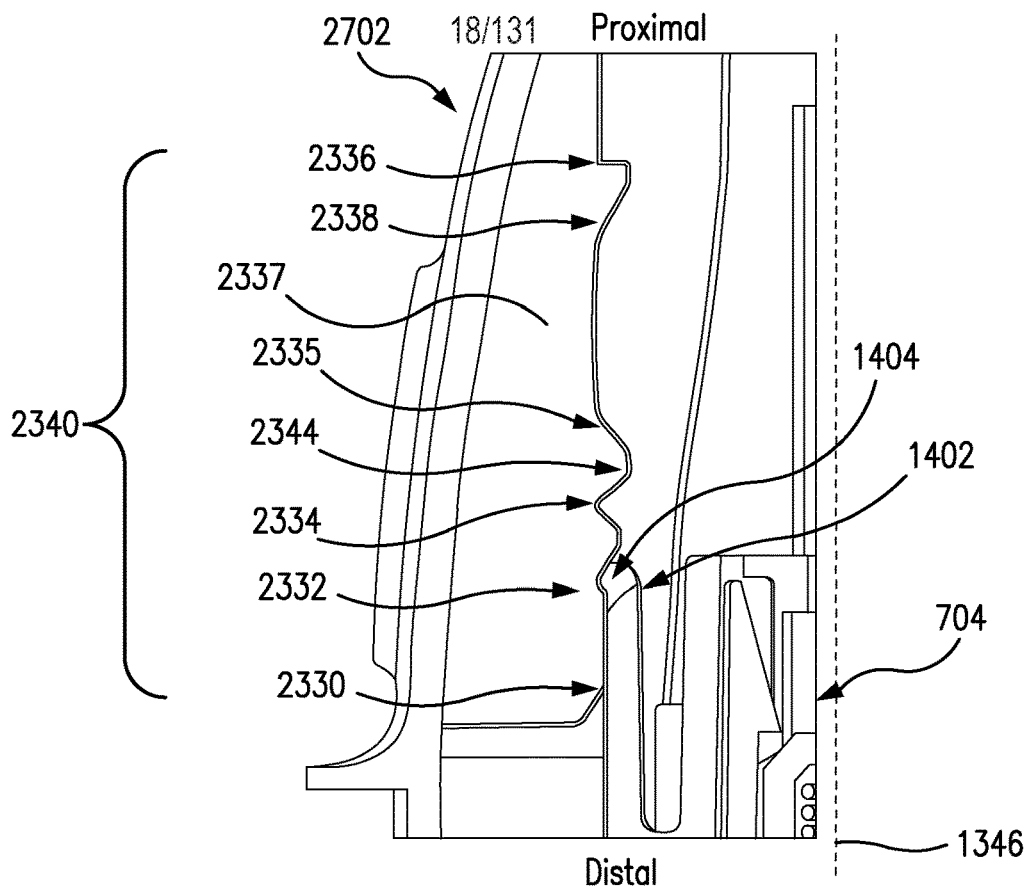
FIGS. 7F and 7G are side cross-sectional views depicting a locking rib portion of another example embodiment of a housing and a portion of a sheath.
Figure 7G:
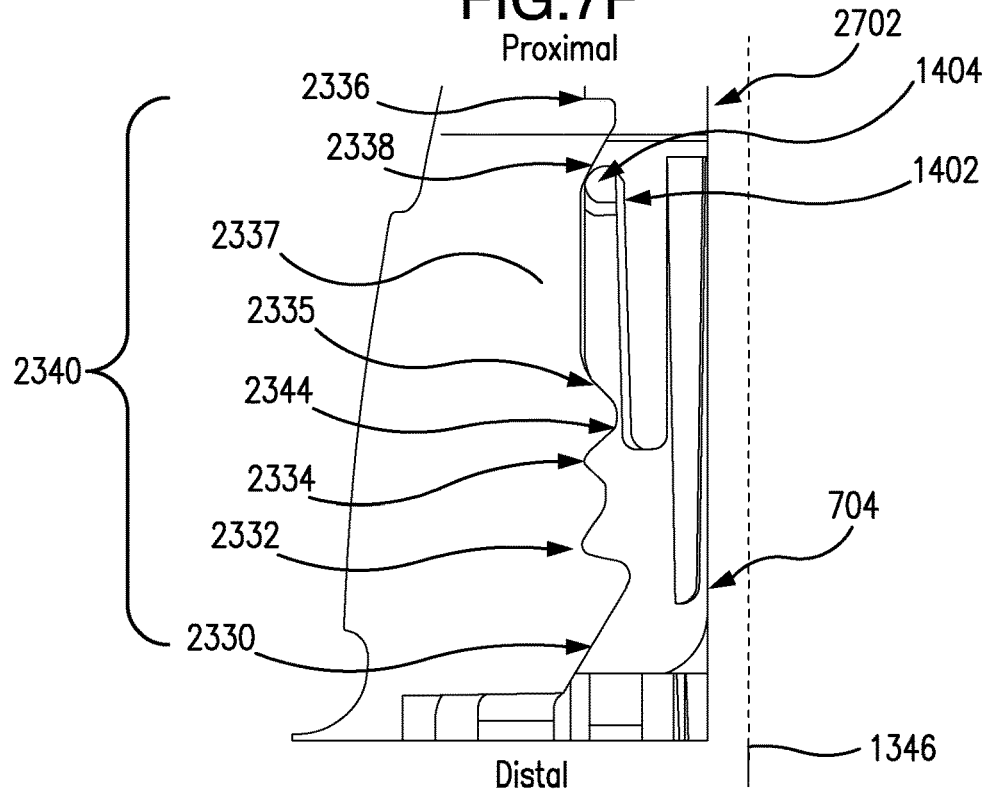

FIGS. 7F and 7G are close-up side views of an alternative embodiment of locking rib 2340 that is designed to improve the firing velocity of the sharp from the sensor applicator. Here, locking rib 2340 includes an inward detent ramp 2335 to reduce friction between sheath 704 and housing 2702 during firing. Locking rib 2340 also includes a sheath stopping ramp 2338 at the proximal end of firing surface 2337. In FIG. 7F, sheath 704 is initially shown in a "locked" state, in which detent round 1404 of detent snap 1402 has already passed over sheath snap lead-in feature 2330, and is positioned in locked groove 2332. As force is applied to the proximal end of housing 2702, detent round 1404 is advanced into unlocked groove 2334, placing applicator 150 into the "armed" position. When force is further applied to the proximal end of housing 2702, applicator 150 is "fired," as detent round 1404 passes over firing detent 2344.

As shown in FIG. 7G, detent round 1404 then advances toward the proximal end of housing 2702 in a "free flight" state, in which detent round 1404 passes over inward detent ramp 2335. While advancing proximally in the "free flight" state, detent round 1404 can be in non-continuous, or have no contact with, inward detent ramp 2335 and firing surface 2337. In this regard, detent round 1404 can be easily and quickly advanced, as there is little to no frictional force between detent round 1404 and inward detent ramp 2335 and firing surface 2337, and as such, improves upon the firing velocity of the sharp from the applicator. Sheath stopping ramp 2338, which is positioned proximally further along the locking rib 2340 relative to the embodiment shown in FIGS. 7D and 7E, provides an edge portion to frictionally engage the detent round 1404 and slow the movement of sheath 704. The sheath stopping ramp 2338 can have a sloped shape and provide for increasing frictional contact as the detent round 1404 advances in a proximal direction. Finally, upon detent round 1404 reaching final lockout recess 2336, detent snap flat 1406 (not shown) is engaged and securely holds sheath 704 in place with respect to housing 2702. Lockout recess 2336 prevents detent round 1404 and sheath 704 from backwards, or distal movement. This embodiment reflects a higher firing velocity relative to the embodiment depicted in FIGS. 7D and 7E, which also assists in prevention of a premature withdrawal of sharp.

Figure 7I:
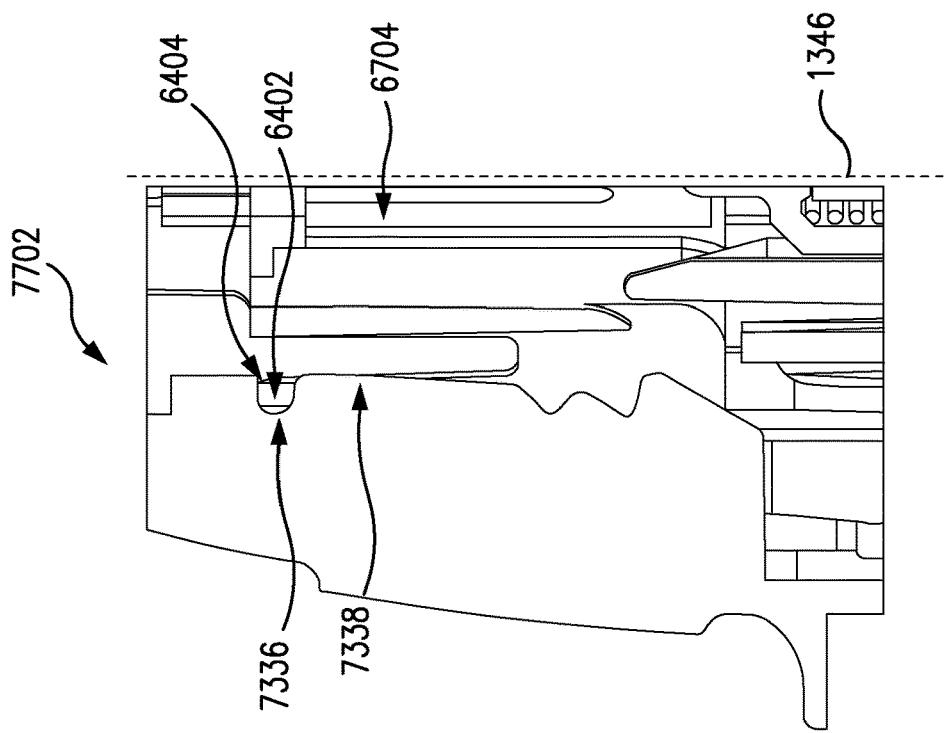
FIG. 7I is a side cross-sectional view depicting a locking rib portion of another example embodiment of a housing and a portion of a sheath.
Figure 7H:
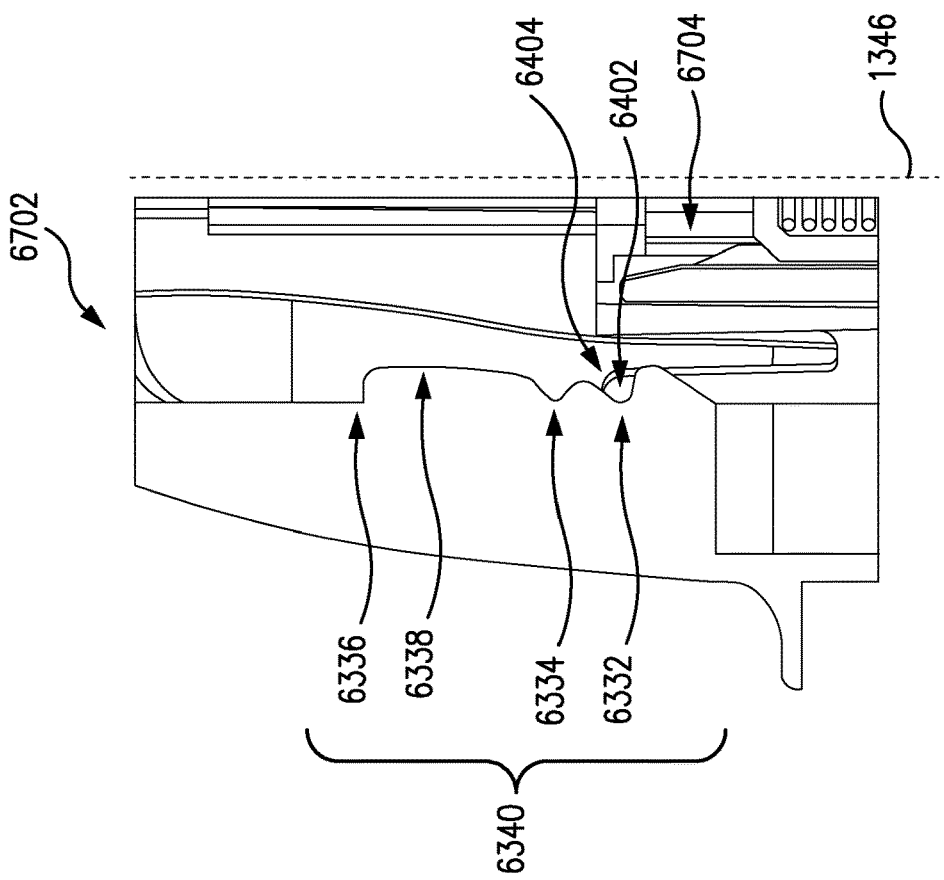
FIG. 7H is a side cross-sectional view depicting a locking rib portion of another example embodiment of a housing and a portion of a sheath.

FIG. 7H is a close-up side view of an alternative embodiment of locking rib 6340 designed to maintain a downward force on sheath 6704 during firing which, in turn, can prevent sheath 6704 from unwanted movement during the sensor insertion process. Here, sheath 6704 is shown in a "locked" state, in which detent round 6404 of detent snap 6402 is positioned in locked groove 6332. As force is applied to the proximal end of housing 6702, detent round 6404 is advanced into unlocked groove 6334, placing applicator in the "armed" position. When force is further applied to the proximal end of housing 6702, applicator is "fired," and detent round 6404 advances over sloped firing surface 6338 toward the proximal end of housing 6702. Sloped firing surface 6338 can be angled toward central axis 1346 such that the resulting downward force upon sheath 6704 increases as detent round 6404 advances in a proximal direction. In the depicted embodiment, detent round 6404 is in continuous contact with sloped firing surface 6338. Lockout recess 6336 prevents detent round 6404 and sheath 6704 from backwards, or distal movement. This embodiment reflects a slower firing velocity relative to the previously described embodiments, and can be used, for example, with the motion-actuated sharp retraction process that is described with respect to FIGS. 14A-14C and 15A-15B.

FIG. 7I is a close-up side view of still another alternative embodiment of locking rib 7340, also designed to maintain a downward force on sheath 6704 during firing which, in turn, can prevent sheath 6704 from unwanted movement during a sensor insertion process. Here, sheath 6704 is shown in a "fired" state, in which detent round 6404 of detent snap 6402 is positioned in a two-way lockout recess 7336. Upon detent round 6404 advancing into two-way lockout recess 7336, sheath 6704 can be prevented from further movement in either a proximal or distal direction. This can reduce unwanted movement of sheath 6704 during the sensor insertion process. Furthermore, in some embodiments, as described with respect to FIGS. 14A-14C and 15A-15B, two-way lockout recess 7336 can provide for the immobilization of sheath 6704 during a motion-actuated sharp retraction process. As can be seen in FIG. 7I, sloped firing surface 7338 is angled toward central axis 1346 such that a resulting downward force upon sheath 6704 increases as detent round 6404 advances in a proximal direction. In the depicted embodiment, detent round 6404 is in continuous contact with sloped firing surface 7338. This embodiment reflects a slower firing velocity and can be used, for example, with the motion-actuated sharp retraction process that is described with respect to FIGS. 14A-14C and 15A-15B.

Figure 7J:
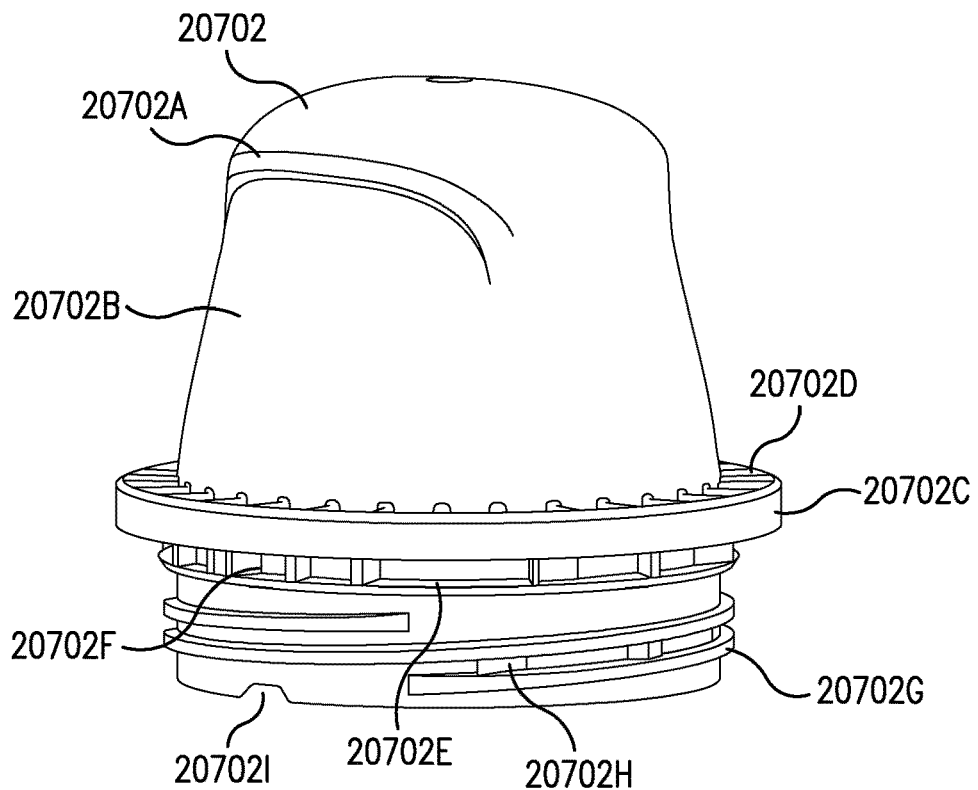
FIG. 7J is a side view of an exemplary housing in accordance with the disclosed subject matter.
Figure 7K:
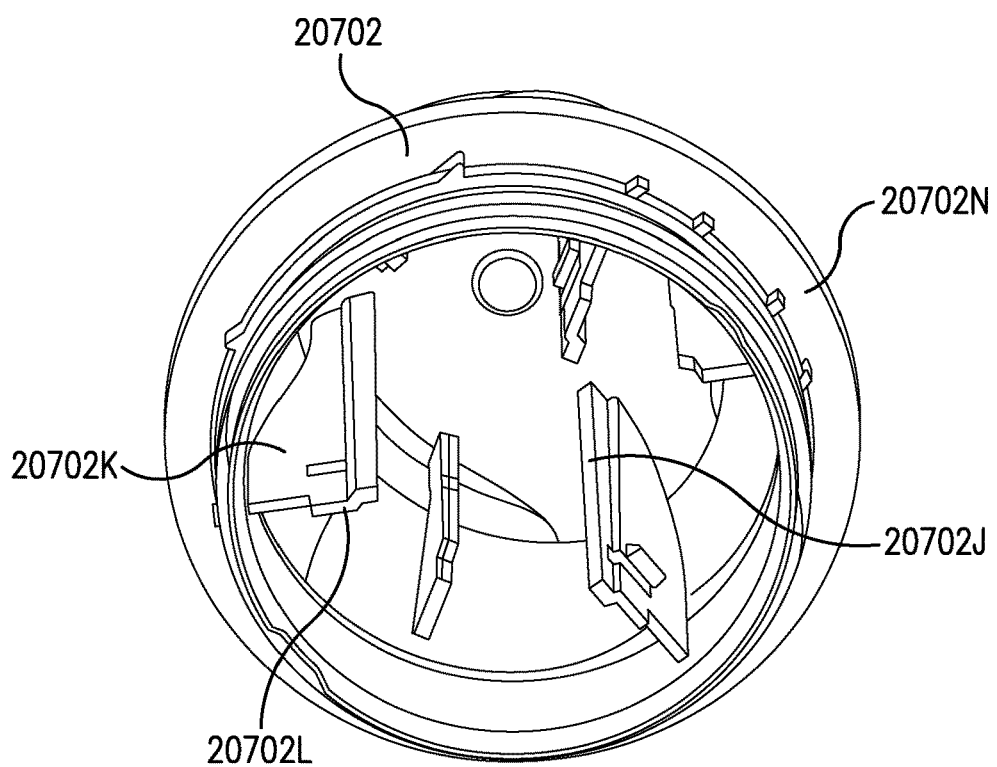
FIG. 7K is a bottom perspective view of the housing of FIG. 7J.
Figure 7L:
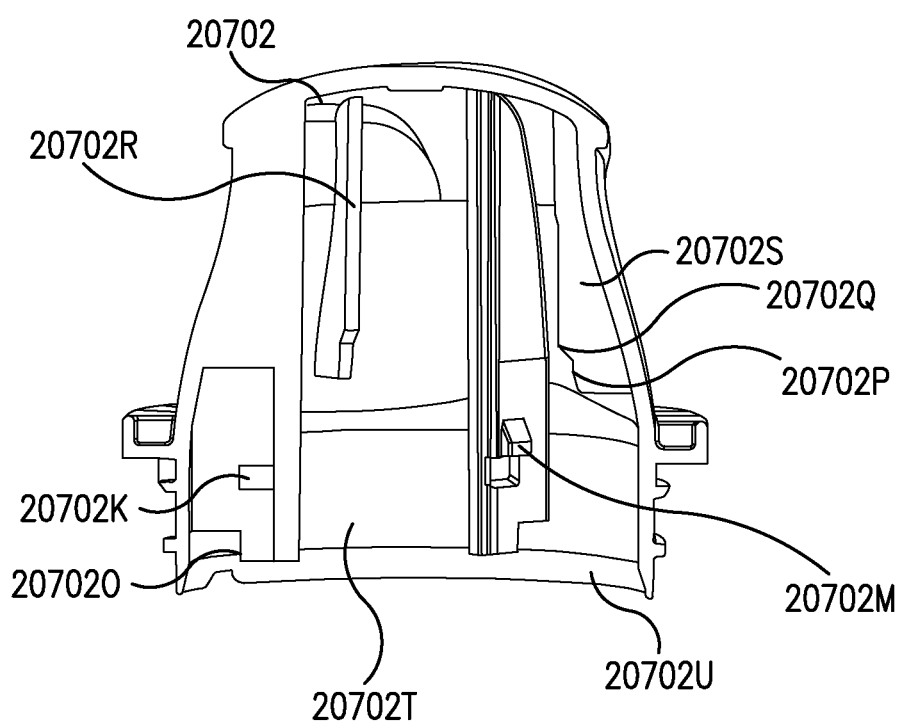
FIG. 7L is a side cutaway view of the housing of FIG. 7J.
Figure 7M:
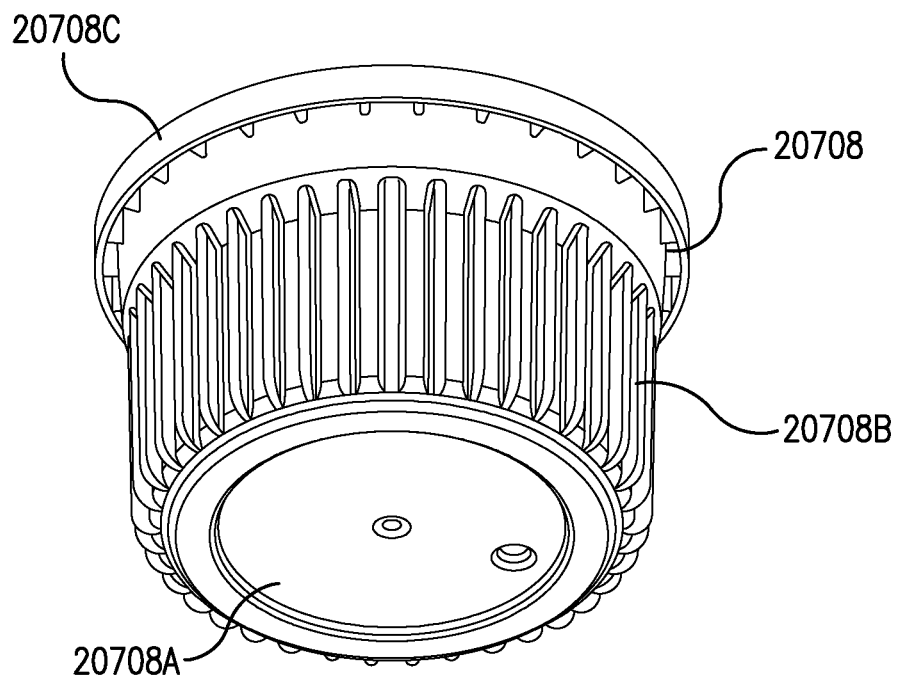
FIG. 7M is bottom perspective view of a cap in accordance with the disclosed subject matter.
Figure 7N:
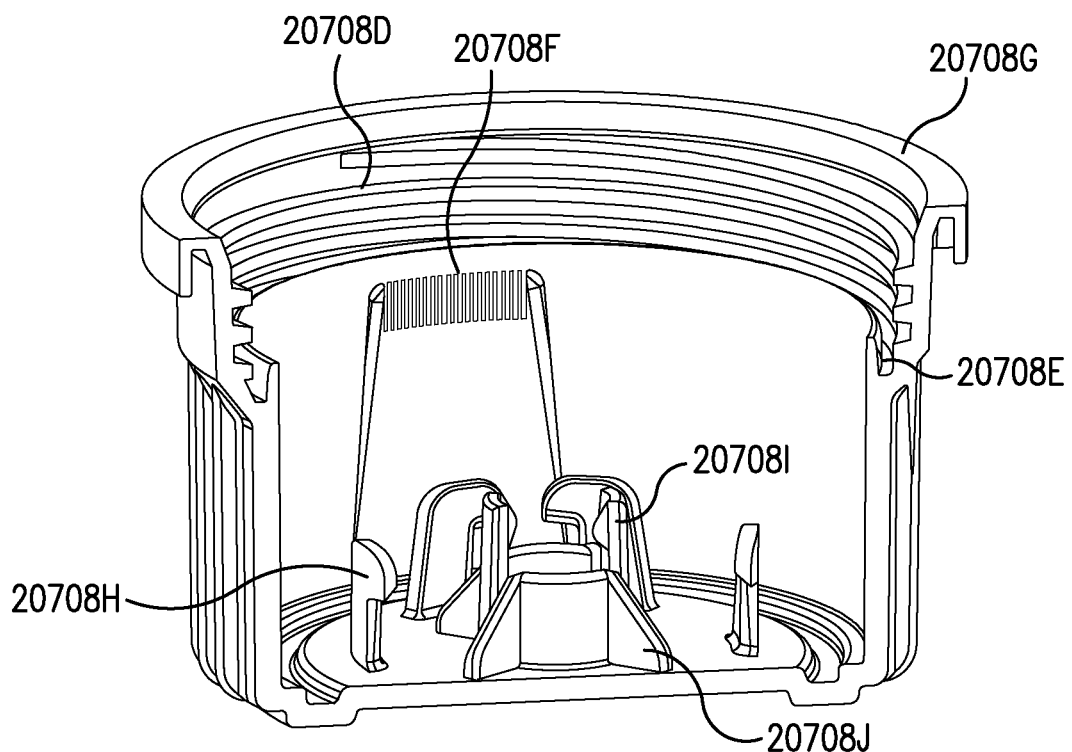
FIG. 7N is a side cutaway view of the cap of FIG. 7M.
Figure 7O:
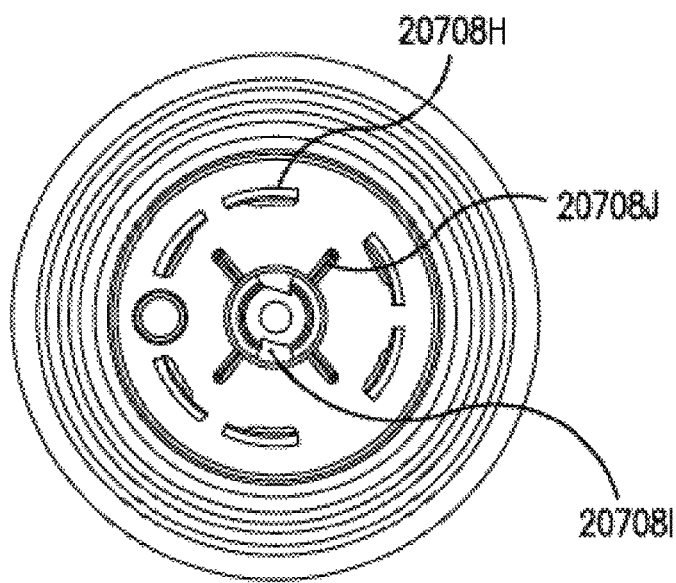
FIG. 7O is a top view of the cap of FIG. 7M.
Figure 7P:
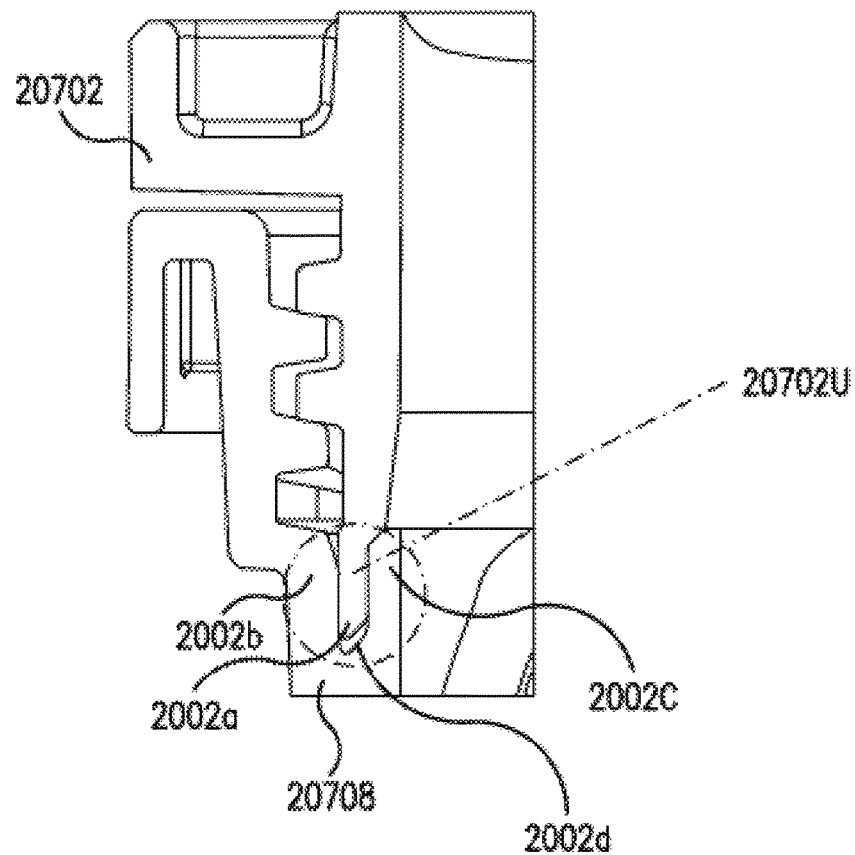
FIGS. 7P-Q are enlarged cross-sectional side views of the interface between the housing and cap in accordance with the disclosed subject matter.
Figure 7Q:
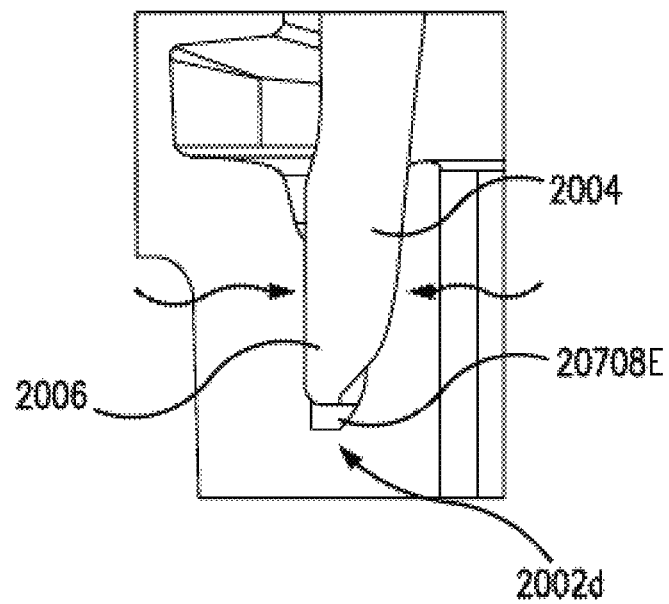

Referring to FIGS. 7J-7L, for purpose of illustration and not limitation, a housing 20702 in accordance with the disclosed subject matter is provided. Housing 20702 can be made of cyclic olefin copolymer, or other suitable materials, such as polycarbonate or high density polyethylene (HDPE). Housing 20702 can include one or more of the features described herein with regard to housings, wherein similar features can operate as described herein. For example, housing 20702 can include a grip overhang 20702A that can enable a user to securely grip housing 20702. The housing 20702 can have additional grip overhangs 20702A, for example, two grip overhands 20702A on opposite sides of the housing 20702. The housing 20702 can include a side grip zone 20702B disposed below the grip overhand 20702A. The side grip zone 20702B can be textured for improved gripping by a user. The housing 20702 can have additional side grip zones 20702B, for example, two side grip zones 20702B on opposite sides of the housing 20702, each disposed below a grip overhang 20702A.

The housing 20702 can include a housing skirt 20702C, which can provide a surface for tamper evidence feature 20712. The housing skirt 20702C can be supported by a plurality of skirt stiffening ribs 20702D. The skirt stiffening ribs 20702D can provide support for the housing skirt 20702C and can help protect the applicator device 20150 during a shock event, such as a drop. Additionally, the skirt stiffening ribs 20702D can be used to support the housing 20702 during manufacturing. The housing skirt 20702C and skirt stiffening ribs 20702D can provide stiffness against forces due to gasket compression, and can help maintain gasket 20701 compression through shelf life. The housing 20702 can include a gasket retention ring 20702E and a plurality of gasket retention pockets 20702F, which can hold the gasket 20701 relative the housing 20702. For example, the gasket retention ring 20702E can prevent lateral movement of the gasket 20701 and the gasket retention pockets 20702E can prevent rotation of the gasket 20701. The housing 20702 can include a plurality of gasket retention pockets, for example, 14 gasket retention pockets 20702E. Gasket sealing face 20702N that can seal against the gasket

20701. Housing 20702 can additionally or alternatively have an applicator cap sealing lip 20702U that can interface with the cap 20708, as described in greater detail below. Housing 20702 can have inner surface 20702T that can receive the sheath 20704.

Housing 20702 can include threads 20702G configure to engage with threads 20708D disposed on cap 20708. The threads can include radial limiting features 20702H, which can limit radial deformation of the cap 20702G during a shock event, such as a drop. Housing 20702 can include a plurality of radial limiting features 20702H, for example, 6 radial limiting features 20702H. The radial limiting features 20702H can be protrusions from the housing and can close a gap with the threads 20708D disposed on cap 20708. This can limit oval deformation of the cap 20702H during a shock event, such as a drop. Preventing oval deformation of cap 20702H can, in turn, ensure that lock arms 20704J of sheath 20704 stay locked between the cap 20702 and the sensor carrier 20710 to limit movement of the sheath 20704 prior to removing cap 20702H (as described in greater detail below). Housing 20702 can further include a clearance notch 20702I for clearance of the sheath arms during firing.

The interior of housing 20702 can include a plurality of sensor carrier attachment features for receiving, aligning, and limiting movement of the sensor carrier 20710. For example, housing 20703 can include sheath guide rails 20702J, which can help to align and guide sheath 20704 as the sheath 20704 moves relative the housing 20702. Housing 20702 can include sensor carrier attach slots 20702K, which can engage and hold the sensor carrier 20710, and sensor carrier hard stops 20702L, that can limit axial movement of the sensor carrier 20710 relative the housing 20702. Housing 20702 can include sensor carrier biasing feature 20702M that can remove slop between the sensor carrier 20710 and the housing 20702 after assembly and sensor carrier radial limiting feature 20702O that can keep the sensor carrier radially aligned relative the housing 20702. Flat horizontal faces between sensor carrier attach slots 20702K and sensor carrier radial limiting feature 20702O can be used to stop the sheath 20704 at the end of a stroke. Corresponding features on the sheath 20704 can interact with these faces. The sensor carrier biasing feature 20702M can further limit rotation of the sensor carrier 20710 relative the housing 20702. Housing 20702 can include one or more of each of the sheath guide rails 20702J, sensor carrier attach slots 20702K, sensor carrier hard stops 20702L, sensor carrier radial limiting feature 20702O, and sensor carrier biasing feature 20702M, for example, three of each.

The interior of housing 20702 can further include a plurality sheath ribs 20702S for engaging the sheath 20704 for insertion, as described herein. Housing 20702 can include one or more of sheath ribs 20702S, for example, three. Each sheath rib 20702S can include a sheath snap lead in feature 20702P configured to initially lead in the detent snap 20704A of sheath 20704 into the correct location. The housing 20702 can include a firing detent 20702Q. After the detent snap 20704A of sheath 20704 passes the firing detent 20702Q, the firing sequence can be initiated, and the sheath 20704 can travel toward the sheath stopping ramp 20702R. The sheath stopping ramp 20702 can slow the sheath 20704 at the end of firing.

Referring to FIGS. 7M-7U for purpose of illustration, an exemplary cap 20708 is provided. Cap 20708 can include one or more of the features described herein with regard to caps, wherein similar features can operate as described herein. Cap 20708 can be made of high density polyethylene (HDPE) or any other suitable materials, such as polypropylene or low-density polyethylene (LDPE). Cap 20708 can include a label surface 20708A configured to receive label 20709. Cap 20708 can include ribs 20708B which can provide strength and provide an improved gripping surface for a user. The cap 20708 can include tamper label ring 20708C, which can receive the tamper evidence feature 20712. The cap 20708 can also include a gasket sealing surface 20708G, configured to engage gasket 20701.

Internally, cap 20708 can include threads 20708D, which can engage threads 20702G disposed on the housing 20702. Cap 20708 can also include seal interface 20708E which can be configured to receive the applicator cap sealing lip 20702U to create a seal between the housing 20702 and the cap 20708.

Figure 7R:
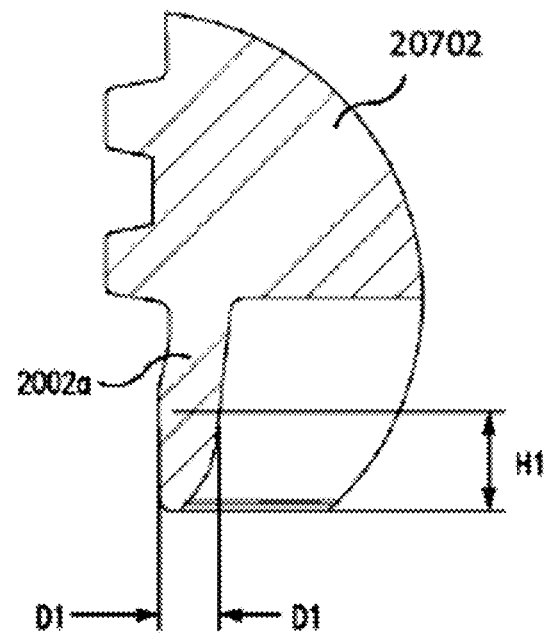

FIGS. 7P-S show an enlarged cross-sectional side view of the interface between housing 20702 and cap 20708. As illustrated, applicator cap sealing lip 20702U of housing 20702 includes a first axial extension 2002a and seal interface 20708E of cap 20708 provides a cavity 2002d matable with the first axial extension 2002a. In the illustrated embodiment, the diameter of cavity 2002d formed from second axial extension 2002b and third axial extension 2002c of the cap 20708 is sized to receive the diameter of first axial extension 2002a of housing 20702 within cavity 2002d. For example, as shown in FIG. 7R, axial extension 2002a can have thickness D1 at height H1, as measured from distal edge of axial extension 2002a. Similarly, second axial extension 2002c can have a thickness D5 at height H3, as measured from proximal edge of cap 20708; cavity 2002d can have a thickness D2, D3, and D4 at heights H2, H3, and H4, respectively, as measured from proximal edge of cap 20708. In certain embodiments, D1 can measure 1 mm with a tolerance of +/−0.03 mm, D2, D3, D4 can have any suitable dimensions, H1 can measure 1.66 mm with a tolerance of +/−0.1 mm, H2 can measure 8.25 mm with a tolerance of +/−0.1 mm, H3 can measure 9.25 mm with a tolerance of +/−0.1 mm, H4 can measure 9.75 mm with a tolerance of +/−0.1 mm. In other embodiments, however, the reverse can be employed, where the diameter of first axial extension 2002a can be sized to receive the diameter of the second axial extension 2002b, without departing from the scope of the disclosure.

In each embodiment, two radial seals 2004, 2006 can be defined or otherwise provided at the interface between first and second axial extensions 2002a, b and radial seals 2004 and 2006 can help prevent migration of fluids or contaminants across the interface in either axial direction. Moreover, the dual radial seals described herein can accommodate tolerance and thermal variations combined with stress relaxation via a redundant sealing strategy. In the illustrated embodiment, dual radial seals 2004, 2006 utilize a "wedge" effect for effective sealing between first axial extension 2002a and second axial extension 2002b.

Cap 20708 can include one or more sets of crush ribs 20708F (see FIG. 7N), for example, two sets of crush ribs 20708F. The crush ribs 20708F can be configured to engage the sharp edge 20704N of lock arm 20704J during a shock event, for example a drop, as described in greater detail below (see e.g., FIG. 8N).

In accordance with the disclosed subject matter, Cap 20708 can include one or more desiccant retention clips 20708H to retain the desiccant 20502 in the cap 20708 and limit rotation of the desiccant 20502. Cap 20708 can include a ratchet 20708I to engage the sensor cap and remove the sensor cap when the cap 20708 is removed from the housing 20702, as described in greater detail below. Cap 20708 can include a plurality of ribs 20708J to provide strength.

Figure 7U:
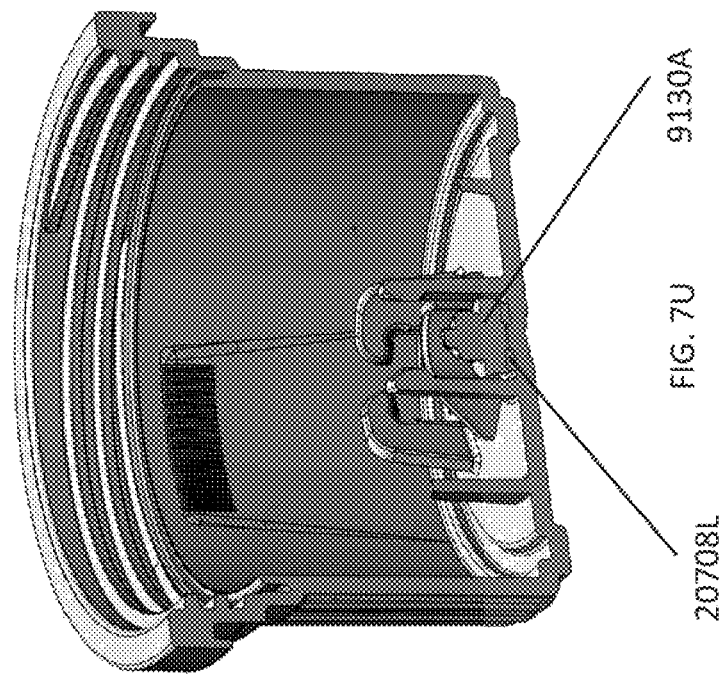
FIGS. 7T-U are side cutaway views of the cap of FIG. 7M.
Figure 7T:
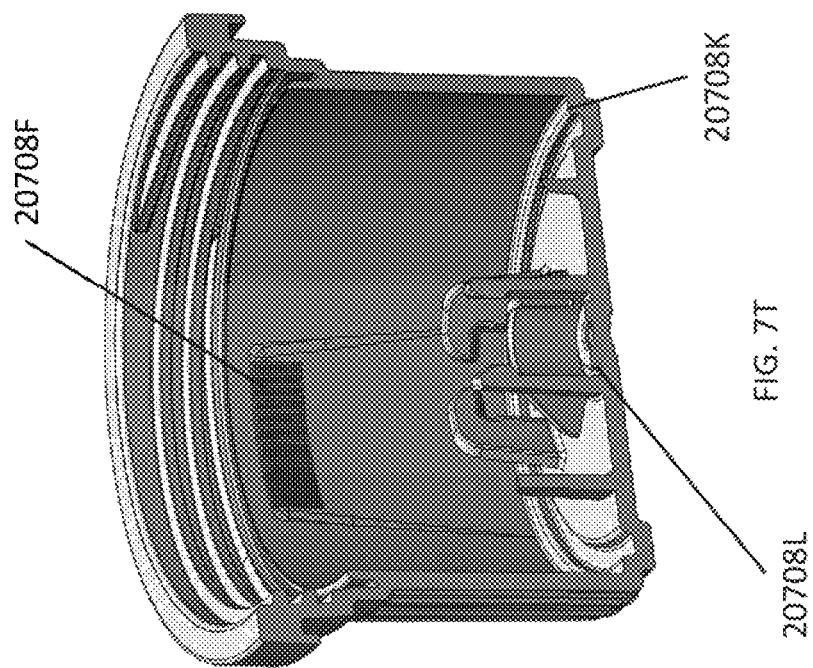

Referring to FIGS. 7T and 7U for purpose of illustration and not limitation, in accordance with the disclosed subject matter, cap 20708 can include one or more surfaces to engage other elements in the applicator device 20150 to provide support or limit movement in the case of a shock event, for example, a drop. For example, the cap can include a sheath support surface 20708K, configured to support the sheath 20704 during a shock event. The sheath support surface 20708K can limit distal movement of the sheath 20704 during a shock event. This can lead to less stress on the sensor carrier 20710 and the sensor control device 20102 and can reduce the risk of the sensor control device 20102 dislodging form the sensor carrier 20710. Additionally or alternatively, the cap 20708 can include a raised ridge 20708L. The raised ridge 20708L can interface with a plug, such as an elastomeric plug 9130A (which can be coupled to a desiccant cap 9130). The raised ridge 20708L can thereby also support the sharp carrier 201102, sensor carrier 20710, sensor control device 20102, and accordingly, can prevent dislodging of the sensor control device 20102 from the sensor carrier 20710 during a shock event. Furthermore, additional support on the elastomeric plug 9130A and other features can increase the stress on various seals in the applicator device 20150, and thereby improve the seals prior to removing the cap 20708 from the housing.

Exemplary Applicator Sheaths

Figure 8A:
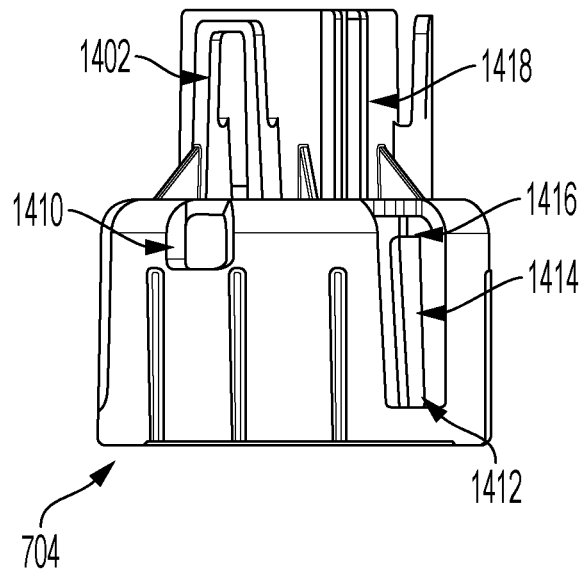
FIG. 8A is a side view depicting an example embodiment of a sheath.
Figure 8B:
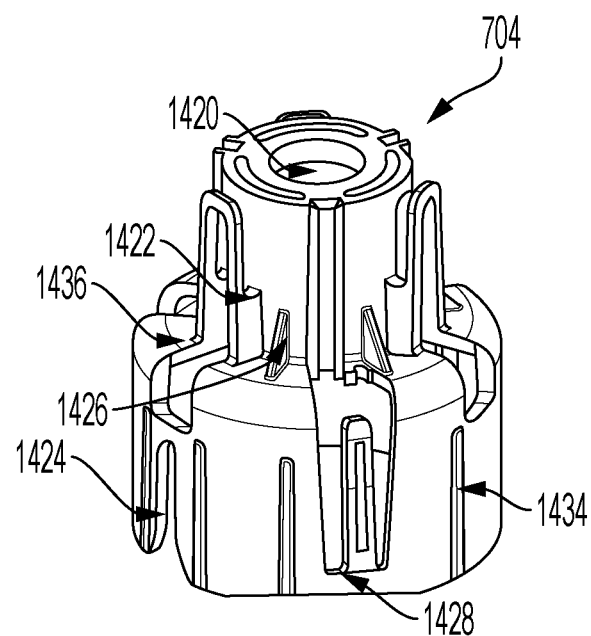
FIG. 8B is a perspective view depicting an example embodiment of a proximal end of a sheath.

FIGS. 8A and 8B are a side view and perspective view, respectively, depicting an example embodiment of sheath 704. In this example embodiment, sheath 704 can stage sensor control device 102 above a user's skin surface prior to application. Sheath 704 can also contain features that help retain a sharp in a position for proper application of a sensor, determine the force required for sensor application, and guide sheath 704 relative to housing 702 during application. Detent snaps 1402 are near a proximal end of sheath 704, described further with respect to FIG. 8C below. Sheath 704 can have a generally cylindrical cross section with a first radius in a proximal section (closer to top of figure) that is shorter than a second radius in a distal section (closer to bottom of figure). Also shown are a plurality of detent clearances 1410, three in the example embodiment. Sheath 704 can include one or more detent clearances 1410, each of which can be a cutout with room for sheath snap lead-in feature 1330 to pass distally into until a distal surface of locking rib 1340 contacts a proximal surface of detent clearance 1410.

Guide rails 1418 are disposed between sensor carrier traveler limiter face 1420 at a proximal end of sheath 704 and a cutout around lock arms 1412. Each guide rail 1418 can be a channel between two ridges where the guide edge 1326 of housing guide rib 1321 can slide distally with respect to sheath 704.

Lock arms 1412 are disposed near a distal end of sheath 704 and can include an attached distal end and a free proximal end, which can include lock arm interface 1416. Lock arms 1412 can lock sensor carrier 710 to sheath 704 when lock arm interface 1416 of lock arms 1412 engage lock interface 1502 of sensor carrier 710. Lock arm strengthening ribs 1414 can be disposed near a central location of each lock arm 1412 and can act as a strengthening point for an otherwise weak point of each lock arm 1412 to prevent lock arm 1412 from bending excessively or breaking.

Detent snap stiffening features 1422 can be located along the distal section of detent snaps 1402 and can provide reinforcement to detent snaps 1402. Alignment notch 1424 can be a cutout near the distal end of sheath 704, which provides an opening for user alignment with sheath orientation feature of platform 808. Stiffening ribs 1426 can include buttresses, that are triangularly shaped here, which provide support for detent base 1436. Housing guide rail clearance 1428 can be a cutout for a distal surface of housing guide rib 1321 to slide during use.

FIG. 8C is a close-up perspective view depicting an example embodiment of detent snap 1402 of sheath 704. Detent snap 1402 can include a detent snap bridge 1408 located near or at its proximal end. Detent snap 1402 can also include a detent snap flat 1406 on a distal side of detent snap bridge 1408. An outer surface of detent snap bridge 1408 can include detent snap rounds 1404 which are rounded surfaces that allow for easier movement of detent snap bridge 1408 across interior surfaces of housing 702 such as, for example, locking rib 1340.

Figure 8D:
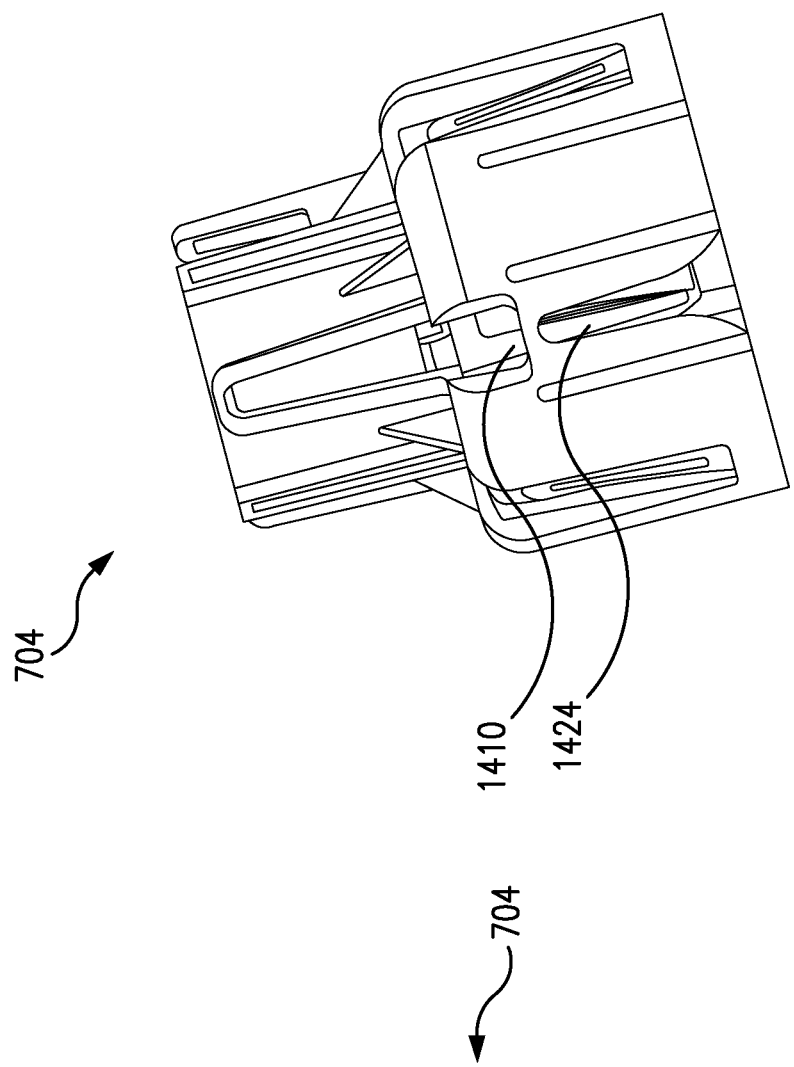
FIG. 8D is a side view depicting an example embodiment of features of a sheath.
Figure 8C:
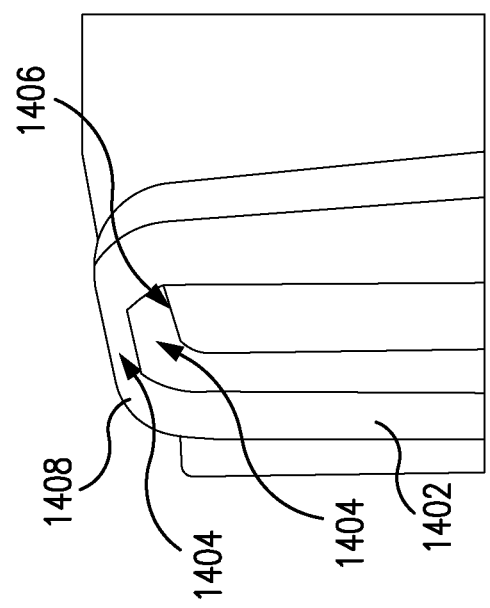
FIG. 8C is a close-up perspective view depicting an example embodiment of a distal side of a detent snap of a sheath.

FIG. 8D is a side view depicting an example embodiment of sheath 704. Here, alignment notch 1424 can be relatively close to detent clearance 1410. Detent clearance 1410 is in a relatively proximal location on distal portion of sheath 704.

Figure 8E:
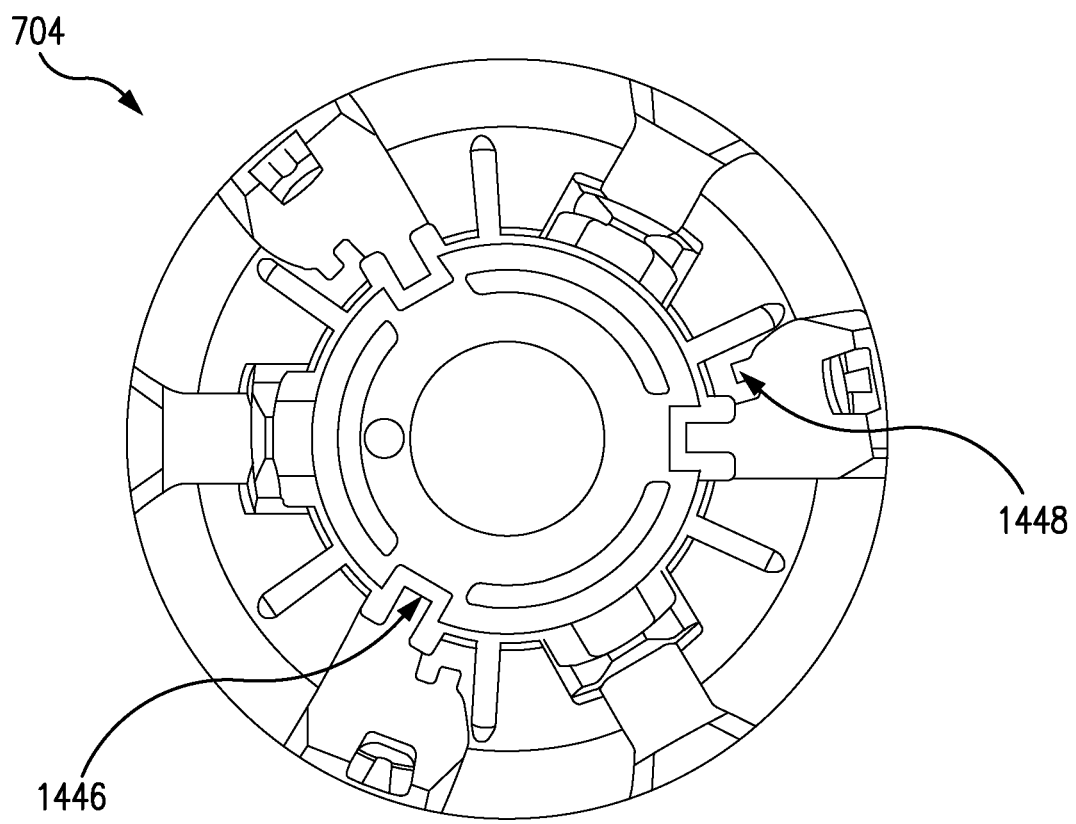
FIG. 8E is an end view of an example embodiment of a proximal end of a sheath.

FIG. 8E is an end view depicting an example embodiment of a proximal end of sheath 704. Here, a back wall for guide rails 1446 can provide a channel to slidably couple with housing guide rib 1321 of housing 702. Sheath rotation limiter 1448 can be notches which reduce or prevent rotation of the sheath 704.

Figure 8F:
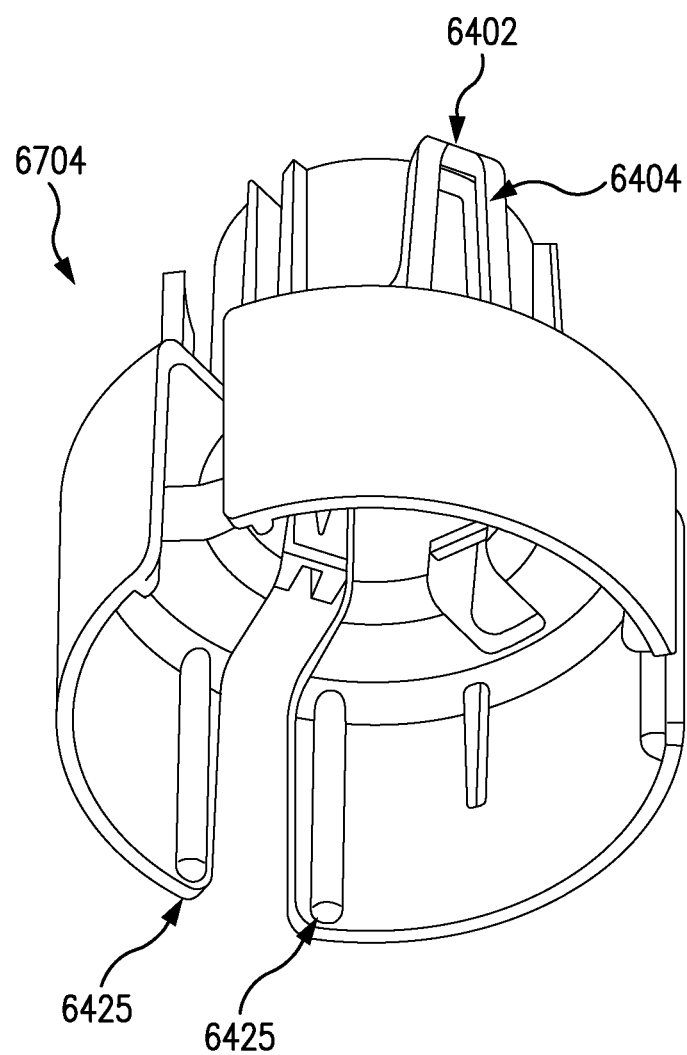
FIGS. 8F to 8H are perspective views depicting another example embodiment of a sheath in various stages of assembly with other applicator components.
Figure 8G:
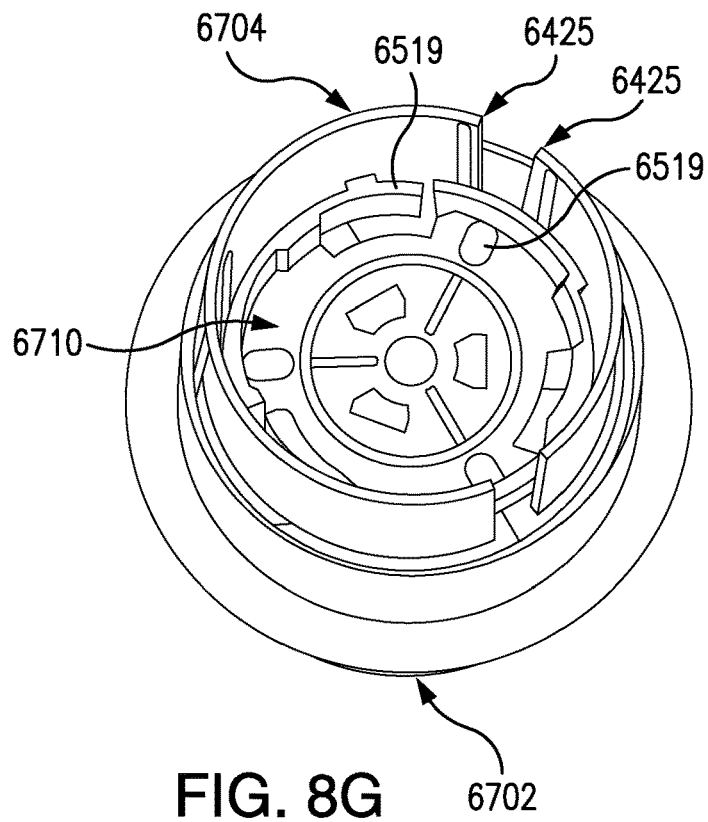
Figure 8H:
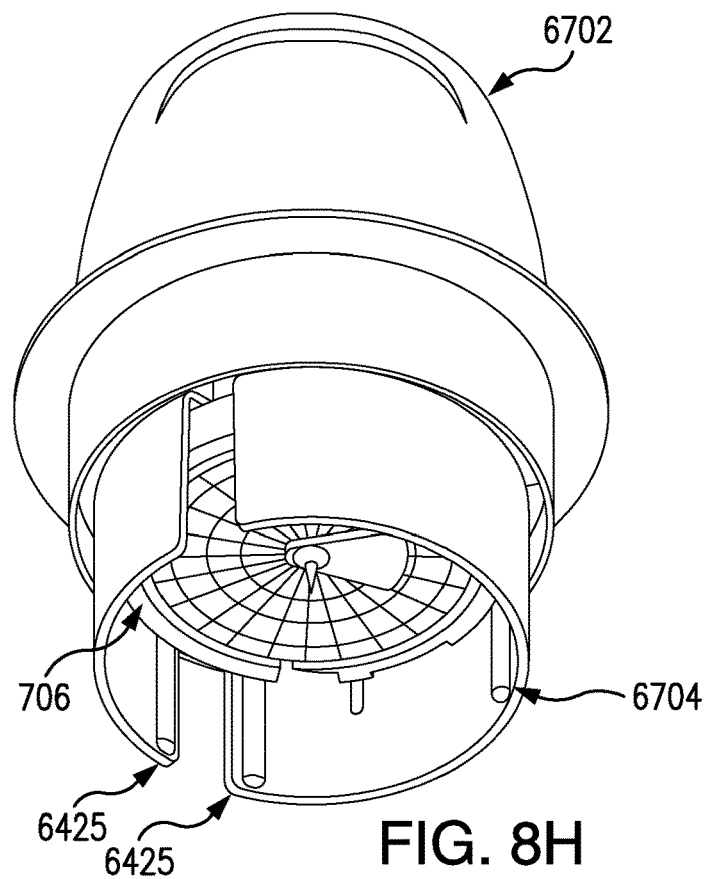
Figure 8I:
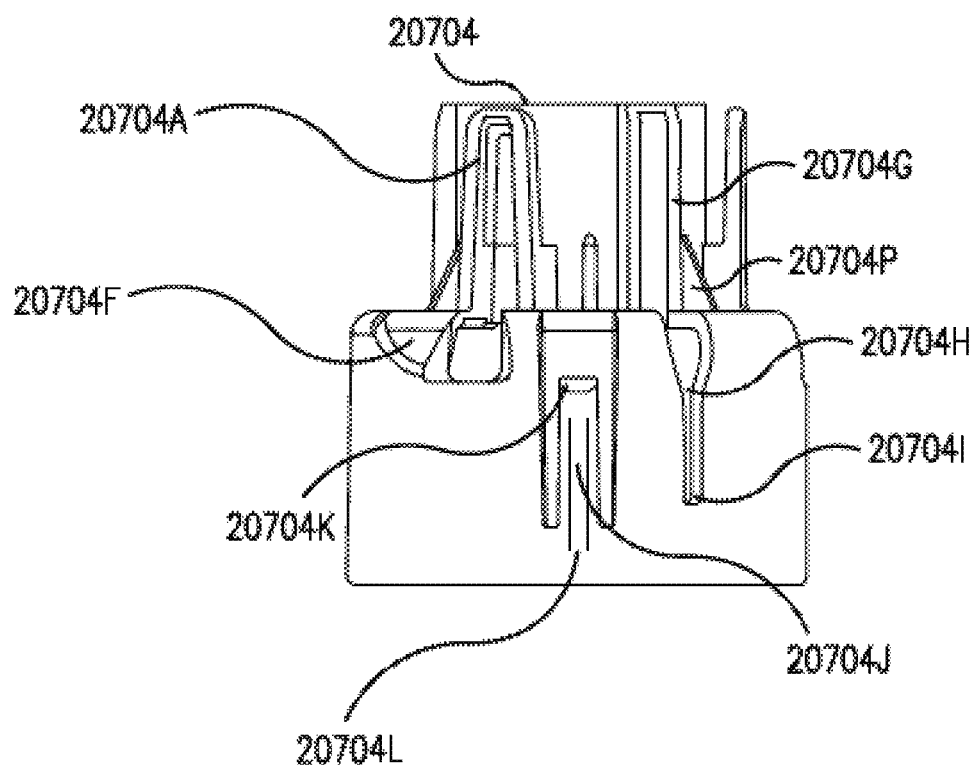
FIG. 8I is a side view of a sheath in accordance with the disclosed subject matter.

FIGS. 8F-8H are perspective views of an alternative example embodiment of sheath 6704 in various stages of assembly with other components of the applicator. As shown in FIG. 8F, sheath 6704 can have many of the same features as sheath 704, previously described with respect to FIGS. 8A-8C. Sheath 6704, for example, can include one or more detent snaps 6404 having one or more detent rounds 6402 attached thereto. Sheath 6704, however, can be shorter in overall length as compared to sheath 702. In addition, sheath 6704 can include one or more inner sheath ribs 6425 disposed on the inner surface of sheath 6704, and which protrude in an inward direction towards the central axis of sheath 6704.

Turning to FIG. 8G, sheath 6704 is shown in perspective view in a stage of assembly with applicator housing 6702 and sensor carrier 6710. One or more inner sheath ribs 6425 of sheath 6704 can interface with one or more corresponding rib notches 6519 in sensor carrier 6710. The fitted interface between corresponding ribs 6425 and notches 6519 can help maintain axial alignment of the sheath 6704 and sensor carrier 6710 during the sensor insertion process. Furthermore, the interface between ribs 6425 and notches 6519 can reduce lateral and rotational movement between the applicator components, which can, in turn, reduce the chance of improper sensor insertion.

Turning to FIG. 8H, sheath 6704 is shown in perspective view in a stage of assembly with applicator housing 6702 and sensor electronics housing 706, which has been inserted into sensor carrier 6710. Inner sheath ribs 6425 are also shown.

It should be noted that although six inner sheath ribs 6425 and six corresponding rib notches 6519 are depicted, any number of ribs and notches are fully within the scope of the present disclosure. Moreover, while ribs 6425 are depicted with a rounded surface edge, in other embodiments, ribs 6425 can have a rectangular or triangular shape, and rib notches 6519 can have a corresponding receiving shape for interfacing with ribs 6425. In addition, although ribs 6425 are depicted as being disposed on an inner circumferential surface of sheath 6704, ribs 6425 can also be disposed on any other surface of sheath 6704, or portion thereof, that comes into contact with sensor carrier 6710.

Figure 8J:
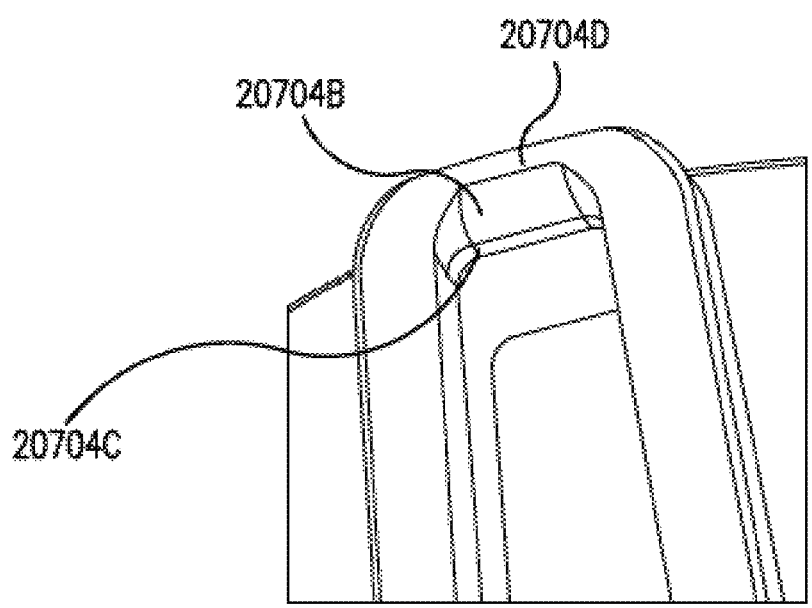
FIG. 8J is a close-up view of a detent snap of the sheath of FIG. 8I.
Figure 8K:
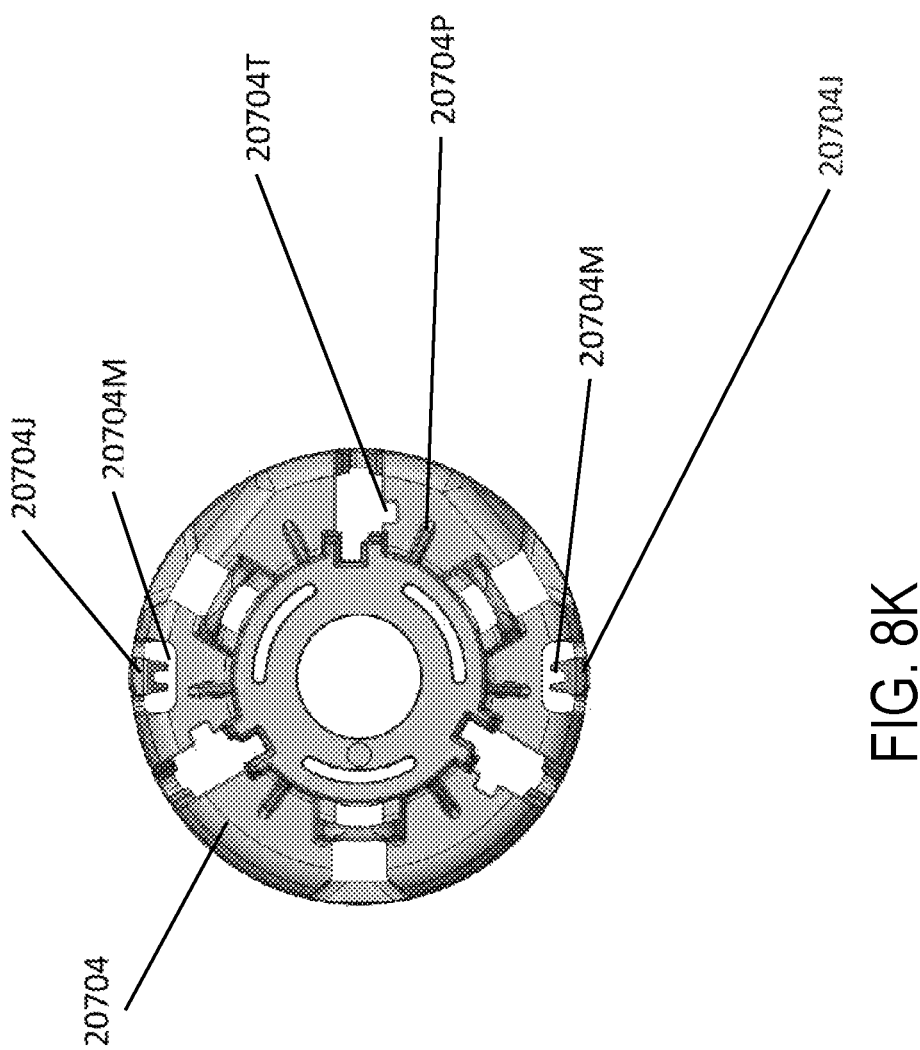
FIG. 8K is a top view of the sheath of FIG. 8I.
Figure 8L:
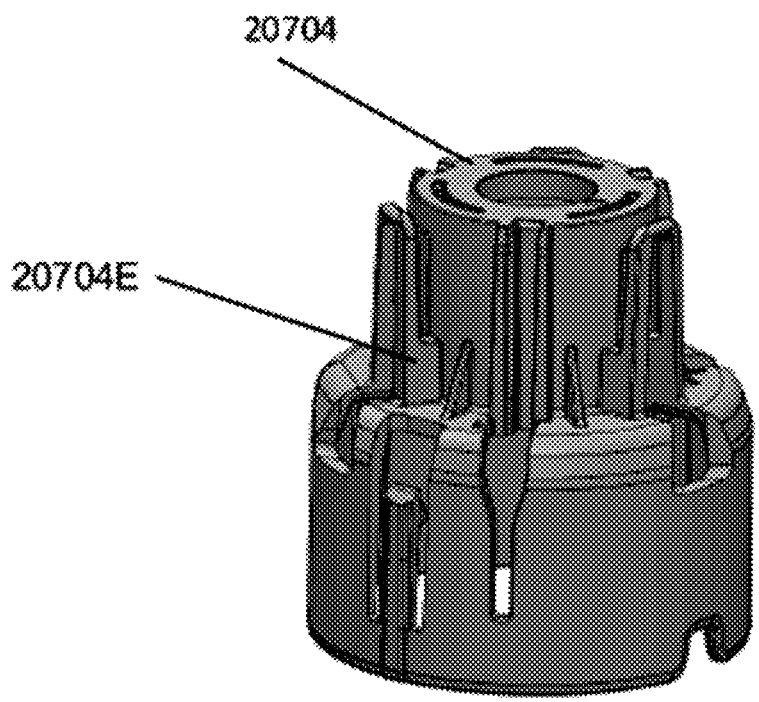
FIG. 8L is a perspective view of the sheath of FIG. 8I.
Figure 8M:
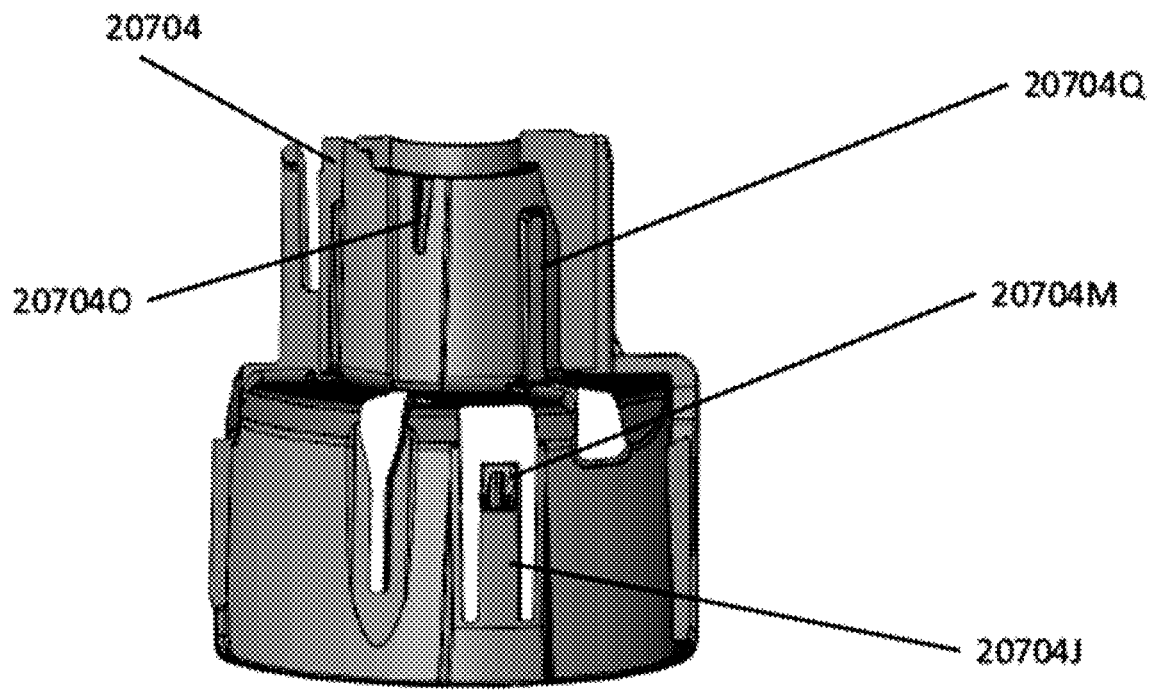
FIG. 8M is a side cutaway view of the sheath of FIG. 8I.
Figure 8N:
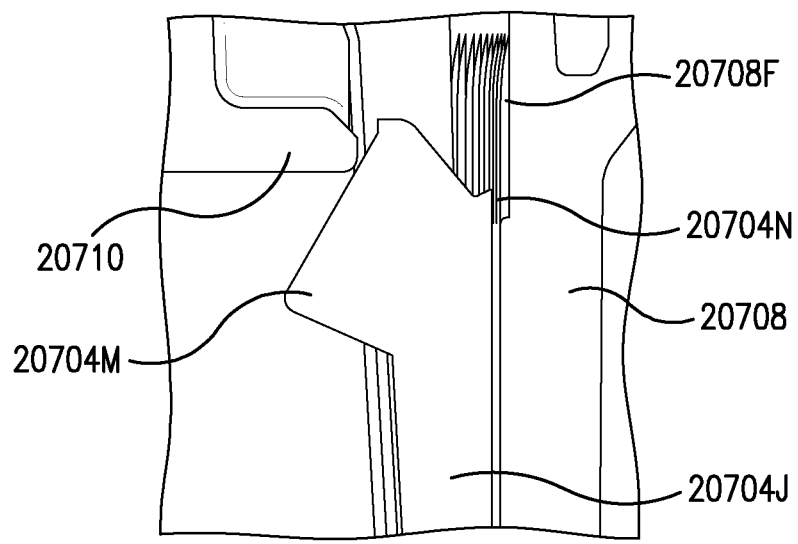
FIG. 8N is a close-up view a lock arm of the sheath of FIG. 8I and the lock arm's engagement with a cap and a sensor carrier, in accordance with the disclosed subject matter.
Figure 8O:
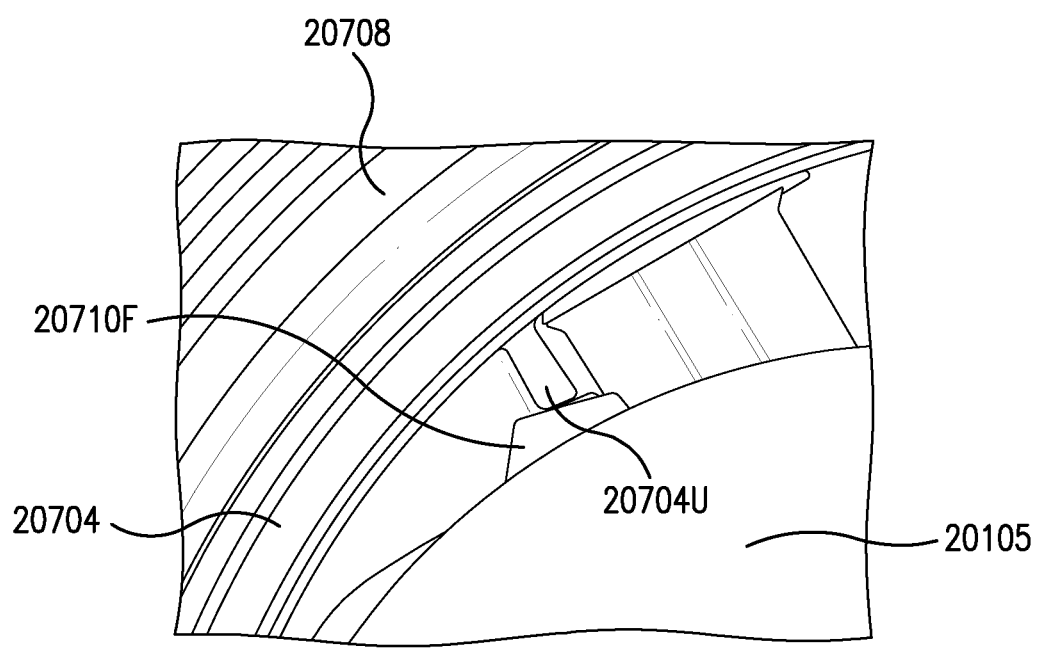

Referring to FIGS. 8I-8O, for purpose of illustration and not limitation, a sheath 20704 is provide, in accordance with the disclosed subject matter. Sheath 20704 can be made of Delrin or other suitable materials, for example, other low friction polymers. Sheath 20704 can include one or more of the features described herein with regard to sheaths, wherein similar features can operate as described herein. For example, sheath 20704 can include detent snaps 20704A having a free proximal end, configured to engage the sheath ribs 20702S during firing. FIG. 8J shows a close up of the free proximal end of detent snap 20704A. The detent snaps 20704A can include a round portion 20704B, for engagement with the sheath ribs 20702S and a flat portion 20704C for final lockout on housing 20704 after use. The round portion 20704B can include a parting line mismatch 20704D that can prevent a force spike during firing. The detent snaps 20704A can be coupled to the sheath 20704 at an enlarged distal portion 20704E, which can provide support to the detent snap 20704. Sheath 20704 can include a plurality of detent snaps 20704A, for example, three. The sheath 20704 can include one or more, for example, three, housing clearances 20704F, which can allow the sheath 20704 to clear the housing 20702 at the end of firing. In accordance with the disclosed subject matter, sheath 20704 can further include a plurality of stiffening ribs 20704P (e.g., six) which can stiffen the sheath 20704.

Sheath 20704 can include a plurality of guides 20704G for engaging the sheath guide rails 20702J of the housing 20702. Sheath 20704 can further include a slot 20704H including a stop 20704I at a distal end of the slot 20704H configured to engage the sheath guide rails 20702J of the sheath 20702 to limit further proximal movement of the sheath 20704 relative the housing 20702 at the end of firing. Sheath 20704 can also include a clearance 20704T for clearing the sensor carrier biasing feature 20702I disposed on the sheath guide rails 20702J of the housing 20702.

In accordance with the disclosed subject matter, sheath 20704 can include lock arms 20704J. Lock arms 20704J can be configured to engage the sensor carrier 20710 and limit movement of the sensor carrier 20710 or sheath 20704 prior to firing. The lock arms 20704J can include a free proximal end 20704K and an attached distal end 20704L. The free proximal end 20704K can include a lock arm interface 20704M disposed on an inner surface of the lock arm 20704J. The lock arm interface 20704M can engage a lock ledge 20710N on the sensor carrier 20710. For example, when cap 20708 is coupled to housing 20702, the cap 20708 can urge the lock arm 20704J inwardly, and can cause the lock arm interface 20704M to engage the sensor carrier 20710. That is, the lock arms 20704J can wedge between the cap 20708 and the sensor carrier 20710. Accordingly, the lock arm 20704J can limit proximal movement of the sheath 20704 when the cap 20708 is coupled to the housing 20702. Such engagement can limit movement of the sheath 20704 during a shock event, such as a drop. The lock arm interface 20704M can have a triangle shape when viewed in side view (e.g., FIG. 8N) and a "U" shape when viewed in top view (e.g., FIG. 8K). The shape of the lock arm interface 20704M can provide benefits during manufacturing. For example, the shape of the lock arm interface 20704M can allow the sheath 20704 to be force ejected from a mold during manufacturing of the sheath 20704. Force ejecting the sheath 20704 can allow for a more a simplified manufacture process, for example, using a one-piece mold, and can eliminate parting lines created from two-piece molds. Parting lines can result in an unsmooth surface which can catch on the sensor carrier 20710 during firing and can result in potential spikes in firing force. Accordingly, using force ejection and a one-piece mold can create a smoother lock arm interface 20704M and prevent potential spikes in firing force due to parting lines.

The proximal free end of the lock arm 20704J can further include a sharp edge 20704N on an outer surface. The sharp edge 20704N can be configured to engage crush ribs 20708F disposed on the cap 20708 during a shock event. The sharp edge 20704N can dig into the crush ribs 20708F and permanently deform the crush ribs 20708F, which can absorb energy during a shock event, and prevent sheath 20704 collapse. The shape lock arm interface 20704M can also be beneficial for drop protection. The ramp can force the lock arm 20704J to move radially as the sheath 20704 collapsed during a drop. This can force the sharp edge 20704N to dig into the crush ribs 20708F and can help to stop the sheath 20704 from collapsing. Sheath 20704 can include a plurality of lock arms 20704J, for example, two lock arms 20704J.

Additionally or alternatively, sheath 20704 can include rib 20704U configured to engage a lock interface 20710F on a sensor retention arm 20710B on the sensor carrier 20710. The rib 20704U can prevent the sensor retention arm 20710B from flexing outwardly, for example, during a shock event, and therefore can prevent movement of the sensor control device 20102 during a shock event. Rib 20704U can have a height (i.e., in the longitudinal direction) selected such that even if the sheath 20704 moves proximally or distally during a shock event, the rib 20704U will continue to engage lock interface 20710F on a sensor retention arm 20710B on the sensor carrier 20710 and prevent the sensor control device 20102 from dislodging from the sensor carrier 20710.

The sheath 20704 can include a noise damper 20704O. The noise damper 20704O can be configured to engage the sharp carrier 201102 as the sharp carrier 201102 is retracted to slow movement of the sharp carrier 201102 and can thereby reduce noise produce by the sharp carrier 201102 engaging the sheath 20704. In exemplary embodiments, the noise damper 20704O includes an angled ramp extending from the inner surface of sheath 20704, but other suitable configurations can be used.

In accordance with the disclosed subject matter, sheath 20704 can include a slot 20704Q configured to receive sharp carrier retention feature 20710L disposed on the sensor carrier 20710 and to thereby permit partial retraction of the sharp carrier 201102 during deployment (as described in greater detail below). The sheath 20704 can also include cap lead-in 20704R, alignment notch 20704S and skin interface 20704T.

Exemplary Sensor Carriers

Figure 9A:
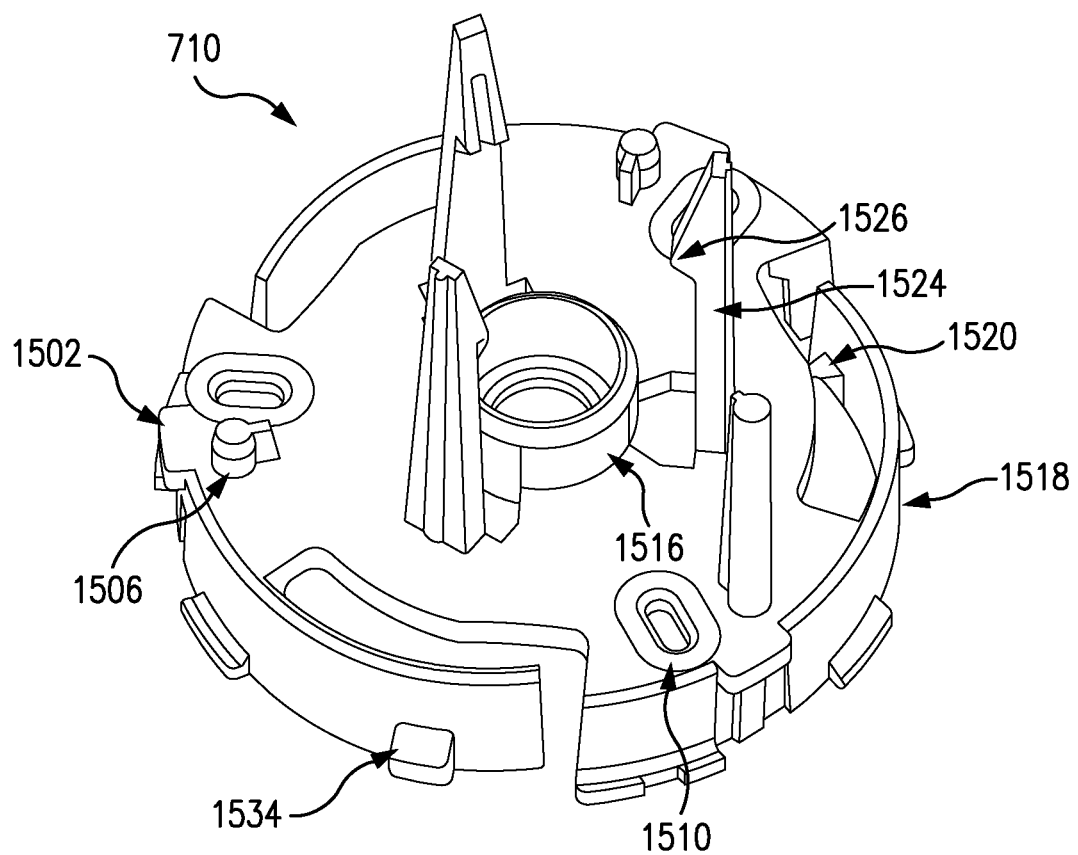
FIG. 9A is a proximal perspective view depicting an example embodiment of a sensor carrier.

FIG. 9A is a proximal perspective view depicting an example embodiment of sensor carrier 710 that can retain sensor electronics within applicator 150. It can also retain sharp carrier 1102 with sharp module 2500. In this example embodiment, sensor carrier 710 generally has a hollow round flat cylindrical shape, and can include one or more deflectable sharp carrier lock arms 1524 (e.g., three) extending proximally from a proximal surface surrounding a centrally located spring alignment ridge 1516 for maintaining alignment of spring 1104. Each lock arm 1524 has a detent or retention feature 1526 located at or near its proximal end. Shock lock 1534 can be a tab located on an outer circumference of sensor carrier 710 extending outward and can lock sensor carrier 710 for added safety prior to firing. Rotation limiter 1506 can be a proximally extending relatively short protrusion on a proximal surface of sensor carrier 710 which limits rotation of carrier 710. Sharp carrier lock arms 1524 can interface with sharp carrier 1102 as described with reference to FIGS. 10A-10E below.

Figure 9B:
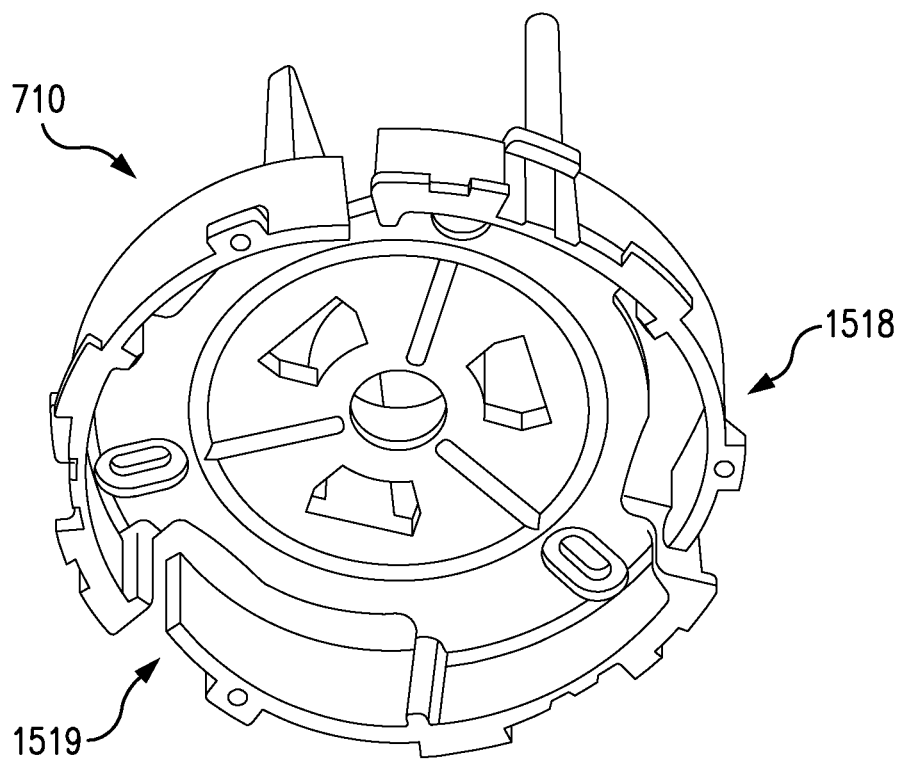
FIG. 9B is a distal perspective view depicting an example embodiment of a sensor carrier.

FIG. 9B is a distal perspective view of sensor carrier 710. Here, one or more sensor electronics retention spring arms 1518 (e.g., three) are normally biased towards the position shown and include a detent 1519 that can pass over the distal surface of electronics housing 706 of device 102 when housed within recess or cavity 1521. In certain embodiments, after sensor control device 102 has been adhered to the skin with applicator 150, the user pulls applicator 150 in a proximal direction, i.e., away from the skin. The adhesive force retains sensor control device 102 on the skin and overcomes the lateral force applied by spring arms 1518. As a result, spring arms 1518 deflect radially outwardly and disengage detents 1519 from sensor control device 102 thereby releasing sensor control device 102 from applicator 150.

Figure 9C:
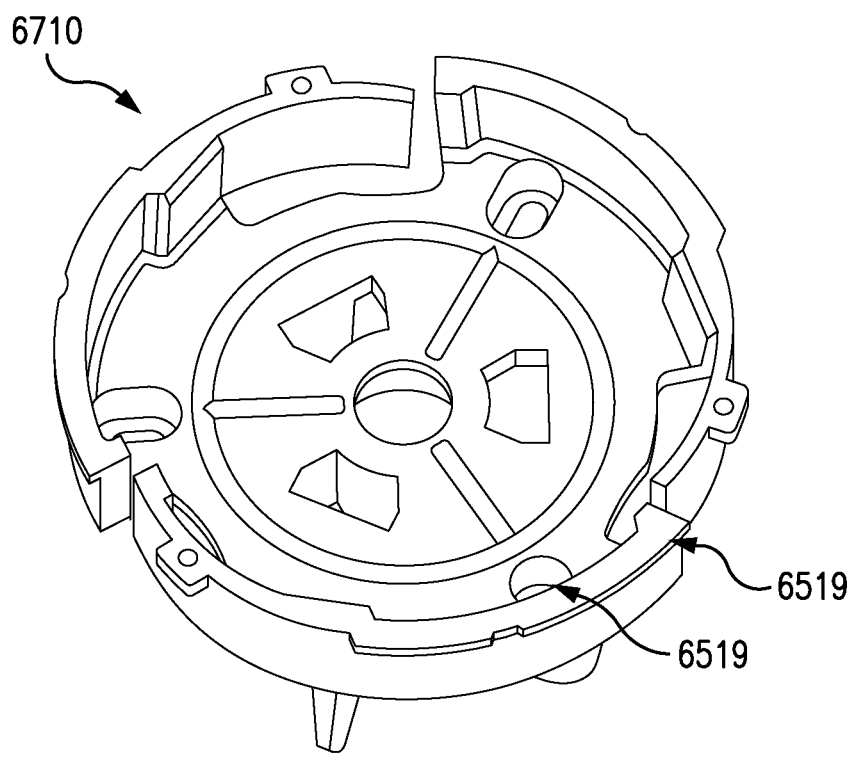
FIG. 9C is a distal perspective view depicting another example embodiment of a sensor carrier.

FIG. 9C is a perspective view of an alternative example embodiment of sensor carrier 6710. As shown in FIG. 9C, sensor carrier 6710 can have many of the same features as sensor carrier 710, previously described with respect to FIGS. 9A-9B. In addition, sensor carrier 6710 also includes one or more notch ribs 6519 disposed along an outer circumferential surface. As best seen in FIGS. 8F-8H, notch ribs 6519 are configured to interface with inner sheath ribs 6425 in order to maintain axial alignment of the sheath and sensor carrier, and reduce lateral and rotational movement between applicator components during the sensor insertion process.

Figure 9D:
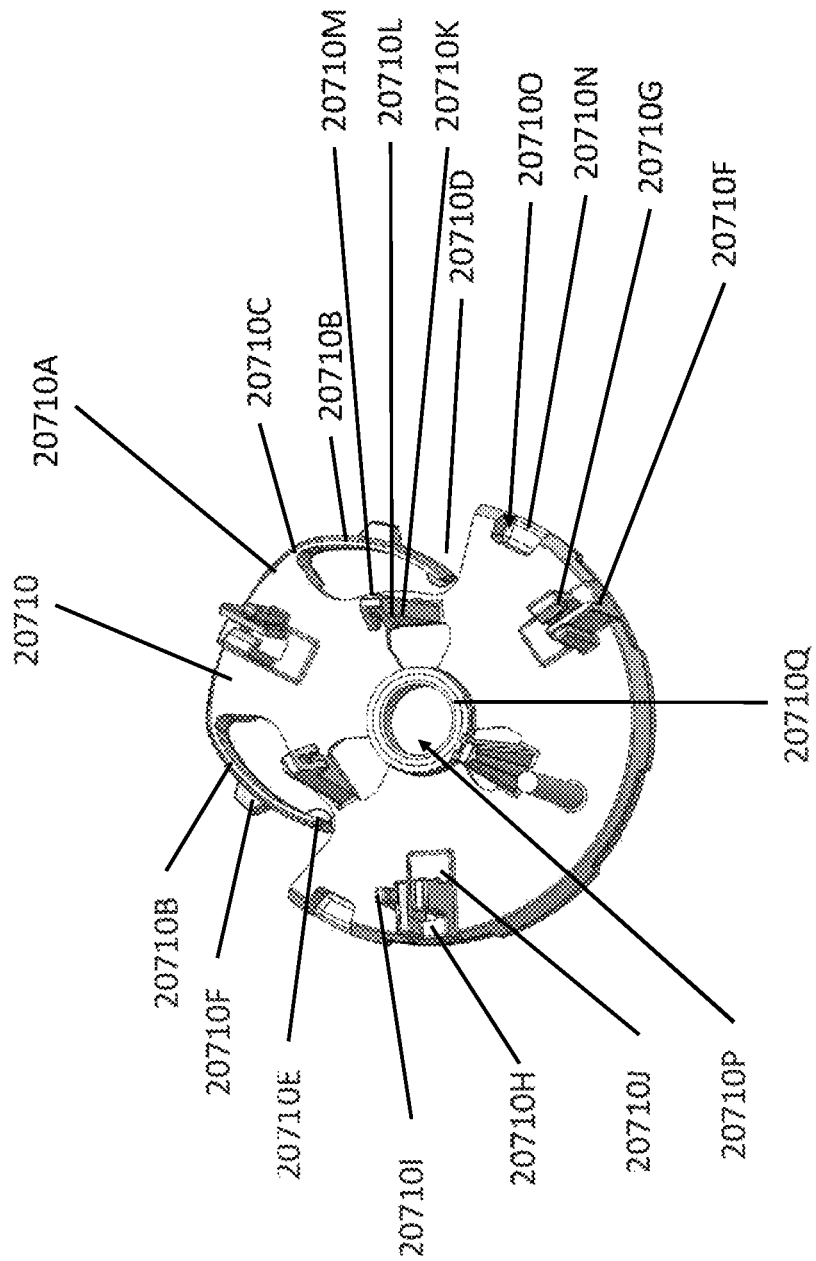
FIG. 9D is a top perspective view of a sensor carrier in accordance with the disclosed subject matter.
Figure 9E:
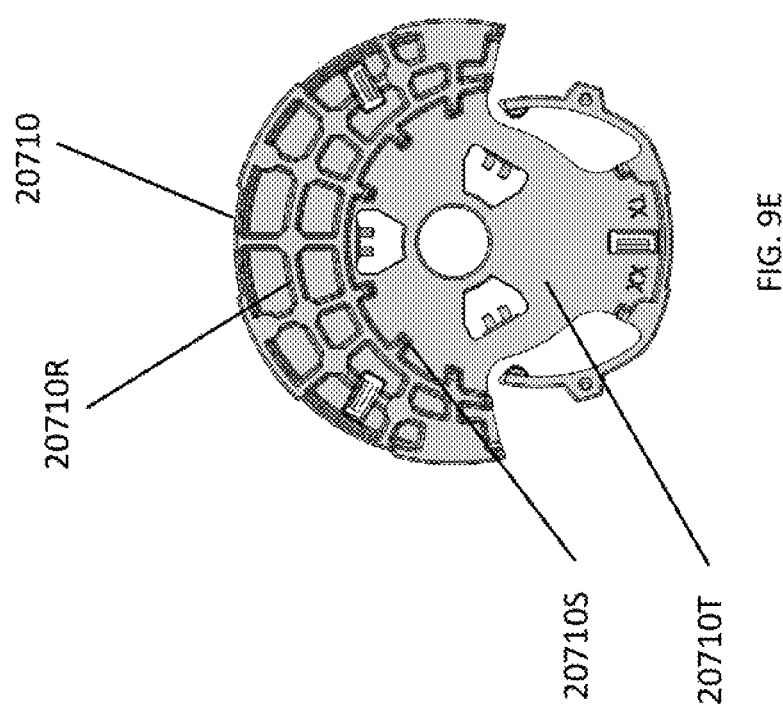
FIG. 9E is a bottom view of the sensor carrier of FIG. 9D.

Referring to FIGS. 9D and 9E, for purpose of illustration and not limitation, an exemplary sensor carrier 20710 is provided. Sensor carrier 20710 can include one or more of the features described herein with regard to sensor carriers, wherein similar features can operate as described herein. For example, sensor carrier 20710 can include a base 20710A and first and second retention arms 20710B. Each retention arm 20710B can include a first end portion 20710C coupled to the base 20710A and a free end portion 20710D. For example, each retention arm 20710B can be coupled to the base 20710A at a first half of the base 20710A and the free end portion 20710D can extend toward a second half of the base 20710A. Each retention arm 20710B can include a sensor retention feature 20710E disposed on an inner surface of the sensor retention arm 20710B. The sensor retention feature 20710E can be disposed on the free end portion 20710D. The sensor retention feature 20710E can be configured to retain the sensor control device 20102 within the housing 20702. The retention feature 20710E can include a conical surface and angular parting line, which can allow for release of the sensor control device 20102 upon delivery. Each retention arm 20710 can include a lock interface 20710F disposed on an outer surface of the retention arm 20710B. The lock interface 20710F can engage rib 20704U on the sheath 20704. As described hereinabove, the rib 20704U can prevent the sensor retention arm 20710B from flexing outwardly, for example, during a shock event, and therefore can keep retention feature 20710E engaged with the sensor control device 20102, and thereby prevent movement of the sensor control device 20102 during a shock event.

Sensor carrier 20710 can include a plurality of housing attachment features 20710F, for example three housing attachment features 20710F. The housing attachment features 20710F can be equally spaced on the sensor carrier 20710 and can extend upwardly from a top surface of the sensor carrier 20710. Each sensor housing attachment feature 20710F can include a housing snap 20710G, housing locator feature 20710H, biasing feature 20710I, and housing stop 20710J. The housing locator feature 20710H can locate the sensor carrier 20710 relative the housing 20702 when the two are to be coupled together. The housing snap 20710G can engage the sensor carrier attach slots 20702K on the housing 20702 to couple the sensor carrier 20710 to the housing 20702. The biasing feature 20710I can engage sensor carrier biasing feature 20702M on housing 20702 configured to remove slop between the sensor carrier 20710 and the housing 20702. Housing stop 20710J can engage sensor carrier hard stop 20702L on sheath guide rails 20702J on housing 20702 to locate the sensor carrier 20710 axially relative to the housing 20702.

Sensor carrier 20710 can further include a plurality of sharp carrier lock arms 20710K, for example three sharp carrier lock arms 20710K. The sharp carrier lock arms 20710K can be equally spaced on the sensor carrier 20710 and can extend upwardly form a top surface of the sensor carrier 20710. Each sharp carrier lock arm 20710K can include a sharp carrier retention feature 20710L and a rib 20710M. Rib 20710M can engage an inner surface of the sheath 20704, which can urge the sharp carrier lock arm 20710K inwardly and cause sharp carrier retention feature 20710L to retain sharp carrier 201102, as described in greater detail below. The carrier retention feature 20710L can have a triangle shape when viewed in side view and a "U" shape when viewed in top view.

In accordance with the disclosed subject matter, the sensor carrier 20710 can include a plurality of lock ledges 20710N configured to engage lock arm interface 20704M of the sheath 20704 as described herein above. For example, the sensor carrier 20710 can include two lock ledges 20710N. Sensor carrier 20710 can include recesses 20710O disposed proximate each lock ledge 20710N and configured to receive the lock arm interface 20704M during firing, to prevent the lock arm 20704J from engaging with housing 20702 during firing. Sensor carrier 20710 can include a hole 20710P extending through a middle of the base 20710A. The hole 20710P can guide and limit movement of sharp hub 205014 during insertion. Additionally, or alternatively, sensor carrier 20710 can include spring locator 20710Q.

A bottom surface of the sensor carrier 20710 can include stiffening ribs 20710R and sensor locator ribs 20710S, which can limit planar motion of the sensor control device 20102 relative the sensor carrier 20710. The bottom surface of the sensor carrier 20710 can include a sensor support surface 20710T configure to support the sensor control device 20102.

Exemplary Sharp Carriers

Figure 10A:
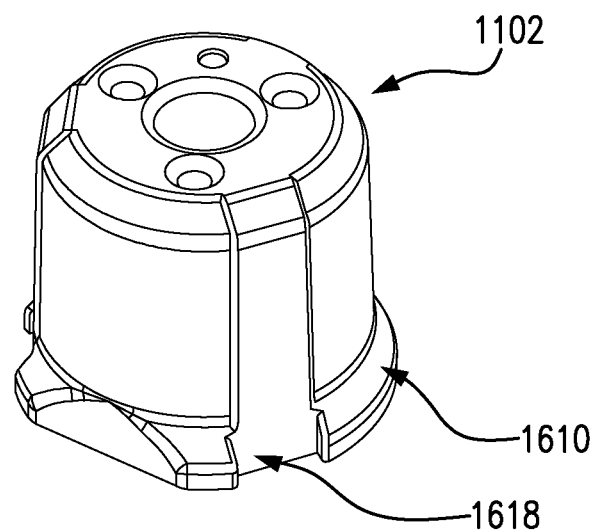
FIG. 10A is a perspective view of a sharp carrier in accordance with the disclosed subject matter.
Figure 10B:
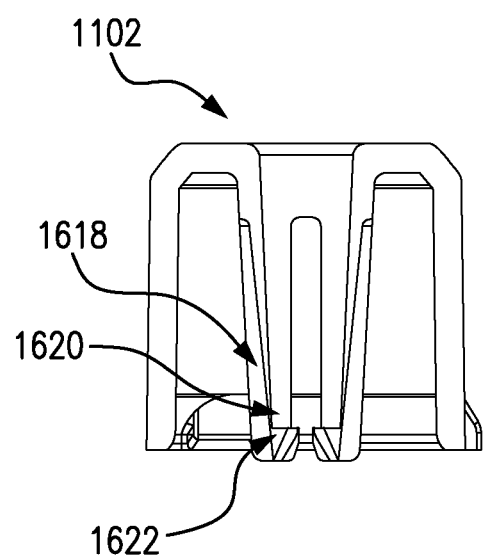
FIG. 10B is a side cutaway view of the sharp carrier of FIG. 10A.

FIGS. 10A and 10B are a proximal perspective view and a side cross-sectional view, respectively, depicting an example embodiment of sharp carrier 1102. Sharp carrier 1102 can grasp and retain sharp module 2500 within applicator 150. It can also automatically retract as a result of one or more springs changing from a preloaded, compressed state to an expanded state during an insertion process, as described with respect to FIGS. 40A-40F. Near a distal end of sharp carrier 1102 can be anti-rotation slots 1608 which prevent sharp carrier 1102 from rotating when located within a central area of sharp carrier lock arms 1524 (as shown in FIG. 9A). Anti-rotation slots 1608 can be located between sections of sharp carrier base chamfer 1610, which can ensure full retraction of sharp carrier 1102 through sheath 704 upon retraction of sharp carrier 1102 at the end of the deployment procedure.

Figure 17A:
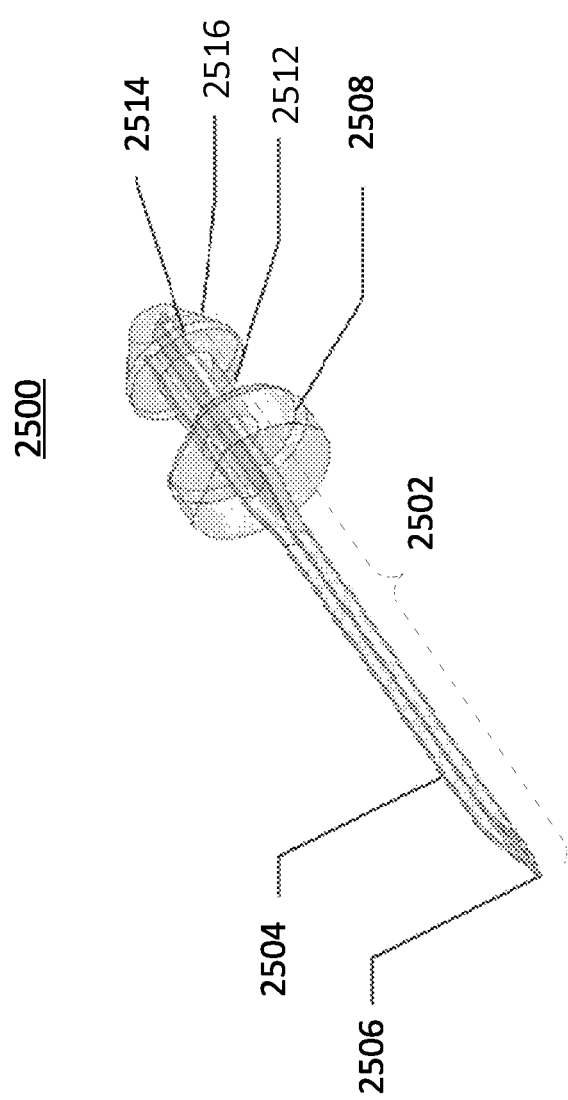
FIG. 17A is a perspective view depicting an example embodiment of a sharp module.

As shown in FIG. 10B, sharp retention arms 1618 can be located in an interior of sharp carrier 1102 about a central axis and can include a sharp retention clip 1620 at a distal end of each arm 1618. Sharp retention clip 1620 can have a proximal surface which can be nearly perpendicular to the central axis and can abut a distally facing surface of sharp hub 2516 (FIG. 17A).

Figure 10C:
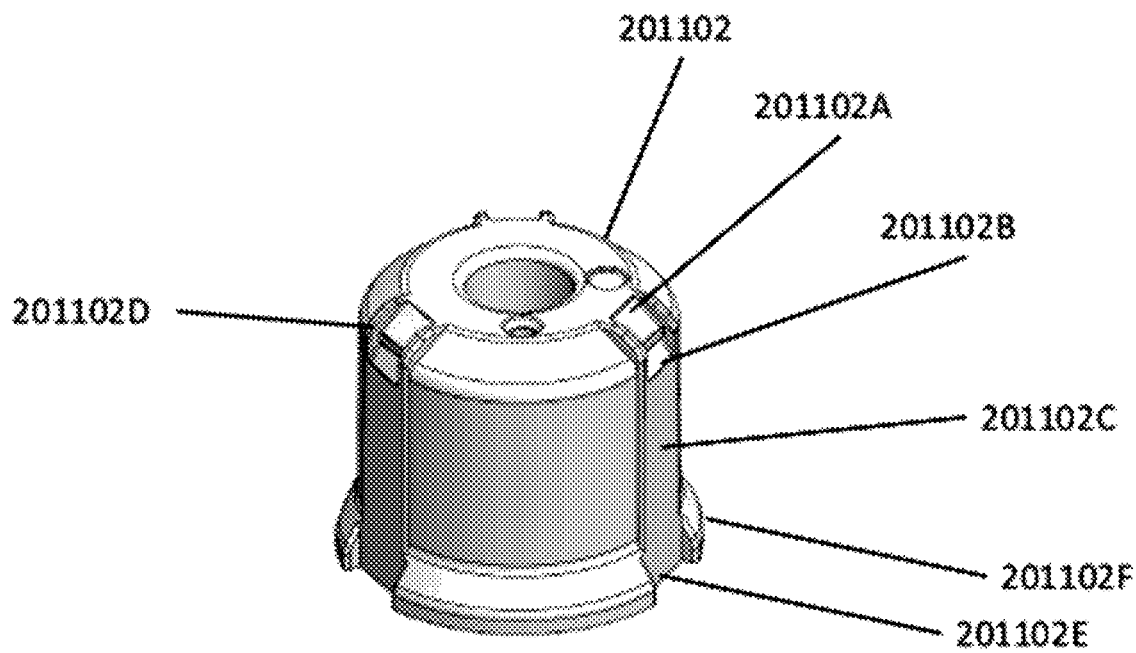
FIG. 10C is a perspective view of a sharp carrier in accordance with the disclosed subject matter.
Figure 10D:
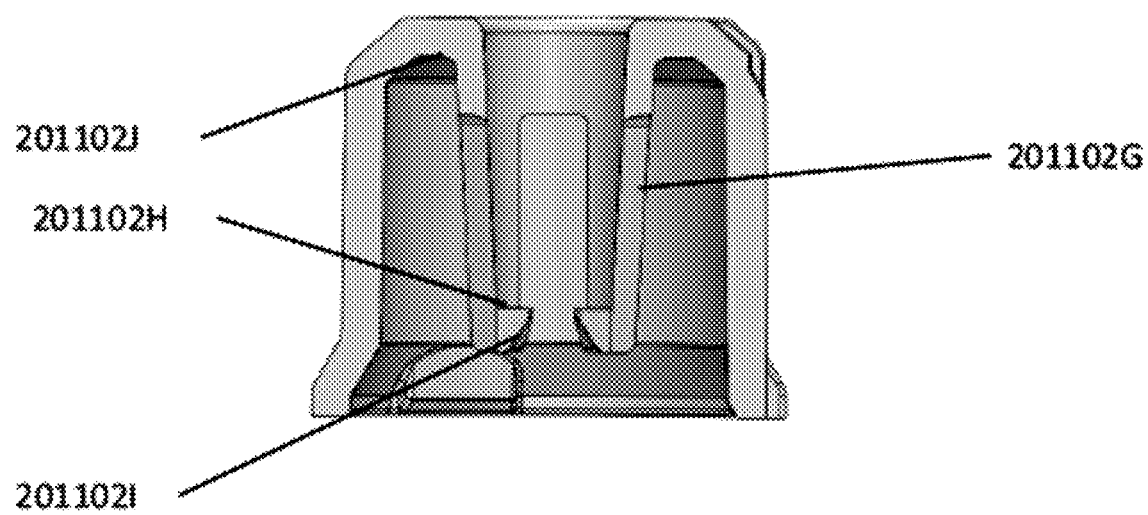
FIG. 10D is a side cutaway view of the sharp carrier of FIG. 10C.

Referring to FIGS. 10C and 10D, for purpose of illustration and not limitation, an exemplary sharp carrier 201102 is provided. Sharp carrier 201102 can include one or more features described herein with regard to sharp carriers, wherein similar features can operate as describe herein. For example, sharp carrier 201102 can include a series of features for engaging with the three sharp carrier lock arms 20710K of the sensor carrier 20710. The features can include a pre-partial-retraction retention face 201102A and a post-partial-retraction retention face 201102B. The pre-partial retraction retention face 201102A can engage the sharp carrier retention feature 20710L prior to partial retraction, for example, during shipping and storage. Post-partial-retraction retention face 201102B can engage the sharp carrier retention feature 20710L after partial retraction. For example, as the sheath 20704 initially move proximally relative to the sensor carrier 20710, the rib 20710M of the retention arm 20710L can engage slot 20704Q of sheath 20704, which can allow the retention arm 20710L to move radially outward and allow sharp carrier retention feature 20710L to clear the pre-partial retraction retention face 201102A and engage the post-partial retraction retention face 201102B. A height between the end of the pre-partial-retraction face 201102A and the start of the post-partial-retraction face 201102B can be the distance of the partial retraction. A running face 201102C can be disposed below the post-partial-retraction retention face 201102B and can slide against the retention arm 20710L as the sharp carrier 201102 is retracted. Alignment walls 201102D can help to keep the sharp carrier 201102 aligned with the sensor carrier 20704 during partial retraction. Sharp carrier 201102 can include a chamfer 201102F, which can include anti-rotation slots 201102E to engage the retention arms 20710L on the sensor carrier 20710.

Internally, sharp carrier 201102 can include sharp retention arms 201102G including lead-in face 2011021 and sharp hub contact face 201102H. The retention arms 201102G can receive and hold sharp hub 205014. Spring stop 201102J can engage retraction spring 205612.

Exemplary Sensor Modules

Figure 11A:
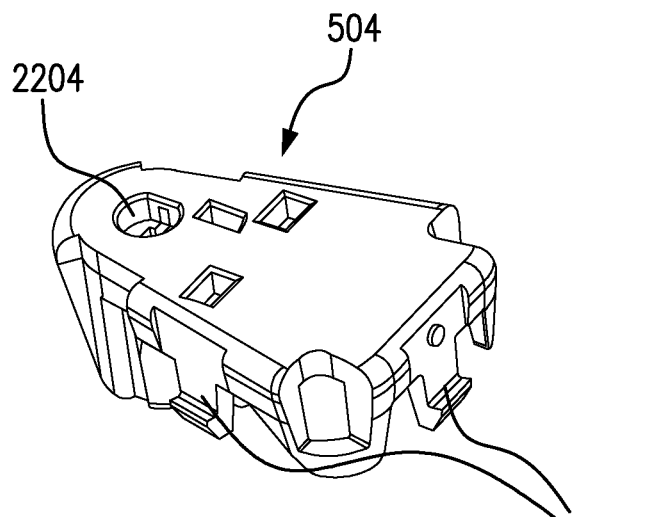
FIGS. 11A to 11B are top and bottom perspective views, respectively, depicting an example embodiment of a sensor module.
Figure 11B:
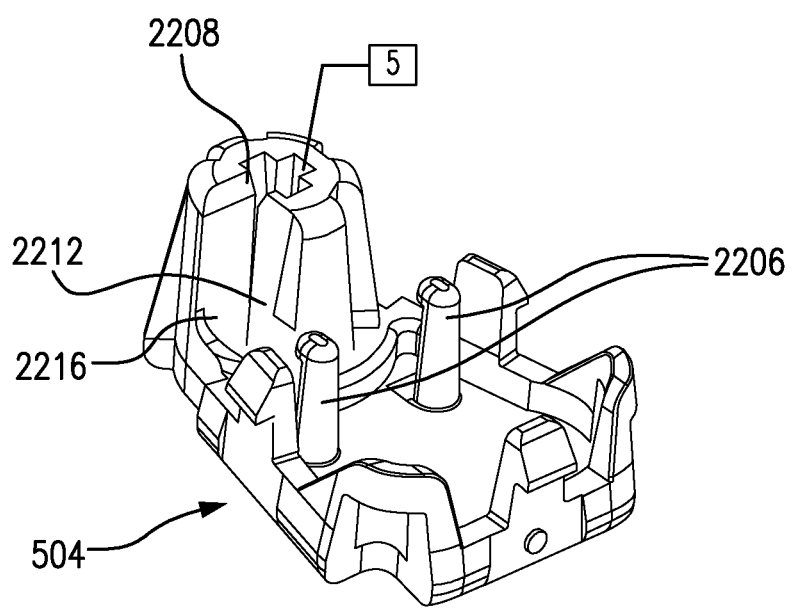

FIGS. 11A and 11B are a top perspective view and a bottom perspective view, respectively, depicting an example embodiment of sensor module 504. Module 504 can hold a connector 2300 (FIGS. 12A and 12B) and a sensor 104 (FIG. 13). Module 504 is capable of being securely coupled with electronics housing 706. One or more deflectable arms or module snaps 2202 can snap into the corresponding features 2010 of housing 706. A sharp slot 2208 can provide a location for sharp tip 2502 to pass through and sharp shaft 2504 to temporarily reside. A sensor ledge 2212 can define a sensor position in a horizontal plane, prevent a sensor from lifting connector 2300 off of posts and maintain sensor 104 parallel to a plane of connector seals. It can also define sensor bend geometry and minimum bend radius. It can limit sensor travel in a vertical direction and prevent a tower from protruding above an electronics housing surface and define a sensor tail length below a patch surface. A sensor wall 2216 can constrain a sensor and define a sensor bend geometry and minimum bend radius.

Figure 12A:
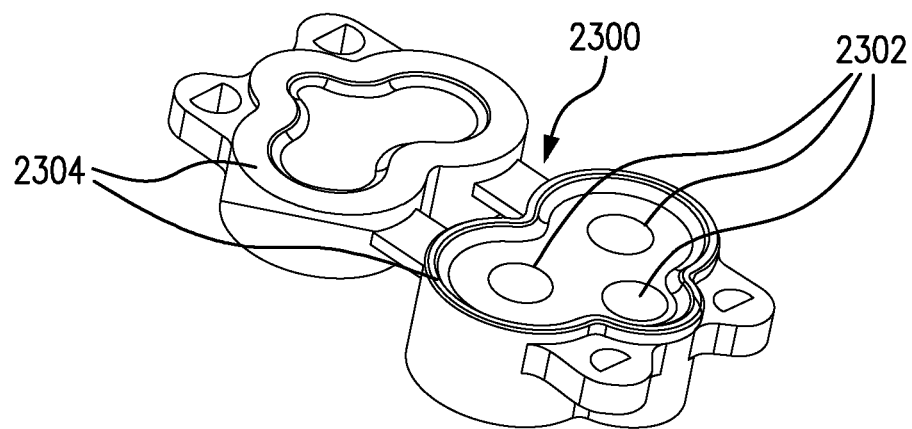
FIGS. 12A and 12B are perspective and compressed views, respectively, depicting an example embodiment of a sensor connector.
Figure 12B:
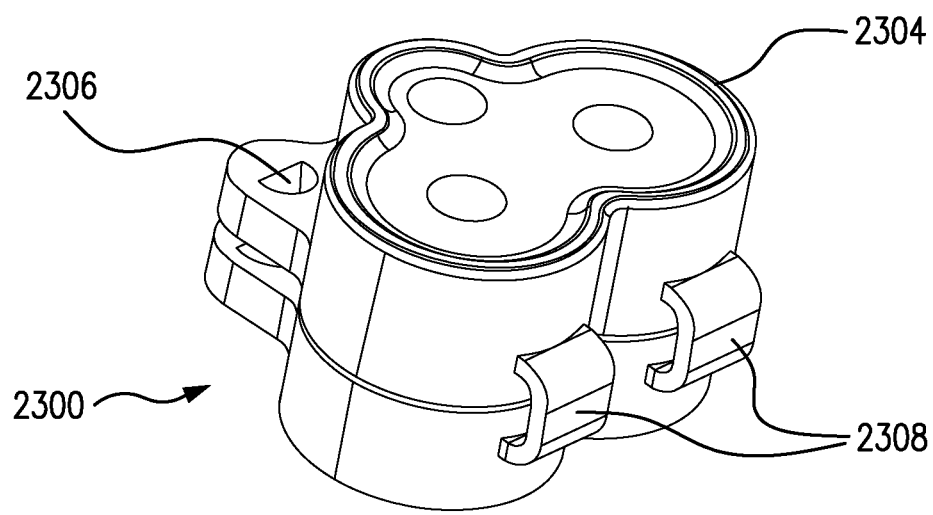
Figure 13:
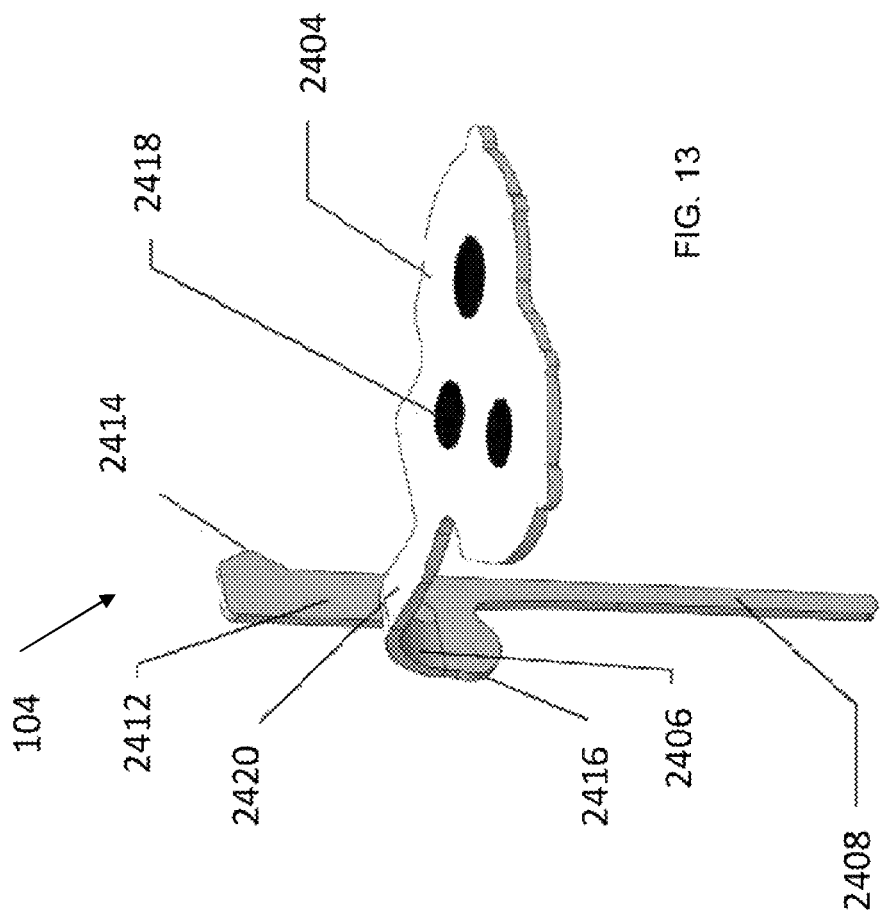
FIG. 13 is a perspective view depicting an example embodiment of a sensor.

FIGS. 12A and 12B are perspective views depicting an example embodiment of connector 2300 in an open state and a closed state, respectively. Connector 2300 can be made of silicone rubber that encapsulates compliant carbon impregnated polymer modules that serve as electrical conductive contacts 2302 between sensor 104 and electrical circuitry contacts for the electronics within housing 706. The connector can also serve as a moisture barrier for sensor 104 when assembled in a compressed state after transfer from a container to an applicator and after application to a user's skin. A plurality of seal surfaces 2304 can provide a watertight seal for electrical contacts and sensor contacts. One or more hinges 2208 can connect two distal and proximal portions of connector 2300.

FIG. 13 is a perspective view depicting an example embodiment of sensor 104. A neck 2406 can be a zone which allows folding of the sensor, for example ninety degrees. A membrane on tail 2408 can cover an active analyte sensing element of the sensor 104. Tail 2408 can be the portion of sensor 104 that resides under a user's skin after insertion. A flag 2404 can contain contacts and a sealing surface. A biasing tower 2412 can be a tab that biases the tail 2408 into sharp slot 2208. A bias fulcrum 2414 can be an offshoot of biasing tower 2412 that contacts an inner surface of a needle to bias a tail into a slot. A bias adjuster 2416 can reduce a localized bending of a tail connection and prevent sensor trace damage. Contacts 2418 can electrically couple the active portion of the sensor to connector 2300. A service loop 2420 can translate an electrical path from a vertical direction ninety degrees and engage with sensor ledge 2212 (FIG. 11B).

Figure 14B:
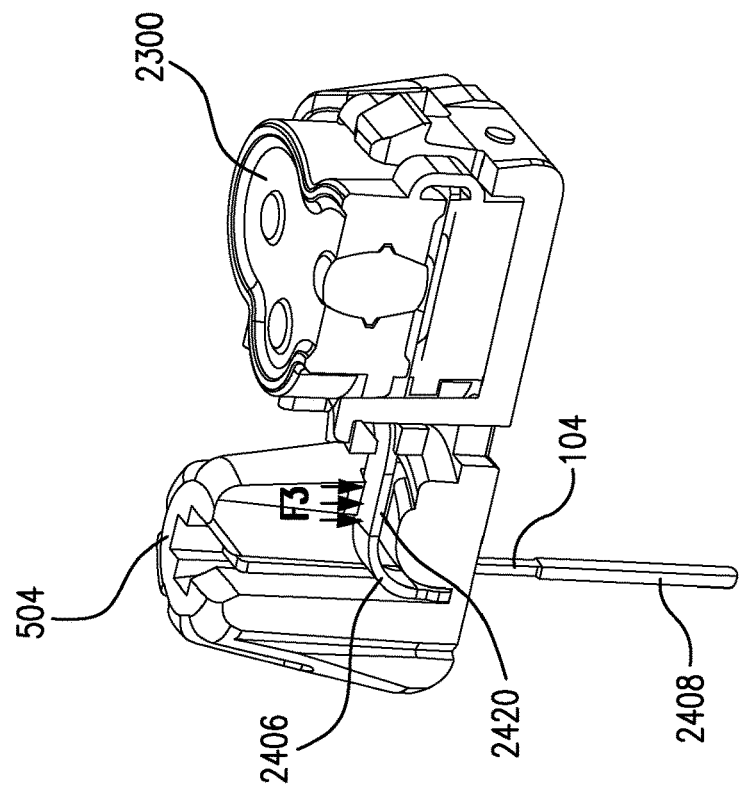
FIGS. 14A and 14B are bottom and top perspective views, respectively, of an example embodiment of a sensor module assembly.
Figure 14A:
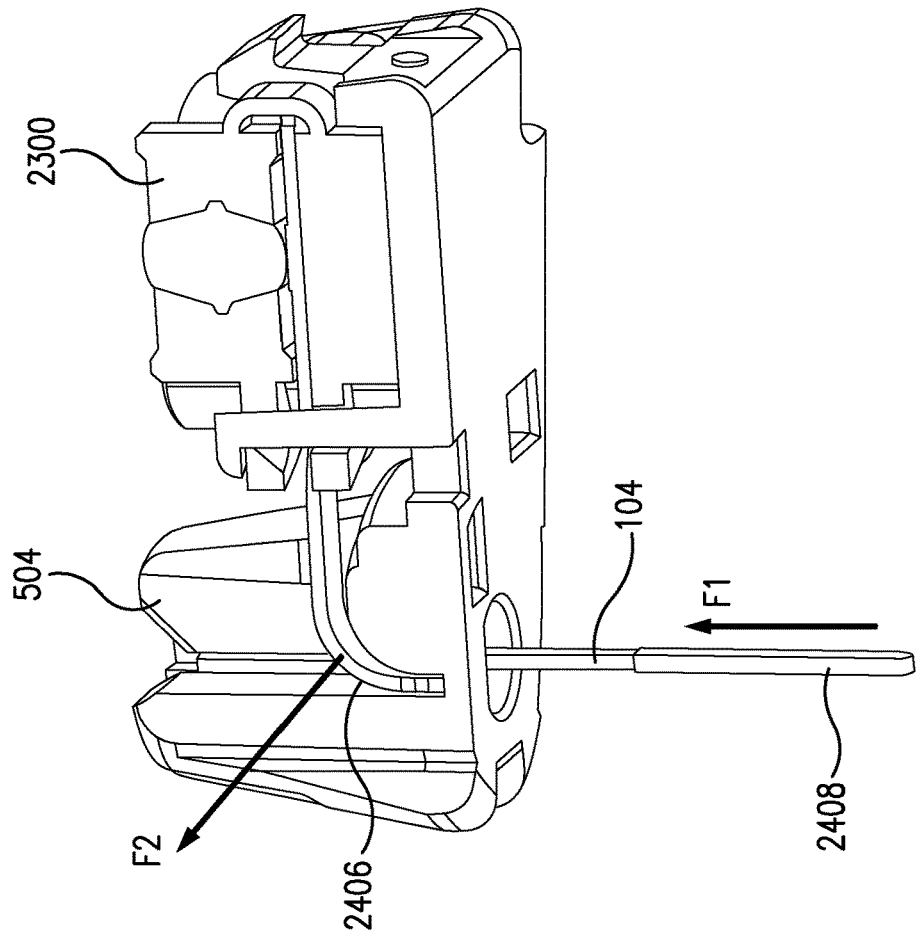

FIGS. 14A and 14B are bottom and top perspective views, respectively, depicting an example embodiment of a sensor module assembly comprising sensor module 504, connector 2300, and sensor 104. According to one aspect of the aforementioned embodiments, during or after insertion, sensor 104 can be subject to axial forces pushing up in a proximal direction against sensor 104 and into the sensor module 504, as shown by force, F1, of FIG. 14A. According to some embodiments, this can result in an adverse force, F2, being applied to neck 2406 of sensor 104 and, consequently, result in adverse forces, F3, being translated to service loop 2420 of sensor 104. In some embodiments, for example, axial forces, F1, can occur as a result of a sensor insertion mechanism in which the sensor is designed to push itself through the tissue, a sharp retraction mechanism during insertion, or due to a physiological reaction created by tissue surrounding sensor 104 (e.g., after insertion).

Figure 15B:
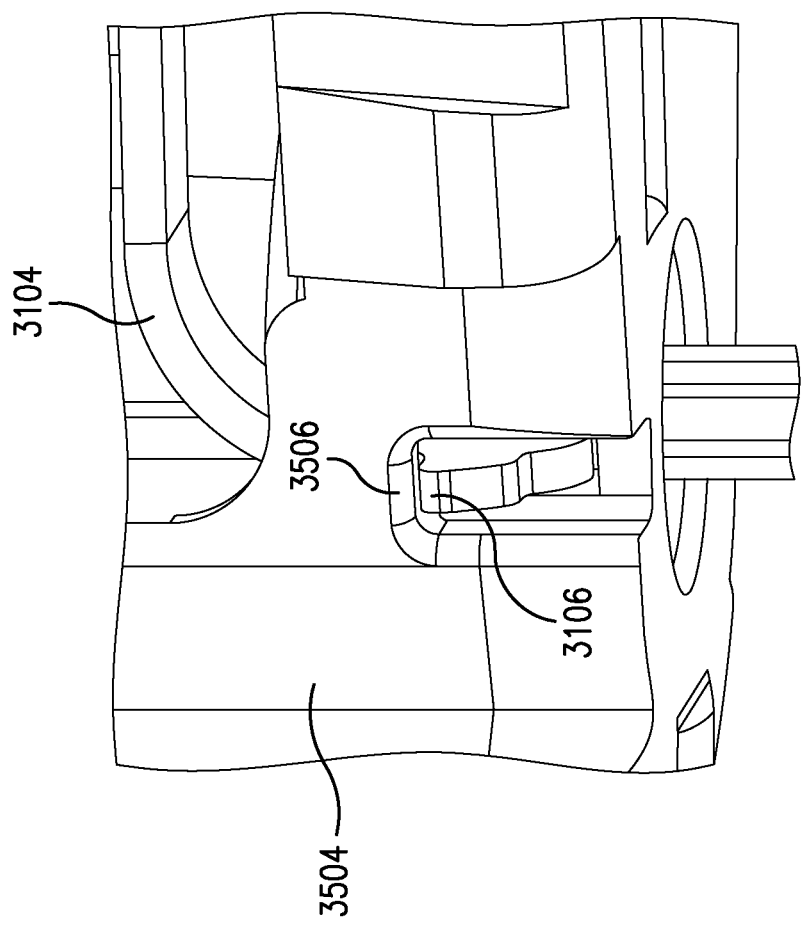
FIGS. 15A and 15B are close-up partial views of an example embodiment of a sensor module assembly.
Figure 15A:
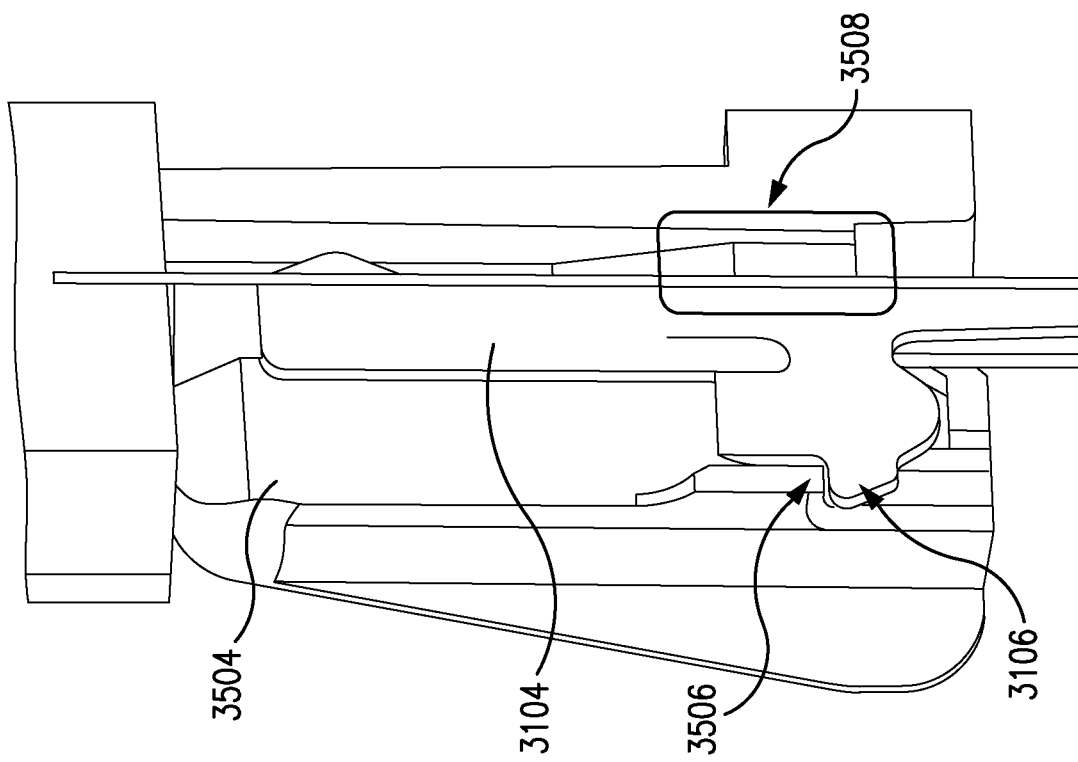

FIGS. 15A and 15B are close-up partial views of an example embodiment of a sensor module assembly having certain axial stiffening features. In a general sense, the embodiments described herein are directed to mitigating the effects of axial forces on the sensor as a result of insertion and/or retraction mechanisms, or from a physiological reaction to the sensor in the body. As can be seen in FIGS. 15A and 15B, according to one aspect of the embodiments, sensor 3104 comprises a proximal portion having a hook feature 3106 configured to engage a catch feature 3506 of the sensor module 3504. In some embodiments, sensor module 3504 can also include a clearance area 3508 to allow a distal portion of sensor 3104 to swing backwards during assembly to allow for the assembly of the hook feature 3106 of sensor 3104 over and into the catch feature 3506 of sensor module 3504.

According to another aspect of the embodiments, the hook and catch features 3106, 3506 operate in the following manner. Sensor 3104 includes a proximal sensor portion, coupled to sensor module 3504, as described above, and a distal sensor portion that is positioned beneath a skin surface in contact with a bodily fluid. As seen in FIGS. 15A and 15B, the proximal sensor portion includes a hook feature 3106 adjacent to the catch feature 3506 of sensor module 3504. During or after sensor insertion, one or more forces are exerted in a proximal direction along a longitudinal axis of sensor 3104. In response to the one or more forces, hook feature 3106 engages catch feature 3506 to prevent displacement of sensor 3104 in a proximal direction along the longitudinal axis.

According to another aspect of the embodiments, sensor 3104 can be assembled with sensor module 3504 in the following manner. Sensor 3104 is loaded into sensor module 3504 by displacing the proximal sensor portion in a lateral direction to bring the hook feature 3106 in proximity to the catch feature 3506 of sensor module 3504. More specifically, displacing the proximal sensor portion in a lateral direction causes the proximal sensor portion to move into clearance area 3508 of sensor module 3504.

Although FIGS. 15A and 15B depict hook feature 3106 as a part of sensor 3104, and catch feature 3506 as a part of sensor module 3504, those of skill in the art will appreciate that hook feature 3106 can instead be a part of sensor module 3504, and, likewise, catch feature 3506 can instead be a part of sensor 3106. Similarly, those of skill in the art will also recognize that other mechanisms (e.g., detent, latch, fastener, screw, etc.) implemented on sensor 3104 and sensor module 3504 to prevent axial displacement of sensor 3104 are possible and within the scope of the present disclosure.

Figure 15C:
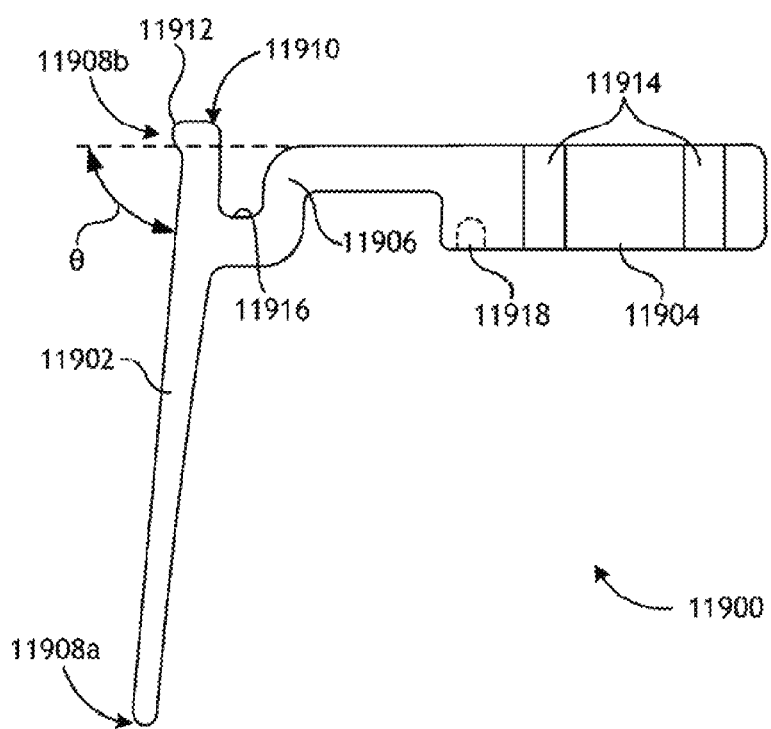
FIGS. 15C-G are side views of exemplary sensors, according to one or more embodiments of the disclosure.

FIG. 15C is a side view of an example sensor 11900, according to one or more embodiments of the disclosure. The sensor 11900 may be similar in some respects to any of the sensors described herein and, therefore, may be used in an analyte monitoring system to detect specific analyte concentrations. As illustrated, the sensor 11900 includes a tail 11902, a flag 11904, and a neck 11906 that interconnects the tail 11902 and the flag 11904. The tail 11902 includes an enzyme or other chemistry or biologic and, in some embodiments, a membrane may cover the chemistry. In use, the tail 11902 is transcutaneously received beneath a user's skin, and the chemistry included thereon helps facilitate analyte monitoring in the presence of bodily fluids.

The tail 11902 may be received within a hollow or recessed portion of a sharp (not shown) to at least partially circumscribe the tail 11902 of the sensor 11900. As illustrated, the tail 11902 may extend at an angle Q offset from horizontal. In some embodiments, the angle Q may be about 85°. Accordingly, in contrast to other sensor tails, the tail 11902 may not extend perpendicularly from the flag 11904, but instead at an angle offset from perpendicular. This may prove advantageous in helping maintain the tail 11902 within the recessed portion of the sharp.

The tail 11902 includes a first or bottom end 11908a and a second or top end 11908b opposite the bottom end 11908a. A tower 11910 may be provided at or near the top end 11908b and may extend vertically upward from the location where the neck 11906 interconnects the tail 11902 to the flag 11904. During operation, if the sharp moves laterally, the tower 11910 will help pivot the tail 11902 toward the sharp and otherwise stay within the recessed portion of the sharp. Moreover, in some embodiments, the tower 11910 may provide or otherwise define a protrusion 11912 that extends laterally therefrom. When the sensor 11900 is mated with the sharp and the tail 11902 extends within the recessed portion of the sharp, the protrusion 11912 may engage the inner surface of the recessed portion. In operation, the protrusion 11912 may help keep the tail 11902 within the recessed portion.

The flag 11904 may comprise a generally planar surface having one or more sensor contacts 11914 arranged thereon. The sensor contact(s) 11914 may be configured to align with a corresponding number of compliant carbon impregnated polymer modules encapsulated within a connector.

In some embodiments, as illustrated, the neck 11906 may provide or otherwise define a dip or bend 11916 extending between the flag 11904 and the tail 11902. The bend 11916 may prove advantageous in adding flexibility to the sensor 11900 and helping prevent bending of the neck 11906.

In some embodiments, a notch 11918 (shown in dashed lines) may optionally be defined in the flag near the neck 11906. The notch 11918 may add flexibility and tolerance to the sensor 11900 as the sensor 11900 is mounted to the mount. More specifically, the notch 11918 may help take up interference forces that may occur as the sensor 11900 is mounted within the mount.

In some embodiments, as illustrated in FIGS. 15D-15G, the neck can comprise or otherwise define a non-linear configuration such as a dip or bend 11920a-11920d with a plurality of turns, e.g., 11921a, 11921b, extending between the flag 11904 and the tail 11902. The bend 11920a-11920d can be advantageous in reducing in-place stiffness of the sensor 11900 by adding flexibility to the sensor 11900 in both a vertically-oriented and horizontally-oriented direction. The added flexibility can provide a multi-directional spring-like structure in the sensor 11900 that helps to limit deformation of the neck 11906 while ensuring that the tail 11902 and the flag 11904 can remain in their expected or fixed positions. The spring-like structure also increases compliance of the sensor 11900 while reducing stress on the overall structure.

Generally, the sensor can be understood as including a tail, a flag, and a neck aligned along a planar surface having a vertical axis and a horizontal axis. The spring-like structure can be created by various orientations of turns in the bend of the neck of a sensor. Between the tail and the flag, the neck can include at least two turns in relation to the vertical axis providing a spring-like structure. The at least two turns can provide, in relation to an axis of the planar surface shared by the tail, the flag, and the neck, overlapping layers of the structure of the neck, where the neck itself remains unbroken. These overlapping turns make up the spring-like structure. In some embodiments, the overlapping layers of the neck are vertically-oriented. In some embodiments, the overlapping layers of the neck are horizontally-oriented.

Figure 15D:
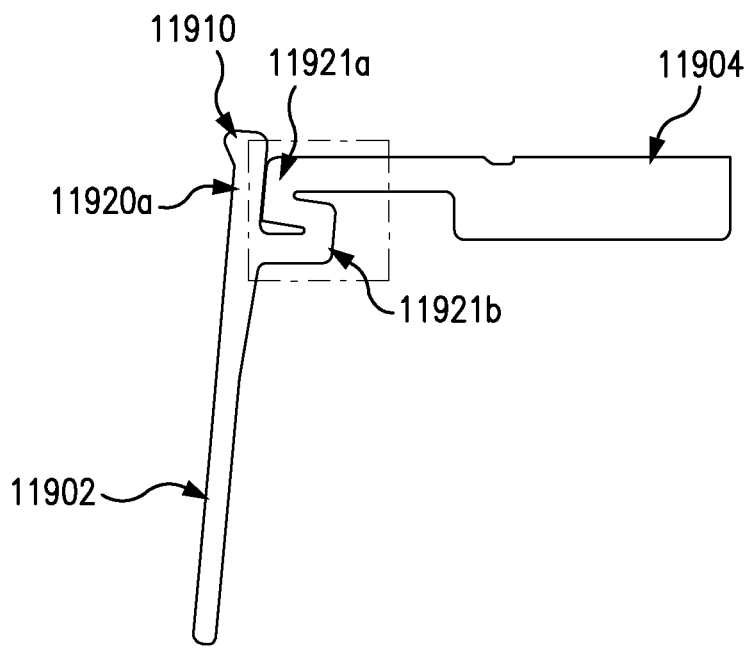

FIG. 15D illustrates one embodiment of a sensor 11900 including a neck between the flag 11904 and tail 11902 with a bend 11920a including turns 11921a and 11921b. In the illustrated embodiment, at least one turn 11921a abuts the top end of the tail or possibly the tower 11910 of the sensor 11900. This orientation can be advantageous in that it reduces the overall footprint of the sensor, even considering the additional material used to generate the bend 11920a. The arrangement can provide multiple overlapping, vertically-aligned horizontal layers between the turns.

Figure 15E:
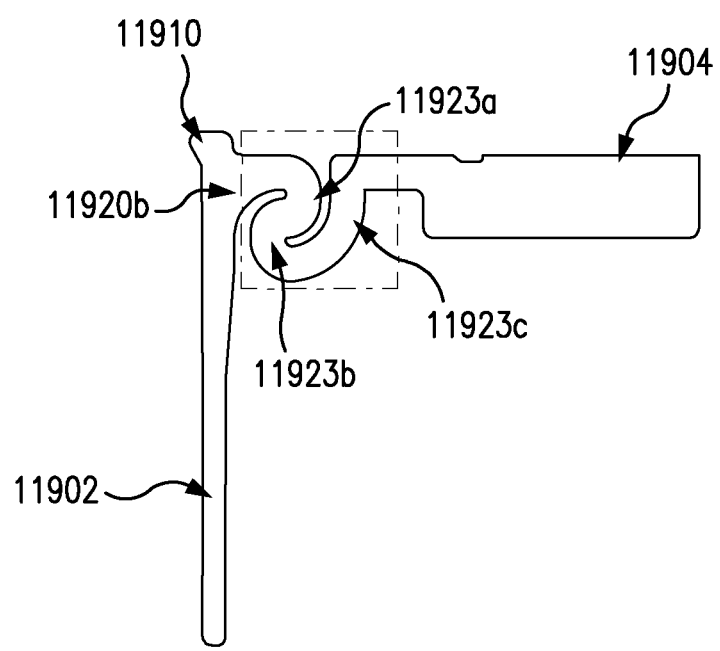

FIG. 15E illustrates another embodiment of a sensor 11900 including a neck between the flag 11904 and tail 11902 with a bend 11920b that generally forms a swirl pattern including at least turn turns 11923a, 11923b, and 11923c. In this embodiment, the turns again abut the top end of the tail or the tower 11910 of the sensor 11900. In addition to maintaining the overall footprint of the sensor, this orientation may provide for additional balancing of the horizontally-oriented and vertically-oriented stresses. The overlapping layers in this arrangement of turns are substantially balanced in along both the horizontal and vertical axes.

Figure 15F:
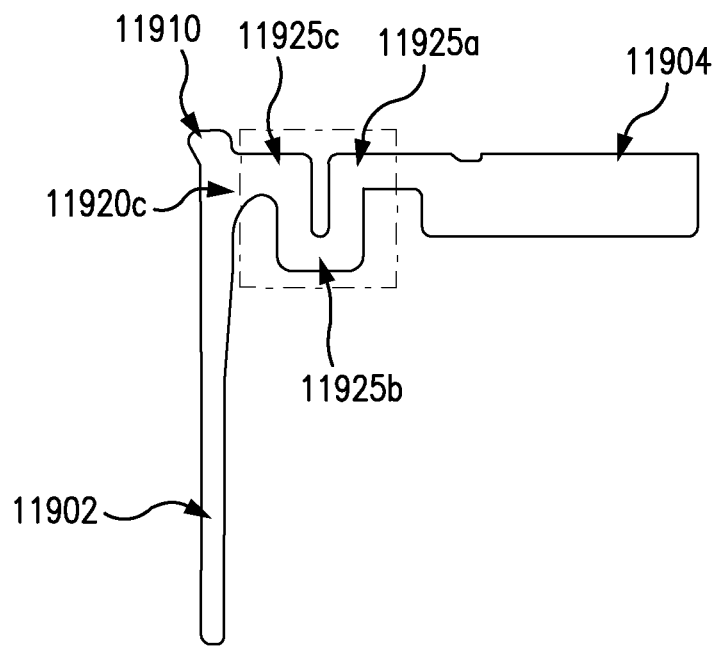

FIG. 15F illustrates another embodiment of a sensor 11900 including a neck between the flag 11904 and tail 11902 with a bend 11920c including turns 11925a, 11925b, and 11925c. In the illustrated embodiment, the turn 11925c connects a region of the tail 11902 near the top end of the tail or the tower 11910 of the sensor to the rest of the bend 11920c. In addition to reducing the overall footprint of the sensor, this orientation can be considered to provide additional flexibility in the horizontally-oriented axis. The arrangement can provide multiple overlapping, horizontally-aligned vertical layers between the turns.

Figure 15G:
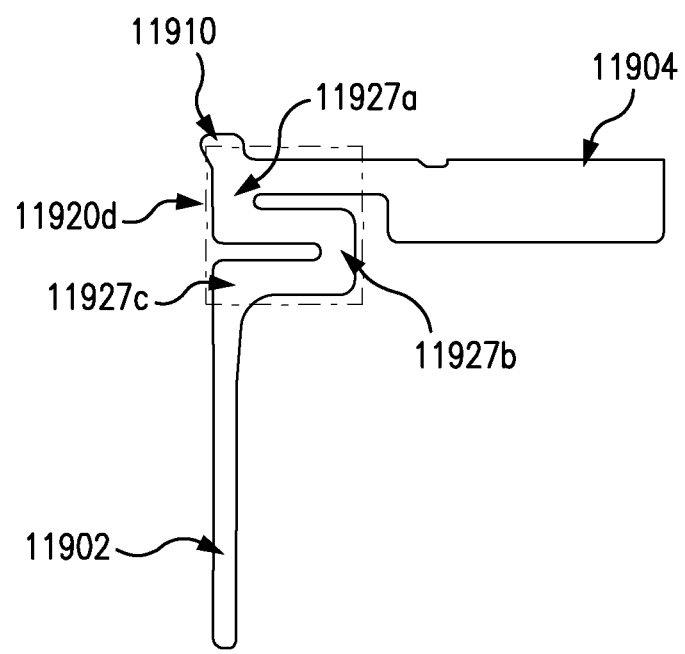

FIG. 15G illustrates another embodiment of a sensor 11900 including a neck between the flag 11904 and tail 11902 with a bend 11920d including turn 11927a, 11927b, and 11927c. In the illustrated embodiment, the bend 11920d occurs primarily in the tail 11902 of the sensor, connecting the tail 11902 and the tower 11910, while the stretch of the sensor between the tower 11910 and the flag 11904 is generally uninterrupted. The turn 11927a generally connects the tower 11910 to the rest of the bend 11920d, while the turn 11927c connects the tail 11902 to the rest of the bend 11920d. This orientation can be considered to provide additional flexibility in the vertically-oriented axis. The arrangement can provide multiple overlapping, horizontally-aligned vertical layers between the turns.

The turns of the neck can be created by folding the neck of the sensor from a larger neck structure, laser cutting the sensor from a sheet of the material comprising the sensor, printing the sensor having the configuration with turns, stamping the sensor from a sheet of material of which the sensor is composed, or other suitable manufacturing processes for providing precision bends in the neck.

Figure 16A:
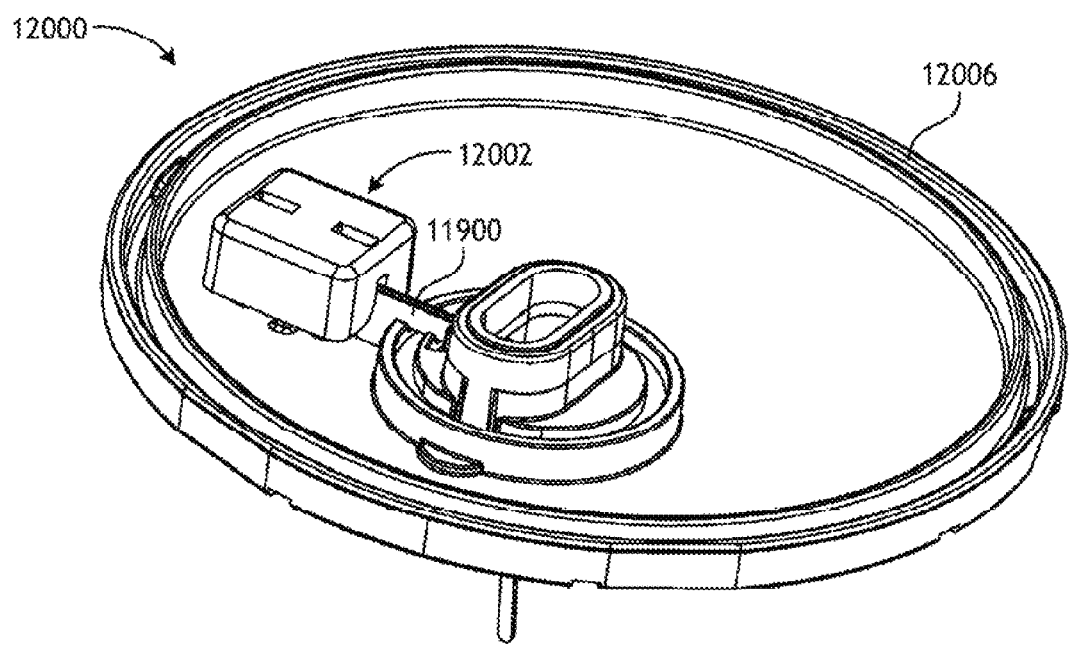

FIGS. 16A and 16B are isometric and partially exploded isometric views of an example connector assembly 12000, according to one or more embodiments. As illustrated, the connector assembly 12000 may include a connector 12002, and FIG. 17C is an isometric bottom view of the connector 12002. The connector 12002 may comprise an injection molded part used to help secure one or more compliant carbon impregnated polymer modules 12004 (four shown in FIG. 16B) to a mount 12006. More specifically, the connector 12002 may help secure the modules 12004 in place adjacent the sensor 11900 and in contact with the sensor contacts 11914 (FIG. 15C) provided on the flag 11904 (FIG. 15C). The modules 12004 may be made of a conductive material to provide conductive communication between the sensor 11900 and corresponding circuitry contacts (not shown) provided within the mount 12006.

As best seen in FIG. 16C, the connector 12002 may define pockets 12008 sized to receive the modules 12004. Moreover, in some embodiments, the connector 12002 may further define one or more depressions 12010 configured to mate with one or more corresponding flanges 12012 (FIG. 16B) on the mount 12006. Mating the depressions 12010 with the flanges 12012 may secure the connector 12002 to the mount 12006 via an interference fit or the like. In other embodiments, the connector 12002 may be secured to the mount 12006 using an adhesive or via sonic welding.

Figure 16E:
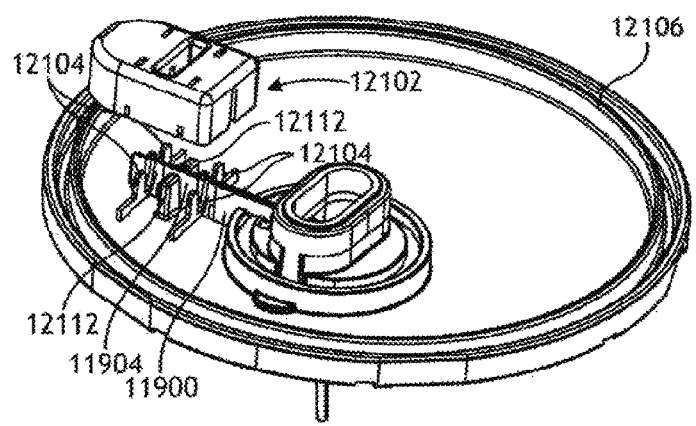
Figure 16F:
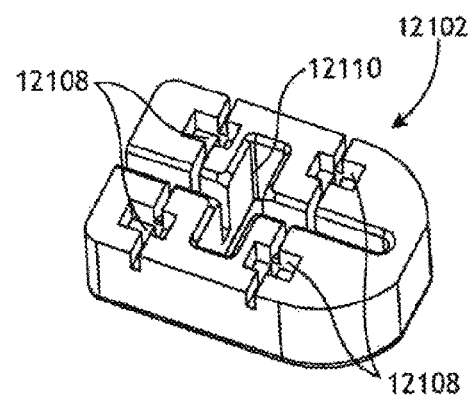
FIG. 16F is an isometric bottom view of the connector of FIGS. 16D-16E.

FIGS. 16D and 16E are isometric and partially exploded isometric views of another example connector assembly 12100, according to one or more embodiments. As illustrated, the connector assembly 12100 may include a connector 12102, and FIG. 16F is an isometric bottom view of the connector 12102. The connector 12102 may comprise an injection molded part used to help keep one or more compliant metal contacts 12104 (four shown in FIG. 16E) secured against the sensor 11900 on a mount 12106. More specifically, the connector 12102 may help secure the contacts 12104 in place adjacent the sensor 11900 and in contact with the sensor contacts 11914 (FIG. 15C) provided on the flag 11904. The contacts 12104 may be made of a stamped conductive material that provides conductive communication between the sensor 11900 and corresponding circuitry contacts (not shown) provided within the mount 12106. In some embodiments, for example, the contacts 12104 may be soldered to a PCB (not shown) arranged within the mount 12106.

As best seen in FIG. 16F, the connector 12102 may define pockets 12108 sized to receive the contacts 12104. Moreover, in some embodiments, the connector 12102 may further define one or more depressions 12110 configured to mate with one or more corresponding flanges 12112 (FIG. 120B) on the mount 12006. Mating the depressions 12110 with the flanges 12112 may help secure the connector 12102 to the mount 12106 via an interference fit or the like. In other embodiments, the connector 12102 may be secured to the mount 12106 using an adhesive or via sonic welding.

Exemplary Sharp Modules

FIG. 17A is a perspective view depicting an example embodiment of sharp module 2500 prior to assembly within sensor module 504 (FIG. 6B). Sharp 2502 can include a distal tip 2506 which can penetrate the skin while carrying sensor tail in a hollow or recess of sharp shaft 2504 to put the active surface of the sensor tail into contact with bodily fluid. A hub push cylinder 2508 can provide a surface for a sharp carrier to push during insertion. A hub small cylinder 2512 can provide a space for the extension of sharp hub contact faces 1622 (FIG. 10B). A hub snap pawl locating cylinder 2514 can provide a distal-facing surface of hub snap pawl 2516 for sharp hub contact faces 1622 to abut. A hub snap pawl 2516 can include a conical surface that opens clip 1620 during installation of sharp module 2500.

FIGS. 17B to 17H show example embodiments of sharp modules, in various stages of assembly, for use in the insertion of dermal analyte sensors. According to one aspect of the embodiments, angling the sensor and/or insertion sharp relative to a reference point can enable co-localization of the tip of the insertion needle and the tip of the sensor, and furthermore, can create a single contact point at the surface of the skin. As such, the sharp can create a leading edge at the surface of the skin to form an insertion path into the dermal layer for the sensor, as the sensor is inserted into a subject. In some embodiments, for example, the sharp and/or dermal sensor may be angled relative to a reference point (e.g., each other, surface of the skin, or the base of the applicator) for insertion, where the angle of the sharp differs from the angle of the sensor. For example, the reference point may be the skin surface to be breached for dermal insertion, or may be a reference or component of the sensor applicator set. In some embodiments, the sharp may be disposed at an angle relative to the sensor. For example, when designed so that that the sharp is angled relative to the sensor, the needle creates a leading edge for the sensor during operation of the applicator set. Furthermore, the needle design itself, and the positioning of the needle with respect to the sensor can be implemented in any desired configuration, including all of those configurations disclosed in U.S. Patent Publication No. 2014/0171771, which is incorporated by reference herein in its entirety for all purposes.

Furthermore, although many of the example embodiments described with respect to FIGS. 17B to 17J make reference to dermal analyte sensors and dermal insertion, it will be understood by those of skill in the art that any of the embodiments can be dimensioned and configured for use with analyte sensors that can be positioned beyond the dermal space, such as into (or even fully through) subcutaneous tissue (e.g., 3 mm to 10 mm beneath the surface of the skin depending on the location of the skin on the body).

Figure 17B:
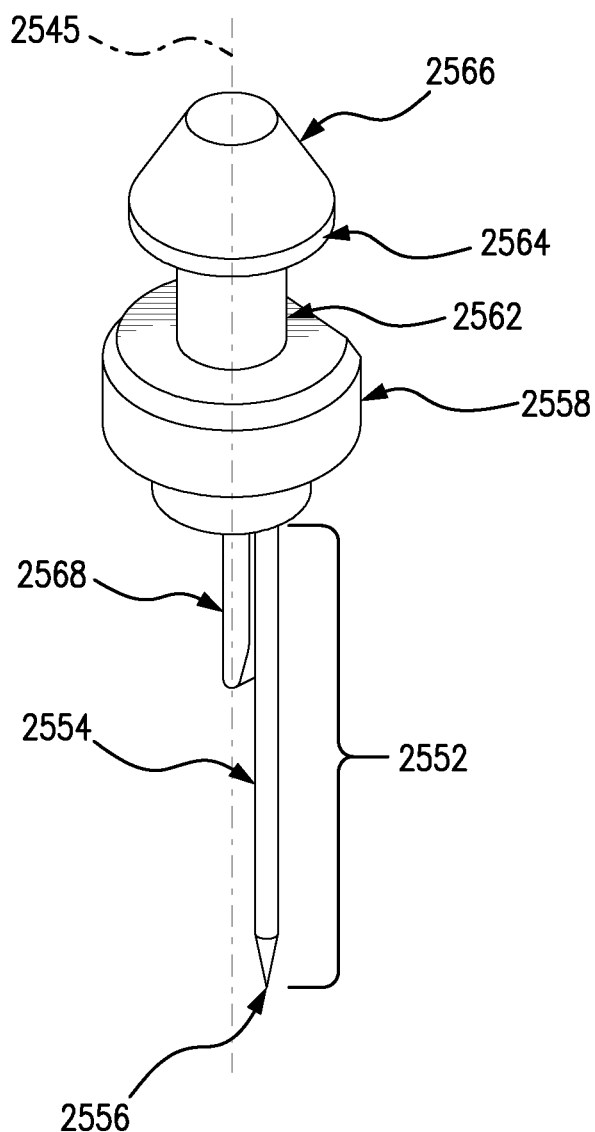
FIG. 17B is a perspective view of another example embodiment of a sharp module.

FIG. 17B is a perspective view depicting an example embodiment of a sharp module 2550 that can be used for the insertion of a dermal sensor. Sharp module 2550 is shown here prior to assembly with sensor module 504 (FIG. 6B), and can include components similar to those of the embodiment described with respect to FIG. 17A, including sharp 2552, sharp shaft 2554, sharp distal tip 2556, hub push cylinder 2558, hub small cylinder 2562, hub snap pawl 2566 and hub snap pawl locating cylinder 2564. Sharp 2552 can be positioned within sharp module 2550 at an off-center location relative to a longitudinal axis 2545 that extends through center of hub snap pawl 2566, hub small cylinder 2562 and hub push cylinder 2558. In addition, sharp module 2550 can include a sharp spacer 2568 that is parallel to and adjacent with a portion of sharp 2552. Sharp spacer 2568 can be positioned in between sensor 104 (not shown) and sharp 2552 along a proximal portion of sharp 2552, and can ensure that sensor 104 and sharp 2552 remain spaced apart at a proximal portion of sharp 2552. Sharp 2552 can be positioned in an off-center location during a molding process with hub components 2558, 2562, 2566, each of which may consist of a rigid plastic material.

Figure 17D:
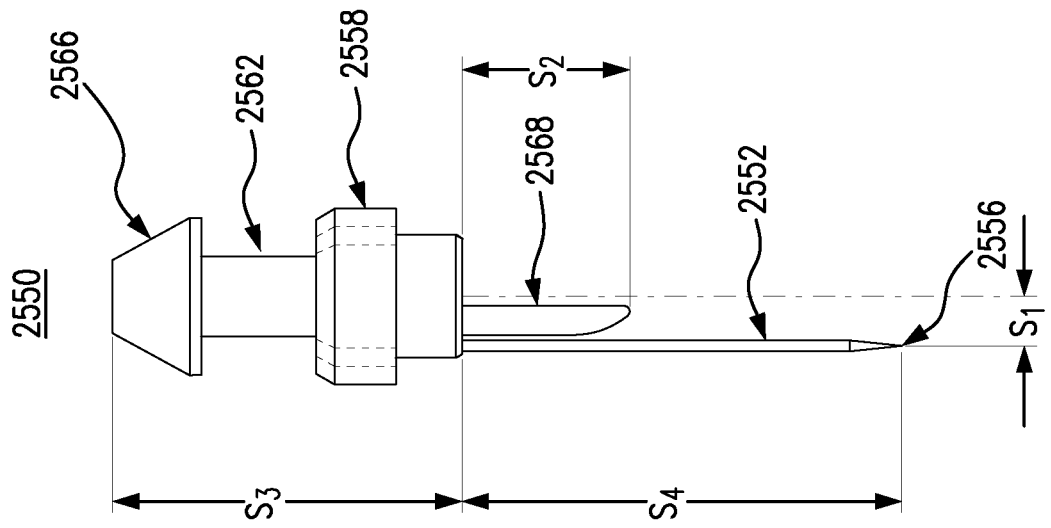
FIGS. 17C and 17D are schematic views depicting the sharp module of FIG. 17B.
Figure 17C:
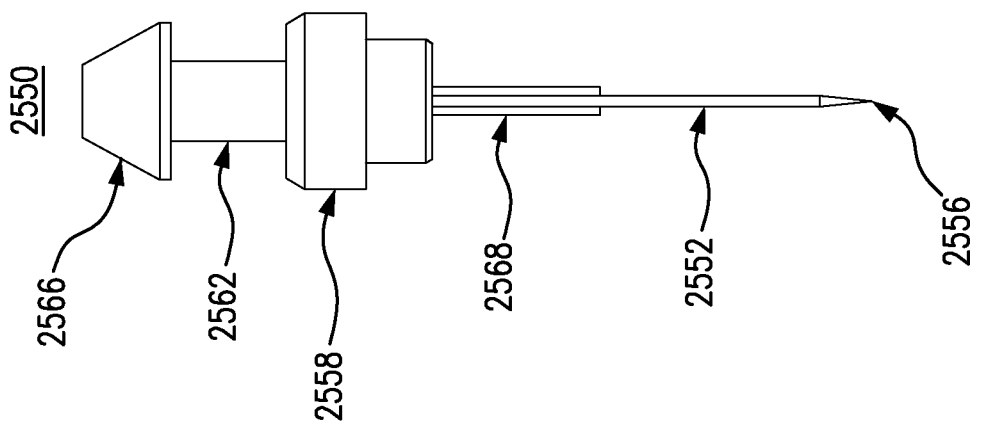

FIGS. 17C and 17D are two side views depicting sharp module 2550 prior to assembly with sensor module 504 (FIG. 6B), and include sharp 2552, spacer 2568, hub push cylinder 2558, hub small cylinder 2562 and hub snap pawl 2566. In some embodiments, the relative distances between the sharp 2552 and hub components can be positioned as follows. For example, distance, $S_1$, between the sharp 2552 and the radial center of hub can range from 0.50 mm to 1 mm (e.g., 0.89 mm). Height, $S_2$, of sharp spacer 2568 can range from 3 to 5 mm (e.g., 3.26 mm). Height, $S_3$, of hub can range from 5 to 10 mm (e.g., 6.77 mm). Length, $S_4$, of sharp 2552 can range from 1.5 mm to 25 mm (e.g., 8.55 mm), and may depend on the location of the insertion site on the subject.

Figure 17F:
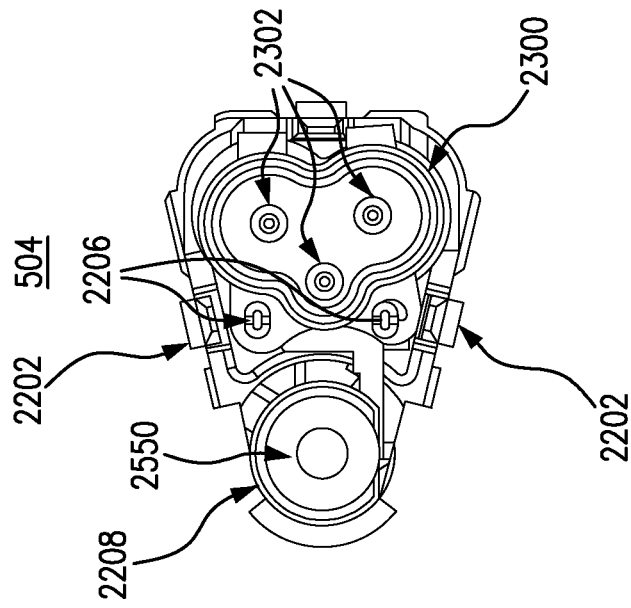
FIGS. 17E and 17F are a side schematic view and a top-down schematic view, respectively, of the sharp module of FIG. 17B, as assembled with a sensor module.
Figure 17E:
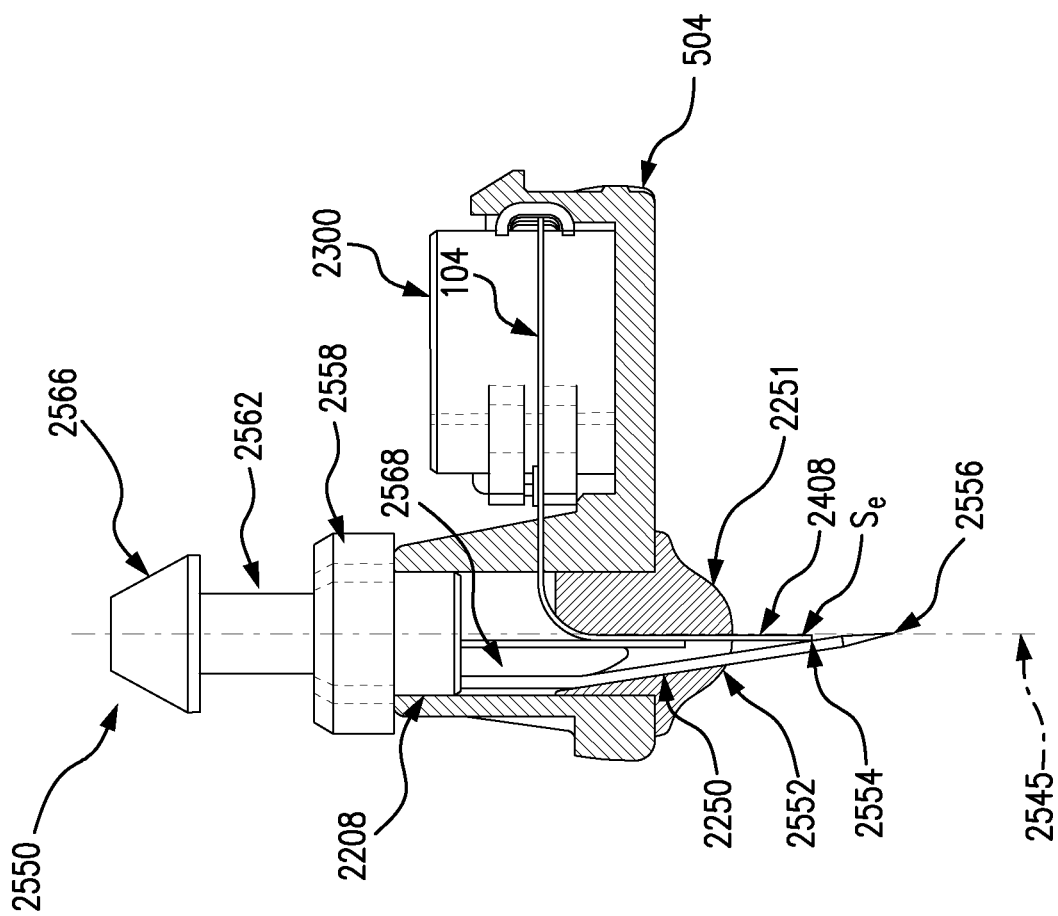
Figure 17H:
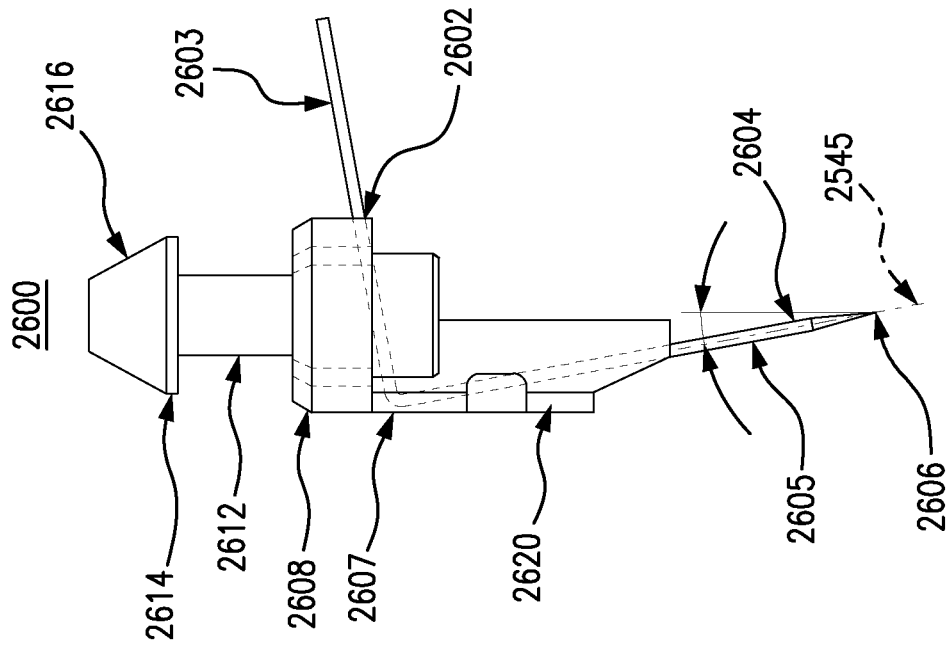
FIG. 17H is a side schematic view depicting the sharp module of FIG. 17G.

FIG. 17E depicts a side cross-sectional side view of sharp module 2550, including sharp 2552, sharp spacer 2568 and hub components (hub snap pawl 2566, hub small cylinder 2562, and hub push cylinder 2558), as assembled with sensor module 504. As can be seen in FIG. 17E, sharp 2552 is positioned within sharp slot 2208 of sensor module 504 that includes a curved interior surface 2250, located at a distal end. Curved interior surface 2250 of sensor module 504 can be in contact with a portion of sharp 2552 and cause a deflection such that sharp distal tip 2556 is oriented toward central longitudinal axis 2545. As best seen in FIG. 17H, sharp 2552 can be positioned such that the distal portion and central longitudinal axis 2545 form an acute angle, $S_\theta$, that can range between 5° and 20°. In some embodiments, for example, $S_\theta$, can range from 5° to 17°, or 7° to 15°, or 9° to 13°, e.g., 9°, 10°, 11°, 12°, or 13°

Referring still to FIG. 17E, near a distal end of sensor module 504 is protrusion 2251, which can enhance the perfusion of bodily fluid, such as dermal fluid. Although shown as a curved surface in FIG. 17E, protrusion 2251 can be shaped in any desired fashion. In addition, in some embodiments, multiple protrusions can be present. U.S. Patent Publication No. 2014/0275907, which is incorporated by reference herein in its entirety for all purposes, describes sensor devices having different protrusion configurations, each of which can be implemented with the embodiments described herein. Many of the embodiments described herein show the needle exiting from the protrusion, and in other embodiments, the needle can exit from the base of the sensor device adjacent the protrusion, and from that position extend over the tip of sensor 104.

Referring still to FIGS. 17E and 17F, sensor 104 can be a dermal sensor and can include sensor tail 2408, located at a distal end of sensor 104, and which can be positioned in a substantially parallel orientation to central longitudinal axis 2545. Distal end of sensor tail 2408 can be proximal to distal sharp tip 2556, either in a spaced relation with, at rest in, or at rest against a portion of sharp shaft 2554. As further depicted in FIG. 17E, sharp spacer 2568 provides a spaced relation between a proximal portion of sharp 2552 and sensor 104, such that the proximal portion of sharp 2552 and sensor 104 are not in contact. Sensor module 504 can further include sensor connector 2300 for housing a proximal portion of sensor 104 that is relatively perpendicular to a distal end of sensor 104.

FIG. 17F is a top-down cross-sectional view of sensor module 504. Sensor module 504 can include one or more sensor module snaps 2202 for coupling with a housing (not shown) of sensor control device 102. Sensor module 504 can also include sensor connector 2300, which can have sensor contacts 2302 for coupling with a proximal portion of sensor 104. Sensor connector 2300 can be made of silicone rubber that encapsulates compliant carbon impregnated polymer modules that serve as electrical conductive contacts 2302 between sensor 104 and electrical circuitry contacts for the electronics within sensor control device 102. The connector can also serve as a moisture barrier for sensor 104 when assembled in a compressed state after transfer from a container to an applicator and after application to a user's skin. Although three contacts 2302 are depicted, it should be understood that connector 2300 can have fewer contacts (e.g., two) or more contacts (e.g., four, five, six, etc.), depending on the particular type or configuration of sensor 104. Sensor connector 2300 can be further coupled with sensor module 504 by two connector posts 2206 positioned through a like number of apertures in connector 2300. Although two connector posts 2206 are depicted, it should be understood that any number of connector posts 2206 can be used to couple connector 2300 to sensor module 504.

Figure 17G:
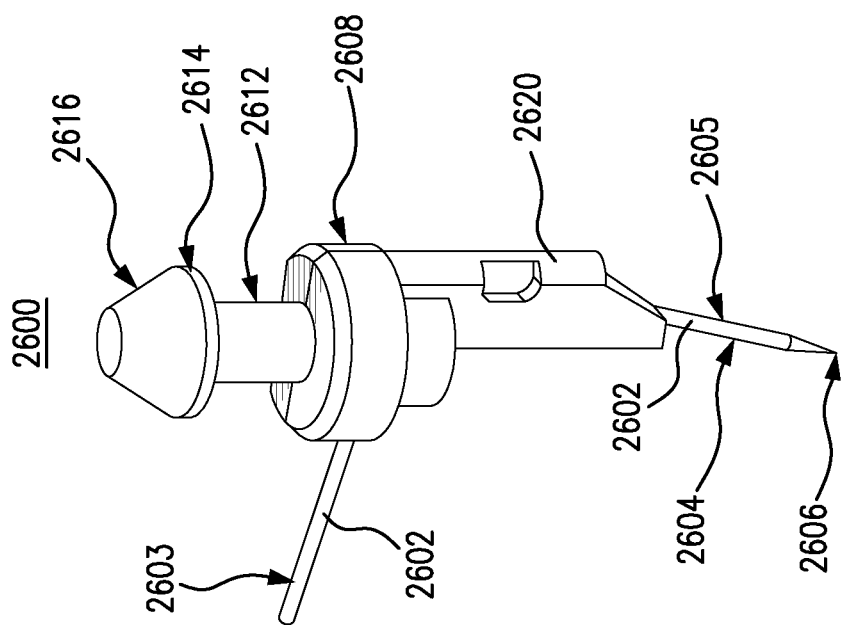
FIG. 17G is a perspective view of another example embodiment of a sharp module.

FIGS. 17G and 17H are, respectively, a perspective view and a side view of another example embodiment of sharp module 2600 that can be used for the insertion of a dermal sensor. Sharp module 2600 is shown here prior to assembly with sensor module 504 (FIG. 6B), and can include components similar to those of the embodiments described with respect to FIGS. 17A and 17B, including sharp 2602, sharp shaft 2604, sharp distal tip 2606, hub push cylinder 2608, hub small cylinder 2612, hub snap pawl 2616 and hub snap pawl locating cylinder 2614. In some embodiments, sharp 2602 can be a "pre-bent" needle that includes a proximal portion 2603 that originates from a point external to sharp module 2600 and intersects, at an angle, a central point of the hub (e.g., through hub push cylinder 2608). Sharp 2602 can also include a distal portion 2605 that extends in a distal direction, at an angle, from a point near a distal portion of hub toward the insertion point of the user's skin. As shown in FIG. 17H, sharp 2602 can include an angled portion 2607 located external to hub push cylinder 2608, which can have a substantially 90° angle between proximal portion 2603 and distal portion 2605 of sharp 2602. Sharp module 2600 can also include a bend fin guide 2620 for maintaining "pre-bent" sharp 2602 in position during assembly and/or use, and can prevent lateral or rotational movement of sharp 2602 relative to hub components. Proximal portion 2603 of sharp 2602 can be "trimmed" from the hub after molding process is completed, and prior to assembly of sharp module 2600 with sensor module 504.

Figure 17J:
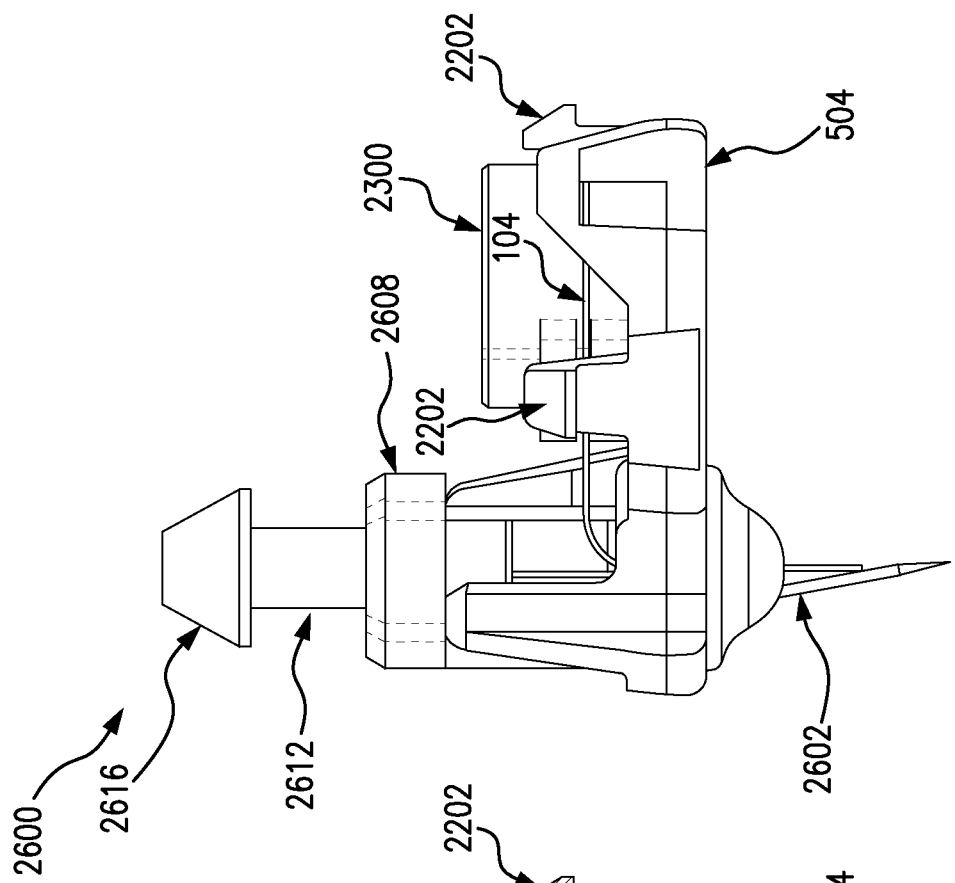
FIGS. 17I and 17J are a side cross-sectional view and a side view, respectively, of the sharp module of FIG. 17G, as assembled with a sensor module.
Figure 17I:
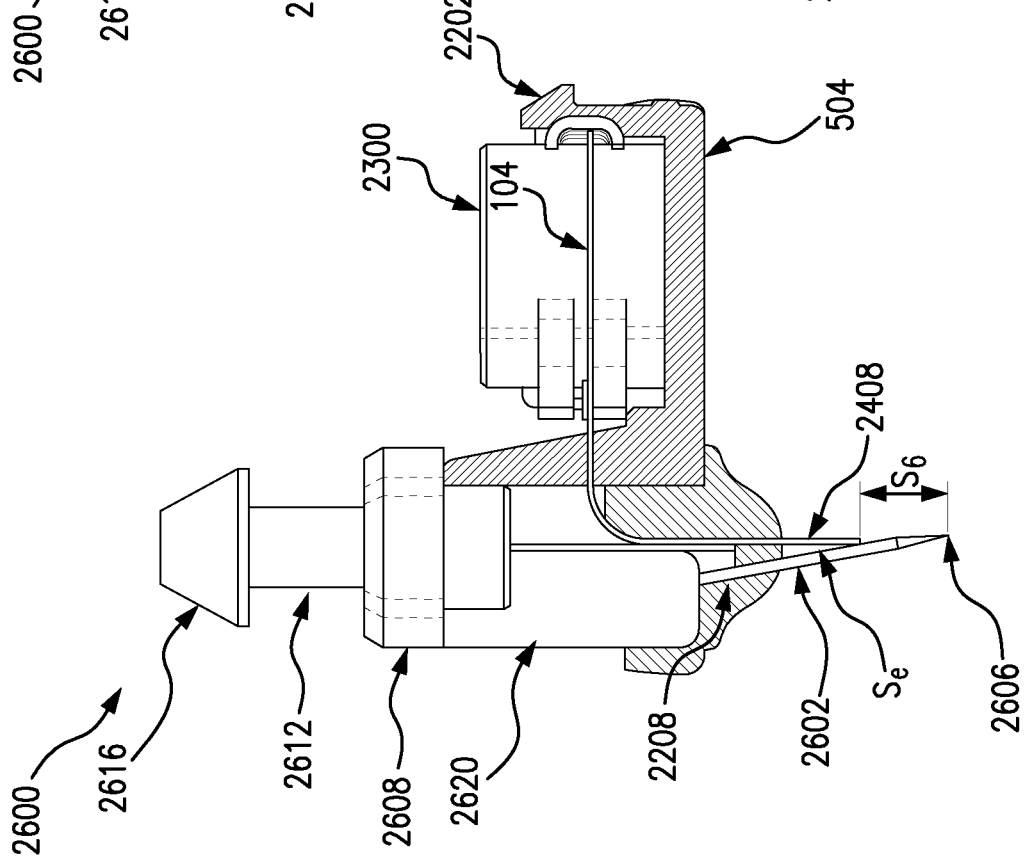

FIGS. 17I and 17J show, respectively, a side cross-sectional view and a side view of sharp module 2600 (including hub snap pawl 2616, hub small cylinder 2612, and hub push cylinder 2608), as assembled with sensor module 504. As can be seen in FIG. 17I, sensor module 504 includes sharp slot 2208, through which sharp 2602 can extend in an angled and distal direction. As described earlier, a proximal portion of sharp 2602 passes through bend fin guide 2620, which is coupled with a distal portion of sensor module 504. Sensor module 504 can also include sensor 104, which can be a dermal sensor. As seen in FIG. 17I, sharp 2602 and sensor tail 2408 can form an acute angle, $S_\ominus$, at a point where their respective longitudinal axes converge. Angle $S_\ominus$ can range between 5° and 20°. In some embodiments, for example, So, can range from 5° to 17°, or 7° to 15°, or 9° to 13°, e.g., 9°, 10°, 11°, 12°, or 13° In some embodiments, distal sharp tip 2606 is located at a distance, $S_6$, that is proximal to an end of sensor tail 2408. Distance, $S_6$, can range between 0.02 mm to 0.10 mm, e.g., 0.05 mm, 0.06 mm or 0.07 mm.

Referring still to FIGS. 17I and 17J, sensor module 504 can also include sensor connector 2300 for housing a proximal portion of sensor 104 that is relatively perpendicular to a distal end of sensor 104. Sensor module 504 can further include one or more sensor module snaps 2202 for coupling with a housing (not shown) of sensor control device 102. Sensor connector 2300 can include the same structures described with respect to FIG. 17F.

In the above embodiments, the sharp can be made of stainless steel or a like flexible material (e.g., material used to manufacture acupuncture needles), and dimensioned such that the applicator provides for insertion of at least a portion of the dermal sensor into the dermal layer, but not through the dermal layer of the skin. According to certain embodiments, the sharp has a cross sectional diameter (width) of from 0.1 mm to 0.5 mm. For example, the sharp may have a diameter of from 0.1 mm to 0.3 mm, such as from 0.15 mm to 0.25 mm, e.g., 0.16 mm to 0.22 mm in diameter. A given sharp may have a constant, i.e., uniform, width along its entire length, or may have a varying, i.e., changing, width along at least a portion of its length, such as the tip portion used to pierce the surface of the skin. For example, with respect to the embodiment shown in FIG. 17I, width of sharp 2602 can narrow along a distal portion between bend fin guide 1620 and distal sharp tip 2606.

A sharp can also have a length to insert a dermal sensor just into the dermal layer, and no more. Insertion depth may be controlled by the length of the sharp, the configuration of the base and/or other applicator components that limit insertion depth. A sharp may have a length between 1.5 mm and 25 mm. For example, the sharp may have a length of from 1 mm to 3 mm, from 3 mm to 5 mm, from 5 mm to 7 mm, from 7 mm to 9 mm, from 9 mm to 11 mm, from 11 mm to 13 mm, from 13 mm to 15 mm, from 15 mm to 17 mm, from 17 mm to 19 mm, from 19 mm to 21 mm, from 21 mm to 23 mm, from 23 mm to 25 mm, or a length greater than 25 mm. It will be appreciated that while a sharp may have a length up to 25 mm, in certain embodiments the full length of the sharp is not inserted into the subject because it would extend beyond the dermal space. Non-inserted sharp length may provide for handling and manipulation of the sharp in an applicator set. Therefore, while a sharp may have a length up to 25 mm, the insertion depth of the sharp in the skin on a subject in those certain embodiments will be limited to the dermal layer, e.g., about 1.5 mm to 4 mm, depending on the skin location, as described in greater detail below. However, in all of the embodiments disclosed herein, the sharp can be configured to extend beyond the dermal space, such as into (or even fully through) subcutaneous tissue (e.g., 3 mm to 10 mm beneath the surface of the skin depending on the location of the skin on the body). Additionally, in some example embodiments, the sharps described herein can include hollow or partially hollow insertion needles, having an internal space or lumen. In other embodiments, however, the sharps described herein can include solid insertion needles, which do not have an internal space and/or lumen. Furthermore, a sharp of the subject applicator sets can also be bladed or non-bladed.

Likewise, in the above embodiments, a dermal sensor is sized so that at least a portion of the sensor is positioned in the dermal layer and no more, and a portion extends outside the skin in the transcutaneously positioned embodiments. That is, a dermal sensor is dimensioned such that when the dermal sensor is entirely or substantially entirely inserted into the dermal layer, the distal-most portion of the sensor (the insertion portion or insertion length) is positioned within the dermis of the subject and no portion of the sensor is inserted beyond a dermal layer of the subject when the sensor is operably dermally positioned.

The dimensions (e.g., the length) of the sensor may be selected according to the body site of the subject in which the sensor is to be inserted, as the depth and thickness of the epidermis and dermis exhibit a degree of variability depending on skin location. For example, the epidermis is only about 0.05 mm thick on the eyelids, but about 1.5 mm thick on the palms and the soles of the feet. The dermis is the thickest of the three layers of skin and ranges from about 1.5 mm to 4 mm thick, depending on the skin location. For implantation of the distal end of the sensor into, but not through, the dermal layer of the subject, the length of the inserted portion of the dermal sensor should be greater than the thickness of the epidermis, but should not exceed the combined thickness of the epidermis and dermis. Methods may include determining an insertion site on a body of a user and determining the depth of the dermal layer at the site, and selecting the appropriately-sized applicator set for the site.

In certain aspects, the sensor is an elongate sensor having a longest dimension (or "length") of from 0.25 mm to 4 mm. The length of the sensor that is inserted, in the embodiments in which only a portion of a sensor is dermally inserted, ranges from 0.5 mm to 3 mm, such as from 1 mm to 2 mm, e.g., 1.5 mm. The dimensions of the sensor may also be expressed in terms of its aspect ratio. In certain embodiments, a dermal sensor has an aspect ratio of length to width (diameter) of about 30:1 to about 6:1. For example, the aspect ratio may be from about 25:1 to about 10:1, including 20:1 and 15:1. The inserted portion of a dermal sensor has sensing chemistry.

However, all of the embodiments disclosed herein can be configured such that at least a portion of the sensor is positioned beyond the dermal layer, such as into (or through) the subcutaneous tissue (or fat). For example, the sensor can be dimensioned such that when the sensor is entirely or substantially entirely inserted into the body, the distal-most portion of the sensor (the insertion portion or insertion length) is positioned within the subcutaneous tissue (beyond the dermis of the subject) and no portion of the sensor is inserted beyond the subcutaneous tissue of the subject when the sensor is operably positioned. As mentioned, the subcutaneous tissue is typically present in the region that is 3 mm to 10 mm beneath the outer skin surface, depending on the location of the skin on the body.

Exemplary Applicators and Sensor Control Devices for One Piece Architectures

Referring briefly again to FIGS. 1 and 3A-3G, for the two-piece architecture system, the sensor tray 202 and the sensor applicator 102 are provided to the user as separate packages, thus requiring the user to open each package and finally assemble the system. In some applications, the discrete, sealed packages allow the sensor tray 202 and the sensor applicator 102 to be sterilized in separate sterilization processes unique to the contents of each package and otherwise incompatible with the contents of the other. More specifically, the sensor tray 202, which includes the plug assembly 207, including the sensor 110 and the sharp 220, may be sterilized using radiation sterilization, such as electron beam (or "e-beam") irradiation. Suitable radiation sterilization processes include, but are not limited to, electron beam (e-beam) irradiation, gamma ray irradiation, X-ray irradiation, or any combination thereof. Radiation sterilization, however, can damage the electrical components arranged within the electronics housing of the sensor control device 102. Consequently, if the sensor applicator 102, which contains the electronics housing of the sensor control device 102, needs to be sterilized, it may be sterilized via another method, such as gaseous chemical sterilization using, for example, ethylene oxide. Gaseous chemical sterilization, however, can damage the enzymes or other chemistry and biologies included on the sensor 110. Because of this sterilization incompatibility, the sensor tray 202 and the sensor applicator 102 are commonly sterilized in separate sterilization processes and subsequently packaged separately, which requires the user to finally assemble the components for use.

According to embodiments of the present disclosure, the sensor control device 102 may be modified to provide a one-piece architecture that may be subjected to sterilization techniques specifically designed for a one-piece architecture sensor control device. A one-piece architecture allows the sensor applicator 150 and the sensor control device 102 to be shipped to the user in a single, sealed package that does not require any final user assembly steps. Rather, the user need only open one package and subsequently deliver the sensor control device 102 to the target monitoring location. The one-piece system architecture described herein may prove advantageous in eliminating component parts, various fabrication process steps, and user assembly steps. As a result, packaging and waste are reduced, and the potential for user error or contamination to the system is mitigated.

Figure 18A:
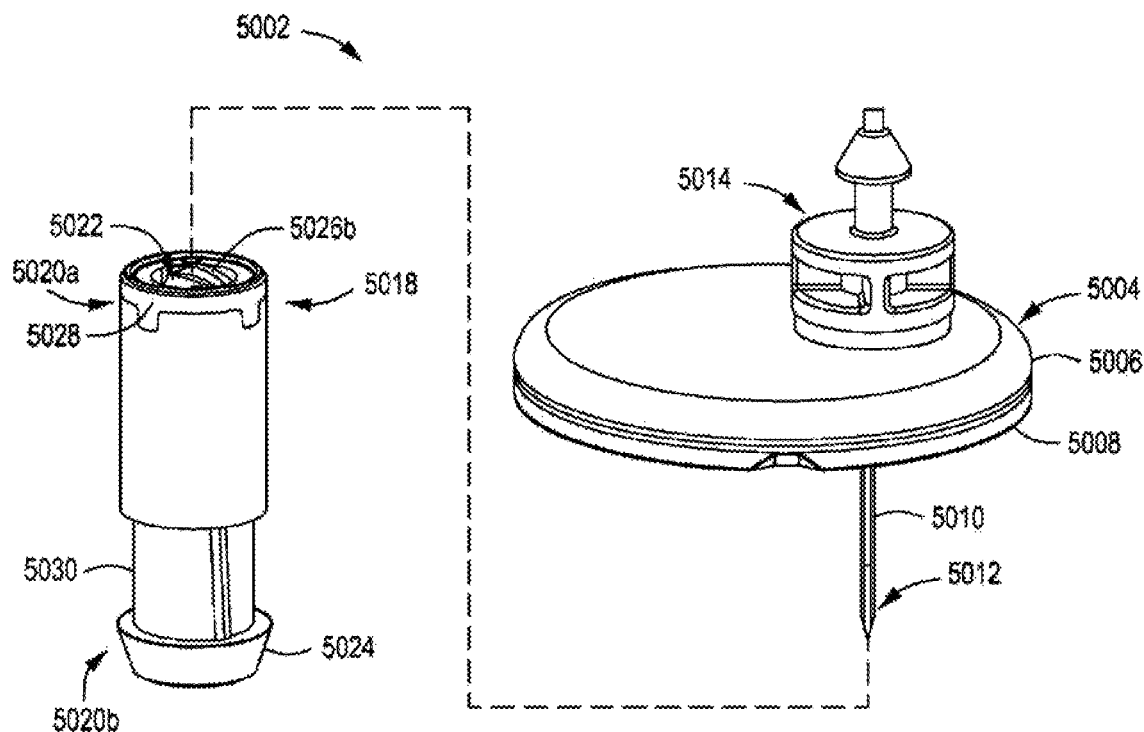
FIGS. 18A and 18B are isometric and side views, respectively, of another example sensor control device.
Figure 18B:
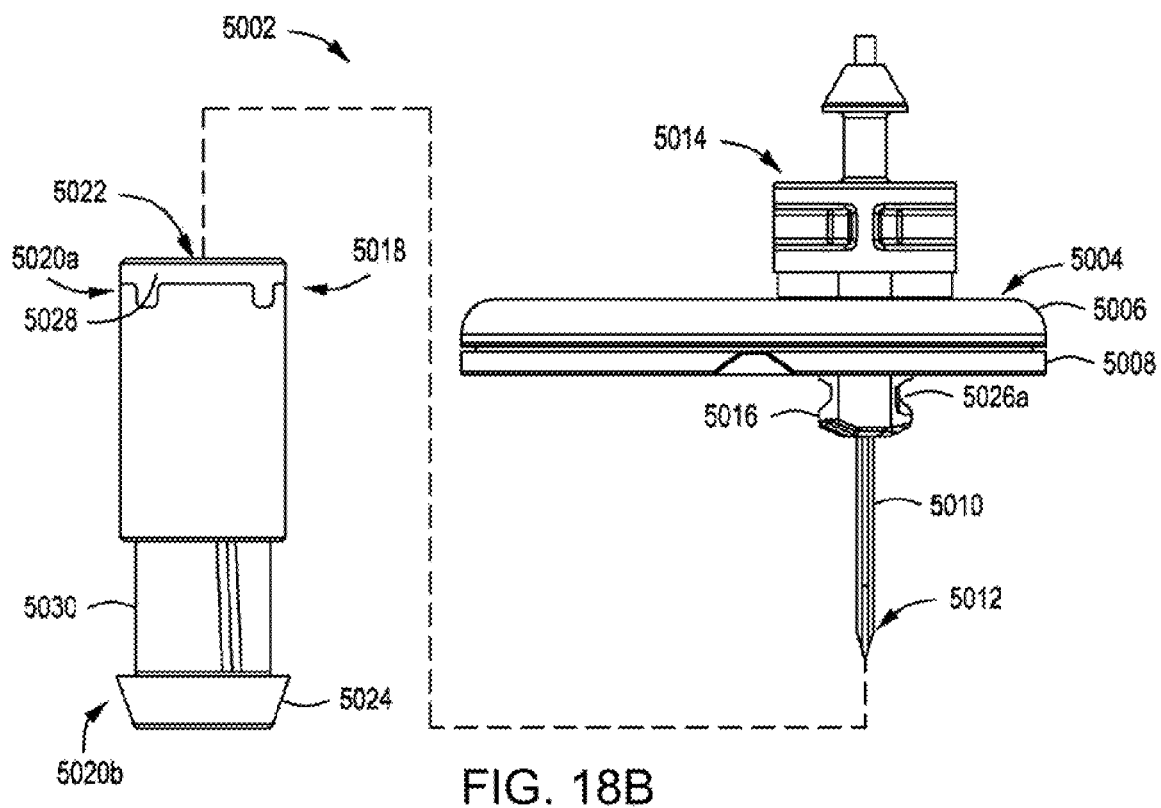

FIGS. 18A and 18B are isometric and side views, respectively, of another example sensor control device 5002, according to one or more embodiments of the present disclosure. The sensor control device 5002 may be similar in some respects to the sensor control device 102 of FIG. 1 and therefore may be best understood with reference thereto. Moreover, the sensor control device 5002 may replace the sensor control device 102 of FIG. 1 and, therefore, may be used in conjunction with the sensor applicator 102 of FIG. 1, which may deliver the sensor control device 5002 to a target monitoring location on a user's skin.

Figure 44A:
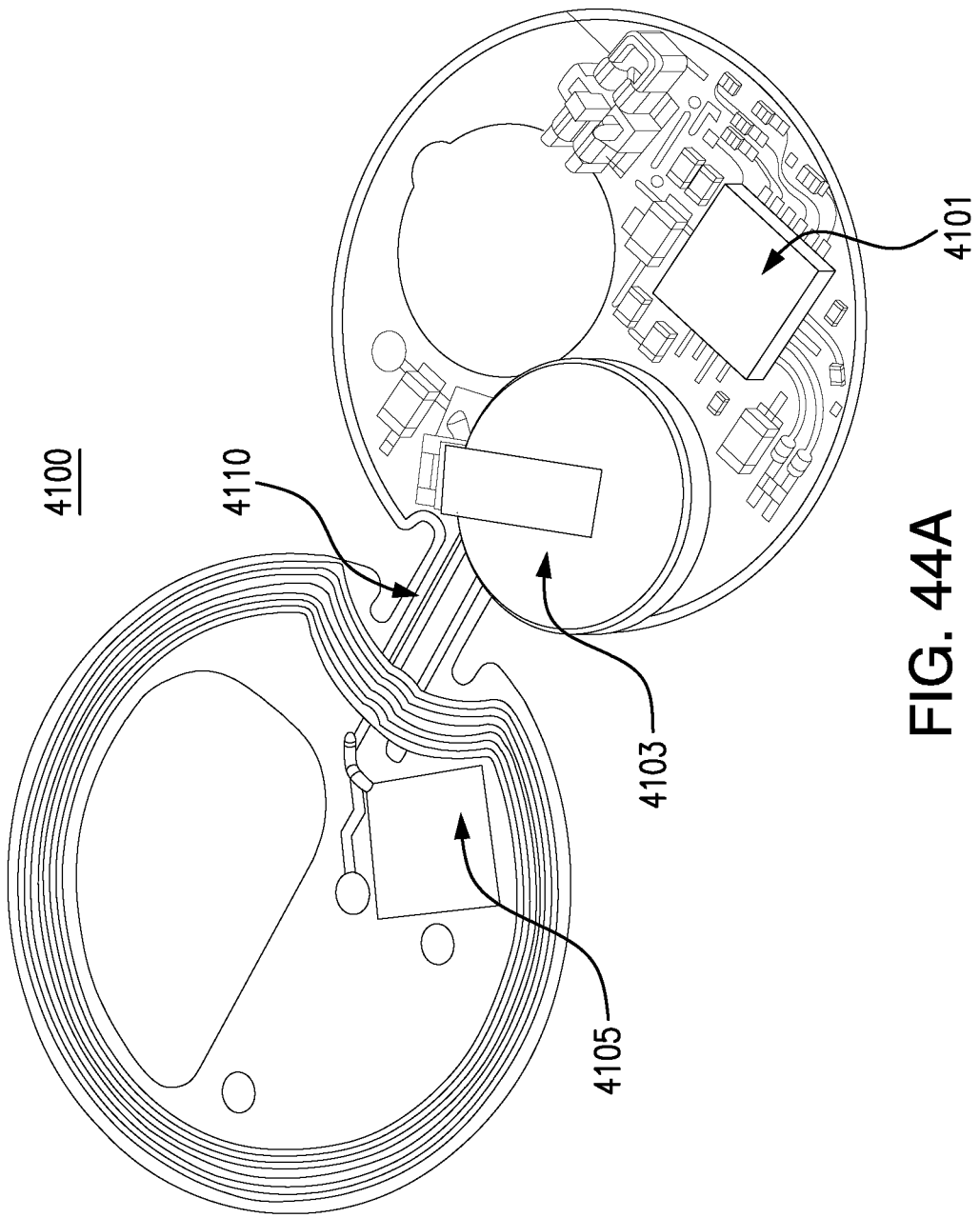
FIGS. 44A-44J illustrate steps of a process for assembling a sensor control device.
Figure 44B:
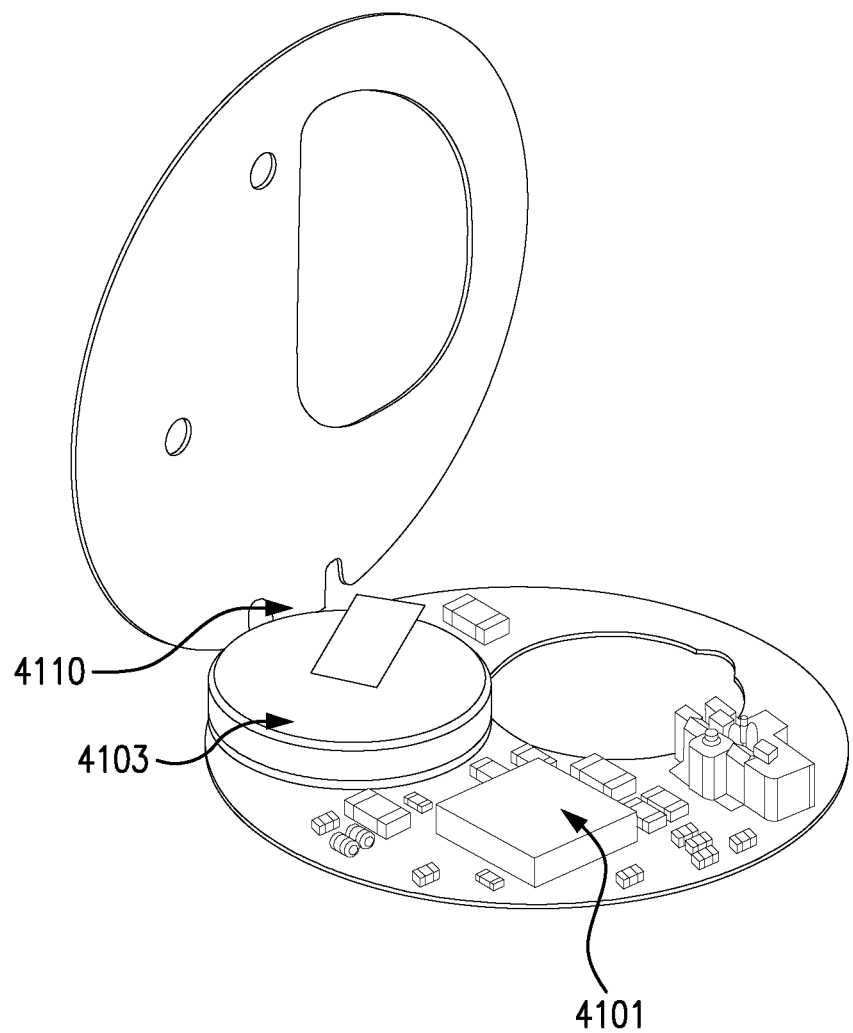
Figure 44C:
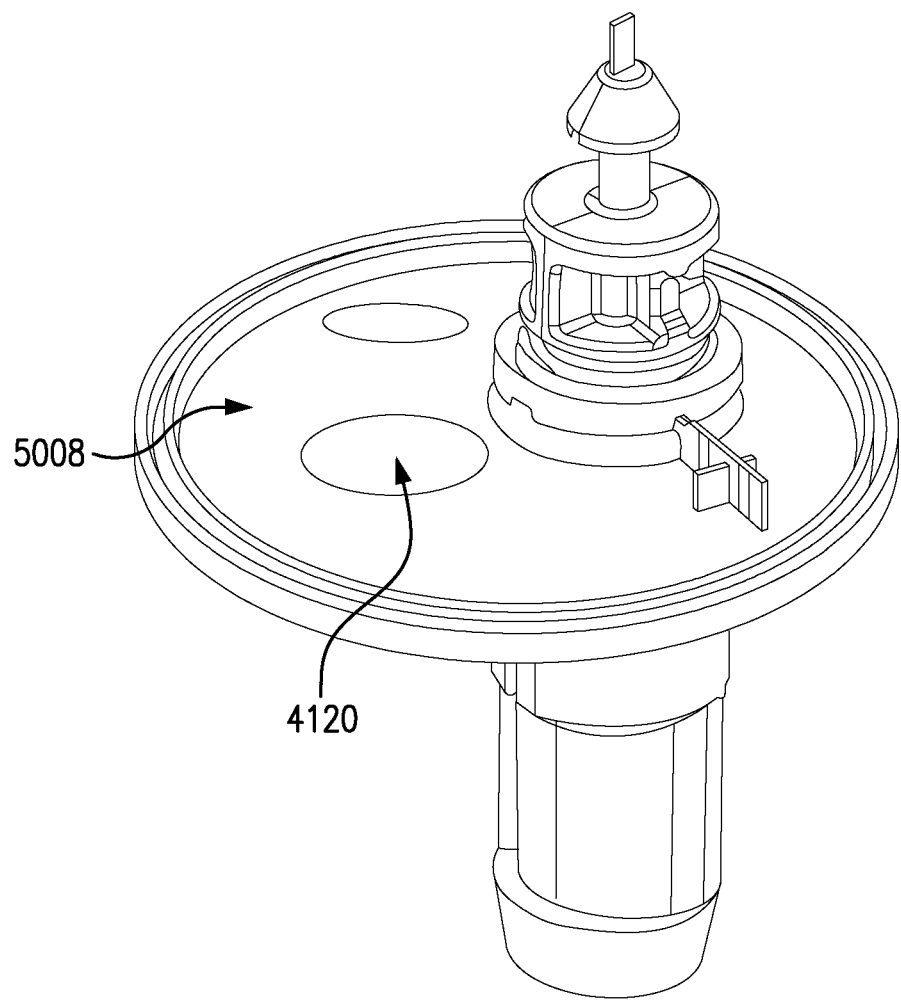
Figure 44D:
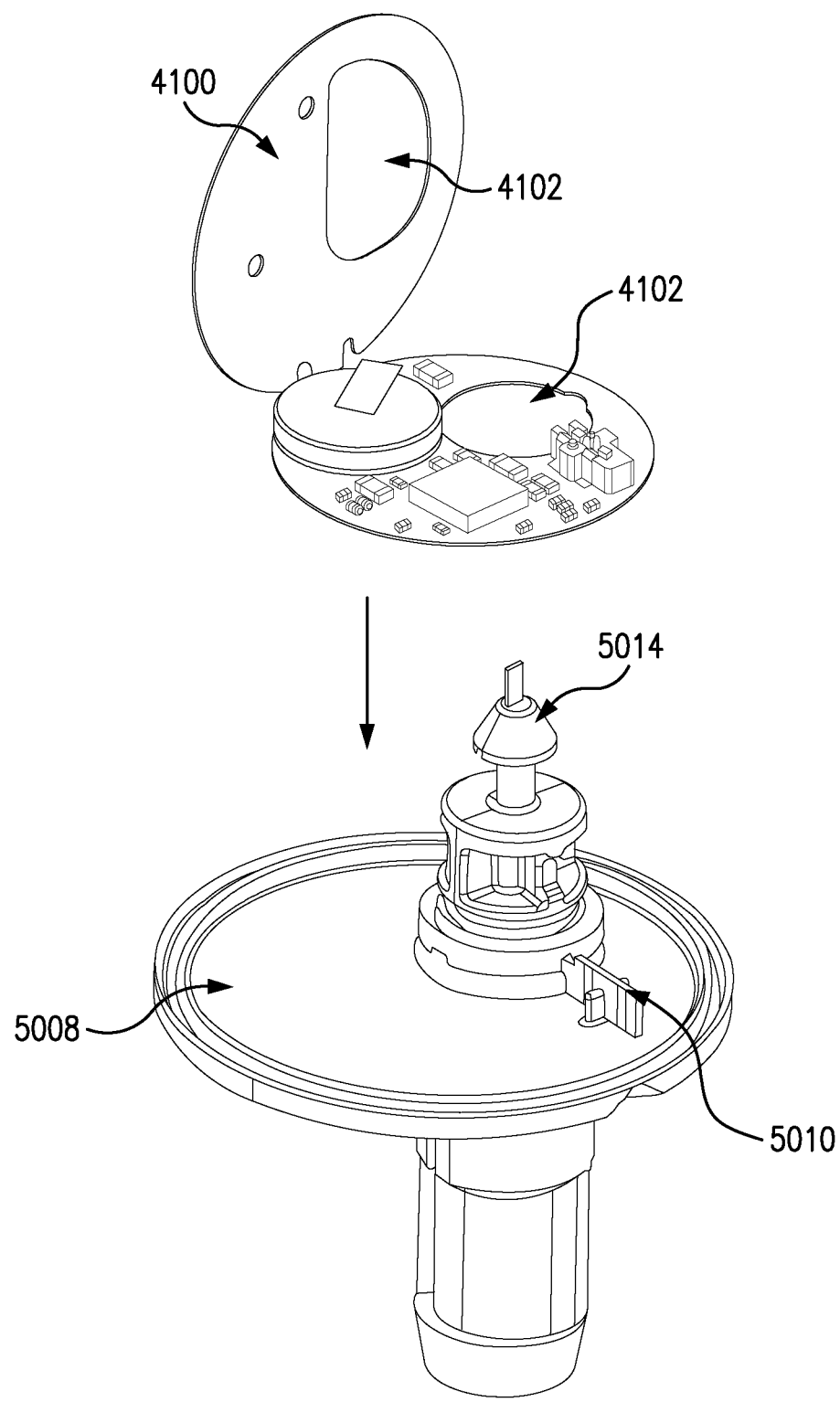
Figure 44E:
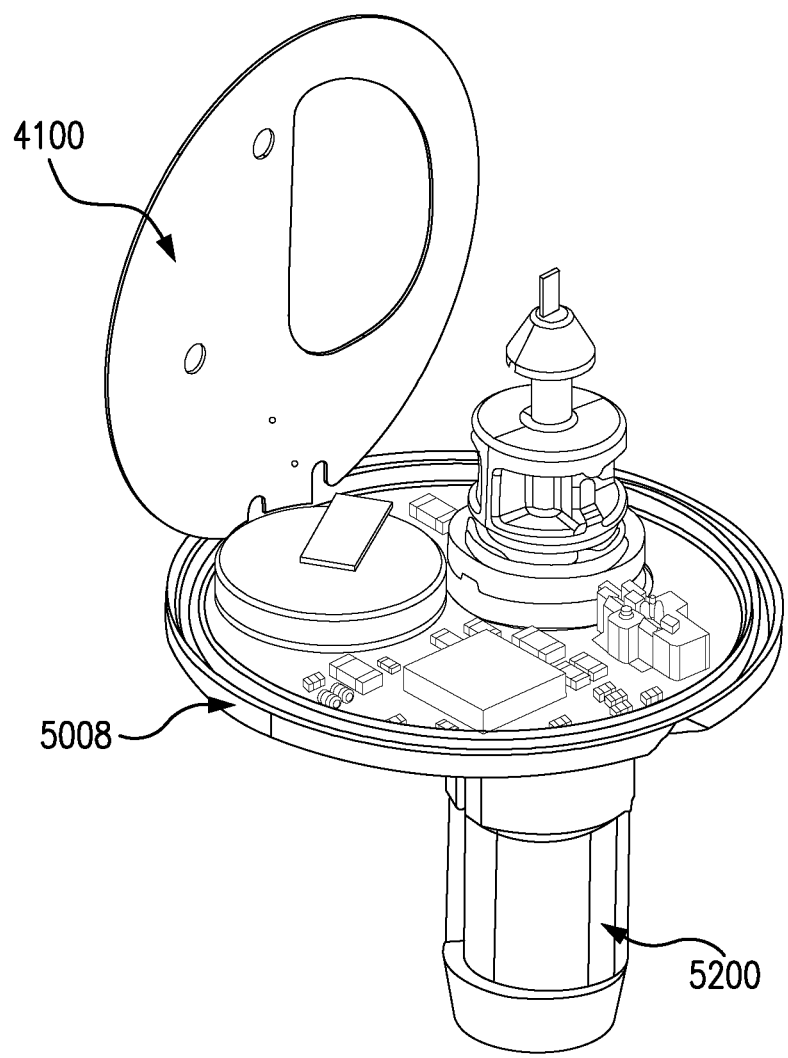
Figure 44F:
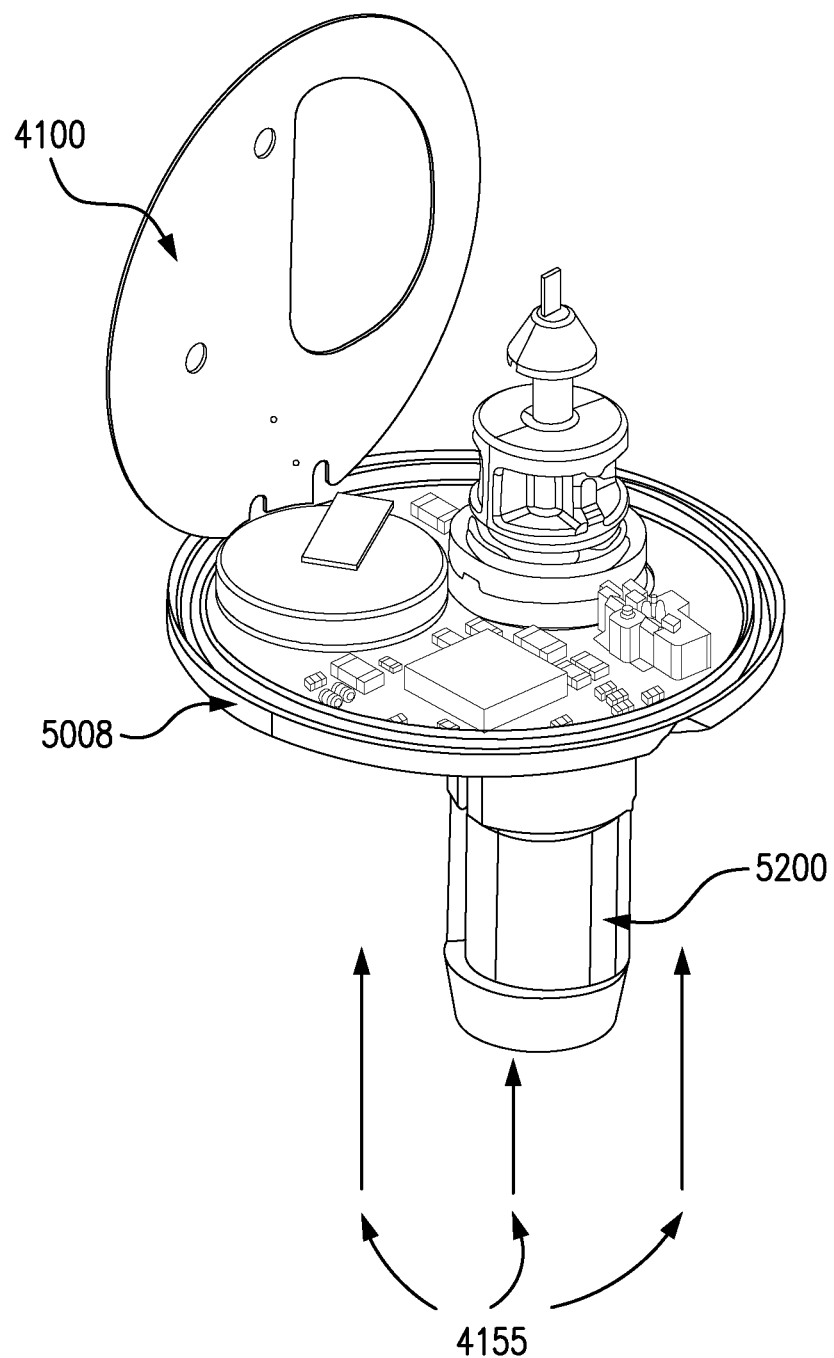
Figure 44G:
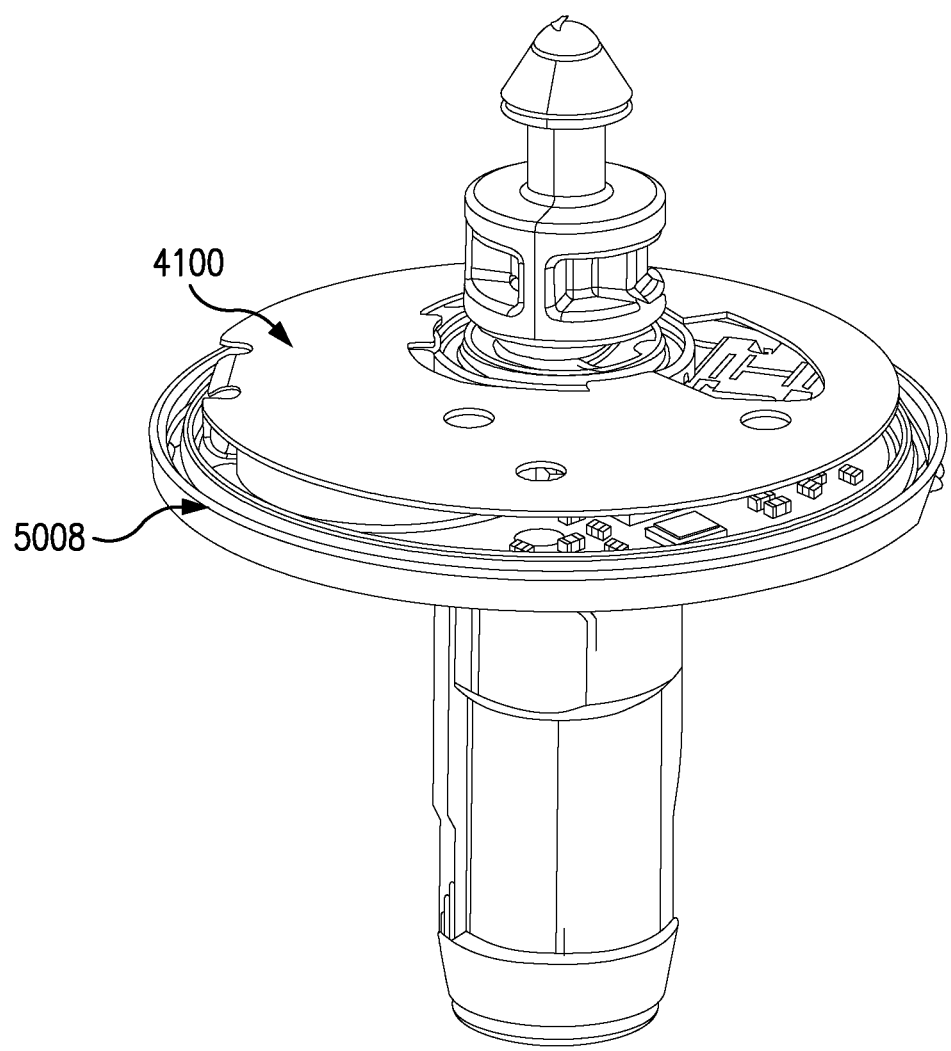
Figure 44H:
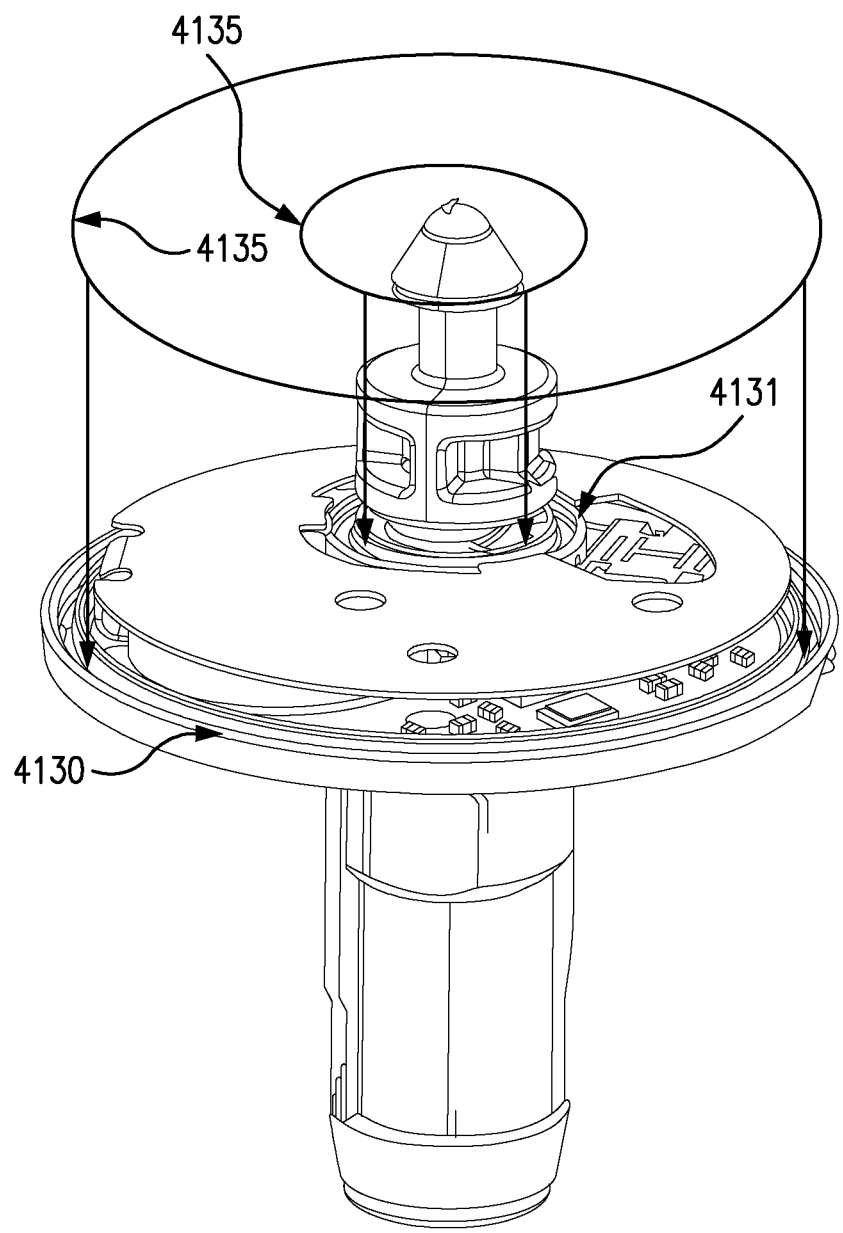
Figures 1, 44H:
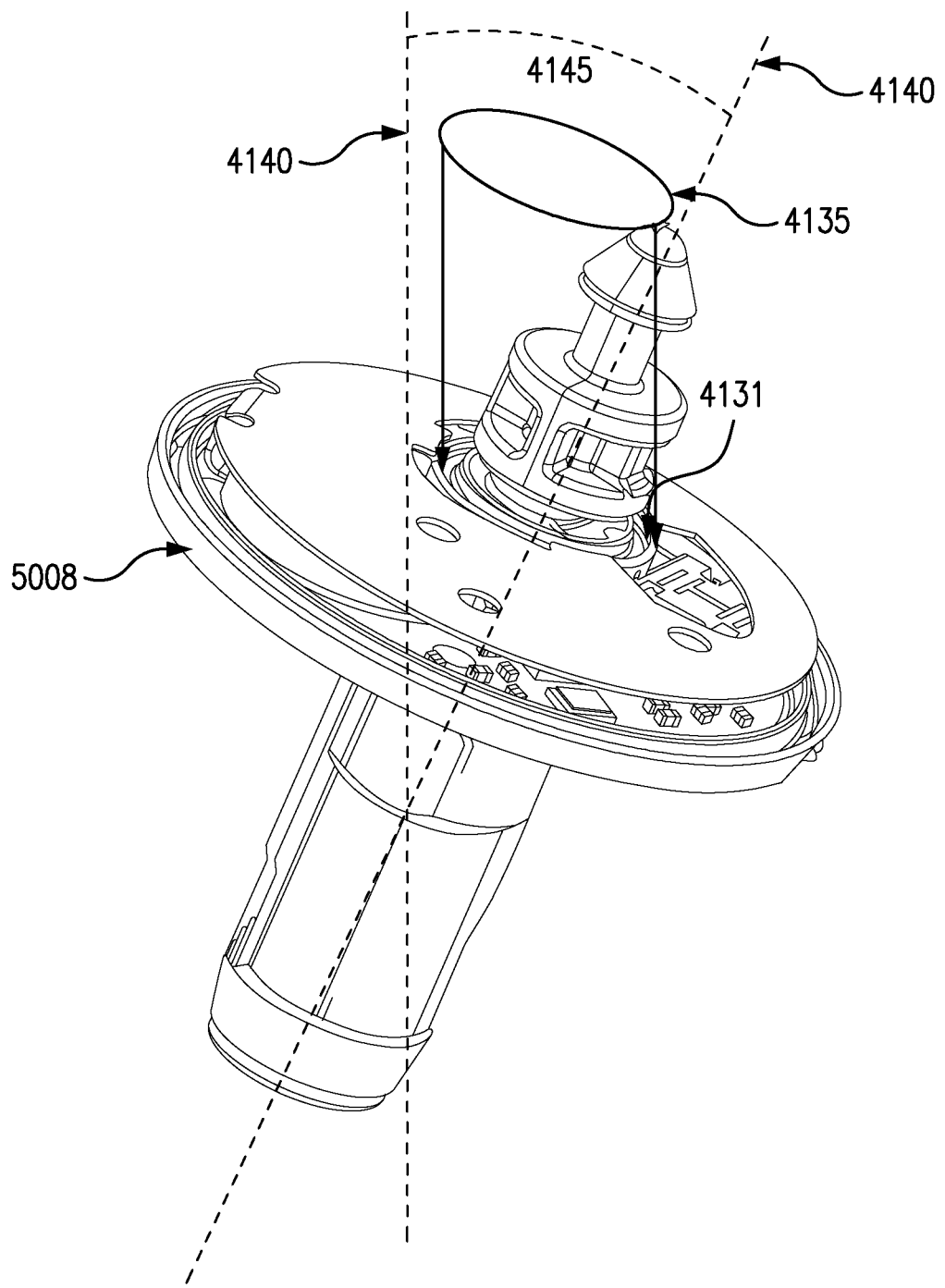

Unlike the sensor control device 102 of FIG. 1, however, the sensor control device 5002 may comprise a one-piece system architecture not requiring a user to open multiple packages and finally assemble the sensor control device 5002 prior to application. Rather, upon receipt by the user, the sensor control device 5002 may already be fully assembled and properly positioned within the sensor applicator 150 (FIG. 1). To use the sensor control device 5002, the user need only open one barrier (e.g., the applicator cap 708 of FIG. 3B) before promptly delivering the sensor control device 5002 to the target monitoring location for use.

As illustrated, the sensor control device 5002 includes an electronics housing 5004 that is generally disc-shaped and may have a circular cross-section. In other embodiments, however, the electronics housing 5004 may exhibit other cross-sectional shapes, such as ovoid or polygonal, without departing from the scope of the disclosure. The electronics housing 5004 may be configured to house or otherwise contain various electrical components used to operate the sensor control device 5002. In at least one embodiment, an adhesive patch (not shown) may be arranged at the bottom of the electronics housing 5004. The adhesive patch may be similar to the adhesive patch 105 of FIG. 1, and may thus help adhere the sensor control device 5002 to the user's skin for use.

As illustrated, the sensor control device 5002 includes an electronics housing 5004 that includes a shell 5006 and a mount 5008 that is matable with the shell 5006. The shell 5006 may be secured to the mount 5008 via a variety of ways, such as a snap fit engagement, an interference fit, sonic welding, one or more mechanical fasteners (e.g., screws), a gasket, an adhesive, or any combination thereof. In some cases, the shell 5006 may be secured to the mount 5008 such that a sealed interface is generated therebetween.

The sensor control device 5002 may further include a sensor 5010 (partially visible) and a sharp 5012 (partially visible), used to help deliver the sensor 5010 transcutaneously under a user's skin during application of the sensor control device 5002. As illustrated, corresponding portions of the sensor 5010 and the sharp 5012 extend distally from the bottom of the electronics housing 5004 (e.g., the mount 5008). The sharp 5012 may include a sharp hub 5014 configured to secure and carry the sharp 5012. As best seen in FIG. 18B, the sharp hub 5014 may include or otherwise define a mating member 5016. To couple the sharp 5012 to the sensor control device 5002, the sharp 5012 may be advanced axially through the electronics housing 5004 until the sharp hub 5014 engages an upper surface of the shell 5006 and the mating member 5016 extends distally from the bottom of the mount 5008. As the sharp 5012 penetrates the electronics housing 5004, the exposed portion of the sensor 5010 may be received within a hollow or recessed (arcuate) portion of the sharp 5012. The remaining portion of the sensor 5010 is arranged within the interior of the electronics housing 5004.

The sensor control device 5002 may further include a sensor cap 5018, shown exploded or detached from the electronics housing 5004 in FIGS. 18A-18B. The sensor cap 5016 may be removably coupled to the sensor control device 5002 (e.g., the electronics housing 5004) at or near the bottom of the mount 5008. The sensor cap 5018 may help provide a sealed barrier that surrounds and protects the exposed portions of the sensor 5010 and the sharp 5012 from gaseous chemical sterilization. As illustrated, the sensor cap 5018 may comprise a generally cylindrical body having a first end 5020a and a second end 5020b opposite the first end 5020a. The first end 5020a may be open to provide access into an inner chamber 5022 defined within the body. In contrast, the second end 5020b may be closed and may provide or otherwise define an engagement feature 5024. As described herein, the engagement feature 5024 may help mate the sensor cap 5018 to the cap (e.g., the applicator cap 708 of FIG. 3B) of a sensor applicator (e.g., the sensor applicator 150 of FIGS. 1 and 3A-3G), and may help remove the sensor cap 5018 from the sensor control device 5002 upon removing the cap from the sensor applicator.

The sensor cap 5018 may be removably coupled to the electronics housing 5004 at or near the bottom of the mount 5008. More specifically, the sensor cap 5018 may be removably coupled to the mating member 5016, which extends distally from the bottom of the mount 5008. In at least one embodiment, for example, the mating member 5016 may define a set of external threads 5026a (FIG. 18B) matable with a set of internal threads 5026b (FIG. 18A) defined by the sensor cap 5018. In some embodiments, the external and internal threads 5026a, b may comprise a flat thread design (e.g., lack of helical curvature), which may prove advantageous in molding the parts. Alternatively, the external and internal threads 5026a,b may comprise a helical threaded engagement. Accordingly, the sensor cap 5018 may be threadably coupled to the sensor control device 5002 at the mating member 5016 of the sharp hub 5014. In other embodiments, the sensor cap 5018 may be removably coupled to the mating member 5016 via other types of engagements including, but not limited to, an interference or friction fit, or a frangible member or substance that may be broken with minimal separation force (e.g., axial or rotational force).

In some embodiments, the sensor cap 5018 may comprise a monolithic (singular) structure extending between the first and second ends 5020a, b. In other embodiments, however, the sensor cap 5018 may comprise two or more component parts. In the illustrated embodiment, for example, the sensor cap 5018 may include a seal ring 5028 positioned at the first end 5020a and a desiccant cap 5030 arranged at the second end 5020b. The seal ring 5028 may be configured to help seal the inner chamber 5022, as described in more detail below. In at least one embodiment, the seal ring 5028 may comprise an elastomeric O-ring. The desiccant cap 5030 may house or comprise a desiccant to help maintain preferred humidity levels within the inner chamber 5022. The desiccant cap 5030 may also define or otherwise provide the engagement feature 5024 of the sensor cap 5018.

FIGS. 19A and 19B are exploded isometric top and bottom views, respectively, of the sensor control device 5002, according to one or more embodiments. The shell 5006 and the mount 5008 operate as opposing clamshell halves that enclose or otherwise substantially encapsulate various electronic components of the sensor control device 5002. More specifically, electronic components may include, but are not limited to, a printed circuit board (PCB; also referred to herein as a "circuit board"), one or more resistors, transistors, capacitors, inductors, diodes, and switches. A data processing unit and a battery may be mounted to or otherwise interact with the PCB. The data processing unit may comprise, for example, an application specific integrated circuit (ASIC) configured to implement one or more functions or routines associated with operation of the sensor control device 5002. More specifically, the data processing unit may be configured to perform data processing functions, where such functions may include, but are not limited to, filtering and encoding of data signals, each of which corresponds to a sampled analyte level of the user. The data processing unit may also include or otherwise communicate with an antenna for communicating with the reader device 120 (FIG. 1). The battery may provide power to the sensor control device 5002 and, more particularly, to the electronic components of the PCB. While not shown, the sensor control device 5002 may also include an adhesive patch that may be applied to the bottom 5102 (FIG. 19B) of the mount 5008, and may help adhere the sensor control device 5002 to the user's skin for use.

The sensor control device 5002 may provide or otherwise include a sealed subassembly that includes, among other component parts, the shell 5006, the sensor 5010, the sharp 5012, and the sensor cap 5018. The sealed subassembly of the sensor control device 5002 may help isolate the sensor 5010 and the sharp 5012 within the inner chamber 5022 (FIG. 19A) of the sensor cap 5018 during a gaseous chemical sterilization process, which might otherwise adversely affect the chemistry provided on the sensor 5010.

The sensor 5010 may include a tail 5104 that extends out an aperture 5106 (FIG. 19B) defined in the mount 5008 to be transcutaneously received beneath a user's skin. The tail 5104 may have an enzyme or other chemistry included thereon to help facilitate analyte monitoring. The sharp 5012 may include a sharp tip 5108 extendable through an aperture 5110 (FIG. 19A) defined by the shell 5006, and the aperture 5110 may be coaxially aligned with the aperture 5106 of the mount 5008. Aperture 5106 may be a keyhole opening. As the sharp tip 5108 penetrates the electronics housing 5004, the tail 5104 of the sensor 5010 may be received within a hollow or recessed portion of the sharp tip 5108. The sharp tip 5108 may be configured to penetrate the skin while carrying the tail 5104 to put the active chemistry of the tail 5104 into contact with bodily fluids.

The sharp tip 5108 may be advanced through the electronics housing 5004 until the sharp hub 5014 engages an upper surface of the shell 5006 and the mating member 5016 extends out the aperture 5106 in the bottom 5102 of the mount 5008. In some embodiments, a seal member (not shown), such as an O-ring or seal ring, may interpose the sharp hub 5014 and the upper surface of the shell 5006 to help seal the interface between the two components. In some embodiments, the seal member may comprise a separate component part, but may alternatively form an integral part of the shell 5006, such as being a co-molded or overmolded component part.

The sealed subassembly may further include a collar 5112 that is positioned within the electronics housing 5004 and extends at least partially into the aperture 5106. The collar 5112 may be a generally annular structure that defines or otherwise provides an annular ridge 5114 on its top surface. In some embodiments, as illustrated, a groove 5116 may be defined in the annular ridge 5114 and may be configured to accommodate or otherwise receive a portion of the sensor 5010 extending laterally within the electronics housing 5004.

In assembling the sealed subassembly, a bottom 5118 of the collar 5112 may be exposed at the aperture 5106 and may sealingly engage the first end 5020a of the sensor cap 5018 and, more particularly, the seal ring 5028. In contrast, the annular ridge 5114 at the top of the collar 5112 may sealingly engage an inner surface (not shown) of the shell 5006. In at least one embodiment, a seal member (not shown) may interpose the annular ridge 5114 and the inner surface of the shell 5006 to form a sealed interface. In such embodiments, the seal member may also extend (flow) into the groove 5116 defined in the annular ridge 5114 and thereby seal about the sensor 5010 extending laterally within the electronics housing 5004. The seal member may comprise, for example, an adhesive, a gasket, or an ultrasonic weld, and may help isolate the enzymes and other chemistry included on the tail 5104.

Figure 20:
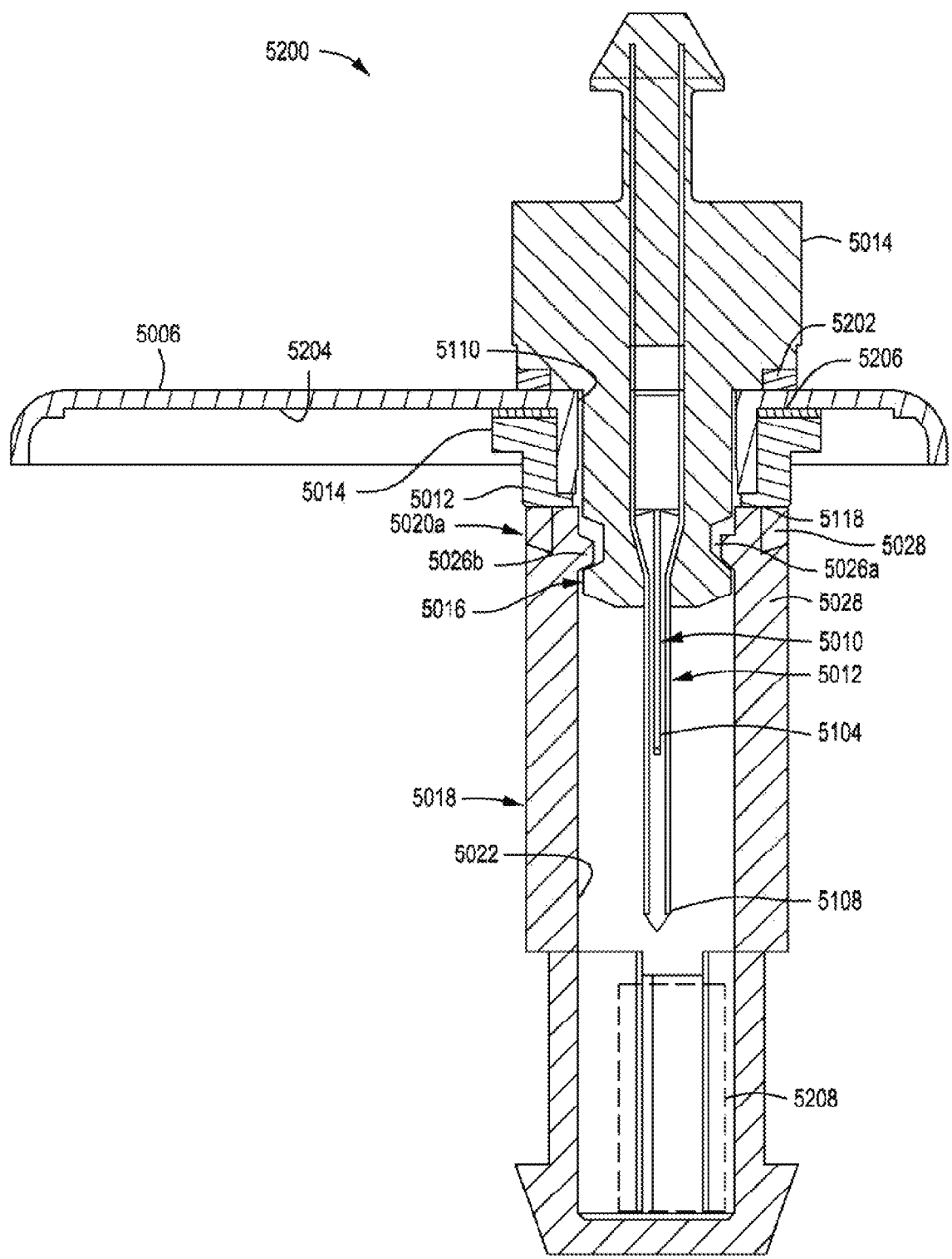
FIG. 20 is a cross-sectional side view of an assembled sealed subassembly, according to one or more embodiments.

FIG. 20 is a cross-sectional side view of an assembled sealed subassembly 5200, according to one or more embodiments. The sealed subassembly 5200 may form part of the sensor control device 5002 of FIGS. 18A-18B and 19A-20B and may include portions of the shell 5006, the sensor 5010, the sharp 5012, the sensor cap 5018, and the collar 5112. The sealed subassembly 5200 may be assembled in a variety of ways. In one assembly process, the sharp 5012 may be coupled to the sensor control device 5002 by extending the sharp tip 5108 through the aperture 5110 defined in the top of the shell 5006 and advancing the sharp 5012 through the shell 5006 until the sharp hub 5014 engages the top of the shell 5006 and the mating member 5016 extends distally from the shell 5006. In some embodiments, as mentioned above, a seal member 5202 (e.g., an O-ring or seal ring) may interpose the sharp hub 5014 and the upper surface of the shell 5006 to help seal the interface between the two components.

The collar 5112 may then be received over (about) the mating member 5016 and advanced toward an inner surface 5204 of the shell 5006 to enable the annular ridge 5114 to engage the inner surface 5204. A seal member 5206 may interpose the annular ridge 5114 and the inner surface 5204 and thereby form a sealed interface. The seal member 5206 may also extend (flow) into the groove 5116 (FIGS. 19A-20B) defined in the annular ridge 5114 and thereby seal about the sensor 5010 extending laterally within the electronics housing 5004 (FIGS. 19A-20B). In other embodiments, however, the collar 5112 may first be sealed to the inner surface 5204 of the shell 5006, following which the sharp 5012 and the sharp hub 5014 may be extended through the aperture 5110, as described above.

The sensor cap 5018 may be removably coupled to the sensor control device 5002 by threadably mating the internal threads 5026*b* of the sensor cap 5018 with the external threads 5026*a* of the mating member 5016. Tightening (rotating) the mated engagement between the sensor cap 5018 and the mating member 5016 may urge the first end 5020*a* of the sensor cap 5018 into sealed engagement with the bottom 5118 of the collar 5112. Moreover, tightening the mated engagement between the sensor cap 5018 and the mating member 5016 may also enhance the sealed interface between the sharp hub 5014 and the top of the shell 5006, and between the annular ridge 5114 and the inner surface 5204 of the shell 5006.

The inner chamber 5022 may be sized and otherwise configured to receive the tail 5104 and the sharp tip 5108. Moreover, the inner chamber 5022 may be sealed to isolate the tail 5104 and the sharp tip 5108 from substances that might adversely interact with the chemistry of the tail 5104. In some embodiments, a desiccant 5208 (shown in dashed lines) may be present within the inner chamber 5022 to maintain proper humidity levels.

Figure 43B:
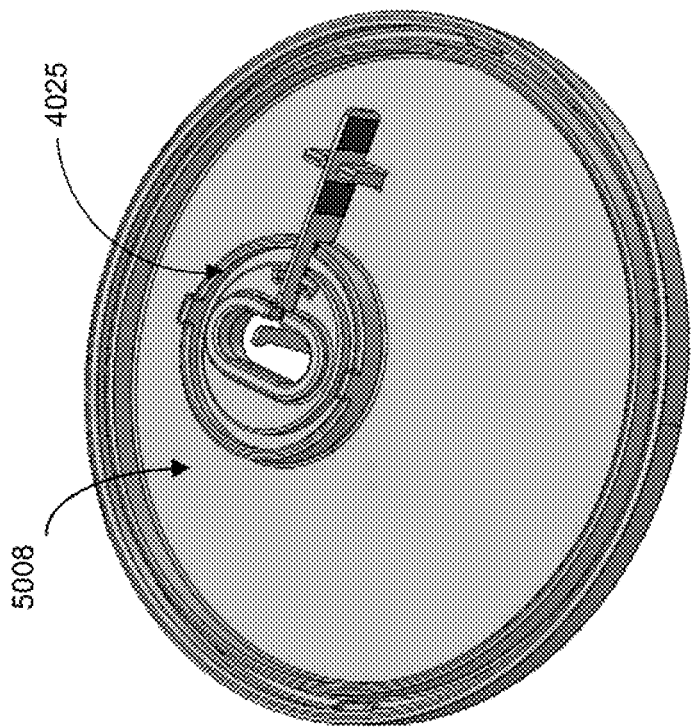
FIGS. 43A-43H illustrate steps of a process for assembling a sensor subassembly.
Figure 43A:
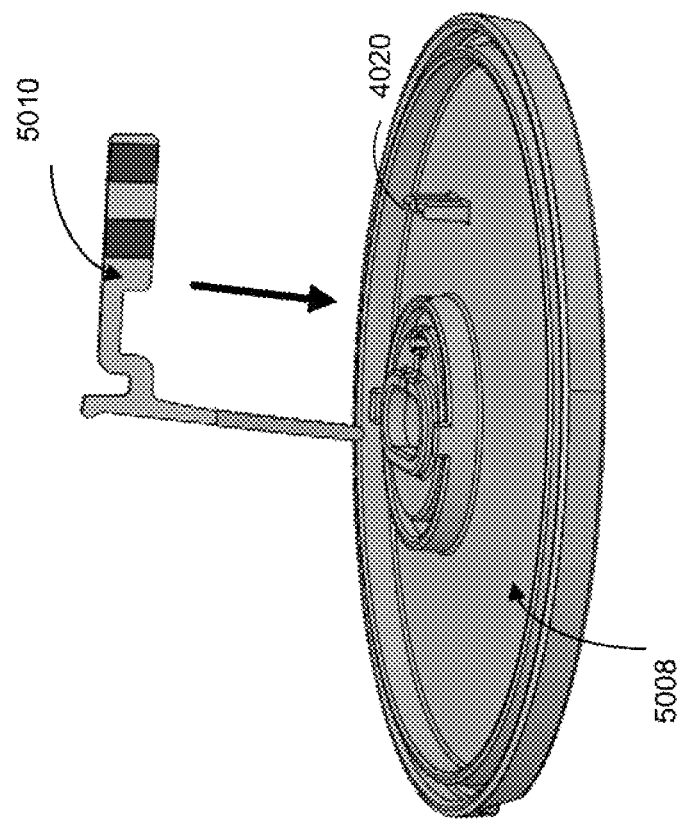
Figure 43D:
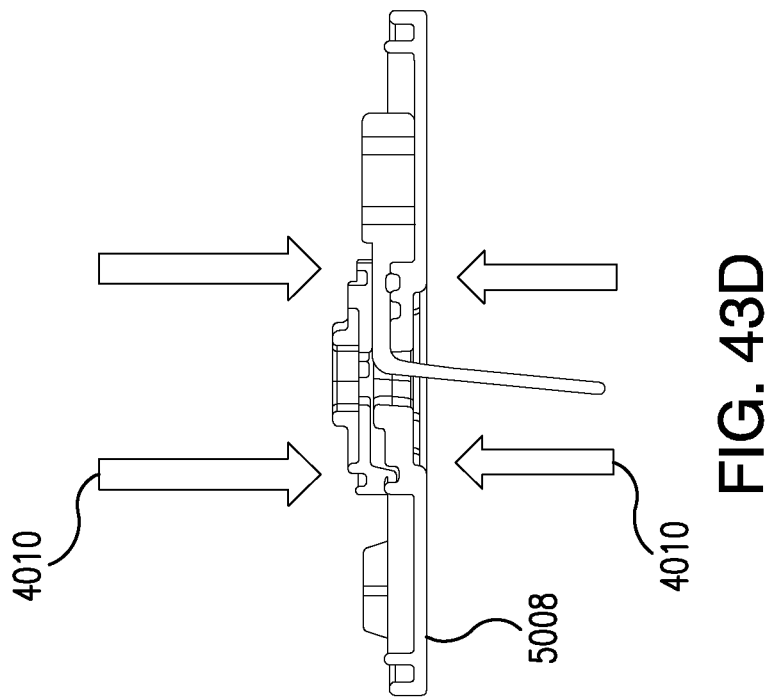
Figure 43C:
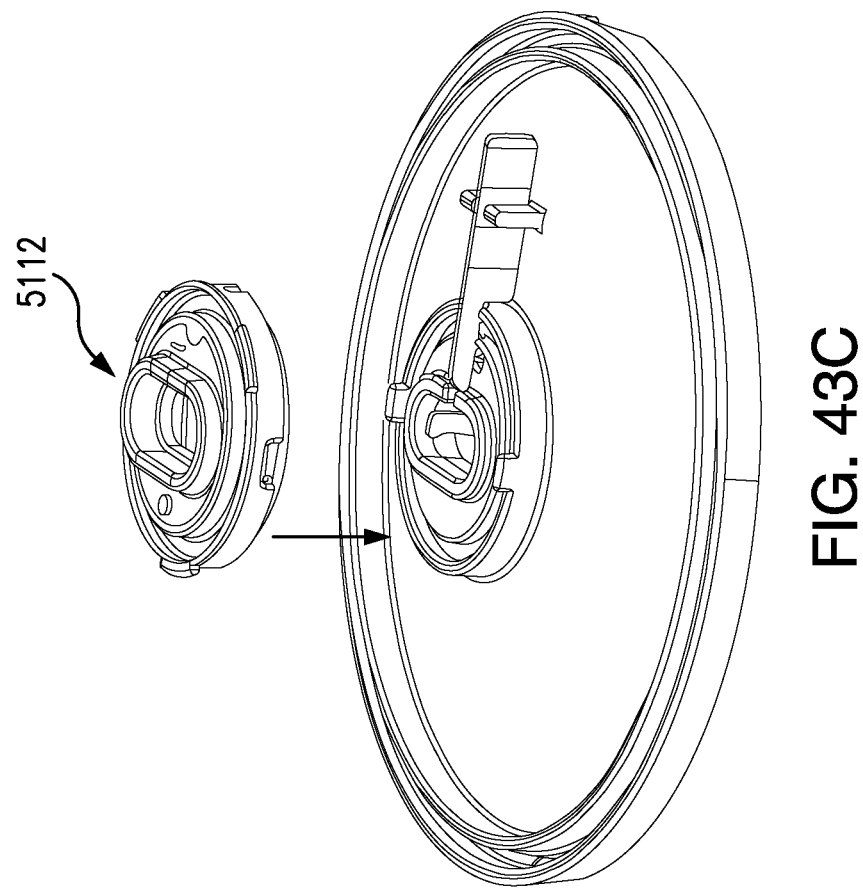
Figure 43F:
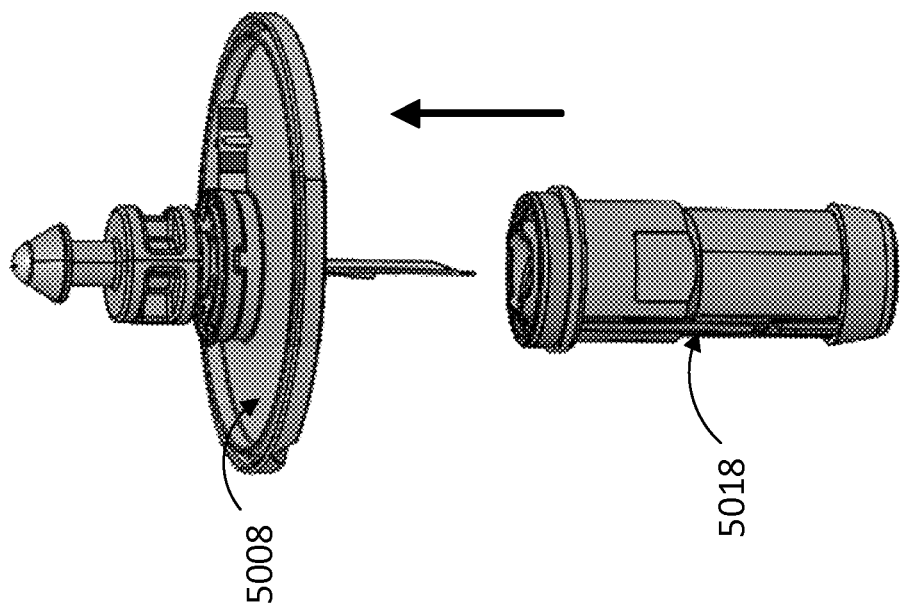
Figure 43E:
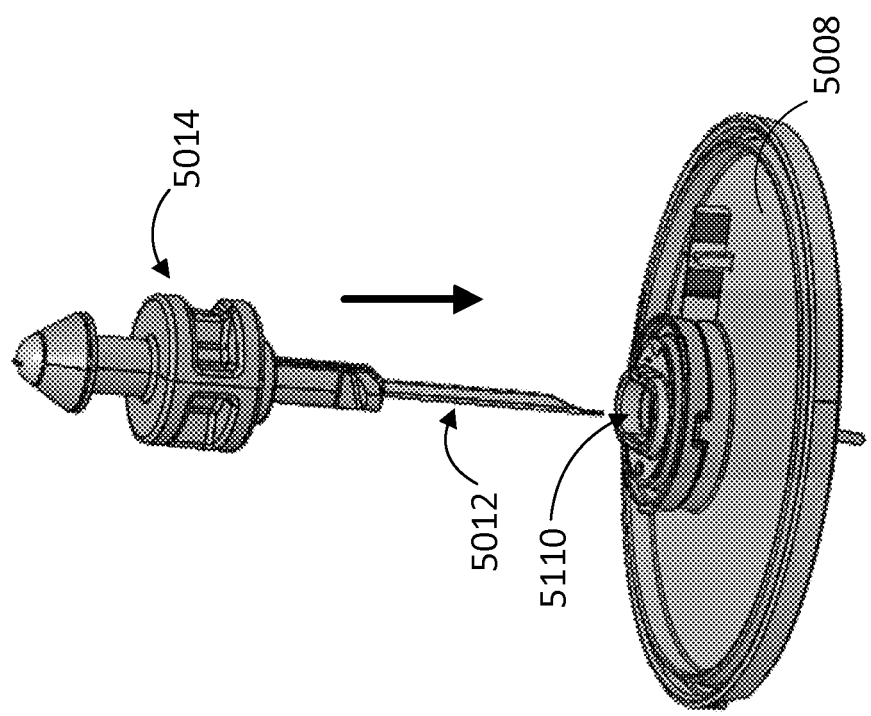
Figure 43H:
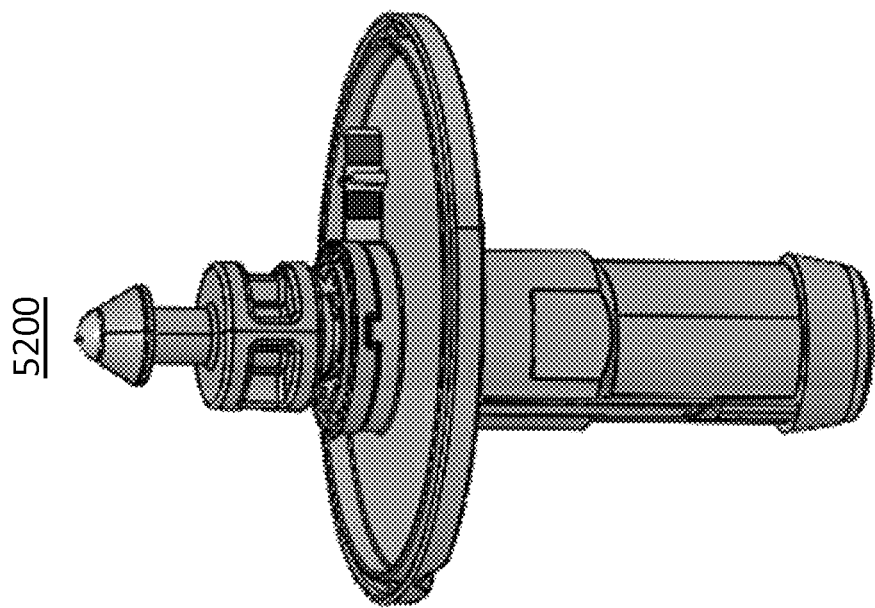

FIGS. 43A-43H illustrate steps of a manufacturing process for manufacturing a sensor subassembly, also referred to as a sealed subassembly such as the sealed subassembly 5200 (see FIGS. 43H, 20). In particular embodiments, assembled sensor subassembly 5200 can include a sensor 5010, sensor mount 5008, collar 5112, sharp 5012, and sensor cap 5018. As described herein, the sensor 5010 can include a body temperature sensor, blood pressure sensor, pulse or heart-rate sensor, glucose level sensor, analyte sensor, or physical activity sensor. Different sensors can be configured and made compatible with the sealed subassembly manufacturing techniques described herein based on the electrical or chemical treatments applied to or used with the sensor of choice.

In an exemplary step of the manufacturing process, as illustrated in FIG. 43A, the sensor 5010 is loaded into the sensor mount 5008. Based on the configuration of the sensor 5010, the sensor mount can include components to interface with and stabilize the sensor 5010 such as flanges 4020, 12112 (see FIG. 16E), 12104, etc. as described herein.

As illustrated in FIG. 43B, the manufacturing process can include dispensing adhesive into a mount channel 4025 of the sensor mount 5008. The adhesive can be dispensed manually or using suitable automation tools. For example, a specially-configured tool having a dispensing valve for dispensing the predetermined adhesive to the mount channel 4025 can be used. In certain embodiments, the adhesive can be an adhesive that does not include IBOA as described herein, e.g., an UV-curable IBOA-free adhesive.

As illustrated in FIG. 43C, the manufacturing process can include loading a collar 5112 onto the sensor mount 5008. In particular, the collar 5112 is loaded to mate with the mount channel 4025 of the sensor 5008. The collar can be loaded manually, or using suitable manufacturing tools, including a manually-operated or robotic loading arm, vacuum or suction gripping arm, magnetic gripping arm, adaptive gripping arm or appendage, or other suitable tool. The collar 5112 can then be clamped to the sensor mount 4025 to ensure the collar 5112 is well-seated within the sensor mount 4025 and disburse the adhesive throughout the sensor mount 4025 and collar 5112. The collar 5112 can be clamped to the sensor mount 4025 using a suitable clamping tool, including a manual clamp, ratcheting clamp, linear slide, including an electric slide, pneumatic slide, ball-screw linear adapter, etc.

The adhesive is then cured to fix the collar 5112 to the sensor mount 5008, as illustrated in FIG. 43D. The adhesive can include a variety of curable adhesive suitable for use in high-throughput manufacturing environments. The adhesive used may be chosen based on cure method and cure time. For example, the adhesive may be chosen to reduce cure time while also limiting exposing the chemistry or electronics of the sensor 5010 to excessive heat, chemicals, etc. that may damage the effectiveness of the sensor, radiation, or excessive infrared or ultra-violet (UV) light. As an example, the adhesive can be a chemically-curable adhesive. Curing the adhesive would then include exposing the adhesive to one or more chemical bonding catalysts. As another example, the adhesive can be an aerobically-curable adhesive. Curing the adhesive would then include exposing the adhesive to air for a sufficient amount before the collar 5112 is mounted or before moving onto the next step. As another example, the adhesive can be a heat-curable adhesive. Curing the adhesive would then include exposing the adhesive to ambient heat or heating elements for a predetermined amount of time. As another example, the adhesive can be a UV-curable adhesive. In certain embodiments, the adhesive can be an adhesive that does not include IBOA as described herein, e.g., an UV-curable IBOA-free adhesive. Curing the adhesive would then include using one or more UV light sources. The UV light sources can include, for example, UV light emitting diodes (LED) arranged to cure the adhesive with a light pipe and multiple angled spot LEDs. FIG. 43D illustrates multiple sources of curing agents 4010 being used to cure the adhesive from above and below the sensor mount 5008.

While curing the adhesive, in certain embodiments, the collar 5112 and sensor mount 5008 can act to shield the sensor 5010 from exposure to curing agents that might otherwise damage the sensor 5010 or other components of the sealed subassembly 5200. Additionally, other temporary components can be used to further protect the sensor 5010. As an example, the collar 5112 can block exposure of chemical agents, heat, or UV light sources while curing the adhesive. Furthermore, depending on the adhesive and curing method, the materials making up the sensor mount 5008 or collar 5112 can be chosen to partially allow curing agents to selectively passthrough to the adhesive.

As illustrated in FIG. 43E, the manufacturing process can include mating the sharp hub 5014 to the sensor mount 5008, covering and mating with the sensor 5010. Mating the sharp hub 5014 to the sensor mount 5008 can include causing some or all of the sharp 5012 to pass through an aperture 5110 in the sensor mount 5008 and collar 5112. In some embodiments, the manufacturing process can further include inspecting the sharp 5012 for imperfections. The inspection can be performed prior to, or after, inserting the sharp hub 5014 into the sensor mount 5008. The inspection can be performed manually, e.g., by loading the sharp into a microscope or other magnifying apparatus and allowing a human operator to confirming condition of the sharp. Alternatively, the inspection can be performed automatically, e.g., by imaging the sharp using high-resolution cameras, x-ray imaging, or similar. Having imaged the sharp 5012, a computer vision system can compare the images to acceptable sharps or apply machine-learned models to the image to confirm the condition of the sharp. If the sharp is deemed to have imperfections, it can be discarded. In some embodiments, imperfections that can cause a sharp to be discarded including, as an example only and not by way of limitation, damage to the sharp tip (e.g., resulting in burrs or bites), debris on the sharp, and other similar damage.

As illustrated in FIG. 43F, the manufacturing process can include attaching a sensor cap 5018 to the sensor mount 5008, covering the sensor 5010 and sharp 5012, to provide a sealed sensor subassembly 5200. In particular embodiments, the sensor cap 5018 can be composed of a singular structure. In other embodiments, the sensor cap 5018 can include multiple component parts. For example, as discussed herein, the sensor cap 5018 can include a desiccant cap 5030 or plug housing a desiccant to control moisture exposure to the sensor 5010 and sharp 5012. The manufacturing process can include assembling the sensor cap 5018 by inserting a desiccant into the desiccant cap 5030 and attaching the desiccant cap 5030 to the sensor cap 5018.

Attaching the sensor cap 5018 to the sensor mount 5008 can be performed by forcibly mating the sensor cap 5018 to the sensor mount 5008. For example, the sensor mount 5008 or sharp hub 5104 may define a set of external threads matable with a set of internal threads defined by the sensor cap 5018. The external and internal threads may comprise a flat thread design (e.g., lack of helical curvature), which may prove advantageous in molding the parts. The sensor cap 5018 may be removably coupled to the sensor mount 5018 via other types of engagements including, but not limited to, an interference or friction fit, or a frangible member or substance that may be broken with minimal separation force (e.g., axial or rotational force). The sensor cap 5018 can be locked into position manually or using machine tools, such as a pneumatic actuator or linear or multi-axis servo motor, to force the sensor cap 5018 to mate with the sensor mount 5008.

Figure 43G:
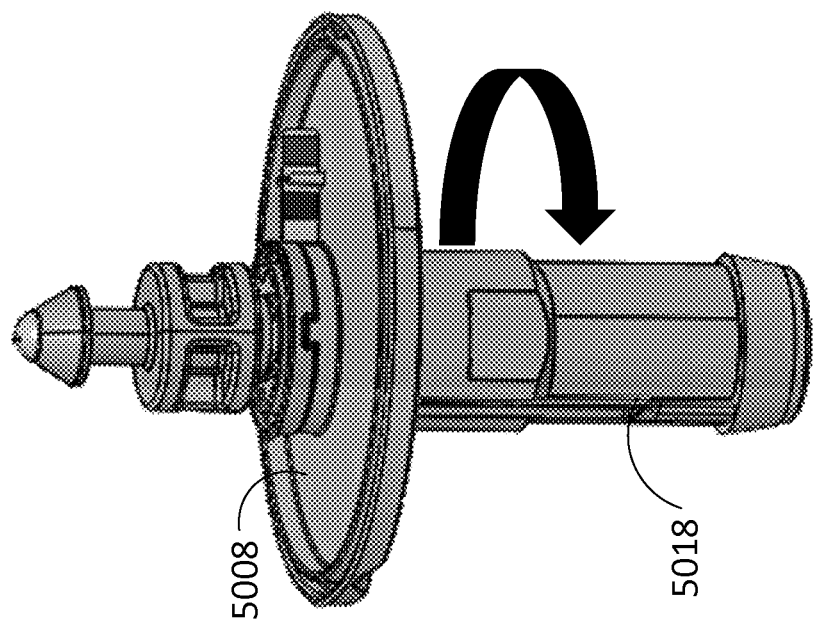

As illustrated in FIG. 43G, attaching the sensor cap 5018 to the sensor mount 5008 can include twisting the sensor cap into position. The external and internal threads may comprise a helical threaded engagement. Accordingly, the sensor cap 5018 may be threadably coupled to the sensor mount 5008 or at a mating member of the sharp hub 5014. FIG. 43G illustrates a completed sensor subassembly 5200.

The manufacturing process can include dispensing adhesive to one or more surfaces of the sharp hub 5014. For example, the manufacturing process can include dispensing adhesive to a top surface of the sharp hub 5014, viewing the sensor subassembly 5200 with the sharp cap 5018 oriented downward. The manufacturing process can include dispensing adhesive to a region of the sharp hub 5014 where the sharp hub 5014 interfaces with the sensor mount 5008. The process can further include curing the adhesive. Curing the adhesive can fix the sharp hub 5014 to the sensor mount 5008. Curing the adhesive can seal the sharp hub to reduce leaks between the sharp hub 5014 and the sharp, improving the barrier between the sharp and environment and thus creating a sterile barrier. The adhesive can be dispensed and cured in a manner similar to how the adhesive is dispensed to the mount channel 4025 and subsequently cured. The adhesive can be used to fix the sharp hub 5014 to the sensor mount 5008. The adhesive, when cured, can further promote the sealing of the sensor subassembly 5200. In certain embodiments, the adhesive can be an adhesive that does not include 1130A as described herein, e.g., an UV-curable 1130A-free adhesive.

The manufacturing process can further include testing the sealed sensor subassembly 5200 for leaks. The testing can be performed using a pressure-decay leak test, vacuum-decay leak test, tracer gas leak test, signature analysis test, or mass-flow leak test. In particular embodiments, the leak test can be automated using dedicated machine tooling to facilitate testing of an individual sealed sensor subassembly 5200 or multiple sealed sensor sub-assemblies simultaneously. If the sealed sensor subassembly fails the leak test, it can be discarded.

Once properly assembled, the sealed subassembly 5200 may be subjected to a sterilization process such as any of the radiation sterilization processes mentioned herein to properly sterilize the sensor 5010 and the sharp 5012. The sterilization process can further include heat treatment, electronic-beam sterilization, gamma sterilization, x-ray sterilization, ethylene oxide sterilization, autoclave steam sterilization, chlorine dioxide gas sterilization, hydrogen peroxide sterilization. In particular, the sterilization process can be configured using appropriate machine tools to facilitate sterilization of multiple seal subassemblies 5200 simultaneously. For example, a plurality of sealed subassemblies 5200 can be loaded into a tray for subsequent sterilization.

This sterilization step may be undertaken apart from the remaining portions of the sensor control device (FIGS. 18A-18B and 19A-20B) to prevent damage to sensitive electrical components. The sealed subassembly 5200 may be subjected to sterilization prior to or after coupling the sensor cap 5018 to the sharp hub 5014. When sterilized after coupling the sensor cap 5018 to the sharp hub 5014, the sensor cap 5018 may be made of a material that permits the propagation of sterilizing elements therethrough. In some embodiments, the sensor cap 5018 may be transparent or translucent, but can otherwise be opaque, without departing from the scope of the disclosure.

FIGS. 44A-44J illustrate steps of an exemplary process for manufacturing a sensor control device 5002. In particular, FIGS. 44A-44J illustrate steps for manufacturing an electronics housing 5004. As the sensor control device 5002 can be adhered to a user's skin for use with the assistance of an adhesive patch (e.g., adhesive patch 105), while also housing a sensor 5010, the sensor control device 5002 may optionally be referred to as an on-body sensor puck assembly. The electronics housing 5004 shown in FIGS. 44A-44J includes a printed circuit board (PCB) 4100, a shell cap 5006, and a sensor subassembly 5200, the sensor subassembly 5200 including a sensor 5010, a sensor mount 5008 that is matable with the shell cap 5006, a collar 5112, and a sensor cap 5018.

FIGS. 44A-44B illustrate an example PCB 4100 that can be used in the electronics housing 5004 of the on-body sensor puck assembly. The PCB 4100 can include components such as an ASIC 4101, battery 4103, and antenna 4105. As illustrated, the PCB 4100 can be a foldable or flexible PCB, however non-foldable PCBs can also be used. In foldable PCB embodiments, the manufacturing process can include folding the PCB 4100 at a fold point 4110 to fit the footprint of the mount 5008 and shell cap 5006 which defines the overall footprint of the electronics housing 5004. FIG. 44B illustrates the PCB 4100 during folding process. Folding the PCB 4100 can also connect components of the PCB 4100, for example connecting the battery 4103 to an appropriate battery terminal.

As illustrated in FIG. 44C, the manufacturing process can include dispensing a first adhesive 4120 to a sensor mount 5008 of the sensor subassembly 5200. As an example, the adhesive can be dispensed at locations corresponding to components of the PCB 4100, such as the fold, the battery location, or PCB connectors. In certain embodiments, the first adhesive 4120 can be an adhesive that does not include IBOA as described herein. The adhesive can be dispensed manually or using suitable automation tools. For example, a specially-configured tool having a dispensing valve for dispensing the predetermined adhesive to the designated locations of the sensor mount 5008 can be used. As described herein, the dispensing valve can be used in combination with other components to manipulate the sensor mount 5008 as appropriate before, during, and after the dispensing. For example, the sensor mount 5008 can be rotated by a rotary motor to facilitate even distribution of the adhesive.

As illustrated in FIG. 44D, the manufacturing process can include loading the PCB 4100 onto the sensor mount 5008 of the sensor subassembly 5200 after aligning the PCB 4100 with the sensor 5010 and the sensor subassembly 5200. For example, the PCB 4100 may include one or more apertures 4102 sized to fit over the sharp hub 5014 of the sealed sensor sharp assembly 5200. FIG. 44E illustrates the PCB 4110 disposed on the sealed subassembly 5200.

As illustrated in FIG. 44F, the manufacturing process can include curing the first adhesive to fix the PCB to the sensor mount. The adhesive and curing process can include any of the features described herein above. FIG. 44G illustrates the PCB 4100 in a folded state, fixed to the sensor mount 5008.

Figure 33:
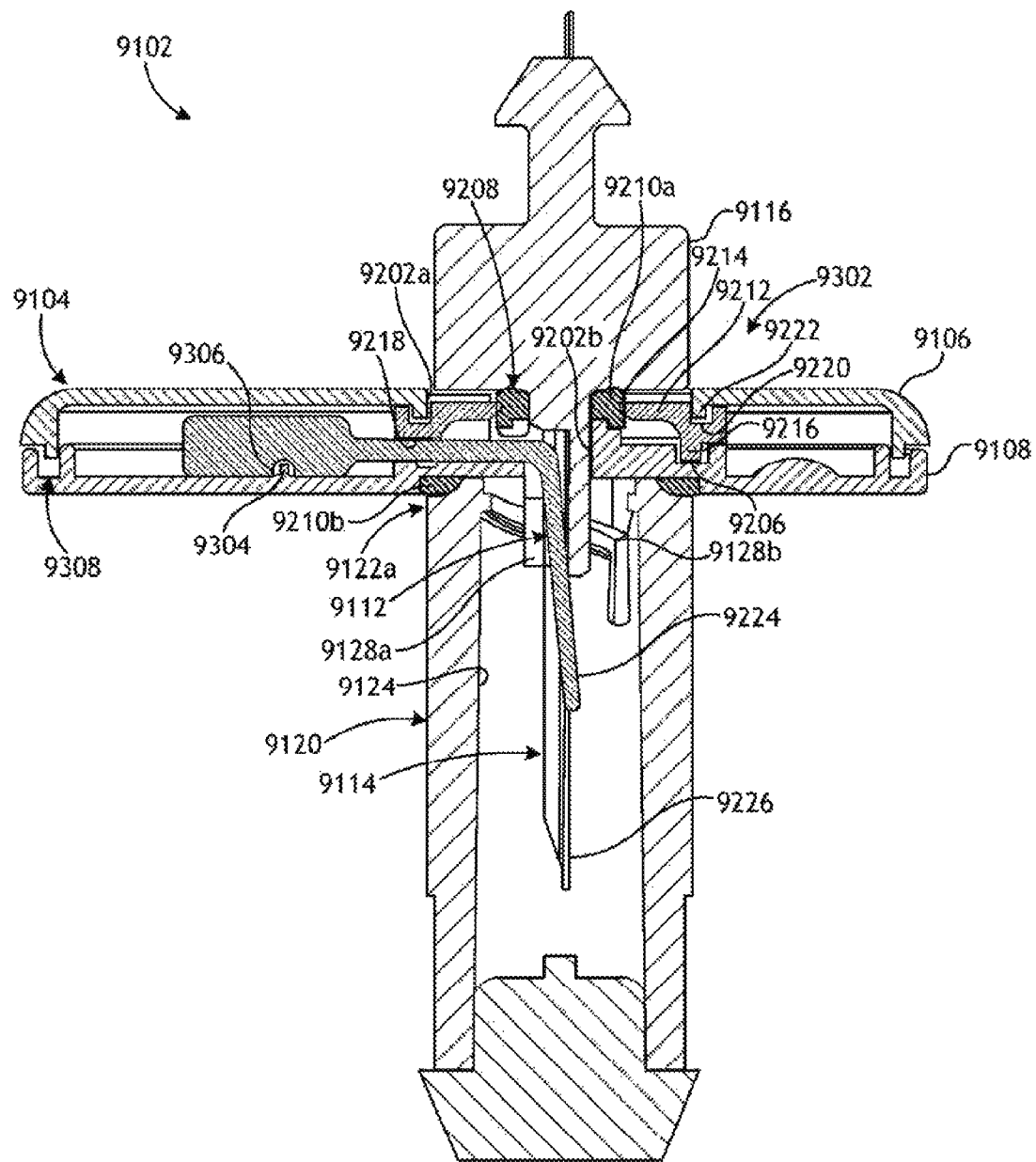
FIG. 33 is a cross-sectional side view of the sensor control device of FIGS. 31A-31B and 32A-32B, according to one or more embodiments.

As illustrated in FIG. 44H, the manufacturing process can include dispensing a second adhesive 4135 onto an outer diameter 4130 of the sensor mount 5008 (e.g., channel 9206 shown in FIG. 33) and an inner diameter 4131 of the sensor mount 5008 or collar 5112 of the sensor subassembly 5200 (e.g., collar channel 9220 shown in FIG. 33). In certain embodiments, the second adhesive 4135 can be an adhesive that does not include IBOA as described herein. The adhesive can be dispensed manually or using suitable automation tools. For example, a specially-configured tool having a dispensing valve for dispensing the predetermined adhesive to the outer diameter 4130 and inner diameter 4131. As described herein, the dispensing valve can be used in combination with other components to manipulate the sensor mount 5008 as appropriate before, during, and after the dispensing.

Figures 2, 44H:
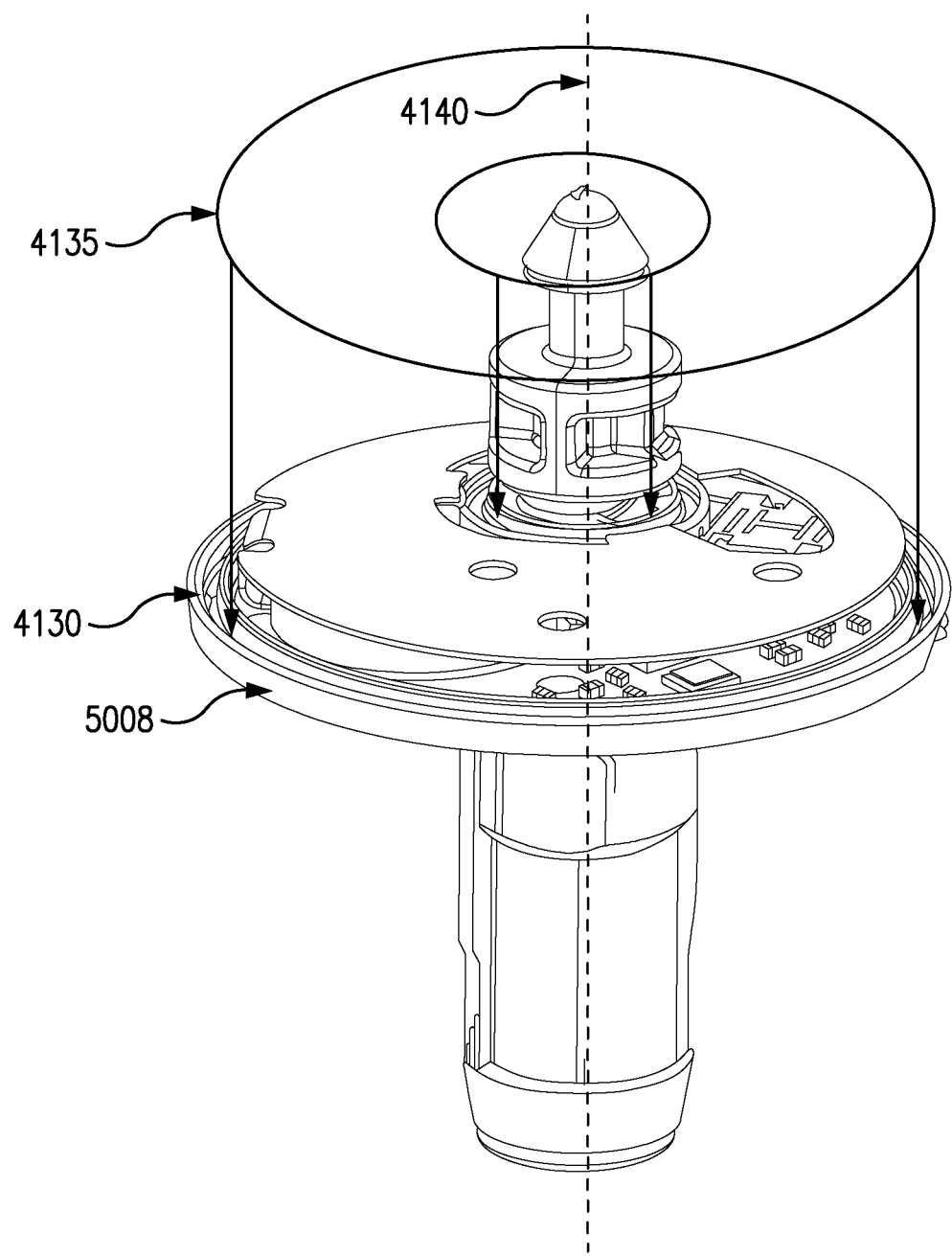

As illustrated in FIG. 44H-1 for the purpose of illustration and not limitation, dispensing the second adhesive 4135 onto the outer diameter 4130 of the sensor mount 5008 and inner diameter 4131 of the sensor mount 5008 or collar 5112 of the sensor subassembly 5200 can include tilting the sensor mount 5200 along an axis 4140 to a predetermined angle 4145 before dispensing the second adhesive 4145 to the inner diameter 4131 of the sensor mount 5008 or collar 5112 of the sensor subassembly 5200. In some embodiments, tilting the sensor mount 520 before dispensing the second adhesive 4145 can allow the nozzle of a dispensing apparatus to more accurately reach the inner diameter 4131 of the sensor mount 5008 or collar 5112 of the sensor subassembly 5200 by facilitating the nozzle, and other actuators used in dispensing the adhesive, to clear the sharp hub. This tilting process can be used for any of the adhesive dispensing steps described herein. As illustrated in FIG. 44H-2, the sensor mount 5008 and sensor subassembly 5200 is returned to a substantially horizontal position by tilting the sensor mount 5008 along the axis 4140 before dispensing the second adhesive 4135 to the outer diameter 4130 of the sensor mount 5008.

Figure 44I:
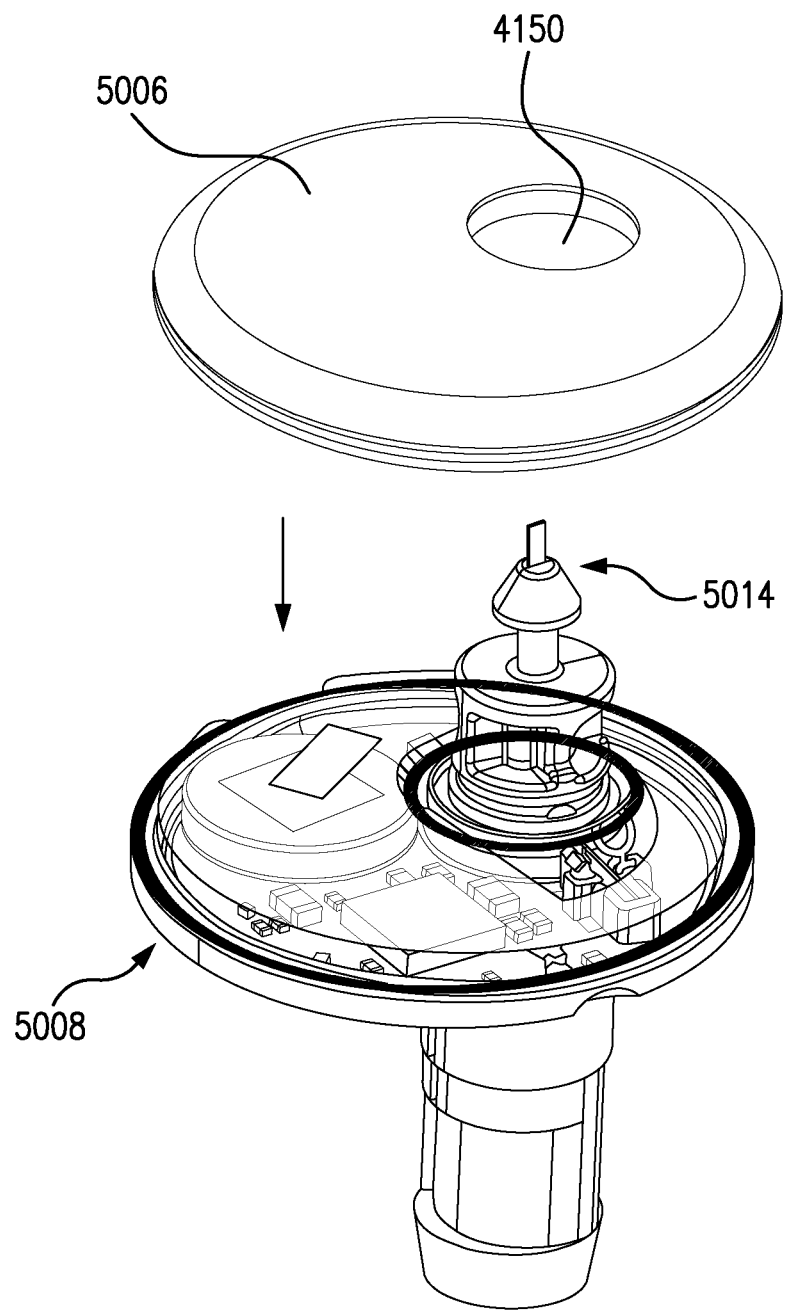

As illustrated in FIG. 44I, the manufacturing process includes attaching the shell cap 5006 to the sensor subassembly 5200 via the sensor mount 5008. An aperture 4150 in the shell cap 5006 is aligned with the sharp hub 5014 before the shell cap 5006 is lowered onto the mount 5008. The shell cap 5006 can be attached to the sensor subassembly 520 manually or using appropriate gripping or clamping tooling, including, but not limited to a manually-operated or robotic loading arm, vacuum or suction gripping arm, magnetic gripping arm, adaptive gripping arm or appendage, or other suitable tool.

Figure 44J:
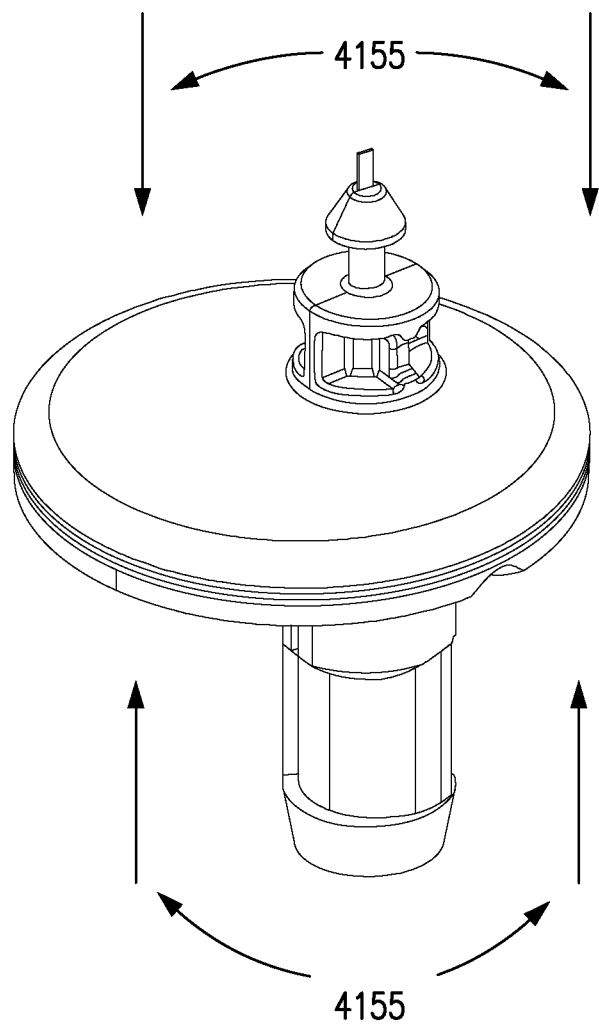

As illustrated in FIG. 44J, the manufacturing process includes curing the second adhesive to form the on-body sensor puck assembly. The first adhesive 4130 or second adhesive 4135 can include a variety of curable adhesives suitable for use in high-throughput manufacturing environments. The adhesive(s) used may be chosen based on cure method and cure time. For example, the adhesive(s) may be chosen to reduce cure time while also limit exposing the chemistry or electronics of the sensor subassembly 5200 or PCB 4100 to excessive heat, chemicals, radiation, or excessive infrared or UV light. As an example, the adhesive(s) chosen for the first adhesive 4130 or second adhesive 4135 can be a chemically-curable adhesive. Curing the adhesive would then include exposing the first adhesive 4130 or second adhesive 4135 to one or more chemical bonding catalysts. As another example, the adhesive(s) can be an aerobically-curable adhesive. Curing the first adhesive 4130 or second adhesive 4135 would then include exposing the adhesive(s) to air for a sufficient amount of time before, for example, the shell cap 5006 is lowered to the mount 5008 or before moving onto the next step in the manufacturing process.

In certain embodiments, the adhesive(s) chosen can be a heat-curable adhesive. For example, but not by way of limitation, the adhesive used for the first adhesive 4130 and/or the second adhesive 4135 can be an adhesive that is free of IBOA, e.g., a heat-curable IBOA-free adhesive, as disclosed herein. In certain embodiments, the adhesive used for the first adhesive 4130 can be an adhesive that is free of IBOA, e.g., a heat-curable IBOA-free adhesive, as disclosed herein. In certain embodiments, the adhesive used for the second adhesive 4135 can be an adhesive that is free of IBOA, e.g., a heat-curable IBOA-free adhesive, as disclosed herein. Curing the first adhesive 4130 or second adhesive 4135 would then include exposing the adhesive(s) to ambient heat or heating elements for a predetermined amount of time sufficient to cause the adhesive to cure.

In certain embodiments, the adhesive(s) chosen can be a UV-curable adhesive. For example, but not by way of limitation, the adhesive used for the first adhesive 4130 and/or the second adhesive 4135 can be an adhesive that is free of IBOA, e.g., a UV-curable IBOA-free adhesive, as disclosed herein. In certain embodiments, the adhesive used for the first adhesive 4130 can be an adhesive that is free of IBOA, e.g., a UV-curable IBOA-free adhesive, as disclosed herein. In certain embodiments, the adhesive used for the second adhesive 4135 can be an adhesive that is free of IBOA, e.g., a UV-curable IBOA-free adhesive, as disclosed herein. Curing the first adhesive 4130 or second adhesive 4135 would then include exposing the adhesive(s) to UV light via one or more UV light sources. The UV light sources can include, for example, UV light emitting diodes (LED) arranged to cure the adhesive with a light pipe and multiple angled spot LEDs. FIGS. 44F and 44J illustrate sources of curing agents 4155 in one embodiment being used to cure the first adhesive 4130 and second adhesive 4135 from above and below the sensor mount 5008.

In certain embodiments, the sensor mount 5008 and shell cap 5006 comprise material that partially allow curing agents to selectively pass through to the first adhesive 4130 and the second adhesive 4135. The sensor mount 5008 and shall cap 5006 can also act to shield the sensor 5010, PCB 4100 and other components of the electronics housing 5004 from exposure to curing agents that might otherwise damage the components of the electronics housing 5004 and sealed subassembly 5200. Additionally, other temporary components can be used to further protect the components.

In some embodiments, the PCB 4100 includes a radio component and the manufacturing process further includes writing data to the radio component of the PCB 4100. For example, data to be written to the radio component of the PCB 4100 can be read from the sensor subassembly 5200, PCB 4100, a shell cap 5004, mount 5006 or other component associated with the electronics housing 5004. The data can then be written to the radio component of the PCB 4100.

In certain embodiments, the manufacturing process can further include testing the electronics housing 5004 (e.g., the on-body sensor puck assembly) for leaks. The test can include using a pressure-decay leak test, vacuum-decay leak test, tracer gas leak test, signature analysis test, or mass-flow leak test. If the on-body sensor puck assembly fails the leak test, it can be discarded.

Figure 21B:
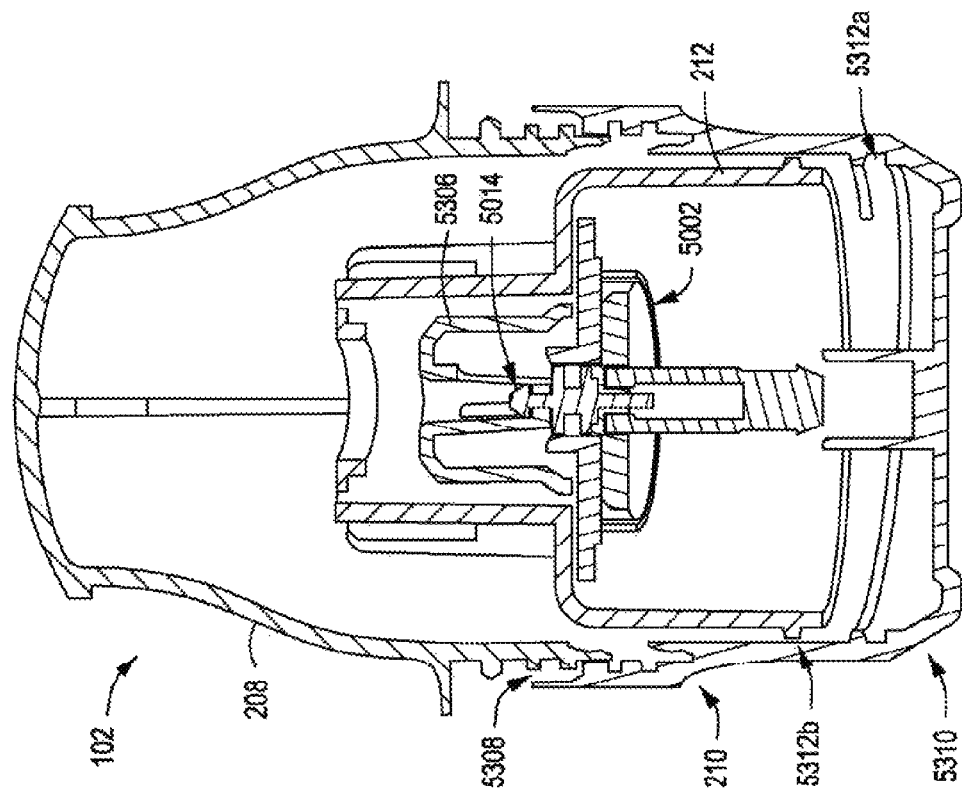
FIGS. 21A-21C are progressive cross-sectional side views showing assembly of the sensor applicator with the sensor control device of FIGS. 18A-18B.
Figure 21A:
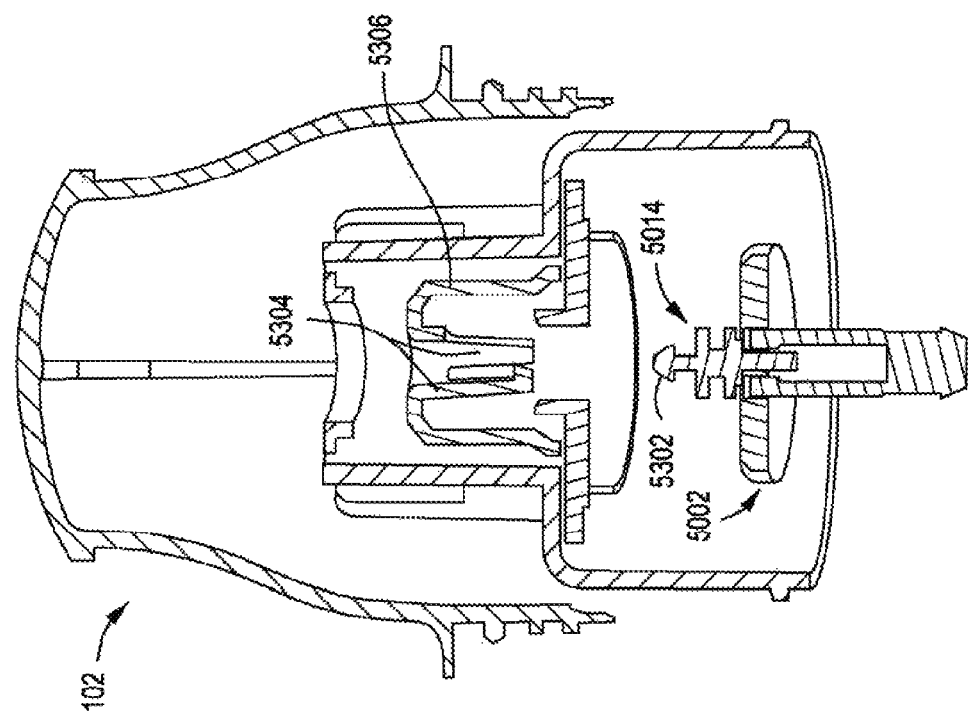
Figure 21C:
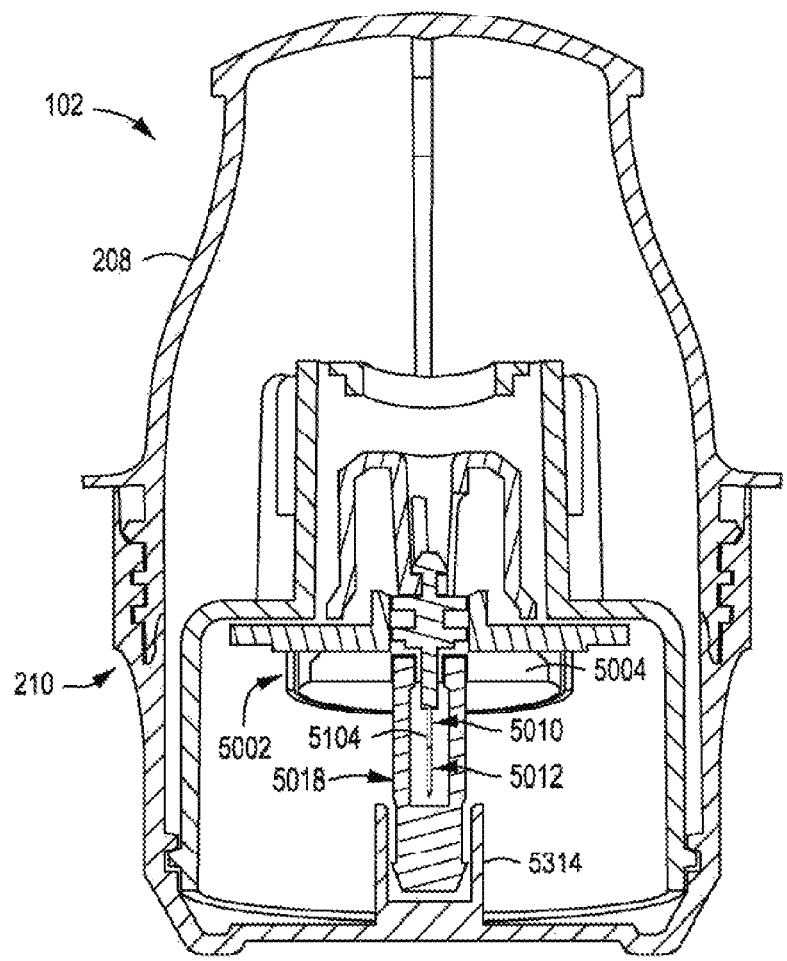

FIGS. 21A-21C are progressive cross-sectional side views showing assembly of the sensor applicator 102 with the sensor control device 5002, according to one or more embodiments. Once the sensor control device 5002 is fully assembled, it may then be loaded into the sensor applicator 102. With reference to FIG. 21A, the sharp hub 5014 may include or otherwise define a hub snap pawl 5302 configured to help couple the sensor control device 5002 to the sensor applicator 102. More specifically, the sensor control device 5002 may be advanced into the interior of the sensor applicator 102 and the hub snap pawl 5302 may be received by corresponding arms 5304 of a sharp carrier 5306 positioned within the sensor applicator 102.

In FIG. 21B, the sensor control device 5002 is shown received by the sharp carrier 5306 and, therefore, secured within the sensor applicator 102. Once the sensor control device 5002 is loaded into the sensor applicator 102, the applicator cap 210 may be coupled to the sensor applicator 102. In some embodiments, the applicator cap 210 and the housing 208 may have opposing, matable sets of threads 5308 that enable the applicator cap 210 to be screwed onto the housing 208 in a clockwise (or counter-clockwise) direction and thereby secure the applicator cap 210 to the sensor applicator 102.

As illustrated, the sheath 212 is also positioned within the sensor applicator 102, and the sensor applicator 102 may include a sheath locking mechanism 5310 configured to ensure that the sheath 212 does not prematurely collapse during a shock event. In the illustrated embodiment, the sheath locking mechanism 5310 may comprise a threaded engagement between the applicator cap 210 and the sheath 212. More specifically, one or more internal threads 5312a may be defined or otherwise provided on the inner surface of the applicator cap 210, and one or more external threads 5312b may be defined or otherwise provided on the sheath 212. The internal and external threads 5312a,b may be configured to threadably mate as the applicator cap 210 is threaded to the sensor applicator 102 at the threads 5308. The internal and external threads 5312a,b may have the same thread pitch as the threads 5308 that enable the applicator cap 210 to be screwed onto the housing 208.

In FIG. 21C, the applicator cap 210 is shown fully threaded (coupled) to the housing 208. As illustrated, the applicator cap 210 may further provide and otherwise define a cap post 5314 centrally located within the interior of the applicator cap 210 and extending proximally from the bottom thereof. The cap post 5314 may be configured to receive at least a portion of the sensor cap 5018 as the applicator cap 210 is screwed onto the housing 208.

With the sensor control device 5002 loaded within the sensor applicator 102 and the applicator cap 210 properly secured, the sensor control device 5002 may then be subjected to a gaseous chemical sterilization configured to sterilize the electronics housing 5004 and any other exposed portions of the sensor control device 5002. Since the distal portions of the sensor 5010 and the sharp 5012 are sealed within the sensor cap 5018, the chemicals used during the gaseous chemical sterilization process are unable to interact with the enzymes, chemistry, and biologies provided on the tail 5104, and other sensor components, such as membrane coatings that regulate analyte influx.

Figure 22A:
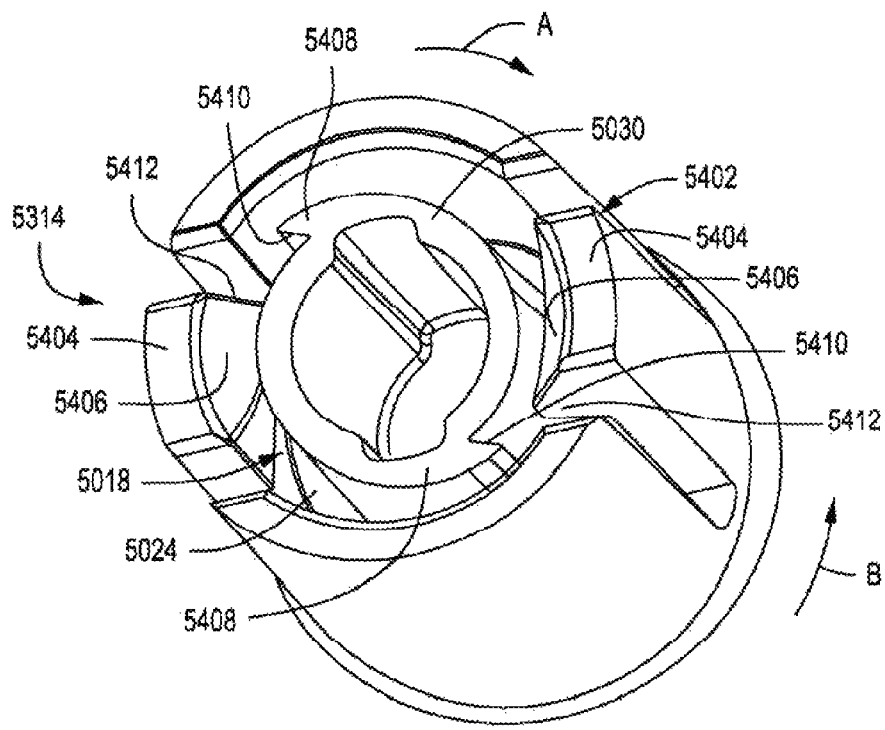
FIGS. 22A and 22B are perspective and top views, respectively, of the cap post of FIG. 21C, according to one or more additional embodiments.
Figure 22B:
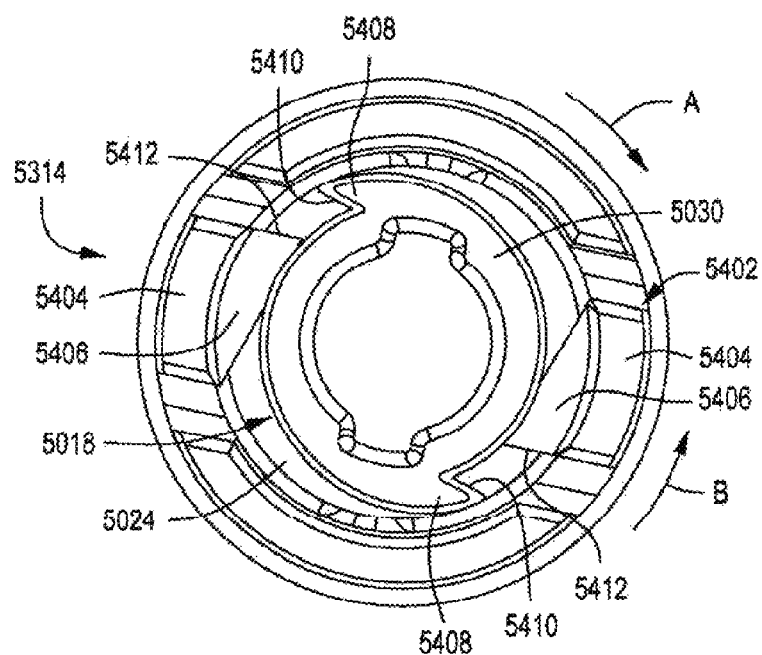

FIGS. 22A and 22B are perspective and top views, respectively, of the cap post 5314, according to one or more additional embodiments. In the illustrated depiction, a portion of the sensor cap 5018 is received within the cap post 5314 and, more specifically, the desiccant cap 5030 of the sensor cap 5018 is arranged within cap post 5314.

As illustrated, the cap post 5314 may define a receiver feature 5402 configured to receive the engagement feature 5024 of the sensor cap 5018 upon coupling (e.g., threading) the applicator cap 210 (FIG. 21C) to the sensor applicator 102 (FIGS. 21A-21C). Upon removing the applicator cap 210 from the sensor applicator 102, however, the receiver feature 5402 may prevent the engagement feature 5024 from reversing direction and thus prevent the sensor cap 5018 from separating from the cap post 5314. Instead, removing the applicator cap 210 from the sensor applicator 102 will simultaneously detach the sensor cap 5018 from the sensor control device 5002 (FIGS. 18A-18B and 21A-21C), and thereby expose the distal portions of the sensor 5010 (FIGS. 21A-21C) and the sharp 5012 (FIGS. 21A-21C).

Many design variations of the receiver feature 5402 may be employed, without departing from the scope of the disclosure. In the illustrated embodiment, the receiver feature 5402 includes one or more compliant members 5404 (two shown) that are expandable or flexible to receive the engagement feature 5024 (FIGS. 18A-18B). The engagement feature 5024 may comprise, for example, an enlarged head and the compliant member(s) 5404 may comprise a collet-type device that includes a plurality of compliant fingers configured to flex radially outward to receive the enlarged head.

The compliant member(s) 5404 may further provide or otherwise define corresponding ramped surfaces 5406 configured to interact with one or more opposing camming surfaces 5408 provided on the outer wall of the engagement feature 5024. The configuration and alignment of the ramped surface(s) 5406 and the opposing camming surface(s) 5408 is such that the applicator cap 210 is able to rotate relative to the sensor cap 5018 in a first direction A (e.g., clockwise), but the cap post 5314 binds against the sensor cap 5018 when the applicator cap 210 is rotated in a second direction B (e.g., counter clockwise). More particularly, as the applicator cap 210 (and thus the cap post 5314) rotates in the first direction A, the camming surfaces 5408 engage the ramped surfaces 5406, which urge the compliant members 5404 to flex or otherwise deflect radially outward and results in a ratcheting effect. Rotating the applicator cap 210 (and thus the cap post 5314) in the second direction B, however, will drive angled surfaces 5410 of the camming surfaces 5408 into opposing angled surfaces 5412 of the ramped surfaces 5406, which results in the sensor cap 5018 binding against the compliant member(s) 5404.

Figure 23:
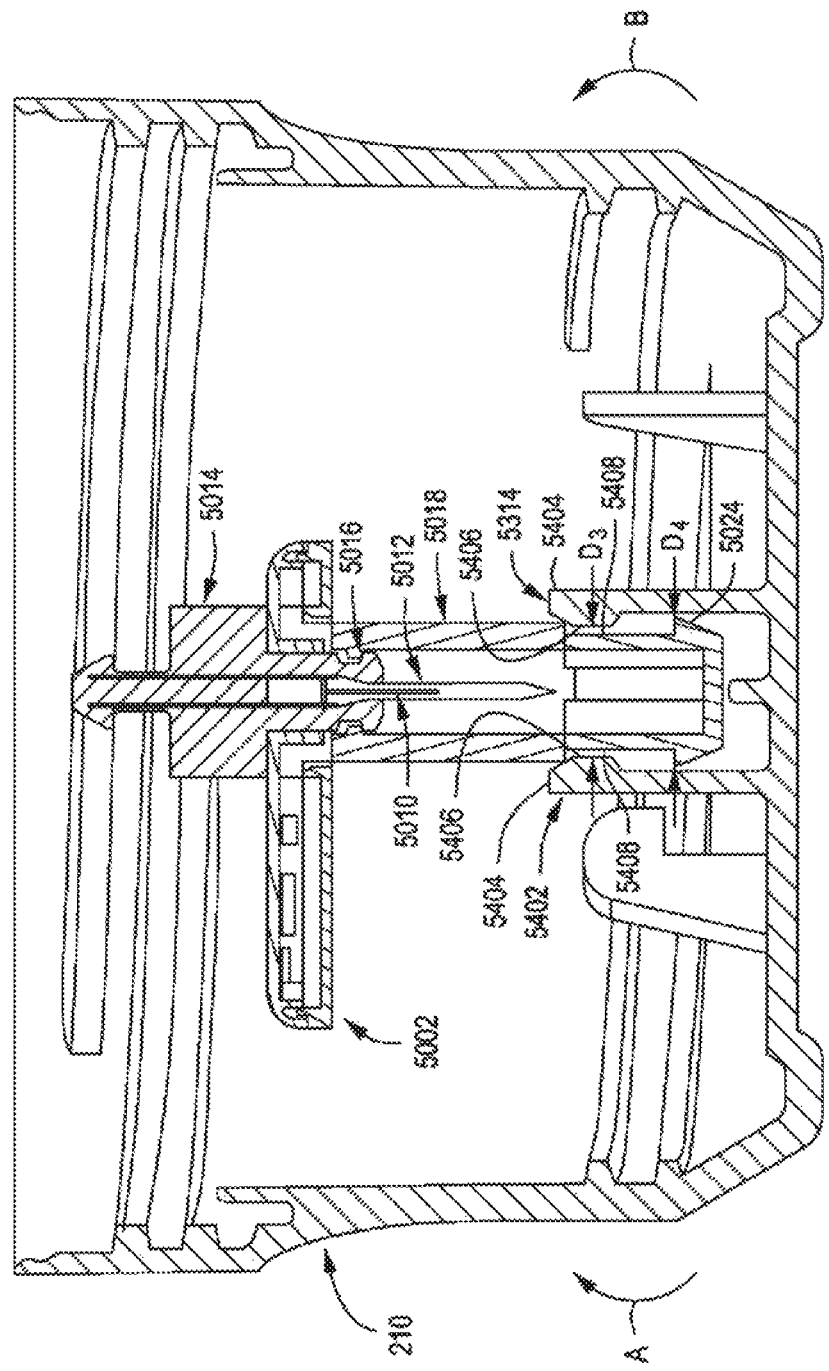
FIG. 23 is a cross-sectional side view of the sensor control device of FIGS. 18A-18B.

FIG. 23 is a cross-sectional side view of the sensor control device 5002 positioned within the applicator cap 210, according to one or more embodiments. As illustrated, the opening to the receiver feature 5402 exhibits a first diameter D3, while the engagement feature 5024 of the sensor cap 5018 exhibits a second diameter D4 that is larger than the first diameter D3 and greater than the outer diameter of the remaining portions of the sensor cap 5018. As the sensor cap 5018 is extended into the cap post 5314, the compliant member(s) 5404 of the receiver feature 5402 may flex (expand) radially outward to receive the engagement feature 5024. In some embodiments, as illustrated, the engagement feature 5024 may provide or otherwise define an angled or frustoconical outer surface that helps bias the compliant member(s) 5404 radially outward. Once the engagement feature 5024 bypasses the receiver feature 5402, the compliant member(s) 5404 are able to flex back to (or towards) their natural state and thus lock the sensor cap 5018 within the cap post 5314.

As the applicator cap 210 is threaded to (screwed onto) the housing 208 (FIGS. 21A-21C) in the first direction A, the cap post 5314 correspondingly rotates in the same direction and the sensor cap 5018 is progressively introduced into the cap post 5314. As the cap post 5314 rotates, the ramped surfaces 5406 of the compliant members 5404 ratchet against the opposing camming surfaces 5408 of the sensor cap 5018. This continues until the applicator cap 210 is fully threaded onto (screwed onto) the housing 208. In some embodiments, the ratcheting action may occur over two full revolutions of the applicator cap 210 before the applicator cap 210 reaches its final position.

To remove the applicator cap 210, the applicator cap 210 is rotated in the second direction B, which correspondingly rotates the cap post 5314 in the same direction and causes the camming surfaces 5408 (i.e., the angled surfaces 5410 of FIGS. 22A-22B) to bind against the ramped surfaces 5406 (i.e., the angled surfaces 5412 of FIGS. 22A-22B). Consequently, continued rotation of the applicator cap 210 in the second direction B causes the sensor cap 5018 to correspondingly rotate in the same direction and thereby unthread from the mating member 5016 to allow the sensor cap 5018 to detach from the sensor control device 5002. Detaching the sensor cap 5018 from the sensor control device 5002 exposes the distal portions of the sensor 5010 and the sharp 5012, and thus places the sensor control device 5002 in position for firing (use).

FIGS. 24A and 24B are cross-sectional side views of the sensor applicator 102 ready to deploy the sensor control device 5002 to a target monitoring location, according to one or more embodiments. More specifically, FIG. 24A depicts the sensor applicator 102 ready to deploy (fire) the sensor control device 5002, and FIG. 24B depicts the sensor applicator 102 in the process of deploying (firing) the sensor control device 5002. As illustrated, the applicator cap 210 (FIGS. 21A-21C and 23) has been removed, which correspondingly detaches (removes) the sensor cap 5018 (FIGS. 21A-21C and 23) and thereby exposes the tail 5104 of the sensor 5010 and the sharp tip 5108 of the sharp 5012, as described above. In conjunction with the sheath 212 and the sharp carrier 5306, the sensor applicator 102 also includes a sensor carrier 5602 (alternately referred to as a "puck" carrier) that helps position and secure the sensor control device 5002 within the sensor applicator 102.

Referring first to FIG. 24A, as illustrated, the sheath 212 includes one or more sheath arms 5604 (one shown) configured to interact with a corresponding one or more detents 5606 (one shown) defined within the interior of the housing 208. The detent(s) 5606 are alternately referred to as "firing" detent(s). When the sensor control device 5002 is initially installed in the sensor applicator 102, the sheath arms 5604 may be received within the detents 5606, which places the sensor applicator 102 in firing position. In the firing position, the mating member 5016 extends distally beyond the bottom of the sensor control device 5002. As discussed below, the process of firing the sensor applicator 102 causes the mating member 5016 to retract so that it does not contact the user's skin.

The sensor carrier 5602 may also include one or more carrier arms 5608 (one shown) configured to interact with a corresponding one or more grooves 5610 (one shown) defined on the sharp carrier 5306. A spring 5612 may be arranged within a cavity defined by the sharp carrier 5306 and may passively bias the sharp carrier 5306 upward within the housing 208. When the carrier arm(s) 5608 are properly received within the groove(s) 5610, however, the sharp carrier 5306 is maintained in position and prevented from moving upward. The carrier arm(s) 5608 interpose the sheath 212 and the sharp carrier 5306, and a radial shoulder 5614 defined on the sheath 212 may be sized to maintain the carrier arm(s) 5608 engaged within the groove(s) 5610 and thereby maintain the sharp carrier 5306 in position.

In FIG. 24B, the sensor applicator 102 is in the process of firing. As discussed herein with reference to FIGS. 3F-3G, this may be accomplished by advancing the sensor applicator 102 toward a target monitoring location until the sheath 212 engages the skin of the user. Continued pressure on the sensor applicator 102 against the skin may cause the sheath arm(s) 5604 to disengage from the corresponding detent(s) 5606, which allows the sheath 212 to collapse into the housing 208. As the sheath 212 starts to collapse, the radial shoulder 5614 eventually moves out of radial engagement with the carrier arm(s) 5608, which allows the carrier arm(s) 5608 to disengage from the groove(s) 5610. The passive spring force of the spring 5612 is then free to push upward on the sharp carrier 5306 and thereby force the carrier arm(s) 5608 out of engagement with the groove(s) 5610, which allows the sharp carrier 5306 to move slightly upward within the housing 208. In some embodiments, fewer coils may be incorporated into the design of the spring 5612 to increase the spring force necessary to overcome the engagement between carrier arm(s) 5608 and the groove(s) 5610. In at least one embodiment, one or both of the carrier arm(s) 5608 and the groove(s) 5610 may be angled to help ease disengagement.

As the sharp carrier 5306 moves upward within the housing 208, the sharp hub 5014 may correspondingly move in the same direction, which may cause partial retraction of the mating member 5016 such that it becomes flush, substantially flush, or sub-flush with the bottom of the sensor control device 5002. As will be appreciated, this ensures that the mating member 5016 does not come into contact with the user's skin, which might otherwise adversely impact sensor insertion, cause excessive pain, or prevent the adhesive patch (not shown) positioned on the bottom of the sensor control device 5002 from properly adhering to the skin.

Figure 25C:
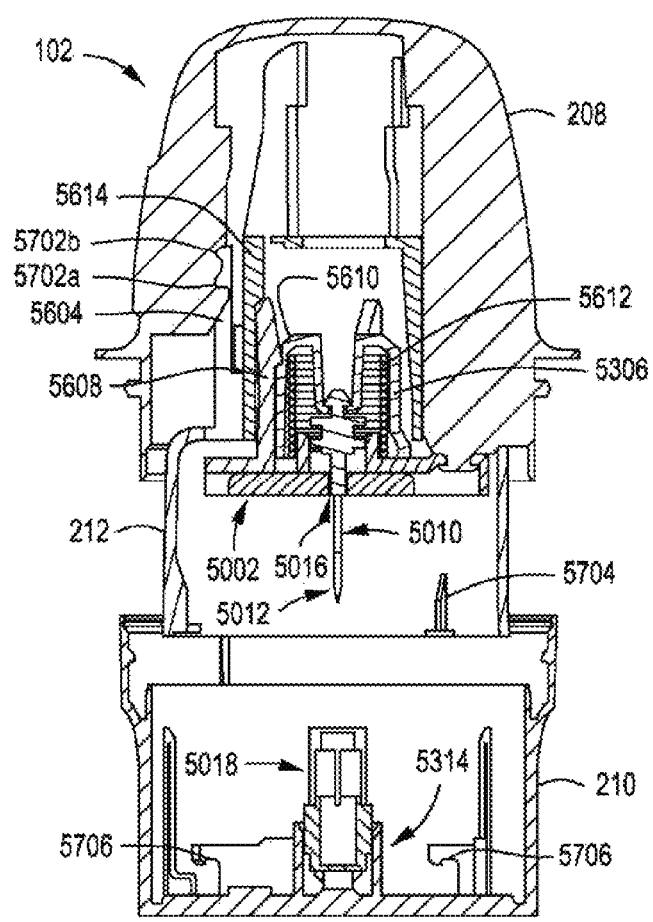

FIGS. 25A-25C are progressive cross-sectional side views showing assembly and disassembly of an alternative embodiment of the sensor applicator 102 with the sensor control device 5002, according to one or more additional embodiments. A fully assembled sensor control device 5002 may be loaded into the sensor applicator 102 by coupling the hub snap pawl 5302 into the arms 5304 of the sharp carrier 5306 positioned within the sensor applicator 102, as generally described above.

In the illustrated embodiment, the sheath arms 5604 of the sheath 212 may be configured to interact with a first detent 5702a and a second detent 5702b defined within the interior of the housing 208. The first detent 5702a may alternately be referred to a "locking" detent, and the second detent 5702b may alternately be referred to as a "firing" detent. When the sensor control device 5002 is initially installed in the sensor applicator 102, the sheath arms 5604 may be received within the first detent 5702a. As discussed below, the sheath 212 may be actuated to move the sheath arms 5604 to the second detent 5702b, which places the sensor applicator 102 in firing position.

In FIG. 25B, the applicator cap 210 is aligned with the housing 208 and advanced toward the housing 208 so that the sheath 212 is received within the applicator cap 210. Instead of rotating the applicator cap 210 relative to the housing 208, the threads of the applicator cap 210 may be snapped onto the corresponding threads of the housing 208 to couple the applicator cap 210 to the housing 208. Axial cuts or slots 5703 (one shown) defined in the applicator cap 210 may allow portions of the applicator cap 210 near its threading to flex outward to be snapped into engagement with the threading of the housing 208. As the applicator cap 210 is snapped to the housing 208, the sensor cap 5018 may correspondingly be snapped into the cap post 5314.

Similar to the embodiment of FIGS. 21A-21C, the sensor applicator 102 may include a sheath locking mechanism configured to ensure that the sheath 212 does not prematurely collapse during a shock event. In the illustrated embodiment, the sheath locking mechanism includes one or more ribs 5704 (one shown) defined near the base of the sheath 212 and configured to interact with one or more ribs 5706 (two shown) and a shoulder 5708 defined near the base of the applicator cap 210. The ribs 5704 may be configured to inter-lock between the ribs 5706 and the shoulder 5708 while attaching the applicator cap 210 to the housing 208.

More specifically, once the applicator cap 210 is snapped onto the housing 208, the applicator cap 210 may be rotated (e.g., clockwise), which locates the ribs 5704 of the sheath 212 between the ribs 5706 and the shoulder 5708 of the applicator cap 210 and thereby "locks" the applicator cap 210 in place until the user reverse rotates the applicator cap 210 to remove the applicator cap 210 for use. Engagement of the ribs 5704 between the ribs 5706 and the shoulder 5708 of the applicator cap 210 may also prevent the sheath 212 from collapsing prematurely.

In FIG. 25C, the applicator cap 210 is removed from the housing 208. As with the embodiment of FIGS. 21A-21C, the applicator cap 210 can be removed by reverse rotating the applicator cap 210, which correspondingly rotates the cap post 5314 in the same direction and causes sensor cap 5018 to unthread from the mating member 5016, as generally described above. Moreover, detaching the sensor cap 5018 from the sensor control device 5002 exposes the distal portions of the sensor 5010 and the sharp 5012.

As the applicator cap 210 is unscrewed from the housing 208, the ribs 5704 defined on the sheath 212 may slidingly engage the tops of the ribs 5706 defined on the applicator cap 210. The tops of the ribs 5706 may provide corresponding ramped surfaces that result in an upward displacement of the sheath 212 as the applicator cap 210 is rotated, and moving the sheath 212 upward causes the sheath arms 5604 to flex out of engagement with the first detent 5702a to be received within the second detent 5702b. As the sheath 212 moves to the second detent 5702b, the radial shoulder 5614 moves out of radial engagement with the carrier arm(s) 5608, which allows the passive spring force of the spring 5612 to push upward on the sharp carrier 5306 and force the carrier arm(s) 5608 out of engagement with the groove(s) 5610. As the sharp carrier 5306 moves upward within the housing 208, the mating member 5016 may correspondingly retract until it becomes flush, substantially flush, or sub-flush with the bottom of the sensor control device 5002. At this point, the sensor applicator 102 in firing position. Accordingly, in this embodiment, removing the applicator cap 210 correspondingly causes the mating member 5016 to retract.

Figure 26A:
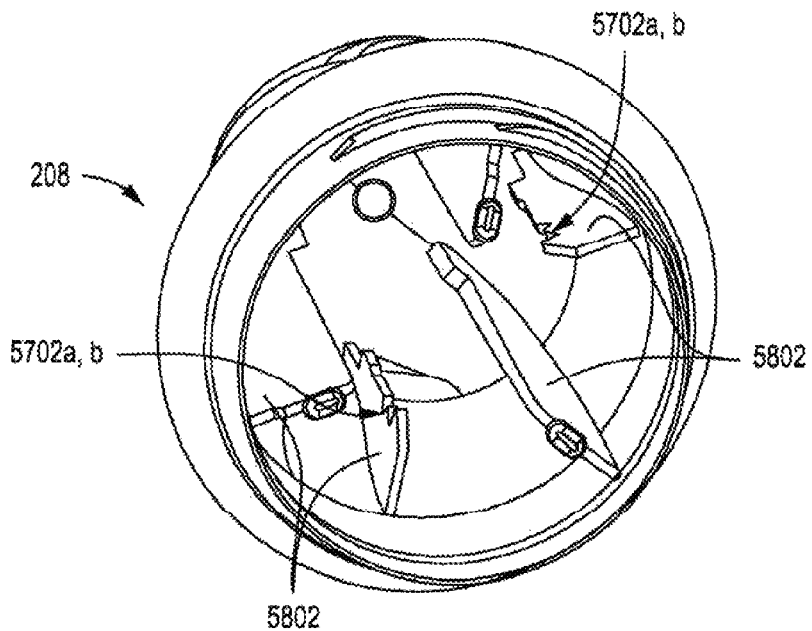
FIG. 26A is an isometric bottom view of the housing, according to one or more embodiments.

FIG. 26A is an isometric bottom view of the housing 208, according to one or more embodiments. As illustrated, one or more longitudinal ribs 5802 (four shown) may be defined within the interior of the housing 208. The ribs 5802 may be equidistantly or non-equidistantly spaced from each other and extend substantially parallel to centerline of the housing 208. The first and second detents 5702a, b may be defined on one or more of the longitudinal ribs 5802.

Figure 27A:
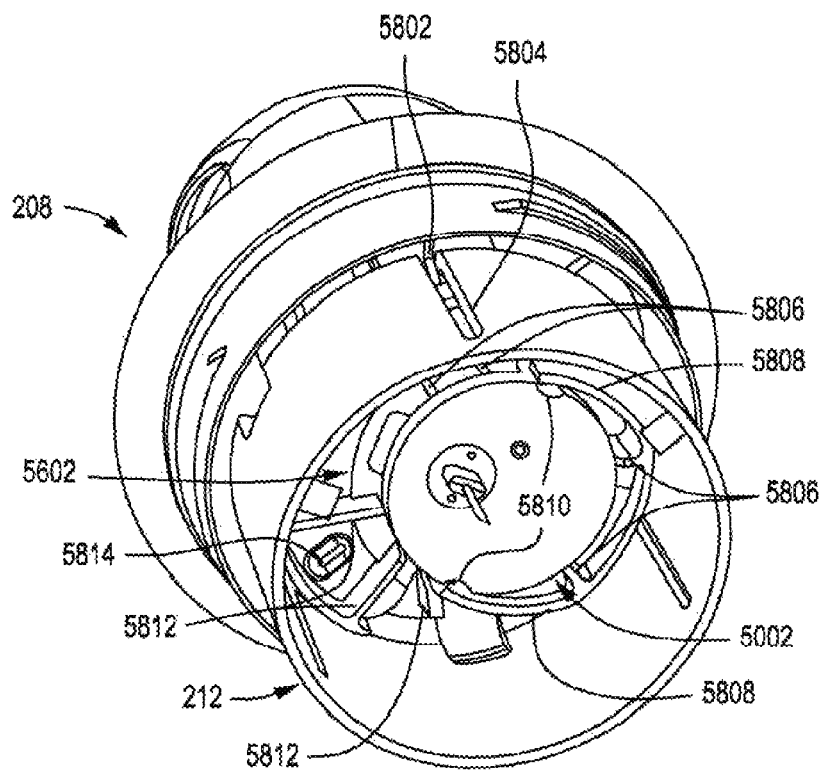
FIG. 27A is an isometric bottom view of the housing with the sheath and other components at least partially positioned therein.

FIG. 27A is an isometric bottom view of the housing 208 with the sheath 212 and other components at least partially positioned within the housing 208. As illustrated, the sheath 212 may provide or otherwise define one or more longitudinal slots 5804 configured to mate with the longitudinal ribs 5802 of the housing 208. As the sheath 212 collapses into the housing 208, as generally described above, the ribs 5802 may be received within the slots 5804 to help maintain the sheath 212 aligned with the housing during its movement. As will be appreciated, this may result in tighter circumferential and radial alignment within the same dimensional and tolerance restrictions of the housing 208.

In the illustrated embodiment, the sensor carrier 5602 may be configured to hold the sensor control device 5002 in place both axially (e.g., once the sensor cap 5018 is removed) and circumferentially. To accomplish this, the sensor carrier 5602 may include or otherwise define one or more support ribs 5806 and one or more flexible arms 5808. The support ribs 5806 extend radially inward to provide radial support to the sensor control device 5002. The flexible arms 5808 extend partially about the circumference of the sensor control device 5002 and the ends of the flexible arms 5808 may be received within corresponding grooves 5810 defined in the side of the sensor control device 5002. Accordingly, the flexible arms 5808 may be able to provide both axial and radial support to the sensor control device 5002. In at least one embodiment, the ends of the flexible arms 5808 may be biased into the grooves 5810 of the sensor control device 5002 and otherwise locked in place with corresponding sheath locking ribs 5812 provided by the sheath 212.

In some embodiments, the sensor carrier 5602 may be ultrasonically welded to the housing 208 at one or more points 5814. In other embodiments, however, the sensor carrier 5602 may alternatively be coupled to the housing 208 via a snap-fit engagement, without departing from the scope of the disclosure. This may help hold the sensor control device 5002 in place during transport and firing.

Figure 28:
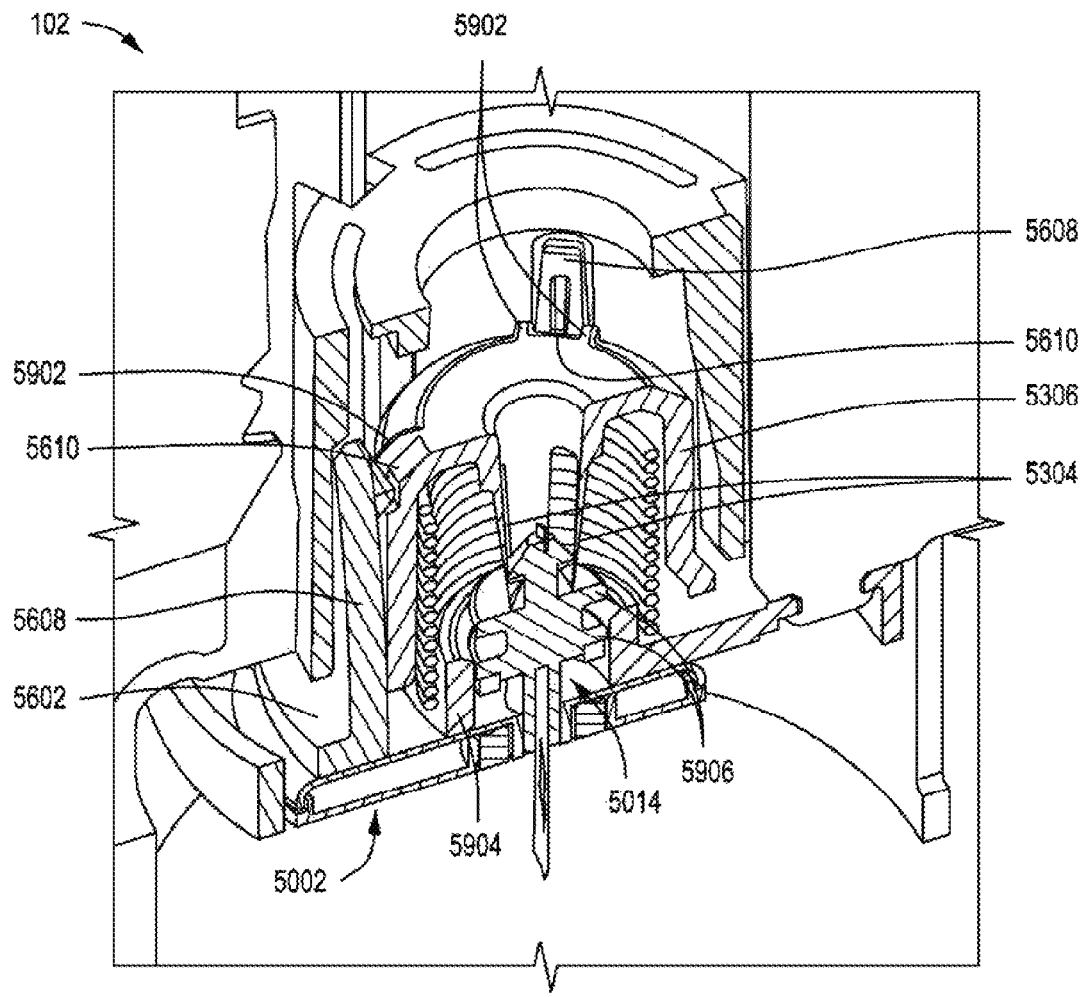
FIG. 28 is an enlarged cross-sectional side view of the sensor applicator with the sensor control device installed therein, according to one or more embodiments.

FIG. 28 is an enlarged cross-sectional side view of the sensor applicator 102 with the sensor control device 5002 installed therein, according to one or more embodiments. As discussed above, the sensor carrier 5602 may include one or more carrier arms 5608 (two shown) engageable with the sharp carrier 5306 at corresponding grooves 5610. In at least one embodiment, the grooves 5610 may be defined by pairs of protrusions 5902 defined on the sharp carrier 5306. Receiving the carrier arms 5608 within the grooves 5610 may help stabilize the sharp carrier 5306 from unwanted tilting during all stages of retraction (firing).

In the illustrated embodiment, the arms 5304 of the sharp carrier 5306 may be stiff enough to control, with greater refinement, radial and bi-axial motion of the sharp hub 5014. In some embodiments, for example, clearances between the sharp hub 5014 and the arms 5304 may be more restrictive in both axial directions as the relative control of the height of the sharp hub 5014 may be more critical to the design.

In the illustrated embodiment, the sensor carrier 5602 defines or otherwise provides a central boss 5904 sized to receive the sharp hub 5014. In some embodiments, as illustrated, the sharp hub 5014 may provide one or more radial ribs 5906 (two shown). In at least one embodiment, the inner diameter of the central boss 5904 helps provide radial and tilt support to the sharp hub 5014 during the life of sensor applicator 102 and through all phases of operation and assembly. Moreover, having multiple radial ribs 5906 increases the length-to-width ratio of the sharp hub 5014, which also improves support against tilting.

Figure 29A:
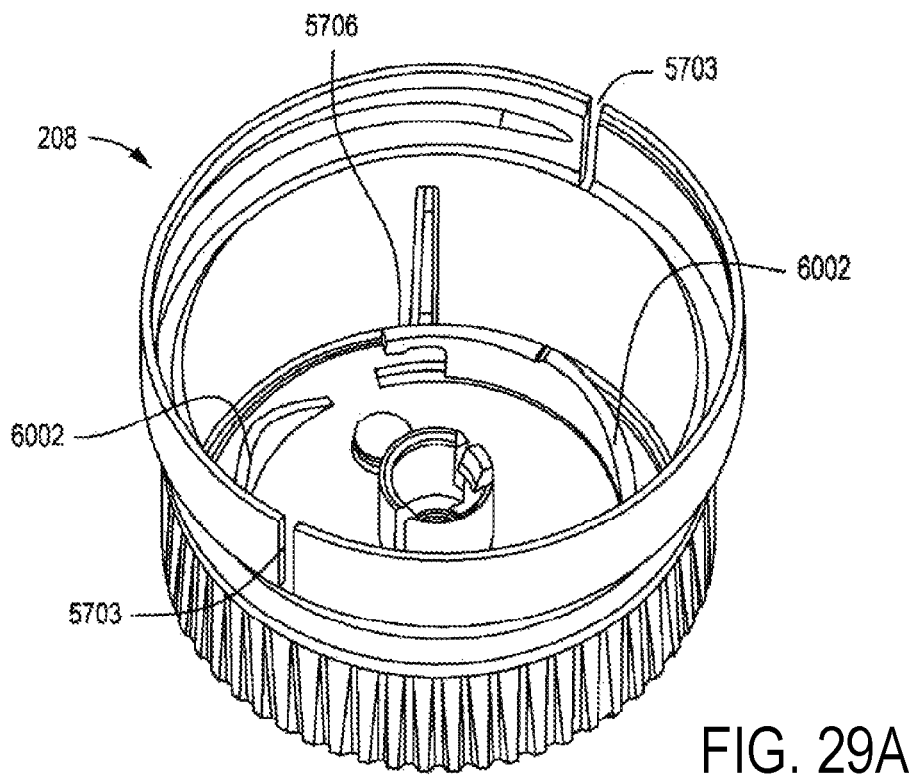
FIG. 29A is an isometric top view of the cap, according to one or more embodiments.

FIG. 29A is an isometric top view of the applicator cap 210, according to one or more embodiments. In the illustrated embodiment, two axial slots 5703 are depicted that separate upper portions of the applicator cap 210 near its threading. As mentioned above, the slots 5703 may help the applicator cap 210 flex outward to be snapped into engagement with the housing 208 (FIG. 25B). In contrast, the applicator cap 210 may be twisted (unthreaded) off the housing 208 by an end user.

FIG. 29A also depicts the ribs 5706 (one visible) defined by the applicator cap 210. By interlocking with the ribs 5704 (FIG. 25C) defined on the sheath 212 (FIG. 25C), the ribs 5706 may help lock the sheath 212 in all directions to prevent premature collapse during a shock or drop event. The sheath 212 may be unlocked when the user unscrews the applicator cap 210 from the housing, as generally described above. As mentioned herein, the top of each rib 5706 may provide a corresponding ramped surface 6002, and as the applicator cap 210 is rotated to unthread from the housing 208, the ribs 5704 defined on the sheath 212 may slidingly engage the ramped surfaces 6002, which results in the upward displacement of the sheath 212 into the housing 208.

In some embodiments, additional features may be provided within the interior of the applicator cap 210 to hold a desiccant component that maintains proper moisture levels through shelf life. Such additional features may be snaps, posts for press-fitting, heat-staking, ultrasonic welding, etc.

Figure 29B:
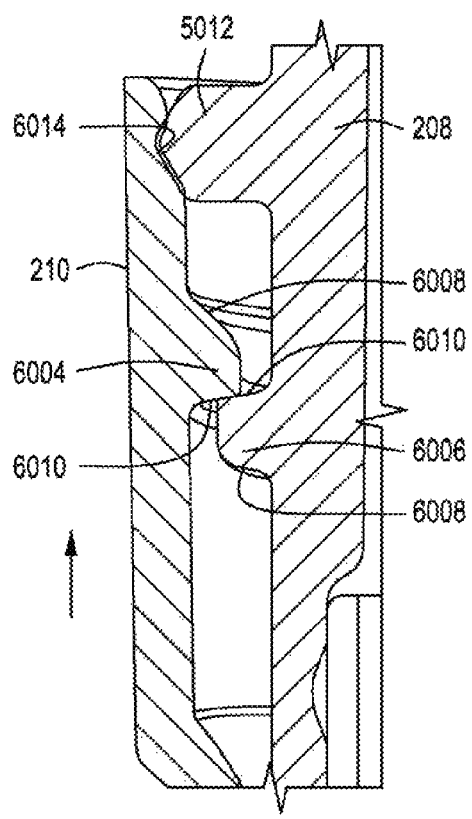
FIG. 29B is an enlarged cross-sectional view of the engagement between the cap and the housing, according to one or more embodiments.

FIG. 29B is an enlarged cross-sectional view of the engagement between the applicator cap 210 and the housing 208, according to one or more embodiments. As illustrated, the applicator cap 210 may define a set of inner threads 6004 and the housing 208 may define a set of outer threads 6006 engageable with the inner threads 6004. As mentioned herein, the applicator cap 210 may be snapped onto the housing 208, which may be accomplished by advancing the inner threads 6004 axially past the outer threads 6006 in the direction indicated by the arrow, which causes the applicator cap 210 to flex outward. To help ease this transition, as illustrated, corresponding surfaces 6008 of the inner and outer threads 6004, 6006 may be curved, angled, or chamfered. Corresponding flat surfaces 6010 may be provided on each thread 6004, 6006 and configured to matingly engage once the applicator cap 210 is properly snapped into place on the housing 208. The flat surfaces 6010 may slidingly engage one another as the user unthreads the applicator cap 210 from the housing 208.

The threaded engagement between the applicator cap 210 and the housing 208 results in a sealed engagement that protects the inner components against moisture, dust, etc. In some embodiments, the housing 208 may define or otherwise provide a stabilizing feature 6012 configured to be received within a corresponding groove 1914 defined on the applicator cap 210. The stabilizing feature 6012 may help stabilize and stiffen the applicator cap 210 once the applicator cap 210 is snapped onto the housing 208. This may prove advantageous in providing additional drop robustness to the sensor applicator 102. This may also help increase the removal torque of the applicator cap 210.

Figure 30A:
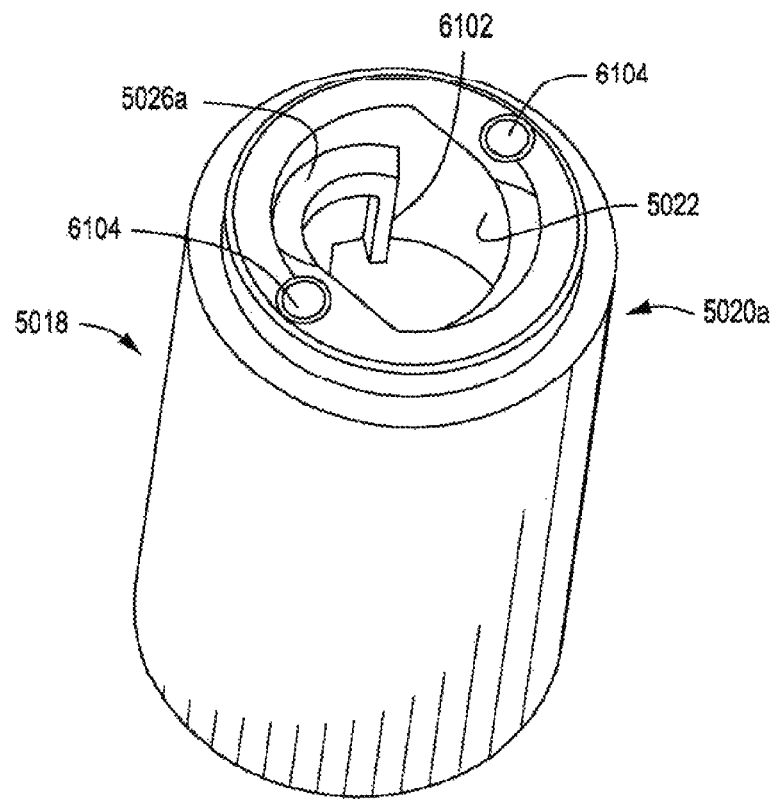
FIGS. 30A and 30B are isometric views of the sensor cap and the collar, respectively, according to one or more embodiments.
Figure 30B:
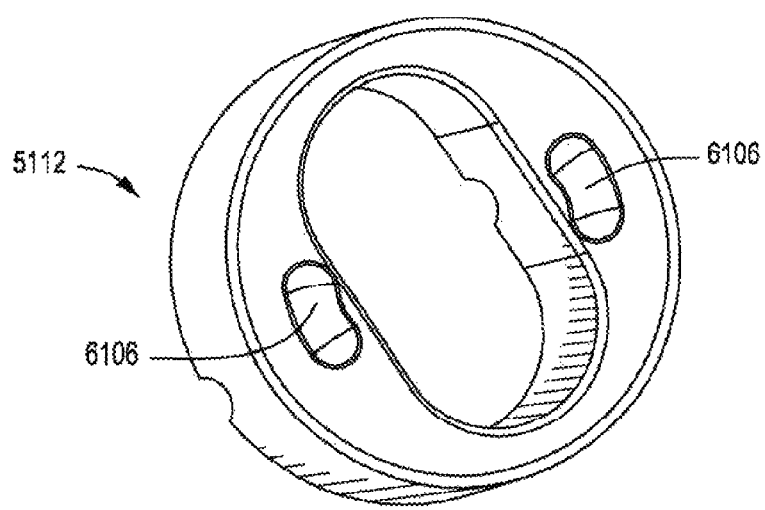

FIGS. 30A and 30B are isometric views of the sensor cap 5018 and the collar 5112, respectively, according to one or more embodiments. Referring to FIG. 30A, in some embodiments, the sensor cap 5018 may comprise an injection molded part. This may prove advantageous in molding the internal threads 5026a defined within the inner chamber 5022, as opposed to installing a threaded core or threading the inner chamber 5022. In some embodiments, one or more stop ribs 6102 (on visible) may be defined within the inner chamber 5022 to prevent over travel relative to mating member 5016 of the sharp hub 5014 (FIGS. 18A-18B).

Referring to both FIGS. 30A and 30B, in some embodiments, one or more protrusions 6104 (two shown) may be defined on the first end 5020a of the sensor cap 5018 and configured to mate with one or more corresponding indentations 6106 (two shown) defined on the collar 5112. In other embodiments, however, the protrusions 6104 may instead be defined on the collar 5112 and the indentations 6106 may be defined on the sensor cap 5018, without departing from the scope of the disclosure.

The matable protrusions 6104 and indentations 6106 may prove advantageous in rotationally locking the sensor cap 5018 to prevent unintended unscrewing of the sensor cap 5018 from the collar 5112 (and thus the sensor control device 5002) during the life of the sensor applicator 102 and through all phases of operation/assembly. In some embodiments, as illustrated, the indentations 6106 may be formed or otherwise defined in the general shape of a kidney bean.

This may prove advantageous in allowing for some over-rotation of the sensor cap 5018 relative to the collar 5112. Alternatively, the same benefit may be achieved via a flat end threaded engagement between the two parts.

Embodiments disclosed herein include:

A. A sensor control device that includes an electronics housing, a sensor arranged within the electronics housing and having a tail extending from a bottom of the electronics housing, a sharp extending through the electronics housing and having a sharp tip extending from the bottom of the electronics housing, and a sensor cap removably coupled at the bottom of the electronics housing and defining a sealed inner chamber that receives the tail and the sharp.

B. An analyte monitoring system that includes a sensor applicator, a sensor control device positioned within the sensor applicator and including an electronics housing, a sensor arranged within the electronics housing and having a tail extending from a bottom of the electronics housing, a sharp extending through the electronics housing and having a sharp tip extending from the bottom of the electronics housing, and a sensor cap removably coupled at the bottom of the electronics housing and defining an engagement feature and a sealed inner chamber that receives the tail and the sharp. The analyte monitoring system may further include a cap coupled to the sensor applicator and providing a cap post defining a receiver feature that receives the engagement feature upon coupling the cap to the sensor applicator, wherein removing the cap from the sensor applicator detaches the sensor cap from the electronics housing and thereby exposes the tail and the sharp tip.

C. A method of preparing an analyte monitoring system that includes loading a sensor control device into a sensor applicator, the sensor control device including an electronics housing, a sensor arranged within the electronics housing and having a tail extending from a bottom of the electronics housing, a sharp extending through the electronics housing and having a sharp tip extending from the bottom of the electronics housing, and a sensor cap removably coupled at the bottom of the electronics housing and defining a sealed inner chamber that receives the tail and the sharp. The method further including securing a cap to the sensor applicator, sterilizing the sensor control device with gaseous chemical sterilization while the sensor control device is positioned within the sensor applicator, and isolating the tail and the sharp tip within the inner chamber from the gaseous chemical sterilization.

Each of embodiments A, B, and C may have one or more of the following additional elements in any combination: Element 1: wherein the sensor cap comprises a cylindrical body having a first end that is open to access the inner chamber, and a second end opposite the first end and providing an engagement feature engageable with a cap of a sensor applicator, wherein removing the cap from the sensor applicator correspondingly removes the sensor cap from the electronics housing and thereby exposes the tail and the sharp tip. Element 2: wherein the electronics housing includes a shell matable with a mount, the sensor control device further comprising a sharp and sensor locator defined on an inner surface of the shell, and a collar received about the sharp and sensor locator, wherein the sensor cap is removably coupled to the collar. Element 3: wherein the sensor cap is removably coupled to the collar by one or more of an interference fit, a threaded engagement, a frangible member, and a frangible substance. Element 4: wherein an annular ridge circumscribes the sharp and sensor locator and the collar provides a column and an annular shoulder extending radially outward from the column, and wherein a seal member interposes the annular shoulder and the annular ridge to form a sealed interface. Element 5: wherein the annular ridge defines a groove and a portion of the sensor is seated within the groove, and wherein the seal member extends into the groove to seal about the portion of the sensor. Element 6: wherein the seal member is a first seal member, the sensor control device further comprising a second seal member interposing the annular shoulder and a portion of the mount to form a sealed interface. Element 7: wherein the electronics housing includes a shell matable with a mount, the sensor control device further comprising a sharp hub that carries the sharp and is engageable with a top surface of the shell, and a mating member defined by the sharp hub and extending from the bottom of the electronics housing, wherein the sensor cap is removably coupled to the mating member. Element 8: further comprising a collar at least partially receivable within an aperture defined in the mount and sealingly engaging the sensor cap and an inner surface of the shell. Element 9: wherein a seal member interposes the collar and the inner surface of the shell to form a sealed interface. Element 10: wherein the collar defines a groove and a portion of the sensor is seated within the groove, and wherein the seal member extends into the groove to seal about the portion of the sensor.

Element 11: wherein the receiver feature comprises one or more compliant members that flex to receive the engagement feature, and wherein the one or more compliant members prevent the engagement feature from exiting the cap post upon removing the cap from the sensor applicator. Element 12: further comprising a ramped surface defined on at least one of the one or more compliant members, and one or more camming surfaces provided by the engagement feature and engageable with the ramped surface, wherein the ramped surface and the one or more camming surfaces allow the cap and the cap post to rotate relative to the sensor cap in a first direction, but prevent the cap and the cap post from rotating relative to the sensor cap in a second direction opposite the first direction. Element 13: wherein the electronics housing includes a shell matable with a mount, the sensor control device further comprising a sharp hub that carries the sharp and is engageable with a top surface of the shell, and a mating member defined by the sharp hub and extending from the bottom of the electronics housing, wherein the sensor cap is removably coupled to the mating member and rotating the cap in the second direction detaches the sensor cap from the mating member. Element 14: wherein the electronics housing includes a shell matable with a mount and the sensor control device further includes a sharp and sensor locator defined on an inner surface of the shell, and a collar received about the sharp and sensor locator, wherein the sensor cap is removably coupled to the collar.

Element 15: wherein the cap provides a cap post defining a receiver feature and the sensor cap defines an engagement feature, the method further comprising receiving the engagement feature with the receiver feature as the cap is secured to the sensor applicator. Element 16: further comprising removing the cap from the sensor applicator, and engaging the engagement feature on the receiver feature as the cap is being removed and thereby detaching the sensor cap from the electronics housing and exposing the tail and the sharp tip. Element 17: wherein loading the sensor control device into a sensor applicator is preceded by sterilizing the tail and the sharp tip with radiation sterilization, and sealing the tail and the sharp tip within the inner chamber.

By way of non-limiting example, exemplary combinations applicable to A, B, and C include: Element 2 with Element 3; Element 2 with Element 4; Element 4 with Element 5; Element 4 with Element 6; Element 7 with Element 8; Element 8 with Element 9; Element 9 with Element 10; Element 11 with Element 12; and Element 15 with Element 16.

Exemplary Embodiments of Seal Arrangement for Analyte Monitoring Systems

Figure 31A:
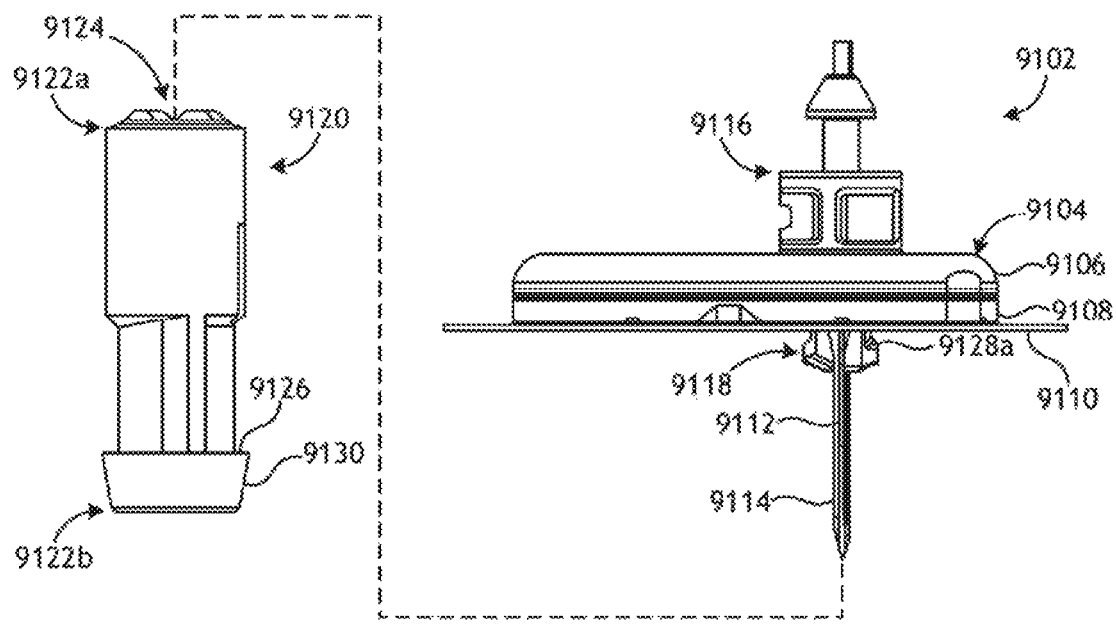
FIGS. 31A and 31B are side and isometric views, respectively, of an example sensor control device, according to one or more embodiments of the present disclosure.
Figure 31B:
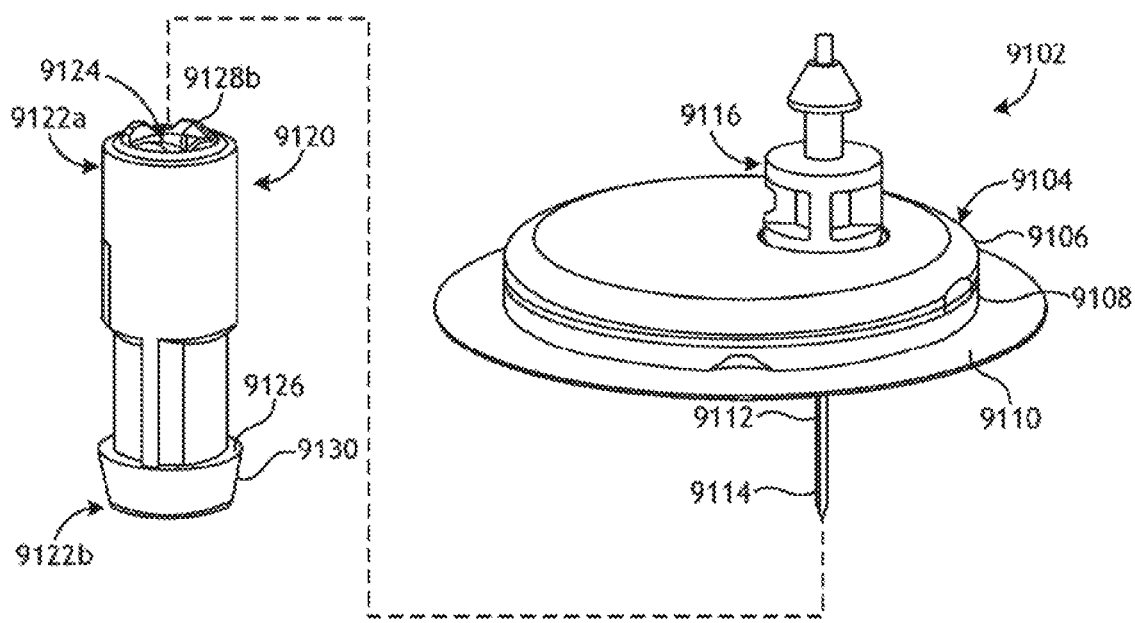

FIGS. 31A and 31B are side and isometric views, respectively, of an example sensor control device 9102, according to one or more embodiments of the present disclosure. The sensor control device 9102 may be similar in some respects to the sensor control device 102 of FIG. 1 and therefore may be best understood with reference thereto. Moreover, the sensor control device 9102 may replace the sensor control device 102 of FIG. 1 and, therefore, may be used in conjunction with the sensor applicator 102 of FIG. 1, which may deliver the sensor control device 9102 to a target monitoring location on a user's skin.

As illustrated, the sensor control device 9102 includes an electronics housing 9104, which may be generally disc-shaped and have a circular cross-section. In other embodiments, however, the electronics housing 9104 may exhibit other cross-sectional shapes, such as ovoid, oval, or polygonal, without departing from the scope of the disclosure. The electronics housing 9104 includes a shell 9106 and a mount 9108 that is matable with the shell 9106. The shell 9106 may be secured to the mount 9108 via a variety of ways, such as a snap fit engagement, an interference fit, sonic welding, laser welding, one or more mechanical fasteners (e.g., screws), a gasket, an adhesive, or any combination thereof. Non-limiting examples of adhesives are disclosed herein. For example, but not by way of limitation, the adhesive can be free of IBOA or acrylics.

In certain embodiments, the shell 9106 may be secured to the mount 9108 such that a sealed interface is generated therebetween. An adhesive patch 9110 may be positioned on and otherwise attached to the underside of the mount 9108. Similar to the adhesive patch 108 of FIG. 1, the adhesive patch 9110 may be configured to secure and maintain the sensor control device 9102 in position on the user's skin during operation. In certain embodiments, the adhesive patch can be an adhesive patch as shown in FIGS. 40A-40B, 41, and 42A-42C.

The sensor control device 9102 may further include a sensor 9112 and a sharp 9114 used to help deliver the sensor 9112 transcutaneously under a user's skin during application of the sensor control device 9102. Corresponding portions of the sensor 9112 and the sharp 9114 extend distally from the bottom of the electronics housing 9104 (e.g., the mount 9108). A sharp hub 9116 may be overmolded onto the sharp 9114 and configured to secure and carry the sharp 9114. As best seen in FIG. 31A, the sharp hub 9116 may include or otherwise define a mating member 9118. In assembling the sharp 9114 to the sensor control device 9102, the sharp 9114 may be advanced axially through the electronics housing 9104 until the sharp hub 9116 engages an upper surface of the electronics housing 9104 or an internal component thereof and the mating member 9118 extends distally from the bottom of the mount 9108. As described herein below, in at least one embodiment, the sharp hub 9116 may sealingly engage an upper portion of a seal overmolded onto the mount 9108. As the sharp 9114 penetrates the electronics housing 9104, the exposed portion of the sensor 9112 may be received within a hollow or recessed (arcuate) portion of the sharp 9114. The remaining portion of the sensor 9112 is arranged within the interior of the electronics housing 9104.

The sensor control device 9102 may further include a sensor cap 9120, shown detached from the electronics housing 9104 in FIGS. 31A-31B. The sensor cap 9120 may help provide a sealed barrier that surrounds and protects exposed portions of the sensor 9112 and the sharp 9114. As illustrated, the sensor cap 9120 may comprise a generally cylindrical body having a first end 9122*a* and a second end 9122*b* opposite the first end 9122*a*. The first end 9122*a* may be open to provide access into an inner chamber 9124 defined within the body. In contrast, the second end 9122*b* may be closed and may provide or otherwise define an engagement feature 9126. As described in more detail below, the engagement feature 9126 may help mate the sensor cap 9120 to an applicator cap of a sensor applicator (e.g., the sensor applicator 102 of FIG. 1), and may help remove the sensor cap 9120 from the sensor control device 9102 upon removing the sensor cap from the sensor applicator.

The sensor cap 9120 may be removably coupled to the electronics housing 9104 at or near the bottom of the mount 9108. More specifically, the sensor cap 9120 may be removably coupled to the mating member 9118, which extends distally from the bottom of the mount 9108. In at least one embodiment, for example, the mating member 9118 may define a set of external threads 9128*a* (FIG. 31A) matable with a set of internal threads 9128*b* (FIG. 31B) defined within the inner chamber 9124 of the sensor cap 9120. In some embodiments, the external and internal threads 9128*a,b* may comprise a flat thread design (e.g., lack of helical curvature), but may alternatively comprise a helical threaded engagement. Accordingly, in at least one embodiment, the sensor cap 9120 may be threadably coupled to the sensor control device 9102 at the mating member 9118 of the sharp hub 9116. In other embodiments, the sensor cap 9120 may be removably coupled to the mating member 9118 via other types of engagements including, but not limited to, an interference or friction fit, or a frangible member or substance (e.g., wax, an adhesive, etc.) that may be broken with minimal separation force (e.g., axial or rotational force).

In some embodiments, the sensor cap 9120 may comprise a monolithic (singular) structure extending between the first and second ends 9122*a,b*. In other embodiments, however, the sensor cap 9120 may comprise two or more component parts. In the illustrated embodiment, for example, the body of the sensor cap 9120 may include a desiccant cap 9130 arranged at the second end 9122*b*. The desiccant cap 9130 may house or comprise a desiccant to help maintain preferred humidity levels within the inner chamber 9124. Moreover, the desiccant cap 9130 may also define or otherwise provide the engagement feature 9126 of the sensor cap 9120. In at least one embodiment, the desiccant cap 9130 may comprise an elastomeric plug inserted into the bottom end of the sensor cap 9120.

Figure 32A:
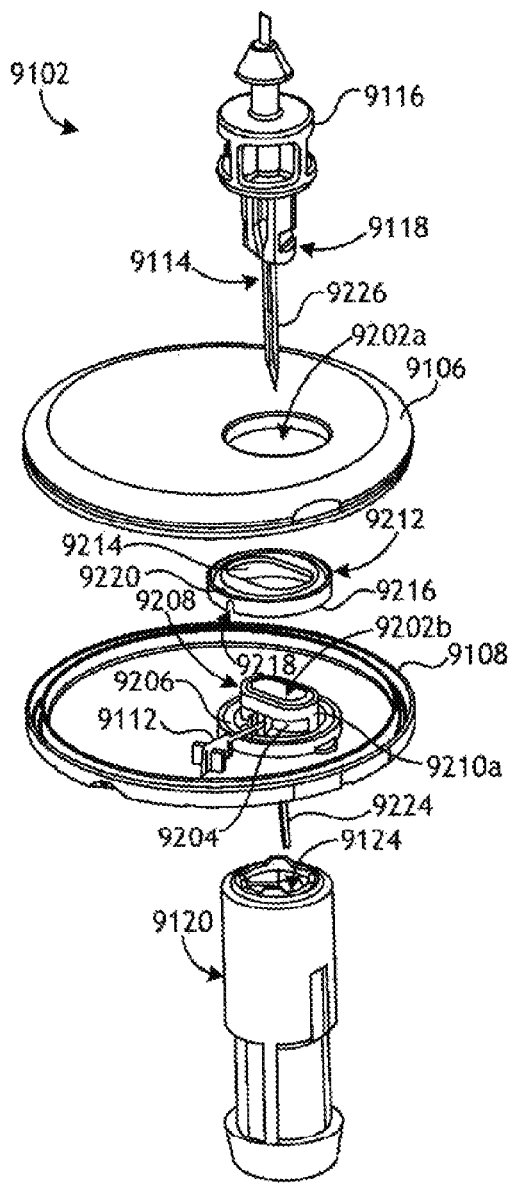
FIGS. 32A and 32B are exploded, isometric top and bottom views, respectively, of the sensor control device of FIG. 2, according to one or more embodiments.
Figure 32B:
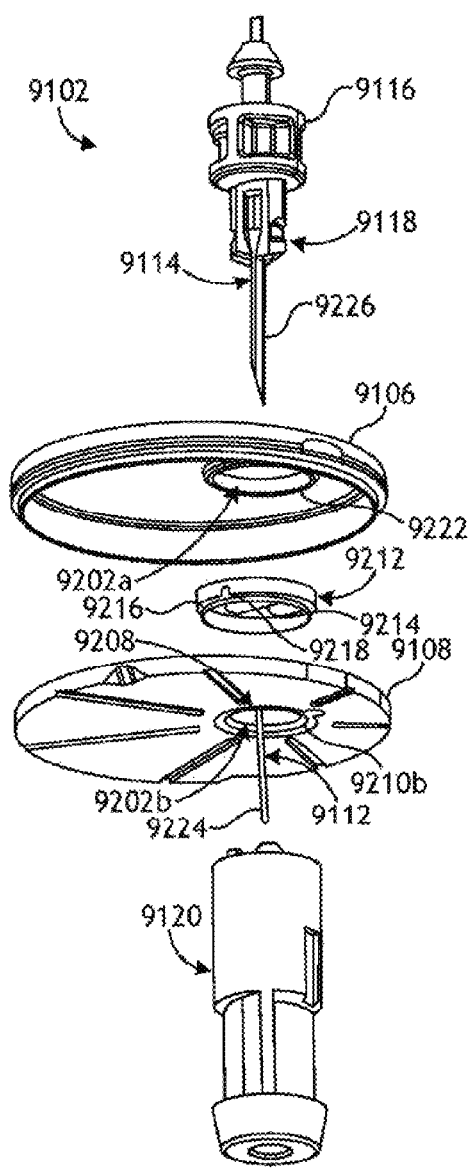

FIGS. 32A and 32B are exploded, isometric top and bottom views, respectively, of the sensor control device 9102, according to one or more embodiments. The shell 9106 and the mount 9108 operate as opposing clamshell halves that enclose or otherwise substantially encapsulate various electronic components (not shown) of the sensor control device 9102. Example electronic components that may be arranged between the shell 9106 and the mount 9108 include, but are not limited to, a battery, resistors, transistors, capacitors, inductors, diodes, and switches.

The shell 9106 may define a first aperture 9202*a* and the mount 9108 may define a second aperture 9202*b*, and the apertures 9202*a, b* may align when the shell 9106 is properly mounted to the mount 9108. As best seen in FIG. 32A, the mount 9108 may provide or otherwise define a pedestal 9204 that protrudes from the inner surface of the mount 9108 at the second aperture 9202b. The pedestal 9204 may define at least a portion of the second aperture 9202b. Moreover, a channel 9206 may be defined on the inner surface of the mount 9108 and may circumscribe the pedestal 9202. In the illustrated embodiment, the channel 9206 is circular in shape, but could alternatively be another shape, such as oval, ovoid, or polygonal.

The mount 9108 may comprise a molded part made of a rigid material, such as plastic or metal. In some embodiments, a seal 9208 may be overmolded onto the mount 9108 and may be made of an elastomer, rubber, a-polymer, or another pliable material suitable for facilitating a sealed interface. In embodiments where the mount 9108 is made of a plastic, the mount 9108 may be molded in a first "shot" of injection molding, and the seal 9208 may be overmolded onto the mount 9108 in a second "shot" of injection molding. Accordingly, the mount 9108 may be referred to or otherwise characterized as a "two-shot mount."

In the illustrated embodiment, the seal 9208 may be overmolded onto the mount 9108 at the pedestal 9204 and also on the bottom of the mount 9108. More specifically, the seal 9208 may define or otherwise provide a first seal element 9210a overmolded onto the pedestal 9204, and a second seal element 9210b (FIG. 32B) interconnected to (with) the first seal element 9210a and overmolded onto the mount 9108 at the bottom of the mount 9108. In some embodiments, one or both of the seal elements 9210a,b may help form corresponding portions (sections) of the second aperture 9202b. While the seal 9208 is described herein as being overmolded onto the mount 9108, it is also contemplated herein that one or both of the seal elements 9210a,b may comprise an elastomeric component part independent of the mount 9208, such as an O-ring or a gasket.

The sensor control device 9102 may further include a collar 9212, which may be a generally annular structure that defines a central aperture 9214. The central aperture 9214 may be sized to receive the first seal element 9210a and may align with both the first and second apertures 9202a, b when the sensor control device 9102 is properly assembled. The shape of the central aperture 9214 may generally match the shape of the second aperture 9202b and the first seal element 9210a.

In some embodiments, the collar 9212 may define or otherwise provide an annular lip 9216 on its bottom surface. The annular lip 9216 may be sized and otherwise configured to mate with or be received into the channel 9206 defined on the inner surface of the mount 9108. In some embodiments, a groove 9218 may be defined on the annular lip 9216 and may be configured to accommodate or otherwise receive a portion of the sensor 9112 extending laterally within the mount 9108. In some embodiments, the collar 9212 may further define or otherwise provide a collar channel 9220 (FIG. 32A) on its upper surface sized to receive and otherwise mate with an annular ridge 9222 (FIG. 32B) defined on the inner surface of the shell 9106 when the sensor control device 9102 is properly assembled.

The sensor 9112 may include a tail 9224 that extends through the second aperture 9202b defined in the mount 9108 to be transcutaneously received beneath a user's skin. The tail 9224 may have an enzyme or other chemistry included thereon to help facilitate analyte monitoring. The sharp 9114 may include a sharp tip 9226 extendable through the first aperture 9202a defined by the shell 9106. As the sharp tip 9226 penetrates the electronics housing 9104, the tail 9224 of the sensor 9112 may be received within a hollow or recessed portion of the sharp tip 9226. The sharp tip 9226 may be configured to penetrate the skin while carrying the tail 9224 to put the active chemistry of the tail 9224 into contact with bodily fluids.

The sensor control device 9102 may provide a sealed subassembly that includes, among other component parts, portions of the shell 9106, the sensor 9112, the sharp 9114, the seal 9208, the collar 9212, and the sensor cap 9120. The sealed subassembly may help isolate the sensor 9112 and the sharp 9114 within the inner chamber 9124 (FIG. 32A) of the sensor cap 9120. In assembling the sealed subassembly, the sharp tip 9226 is advanced through the electronics housing 9104 until the sharp hub 9116 engages the seal 9208 and, more particularly, the first seal element 9210a. The mating member 9118 provided at the bottom of the sharp hub 9116 may extend out the second aperture 9202b in the bottom of the mount 9108, and the sensor cap 9120 may be coupled to the sharp hub 9116 at the mating member 9118. Coupling the sensor cap 9120 to the sharp hub 9116 at the mating member 9118 may urge the first end 9122a of the sensor cap 9120 into sealed engagement with the seal 9208 and, more particularly, into sealed engagement with the second seal element 9210b on the bottom of the mount 9108. In some embodiments, as the sensor cap 9120 is coupled to the sharp hub 9116, a portion of the first end 9122a of the sensor cap 9120 may bottom out (engage) against the bottom of the mount 9108, and the sealed engagement between the sensor hub 9116 and the first seal element 9210a may be able to assume any tolerance variation between features.

FIG. 33 is a cross-sectional side view of the sensor control device 9102, according to one or more embodiments. As indicated above, the sensor control device 9102 may include or otherwise incorporate a sealed subassembly 9302, which may be useful in isolating the sensor 9112 and the sharp 9114 within the inner chamber 9124 of the sensor cap 9120. To assemble the sealed subassembly 9302, the sensor 9112 may be located within the mount 9108 such that the tail 9224 extends through the second aperture 9202b at the bottom of the mount 9108. In at least one embodiment, a locating feature 9304 may be defined on the inner surface of the mount 9108, and the sensor 9112 may define a groove 9306 that is matable with the locating feature 9304 to properly locate the sensor 9112 within the mount 9108.

Once the sensor 9112 is properly located, the collar 9212 may be installed on the mount 9108. More specifically, the collar 9212 may be positioned such that the first seal element 9210a of the seal 9208 is received within the central aperture 9214 defined by the collar 9212 and the first seal element 9210a generates a radial seal against the collar 9212 at the central aperture 9214. Moreover, the annular lip 9216 defined on the collar 9212 may be received within the channel 9206 defined on the mount 9108, and the groove 9218 defined through the annular lip 9216 may be aligned to receive the portion of the sensor 9112 that traverses the channel 9206 laterally within the mount 9108. In some embodiments, an adhesive may be injected into the channel 9206 to secure the collar 9212 to the mount 9108. The adhesive may also facilitate a sealed interface between the two components and generate a seal around the sensor 9112 at the groove 9218, which may isolate the tail 9224 from the interior of the electronics housing 9104. Non-limiting examples of adhesives are disclosed herein. For example, but not by way of limitation, the adhesive is free of IBOA or acrylics.

The shell 9106 may then be mated with or otherwise coupled to the mount 9108. In some embodiments, as illustrated, the shell 9106 may mate with the mount 9108 via a tongue-and-groove engagement 9308 at the outer periphery of the electronics housing 9104. An adhesive may be injected (applied) into the groove portion of the engagement 9308 to secure the shell 9106 to the mount 9108, and also to create a sealed engagement interface. Mating the shell 9106 to the mount 9108 may also cause the annular ridge 9222 defined on the inner surface of the shell 9106 to be received within the collar channel 9220 defined on the upper surface of the collar 9212. In some embodiments, an adhesive may be injected into the collar channel 9220 to secure the shell 9106 to the collar 9212, and also to facilitate a sealed interface between the two components at that location. When the shell 9106 mates with the mount 9108, the first seal element 9210*a* may extend at least partially through (into) the first aperture 9202*a* defined in the shell 9106.

The sharp 9114 may then be coupled to the sensor control device 9102 by extending the sharp tip 9226 through the aligned first and second apertures 9202*a, b* defined in the shell 9106 and the mount 9108, respectively. The sharp 9114 may be advanced until the sharp hub 9116 engages the seal 9208 and, more particularly, engages the first seal element 9210*a*. The mating member 9118 may extend (protrude) out the second aperture 9202*b* at the bottom of the mount 9108 when the sharp hub 9116 engages the first seal element 9210*a*.

The sensor cap 9120 may then be removably coupled to the sensor control device 9102 by threadably mating the internal threads 9128*b* of the sensor cap 9120 with the external threads 9128*a* of the mating member 9118. The inner chamber 9124 may be sized and otherwise configured to receive the tail 9224 and the sharp tip 9226 extending from the bottom of the mount 9108. Moreover, the inner chamber 9124 may be sealed to isolate the tail 9224 and the sharp tip 9226 from substances that might adversely interact with the chemistry of the tail 9224. In some embodiments, a desiccant (not shown) may be present within the inner chamber 9124 to maintain proper humidity levels.

Tightening (rotating) the mated engagement between the sensor cap 9120 and the mating member 9118 may urge the first end 9122*a* of the sensor cap 9120 into sealed engagement with the second seal element 9210*b* in an axial direction (e.g., along the centerline of the apertures 9202*a, b*), and may further enhance the sealed interface between the sharp hub 9116 and the first seal element 9210*a* in the axial direction. Moreover, tightening the mated engagement between the sensor cap 9120 and the mating member 9118 may compress the first seal element 9210*a*, which may result in an enhanced radial sealed engagement between the first seal element 9210*a* and the collar 9212 at the central aperture 9214. Accordingly, in at least one embodiment, the first seal element 9210*a* may help facilitate axial and radial sealed engagements.

As mentioned above, the first and second seal elements 9210*a,b* may be overmolded onto the mount 9108 and may be physically linked or otherwise interconnected. Consequently, a single injection molding shot may flow through the second aperture 9202*b* of the mount 9108 to create both ends of the seal 9208. This may prove advantageous in being able to generate multiple sealed interfaces with only a single injection molded shot. An additional advantage of a two-shot molded design, as opposed to using separate elastomeric components (e.g., O-rings, gaskets, etc.), is that the interface between the first and second shots is a reliable bond rather than a mechanical seal. Hence, the effective number of mechanical sealing barriers is effectively cut in half. Moreover, a two-shot component with a single elastomeric shot also has implications to minimizing the number of two-shot components needed to achieve all the necessary sterile barriers. Once properly assembled, the sealed subassembly 9302 may be subjected to a radiation sterilization process to sterilize the sensor 9112 and the sharp 9114. The sealed subassembly 9302 may be subjected to the radiation sterilization prior to or after coupling the sensor cap 9120 to the sharp hub 9116. When sterilized after coupling the sensor cap 9120 to the sharp hub 9116, the sensor cap 9120 may be made of a material that permits the propagation of radiation therethrough. In some embodiments, the sensor cap 9120 may be transparent or translucent, but can otherwise be opaque, without departing from the scope of the disclosure.

Figure 33A:
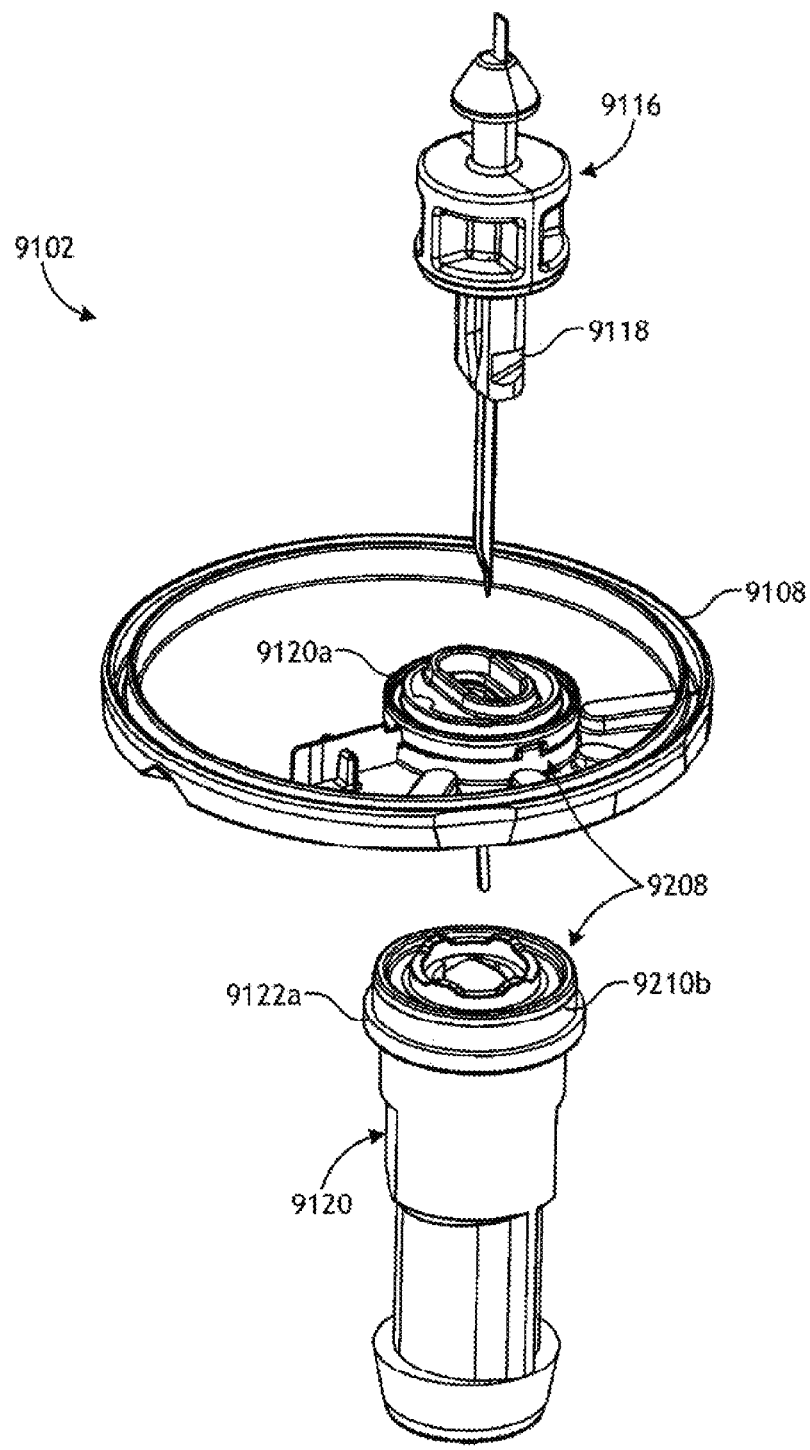
FIG. 33A is an exploded isometric view of a portion of another embodiment of the sensor control device of FIGS. 31A-31B and 32A-32B.

FIG. 33A is an exploded isometric view of a portion of another embodiment of the sensor control device 9102 of FIGS. 31A-31B and 32A-32B. Embodiments included above describe the mount 9108 and the seal 9208 being manufactured via a two-shot injection molding process. In other embodiments, however, as briefly mentioned above, one or both of the seal elements 9210*a,b* of the seal 9208 may comprise an elastomeric component part independent of the mount 9208. In the illustrated embodiment, for example, the first seal element 9210*a* may be overmolded onto the collar 9212 and the second seal element 9210*b* may be overmolded onto the sensor cap 9120. Alternatively, the first and second seal elements 9210*a,b* may comprise a separate component part, such as a gasket or O-ring positioned on the collar 9212 and the sensor cap 9120, respectively. Tightening (rotating) the mated engagement between the sensor cap 9120 and the mating member 9118 may urge the second seal element 9210*b* into sealed engagement with the bottom of the mount 9108 in an axial direction, and may enhance a sealed interface between the sharp hub 9116 and the first seal element 9210*a* in the axial direction.

Figure 34A:
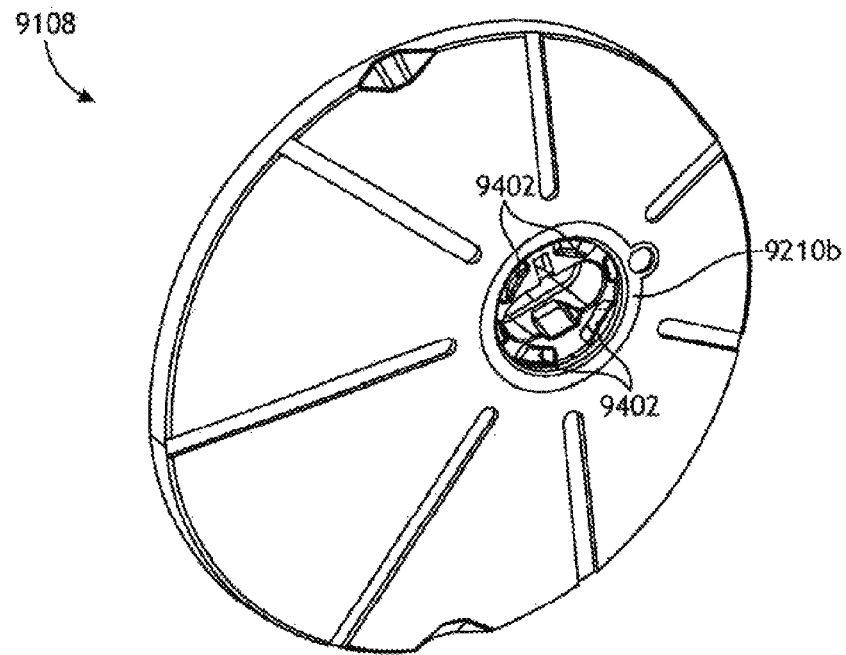
FIG. 34A is an isometric bottom view of the mount of FIGS. 31A-31B and 32A-32B.
Figure 34B:
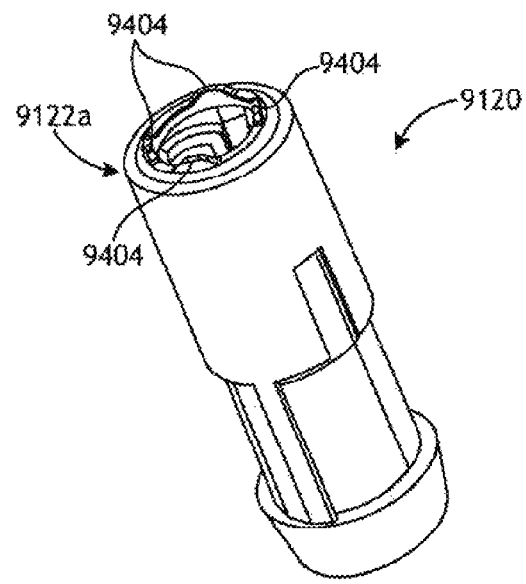
FIG. 34B is an isometric top view of the sensor cap of FIGS. 31A-31B and 32A-32B.

FIG. 34A is an isometric bottom view of the mount 9108, and FIG. 34B is an isometric top view of the sensor cap 9120, according to one or more embodiments. As shown in FIG. 34A, the mount 9108 may provide or otherwise define one or more indentations or pockets 9402 at or near the opening to the second aperture 9202*b*. As shown in FIG. 34B, the sensor cap 9120 may provide or otherwise define one or more projections 9404 at or near the first end 9122*a* of the sensor cap 9120. The projections 9404 may be received within the pockets 9402 when the sensor cap 9120 is coupled to the sharp hub 9116 (FIGS. 32A-32B and 93). More specifically, as described above, as the sensor cap 9120 is coupled to the mating member 9118 (FIGS. 32A-32B and 93) of the sharp hub 9116, the first end 9122*a* of the sensor cap 9120 is brought into sealed engagement with the second seal element 9210*b*. In this process, the projections 9404 may also be received within the pockets 9402, which may help prevent premature unthreading of the sensor cap 9120 from the sharp hub 9116.

Figure 35B:
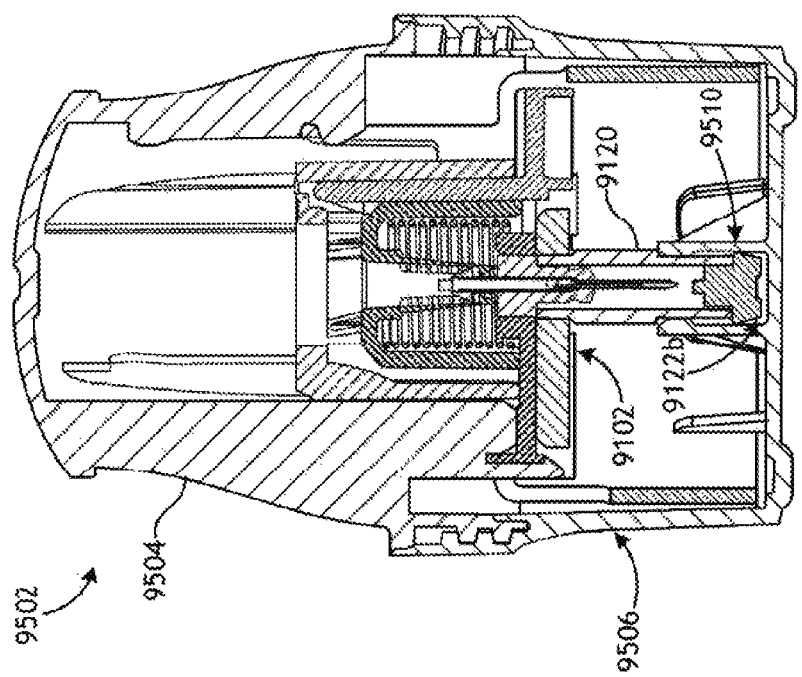
FIGS. 35A and 35B are side and cross-sectional side views, respectively, of an example sensor applicator, according to one or more embodiments.
Figure 35A:
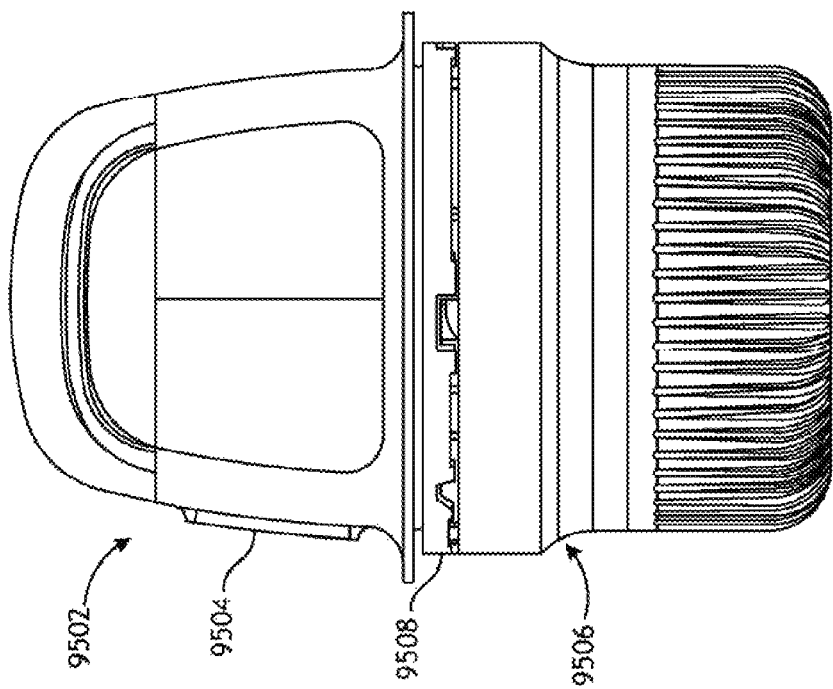

FIGS. 35A and 35B are side and cross-sectional side views, respectively, of an example sensor applicator 9502, according to one or more embodiments. The sensor applicator 9502 may be similar in some respects to the sensor applicator 102 of FIG. 1 and, therefore, may be designed to deliver (fire) a sensor control device, such as the sensor control device 9102. FIG. 35A depicts how the sensor applicator 9502 might be shipped to and received by a user, and FIG. 35B depicts the sensor control device 9102 arranged within the interior of the sensor applicator 9502.

As shown in FIG. 35A, the sensor applicator 9502 includes a housing 9504 and an applicator cap 9506 removably coupled to the housing 9504. In some embodiments, the applicator cap 9506 may be threaded to the housing 9504 and include a tamper ring 9508. Upon rotating (e.g., unscrewing) the applicator cap 9506 relative to the housing 9504, the tamper ring 9508 may shear and thereby free the applicator cap 9506 from the sensor applicator 9502.

In FIG. 35B, the sensor control device 9102 is positioned within the sensor applicator 9502. Once the sensor control device 9102 is fully assembled, it may then be loaded into the sensor applicator 9502 and the applicator cap 9506 may be coupled to the sensor applicator 9502. In some embodiments, the applicator cap 9506 and the housing 9504 may have opposing, matable sets of threads that enable the applicator cap 9506 to be screwed onto the housing 9504 in a clockwise (or counter-clockwise) direction and thereby secure the applicator cap 9506 to the sensor applicator 9502.

Securing the applicator cap 9506 to the housing 9504 may also cause the second end 9122b of the sensor cap 9120 to be received within a cap post 9510 located within the interior of the applicator cap 9506 and extending proximally from the bottom thereof. The cap post 9510 may be configured to receive at least a portion of the sensor cap 9120 as the applicator cap 9506 is coupled to the housing 9504.

Figure 36A:
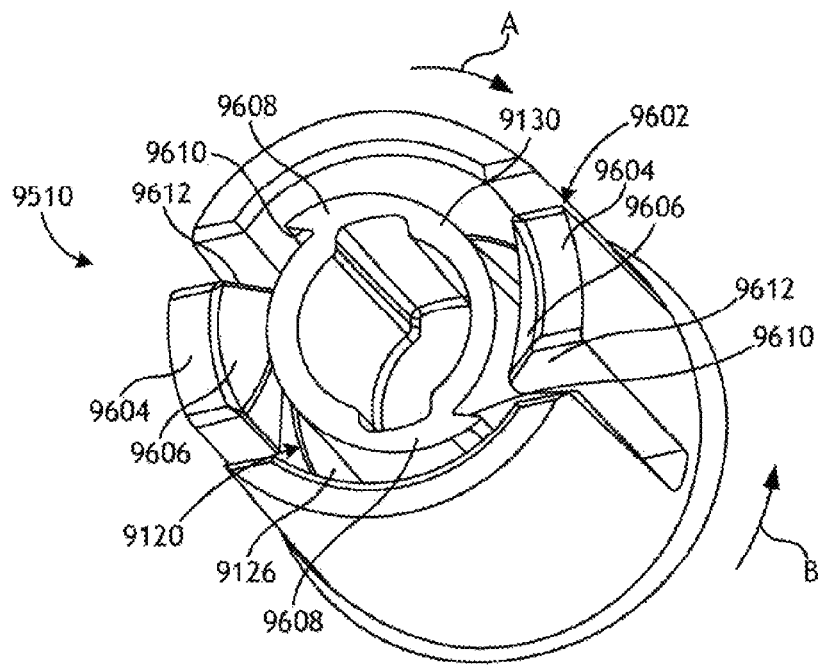
FIGS. 36A and 36B are perspective and top views, respectively, of the cap post of FIG. 35B, according to one or more embodiments.
Figure 36B:
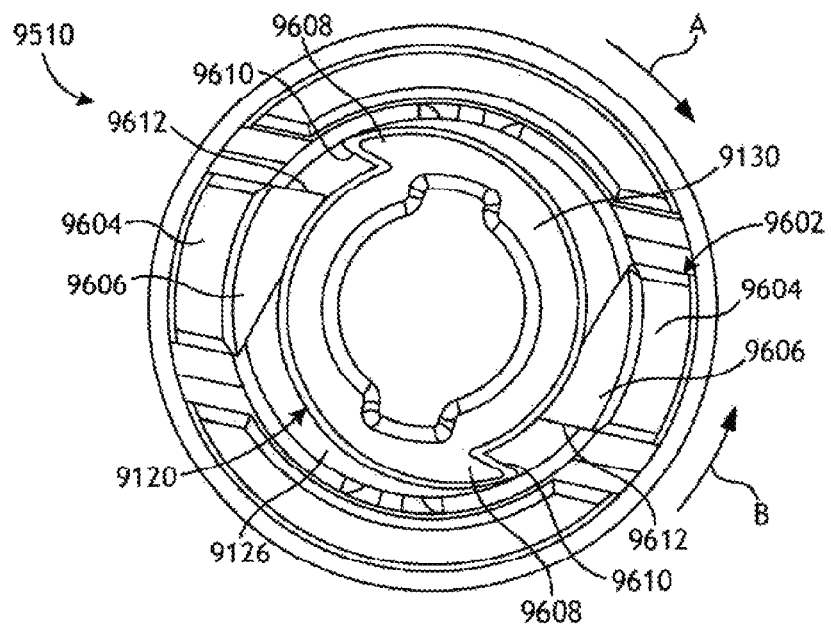

FIGS. 36A and 36B are perspective and top views, respectively, of the cap post 9510, according to one or more additional embodiments. In the illustrated depiction, a portion of the sensor cap 9120 is received within the cap post 9510 and, more specifically, the desiccant cap 9130 of the sensor cap 9120 is arranged within cap post 9510. The cap post 9510 may define a receiver feature 9602 configured to receive the engagement feature 9126 of the sensor cap 9120 upon coupling (e.g., threading) the applicator cap 9506 (FIG. 35B) to the sensor applicator 9502 (FIGS. 35A-35B). Upon removing the applicator cap 9506 from the sensor applicator 9502, however, the receiver feature 9602 may prevent the engagement feature 9126 from reversing direction and thus prevent the sensor cap 9120 from separating from the cap post 9510. Instead, removing the applicator cap 9506 from the sensor applicator 9502 will simultaneously detach the sensor cap 9120 from the sensor control device 9102 (FIGS. 31A-31B and 32A-32B), and thereby expose the distal portions of the sensor 9112 (FIGS. 32A-32B) and the sharp 9114 (FIGS. 32A-32B).

Many design variations of the receiver feature 9602 may be employed, without departing from the scope of the disclosure. In the illustrated embodiment, the receiver feature 9602 includes one or more compliant members 9604 (two shown) that are expandable or flexible to receive the engagement feature 9126. The engagement feature 9126 may comprise, for example, an enlarged head and the compliant member(s) 9604 may comprise a collet-type device that includes a plurality of compliant fingers configured to flex radially outward to receive the enlarged head.

The compliant member(s) 9604 may further provide or otherwise define corresponding ramped surfaces 9606 configured to interact with one or more opposing camming surfaces 9608 provided on the outer wall of the engagement feature 9126. The configuration and alignment of the ramped surface(s) 9606 and the opposing camming surface(s) 9608 is such that the applicator cap 9506 is able to rotate relative to the sensor cap 9120 in a first direction A (e.g., clockwise), but the cap post 9510 binds against the sensor cap 9120 when the applicator cap 9506 is rotated in a second direction B (e.g., counter clockwise). More particularly, as the applicator cap 9506 (and thus the cap post 9510) rotates in the first direction A, the camming surfaces 9608 engage the ramped surfaces 9606, which urge the compliant members 9604 to flex or otherwise deflect radially outward and results in a ratcheting effect. Rotating the applicator cap 9506 (and thus the cap post 9510) in the second direction B, however, will drive angled surfaces 9610 of the camming surfaces 9608 into opposing angled surfaces 9612 of the ramped surfaces 9606, which results in the sensor cap 9120 binding against the compliant member(s) 9604.

Figure 37:
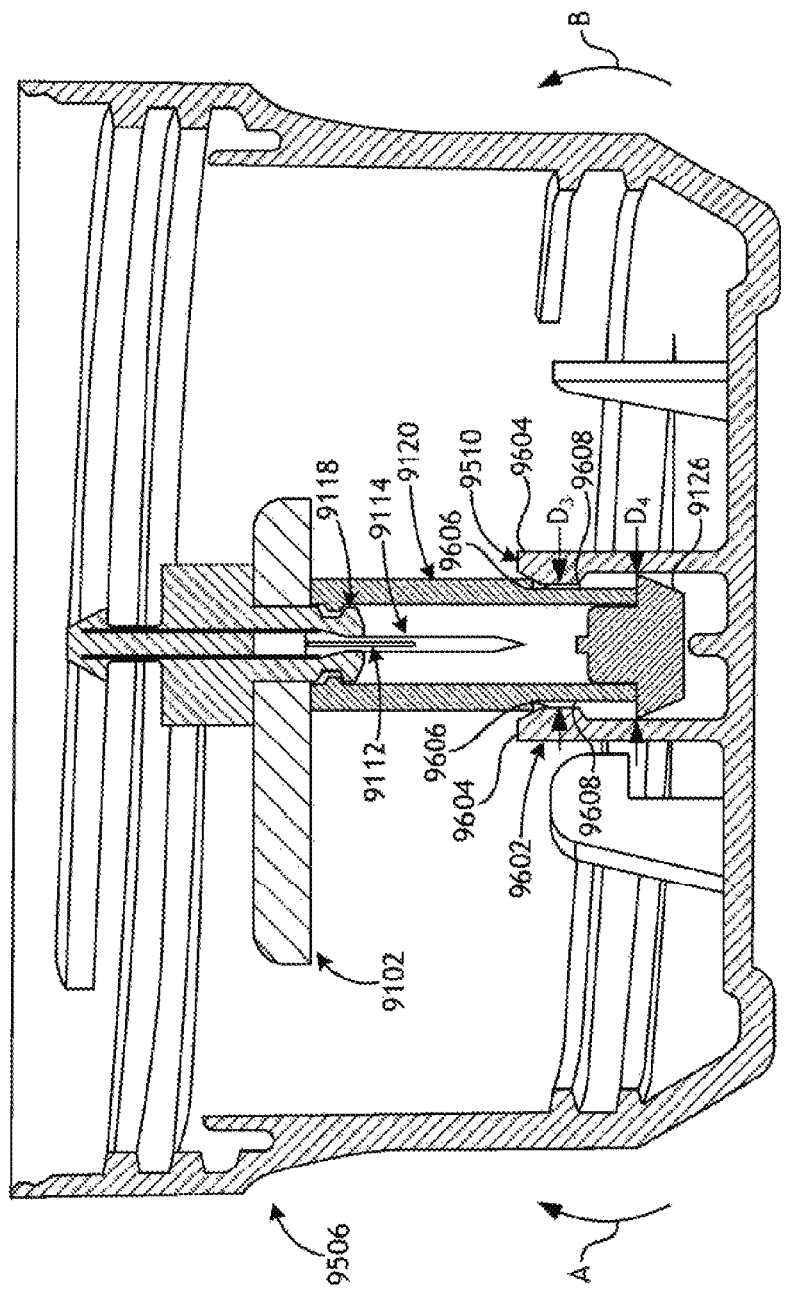
FIG. 37 is a cross-sectional side view of the sensor control device positioned within the applicator cap, according to one or more embodiments.

FIG. 37 is a cross-sectional side view of the sensor control device 9102 positioned within the applicator cap 9506, according to one or more embodiments. As illustrated, the opening to the receiver feature 9602 exhibits a first diameter D3, while the engagement feature 9126 of the sensor cap 9120 exhibits a second diameter D4 that is larger than the first diameter D3 and greater than the outer diameter of the remaining portions of the sensor cap 9120. As the sensor cap 9120 is extended into the cap post 9510, the compliant member(s) 9604 of the receiver feature 9602 may flex (expand) radially outward to receive the engagement feature 9126. In some embodiments, as illustrated, the engagement feature 9126 may provide or otherwise define an angled outer surface that helps bias the compliant member(s) 9604 radially outward. Once the engagement feature 9126 bypasses the receiver feature 9602, the compliant member(s) 9604 are able to flex back to (or towards) their natural state and thus lock the sensor cap 9120 within the cap post 9510.

As the applicator cap 9506 is threaded to (screwed onto) the housing 9504 (FIGS. 35A-35B) in the first direction A, the cap post 9510 correspondingly rotates in the same direction and the sensor cap 9120 is progressively introduced into the cap post 9510. As the cap post 9510 rotates, the ramped surfaces 9606 of the compliant members 9604 ratchet against the opposing camming surfaces 9608 of the sensor cap 9120. This continues until the applicator cap 9506 is fully threaded onto (screwed onto) the housing 9504. In some embodiments, the ratcheting action may occur over two full revolutions of the applicator cap 9506 before the applicator cap 9506 reaches its final position.

To remove the applicator cap 9506, the applicator cap 9506 is rotated in the second direction B, which correspondingly rotates the cap post 9510 in the same direction and causes the camming surfaces 9608 (i.e., the angled surfaces 9610 of FIGS. 36A-36B) to bind against the ramped surfaces 9606 (i.e., the angled surfaces 9612 of FIGS. 36A-36B). Consequently, continued rotation of the applicator cap 9506 in the second direction B causes the sensor cap 9120 to correspondingly rotate in the same direction and thereby unthread from the mating member 9118 to allow the sensor cap 9120 to detach from the sensor control device 9102. Detaching the sensor cap 9120 from the sensor control device 9102 exposes the distal portions of the sensor 9112 and the sharp 9114, and thus places the sensor control device 9102 in position for firing (use).

Figure 38A:
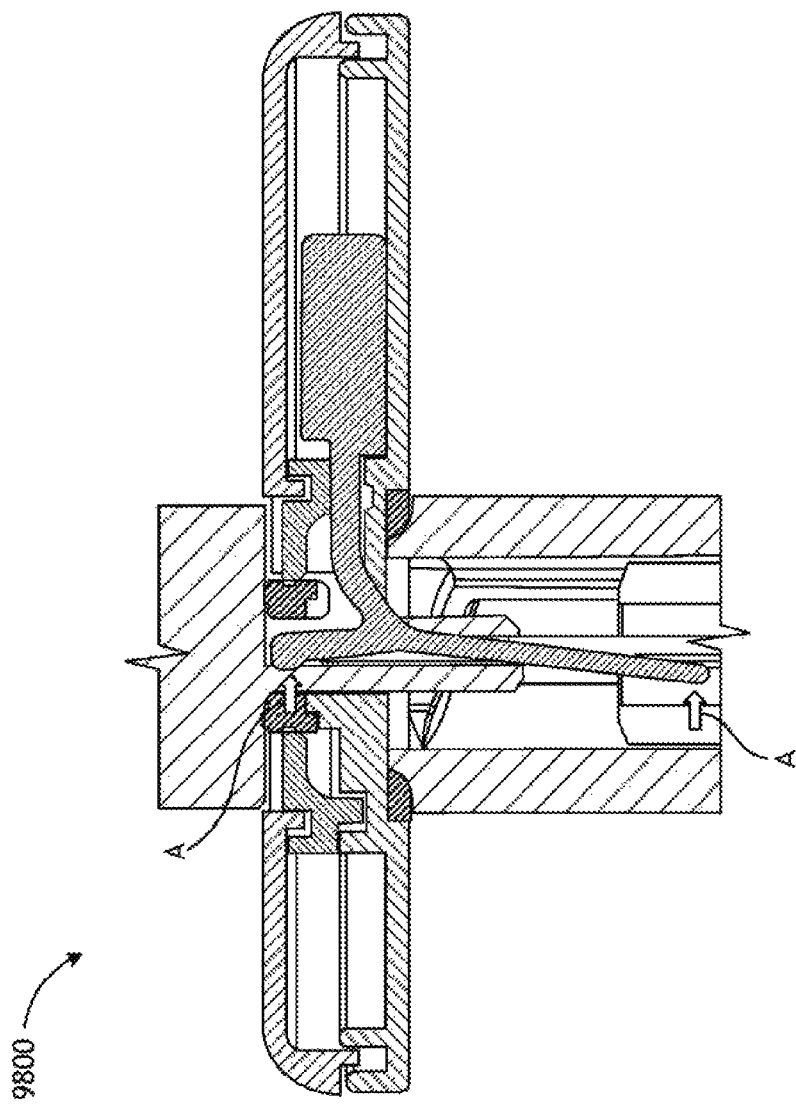
FIG. 38A is a cross-sectional view of a sensor control device showing example interaction between the sensor and the sharp.

FIG. 38A is a cross-sectional view of a sensor control device 9800 showing example interaction between the sensor and the sharp. After assembly of the sharp, the sensor should sit in a channel defined by the sharp. The sensor control device in FIG. 9 does not show the sensor deflected inwards and otherwise aligned fully with the sharp, but such may be the case upon full assembly as slight bias forces may be assumed by the sensor at the locations indicated by the two arrows A. Biasing the sensor against the sharp may be advantageous so that any relative motion between the sensor and the sharp during subcutaneous insertion does not expose the sensor tip (i.e., the tail) outside the sharp channel, which could potentially cause an insertion failure.

Figure 38C:
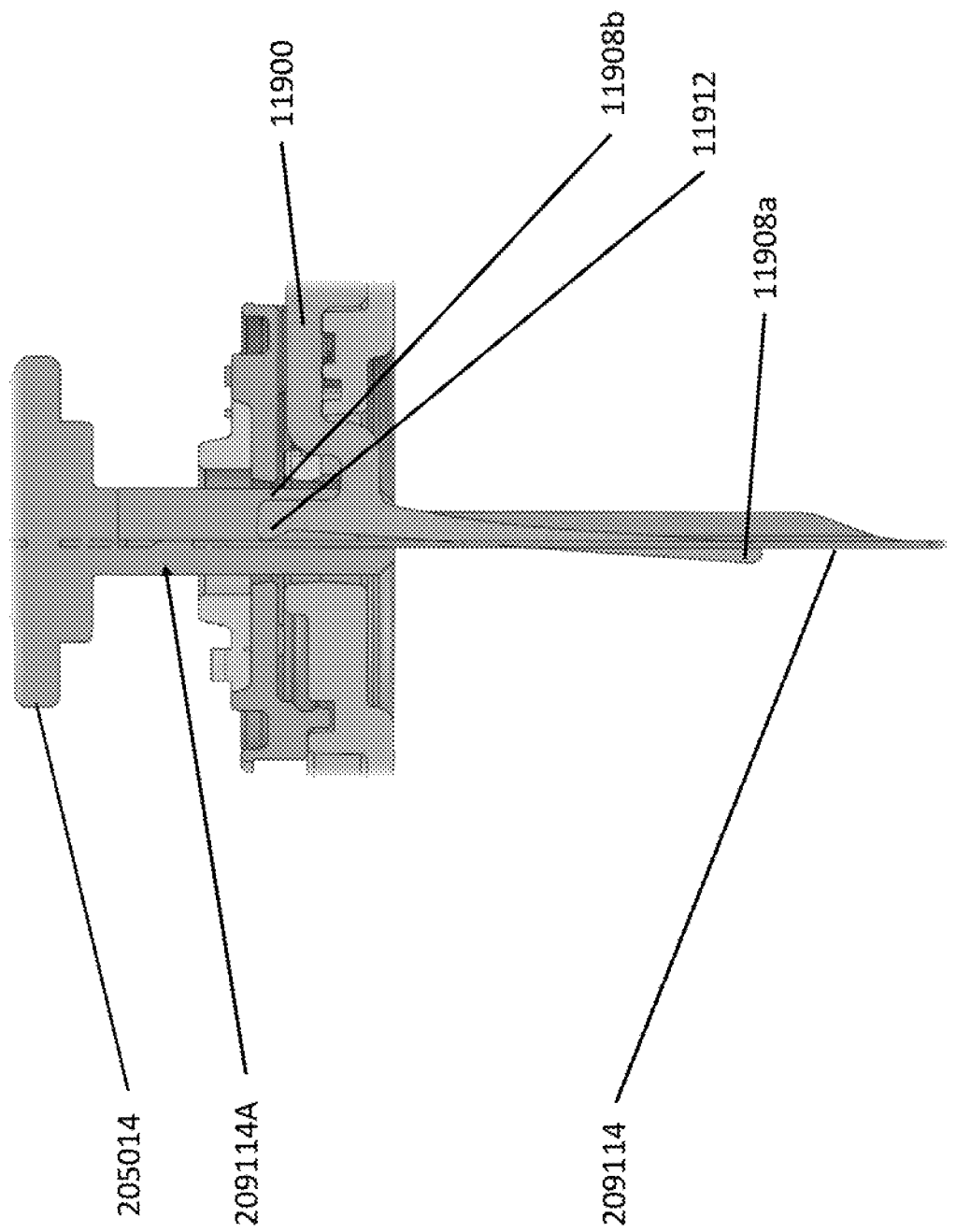
FIG. 38C is a side cross-sectional view of a sharp hub, sharp, and sensor, with the sensor in a biased position, in accordance with the disclosed subject matter.
Figure 38D:
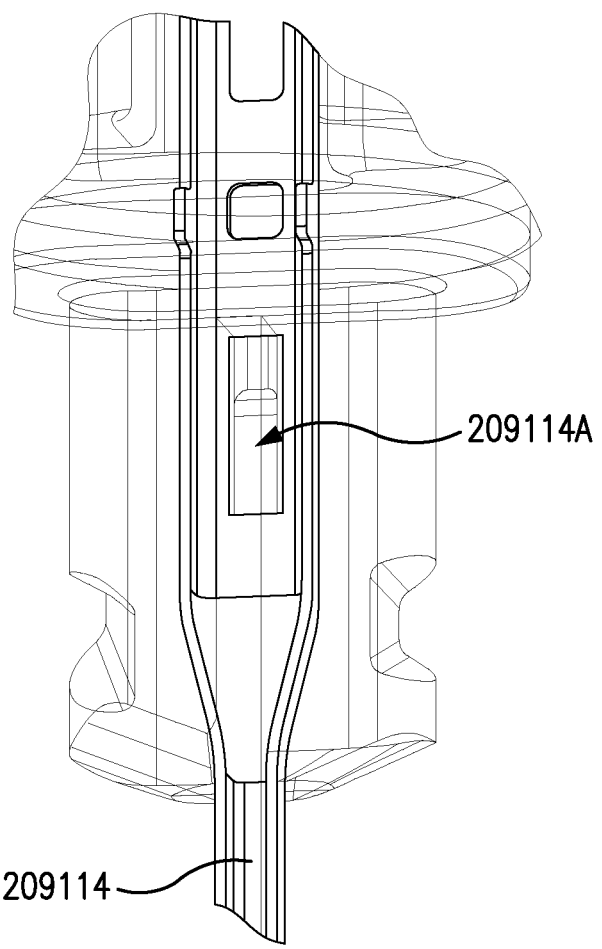
FIG. 38D is a closeup of a portion of a sharp in accordance with the disclosed subject matter.

FIGS. 38B-38D illustrates an exemplary sharp hub 205014 and sharp 209114 configured to not bias the sensor 11900 prior to delivery, for example, during shipping and storage (FIG. 15B) and bias the sensor 11900 during delivery of the sensor (FIG. 38C). By storing and shipping the sensor in the unbiased (relaxed or unstressed) position, the sensor can have increased shelf life and lower overall stress. Furthermore, by storing and shipping the sensor in the unbiased position, stress relaxation over shelf life can be reduced and therefore loss in bias force due to stress relaxation can be limited. Accordingly, bias forces during delivery of the sensor can more predictable and biasing during delivery can be as designed. The sharp 209114 can include a window 209114A. Prior to use, window 209114A can be aligned with protrusion 11912 on top end 11908b of the sensor 11900, and protrusion 11912 can extend through window 209114. In such a configuration, bottom end 11908a is not biased toward the sharp, and accordingly, sensor 11900 can be in a relaxed state. During firing, needle carrier 201102 can be partially retracted, thereby pulling sharp 209114 into a partially retracted position. Partial retraction can occur as the sheath 20704 initially moves proximally relative the sensor carrier 20710 during firing. Each sharp carrier lock arm 20710K of the sensor carrier 20710 (see FIG. 9D) can extend radially outward as the rib 20710M of the retention arm 20710L engages a respective slot 20704Q of sheath 20704 (see FIG. 8M) which can allow sharp carrier retention feature 20710L to clear the pre-partial retraction retention face 201102A and engage the post-partial retraction retention face 201102B of the sharp carrier 201102 (see FIG. 10C). In the partially retracted position, window 209114A no longer receives protrusion 11912, and sharp 209114 engages protrusion 11912 to thereby biases the bottom end 11908a toward the sharp 209114 and into a proper position for delivery, as described above.

FIGS. 45A-45K illustrate steps of an example process for manufacturing an applicator assembly (e.g., an applicator device 150). The applicator assembly includes an inserter 4200, on-body sensor puck assembly (e.g., a sensor control device 5002) coupled to a puck carrier 710 (e.g., sensor electronics carrier 710 of FIG. 4A or sensor carrier 5602 of FIGS. 21A-21C), a sheath 704, an applicator housing 702, and a cap 708.

Figure 45A:
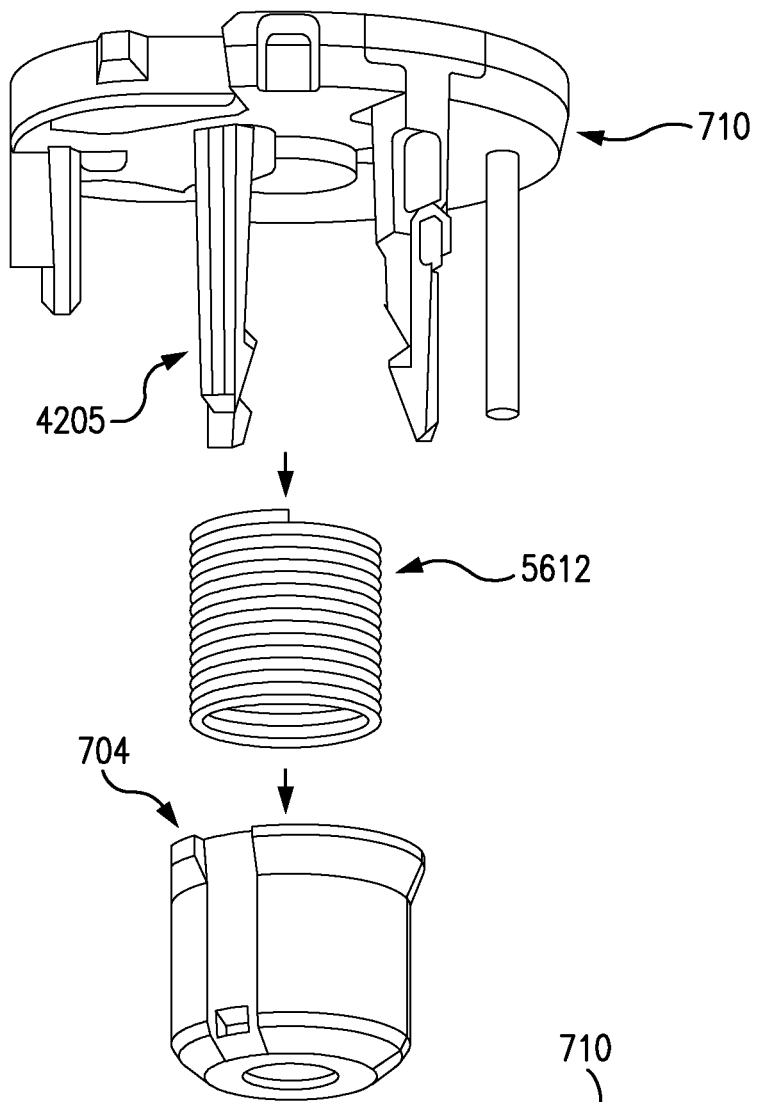
Figure 45B:
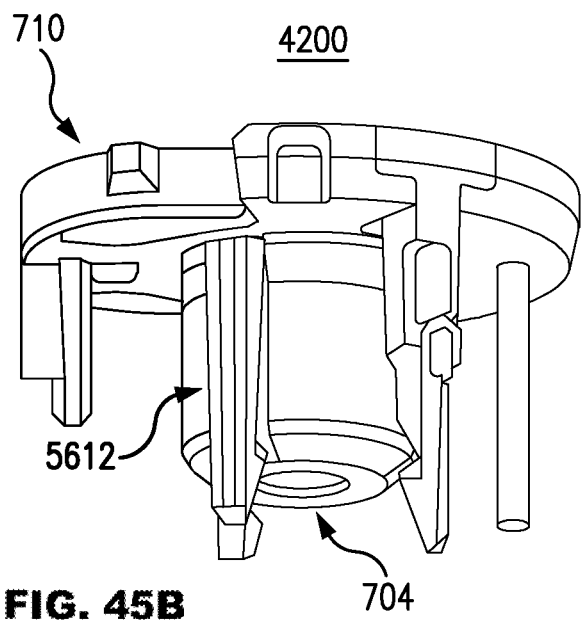

As illustrated in FIGS. 45A-45B, the manufacturing process includes assembling the inserter 4200 by loading a spring 5612 to a sharp carrier 704, lowering a puck carrier 710 to the sharp carrier 704 and compressing the spring 5612 until seated within the sharp carrier 704. The spring 5612 can be compressed manually or using a suitable compression tool, including, but not limited to a manually-operated or robotic loading arm, vacuum or suction gripping arm, magnetic gripping arm, adaptive gripping arm or appendage, pneumatic guided actuator or servo actuator, or other suitable tool. After the spring 5612 is compressed, the process involves locking one or more retention features 4205 of the puck carrier 710 with the sharp carrier 704 to retrain spring compression. The locking may be performed while clamping the puck carrier 710 to the sharp carrier 704 using any suitable clamping mechanism.

Figure 45E:
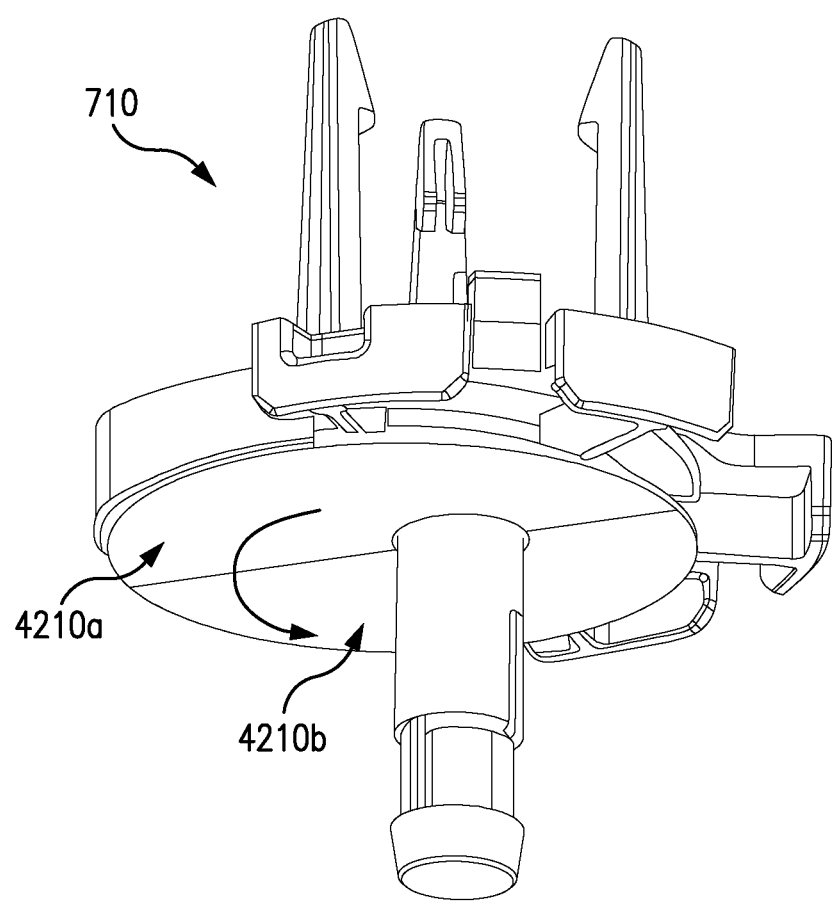
Figure 45F:
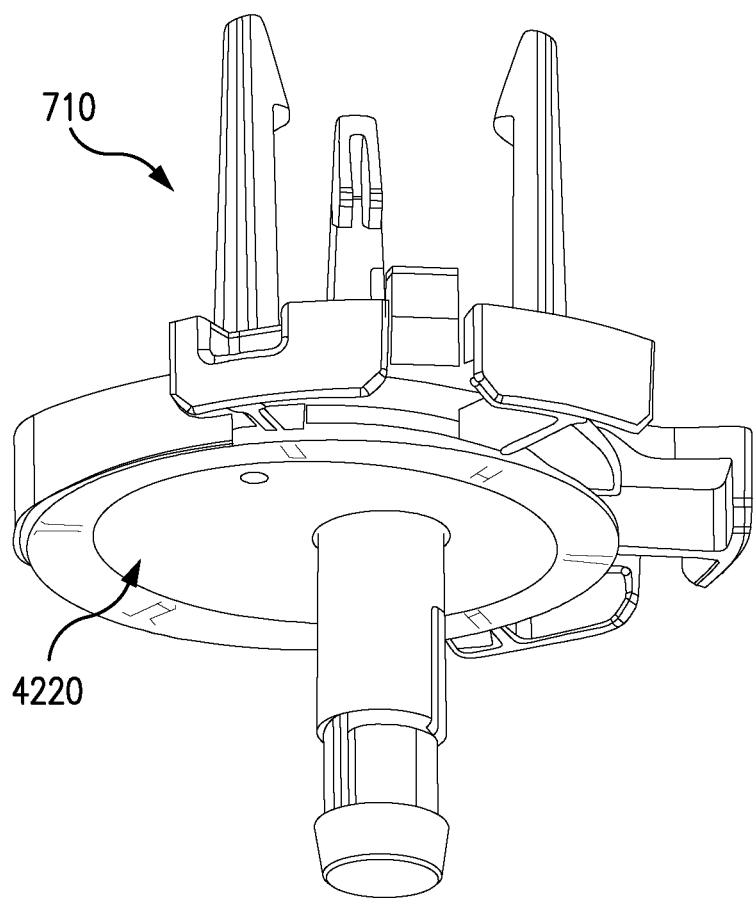

As illustrated in FIG. 45C, the manufacturing process can include coupling the on-body sensor puck assembly 5002 to the puck carrier 710. For example, mount retention features of the can be aligned with arms of the puck carrier 710 and the puck assembly 5002 can be advanced until it snaps into place. As illustrated in FIG. 45D, the manufacturing process can include applying an adhesive patch 105 (or adhesive patch 9110) to the on-body sensor puck assembly or to the puck carrier. The adhesive patch can be applied manually, or using a gripping or applicator machine tooling, vacuum or suction gripping arm, magnetic gripping arm, adaptive gripping arm or appendage, pneumatic guided actuator or servo actuator, or other suitable tool. Prior to applying the adhesive patch, the on-body sensor puck assembly (including puck carrier) and adhesive patch can be loaded into suitable holding tool. The adhesive patch can be configured to fit the contours and components of the on-body sensor puck assembly, for example, the adhesive patch can include a hold to accommodate the sharp cap. The adhesive patch can be aligned with the on-body sensor puck assembly (for example, manually, using optically-guided alignment arms, a spring-loaded alignment tool, etc.) and lowered onto the on-body sensor puck assembly manually or using suitable machine tooling, as described herein. Once the adhesive patch 105 is applied to the on-body sensor puck assembly 5002 or puck carrier 710, as illustrated in FIGS. 45E and 45F, the manufacturing process can include removing tabs 4210a and 4210b of the adhesive patch 105 to expose a side 4220 of the adhesive patch 150 that will attach, for example, to the body of a wearer, for example by securing an exposed corner of the liner and peeling from the patch manually or using automated equipment.

As illustrated in FIG. 45G, the manufacturing process can include attaching a sheath 704 to the puck carrier 710. Attaching the sheath the puck carrier can include loading the sheath into a fixture nest (not illustrated) and lowering the puck carrier 710 with compressed spring into the sheath 704. The manufacturing process can further include attaching the sheath 704 to the applicator housing 708. Attaching the sheath 704 to the applicator housing 708 can include loading the applicator housing 708 into a fixture nest (not illustrated) and engaging an alignment rib of the applicator housing 708 with a notch in the fixture nest. Then, the sheath 704 is lowered onto the applicator housing 708 until it engages the alignment rib of the applicator housing 708. The sheath 704 and puck carrier 710 can be manipulated manually or using suitable machine tooling, e.g., pneumatic guided actuator, to forcibly attach the components, as described herein.

As illustrated in FIG. 45H, the manufacturing process can include loading a desiccant 502 into the cap 702. The desiccant 502 can be used to control moisture exposure of the on-body sensor puck assembly 5002 and adhesive patch 105. The desiccant can be loaded manually or using suitable tooling such as a manually-operated or robotic loading arm, vacuum or suction gripping arm, magnetic gripping arm, adaptive gripping arm or appendage, pneumatic guided actuator, or other suitable tool.

Figure 45J:
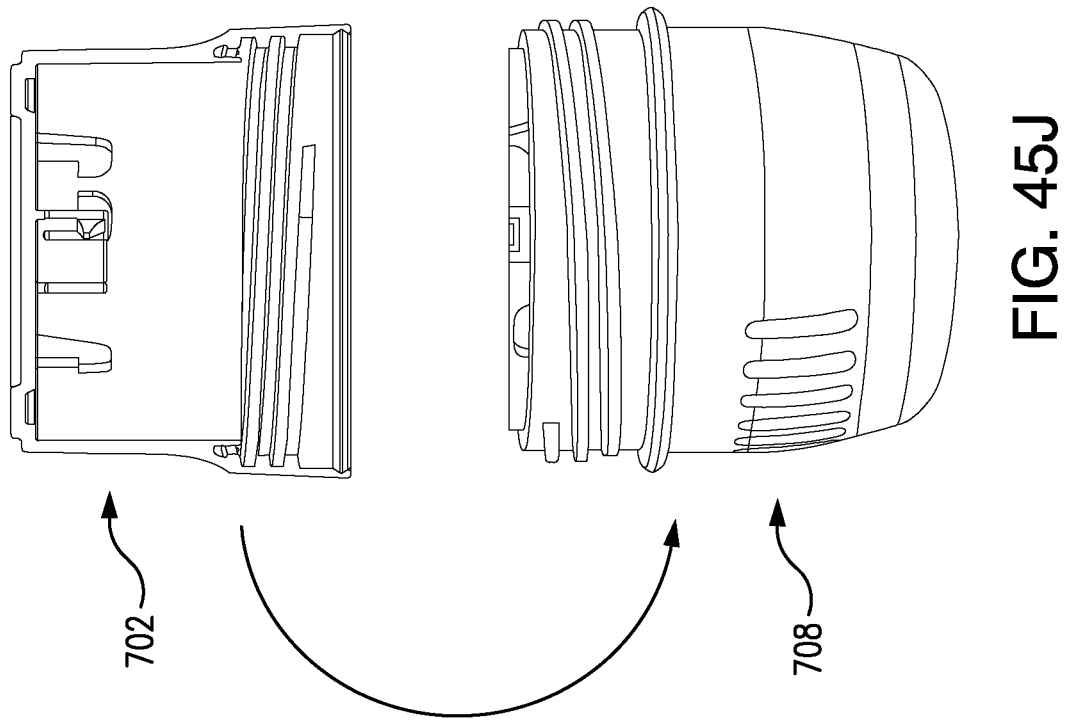
Figure 45I:
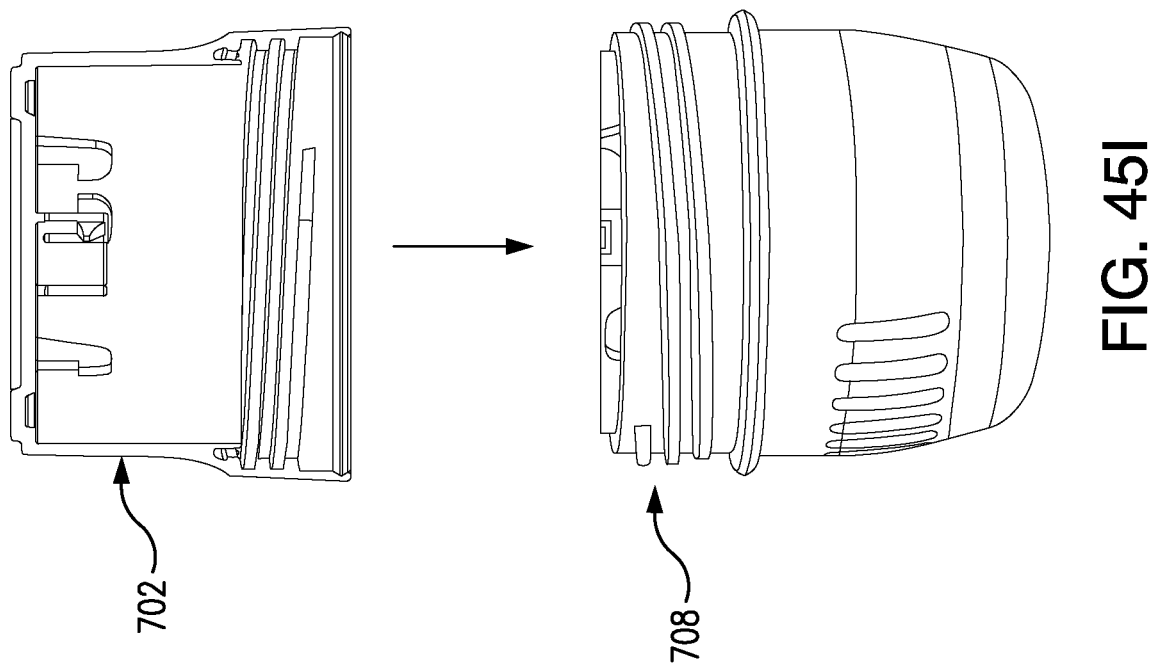

As illustrated in FIG. 45I, the manufacturing process can include coupling the cap 702 to the applicator housing 708. Coupling the cap 702 to the applicator housing 708 can include lowering the cap 702 onto the applicator housing 708. As illustrated in FIG. 45J, coupling the cap 702 to the applicator housing 708 can include lowering the cap 702 onto the applicator housing 708 and screwing the cap 702 to the applicator housing 708 to a pre-determined torque. The cap 702 can be screwed to the applicator housing 708 manually or using suitable automation tooling, for example, a servo rotary actuator can be used to rotate the cap 702 to a suitable motor torque.

Figure 45K:
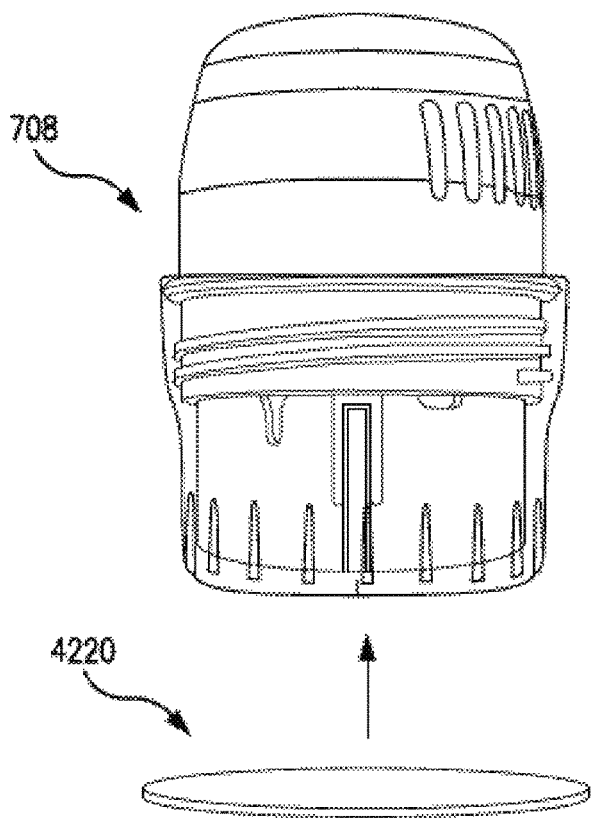

In particular embodiments, a tamper-evident sticker or other method of detecting that the applicator housing 702 has been opened can be applied to the interior or exterior of the applicator housing 708. As illustrated in FIG. 45K, the manufacturing process can include applying a label 4220 to the exterior of the assembled applicator housing 708.

Embodiments disclosed herein include:

D. A sensor control device that includes an electronics housing including a shell that defines a first aperture and a mount that defines a second aperture alignable with the first aperture when the shell is coupled to the mount, a seal overmolded onto the mount at the second aperture and comprising a first seal element overmolded onto a pedestal protruding from an inner surface of the mount, and a second seal element interconnected with the first seal element and overmolded onto a bottom of the mount, a sensor arranged within the electronics housing and having a tail extending through the second aperture and past the bottom of the mount, and a sharp that extends through the first and second apertures and past the bottom of the electronics housing.

E. An assembly that includes a sensor applicator, a sensor control device positioned within the sensor applicator and including an electronics housing including a shell that defines a first aperture and a mount that defines a second aperture alignable with the first aperture when the shell is mated to the mount, a seal overmolded onto the mount at the second aperture and comprising a first seal element overmolded onto a pedestal protruding from an inner surface of the mount, and a second seal element interconnected with the first seal element and overmolded onto a bottom of the mount, a sensor arranged within the electronics housing and having a tail extending through the second aperture and past the bottom of the mount, and a sharp that extends through the first and second apertures and past the bottom of the electronics housing. The assembly further including a sensor cap removably coupled to the sensor control device at the bottom of the mount and defining a sealed inner chamber that receives the tail and the sharp, and an applicator cap coupled to the sensor applicator.

Each of embodiments D and E may have one or more of the following additional elements in any combination: Element 1: wherein the mount comprises a first injection molded part molded in a first shot, and the seal comprises a second injection molded part overmolded onto the first injection molded part in a second shot. Element 2: further comprising a sharp hub that carries the sharp and sealingly engages the first seal element, and a sensor cap removably coupled to the sharp hub at the bottom of the mount and sealingly engaging the second seal element, wherein the sensor cap defines an inner chamber that receives the tail and the sharp. Element 3: wherein the sharp hub provides a mating member that extends past the bottom of the mount and the sensor cap is removably coupled to the mating member. Element 4: further comprising one or more pockets defined on the bottom of the mount at the second aperture, and one or more projections defined on an end of the sensor cap and receivable within the one or more pockets when the sensor cap is coupled to the sharp hub. Element 5: further comprising a collar positioned within the electronics housing and defining a central aperture that receives and sealingly engages the first seal element in a radial direction. Element 6: further comprising a channel defined on the inner surface of the mount and circumscribing the pedestal, an annular lip defined on an underside of the collar and matable with the channel, and an adhesive provided in the channel to secure and seal the collar to the mount at the channel. Element 7: further comprising a groove defined through the annular lip to accommodate a portion of the sensor extending laterally within the mount, wherein the adhesive seals about the sensor at the groove. Element 8: further comprising a collar channel defined on an upper surface of the collar, an annular ridge defined on an inner surface of the shell and matable with the collar channel, and an adhesive provided in the collar channel to secure and seal the shell to the collar. Element 9: wherein one or both of the first and second seal elements define at least a portion of the second aperture. Element 10: wherein the first seal element extends at least partially through the first aperture when the shell is coupled to the mount.

Element 11: wherein the sensor control device further includes a sharp hub that carries the sharp and sealingly engages the first seal element, and wherein the sensor cap is removably coupled to the sharp hub at the bottom of the mount and sealingly engages the second seal element. Element 12: wherein the sensor control device further includes one or more pockets defined on the bottom of the mount at the second aperture, and one or more projections defined on an end of the sensor cap and receivable within the one or more pockets when the sensor cap is coupled to the sharp hub. Element 13: wherein the sensor control device further includes a collar positioned within the electronics housing and defining a central aperture that receives and sealingly engages the first seal element in a radial direction. Element 14: wherein the sensor control device further includes a channel defined on the inner surface of the mount and circumscribing the pedestal, an annular lip defined on an underside of the collar and matable with the channel, and an adhesive provided in the channel to secure and seal the collar to the mount at the channel. Element 15: wherein the sensor control device further includes a groove defined through the annular lip to accommodate a portion of the sensor extending laterally within the mount, and wherein the adhesive seals about the sensor at the groove. Element 16: wherein the sensor control device further includes a collar channel defined on an upper surface of the collar, an annular ridge defined on an inner surface of the shell and matable with the collar channel, and an adhesive provided in the collar channel to secure and seal the shell to the collar. Element 17: wherein one or both of the first and second seal elements define at least a portion of the second aperture. Element 18: wherein the first seal element extends at least partially through the first aperture.

By way of non-limiting example, exemplary combinations applicable to D and E include: Element 2 with Element 3; Element 2 with Element 4; Element 5 with Element 6; Element 6 with Element 7; Element 5 with Element 8; Element 11 with Element 12; Element 13 with Element 14; Element 14 with Element 15; and Element 13 with Element 16.

Exemplary Firing Mechanism of One-Piece and Two-Piece Applicators

FIGS. 39A-39F illustrate example details of embodiments of the internal device mechanics of "firing" the applicator 216 to apply sensor control device 222 to a user and including retracting sharp 1030 safely back into used applicator 216. All together, these drawings represent an example sequence of driving sharp 1030 (supporting a sensor coupled to sensor control device 222) into the skin of a user, withdrawing the sharp while leaving the sensor behind in operative contact with interstitial fluid of the user, and adhering the sensor control device to the skin of the user with an adhesive. Modification of such activity for use with the alternative applicator assembly embodiments and components can be appreciated in reference to the same by those with skill in the art. Moreover, applicator 216 may be a sensor applicator having one-piece architecture or a two-piece architecture as disclosed herein.

Figure 39A:
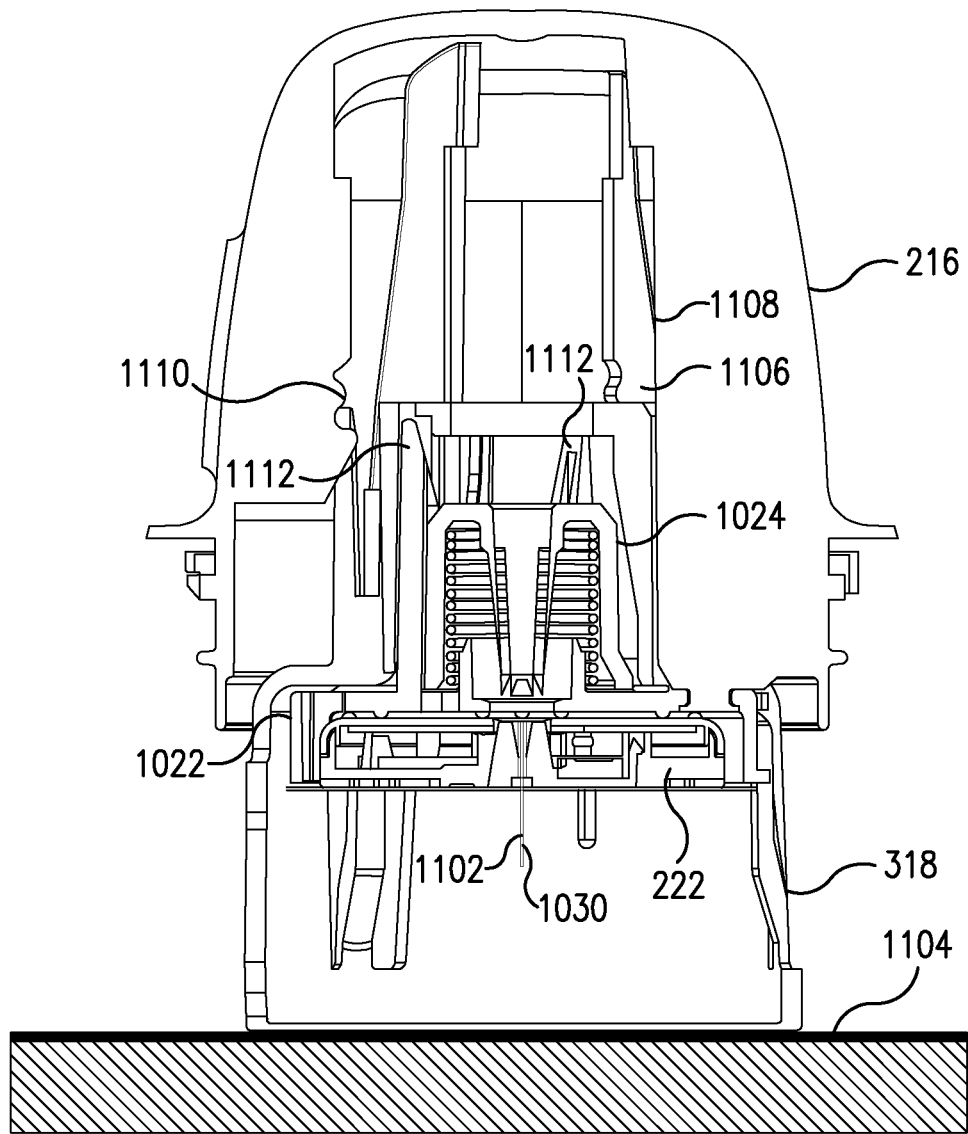
FIGS. 39A-39F illustrate cross-sectional views depicting an example embodiment of an applicator during a stage of deployment.

Turning now to FIG. 39A, a sensor 1102 is supported within sharp 1030, just above the skin 1104 of the user. Rails 1106 (optionally three of them) of an upper guide section 1108 may be provided to control applicator 216 motion relative to sheath 318. The sheath 318 is held by detent features 1110 within the applicator 216 such that appropriate downward force along the longitudinal axis of the applicator 216 will cause the resistance provided by the detent features 1110 to be overcome so that sharp 1030 and sensor control device 222 can translate along the longitudinal axis into (and onto) skin 1104 of the user. In addition, catch arms 1112 of sensor carrier 1022 engage the sharp retraction assembly 1024 to maintain the sharp 1030 in a position relative to the sensor control device 222.

Figure 39B:
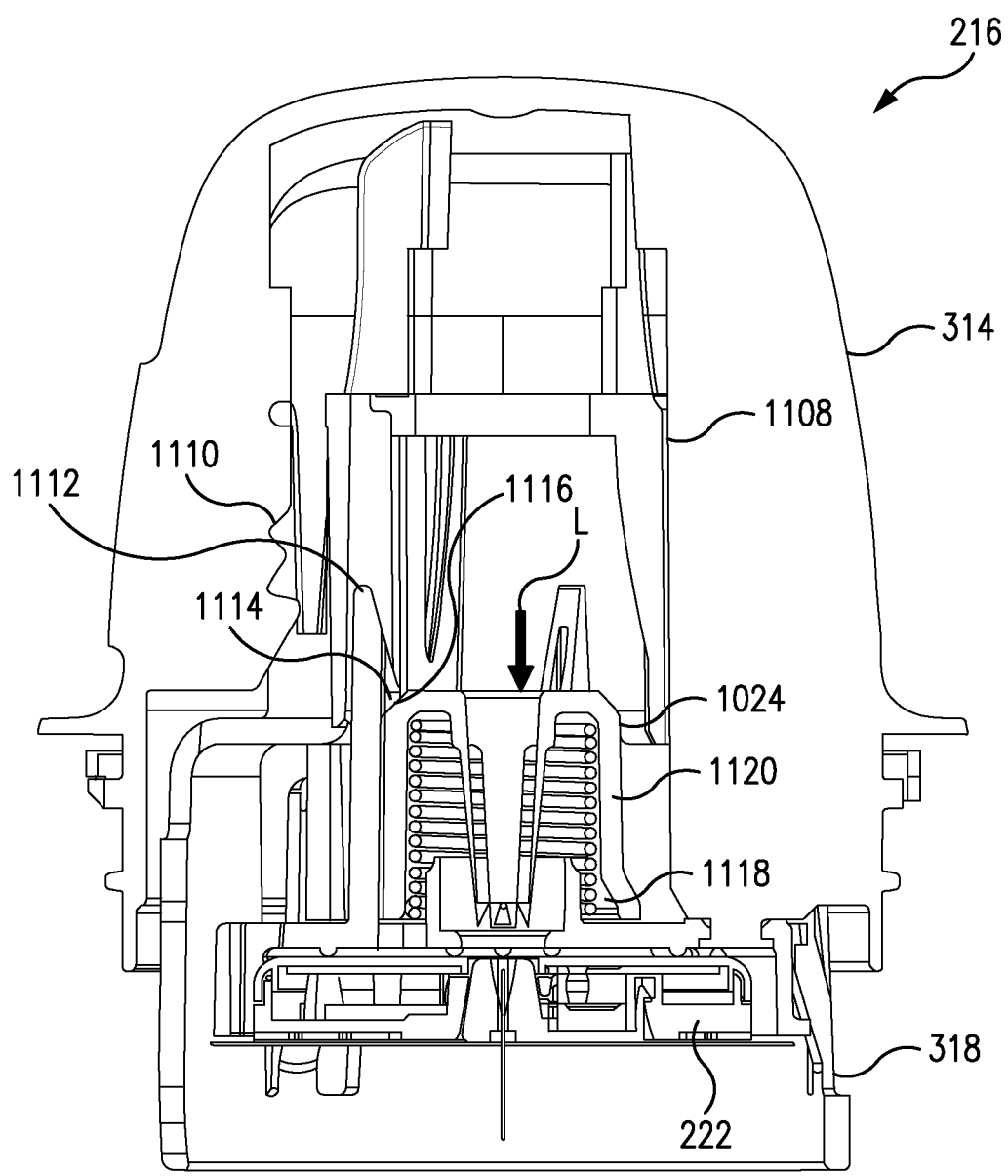

In FIG. 39B, user force is applied to overcome or override detent features 1110 and sheath 318 collapses into housing 314 driving the sensor control device 222 (with associated parts) to translate down as indicated by the arrow L along the longitudinal axis. An inner diameter of the upper guide section 1108 of the sheath 318 constrains the position of carrier arms 1112 through the full stroke of the sensor/sharp insertion process. The retention of the stop surfaces 1114 of carrier arms 1112 against the complimentary faces 1116 of the sharp retraction assembly 1024 maintains the position of the members with return spring 1118 fully energized. According to embodiments, rather than employing user force to drive the sensor control device 222 to translate down as indicated by the arrow L along the longitudinal axis, housing 314 can include a button (for example, not limitation, a push button) which activates a drive spring (for example, not limitation, a coil spring) to drive the sensor control device 222.

Figure 39C:
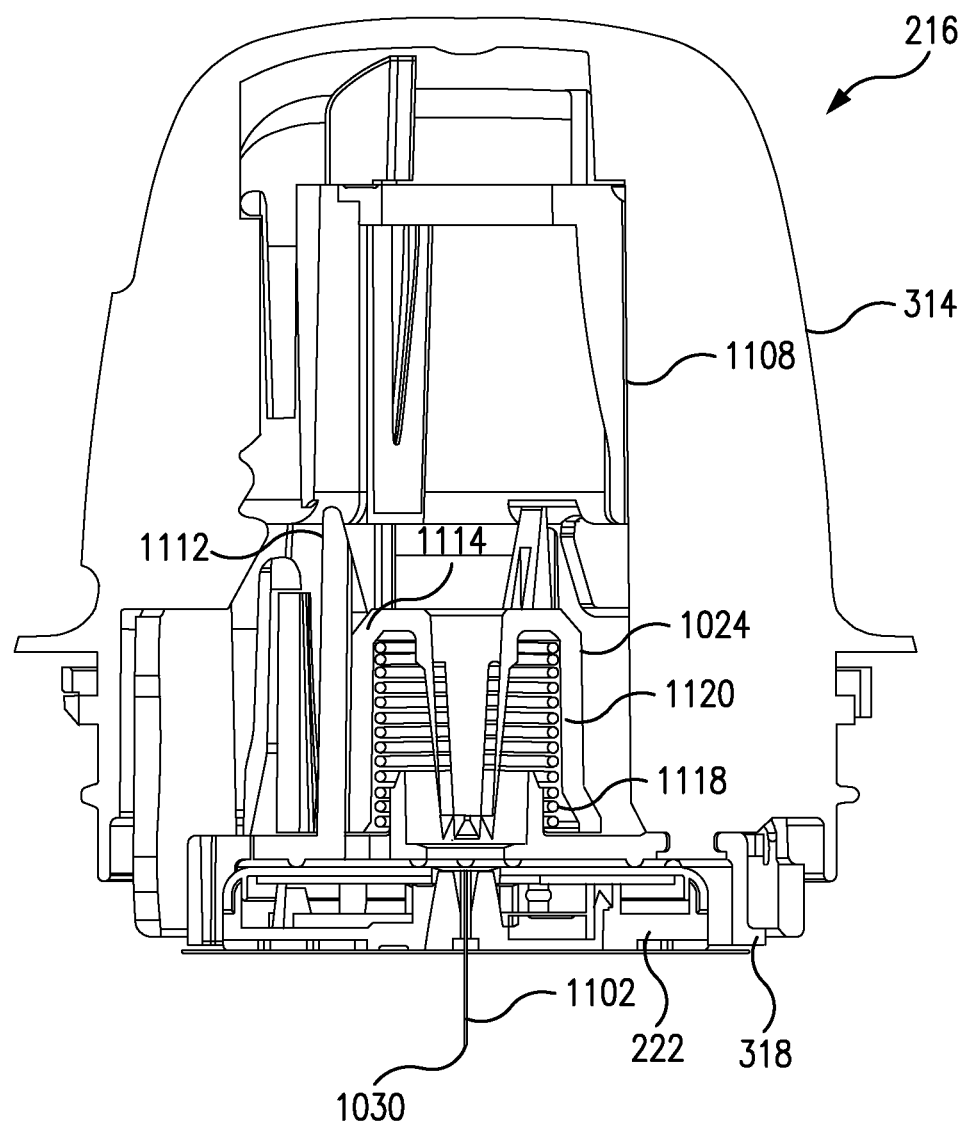
Figure 39D:
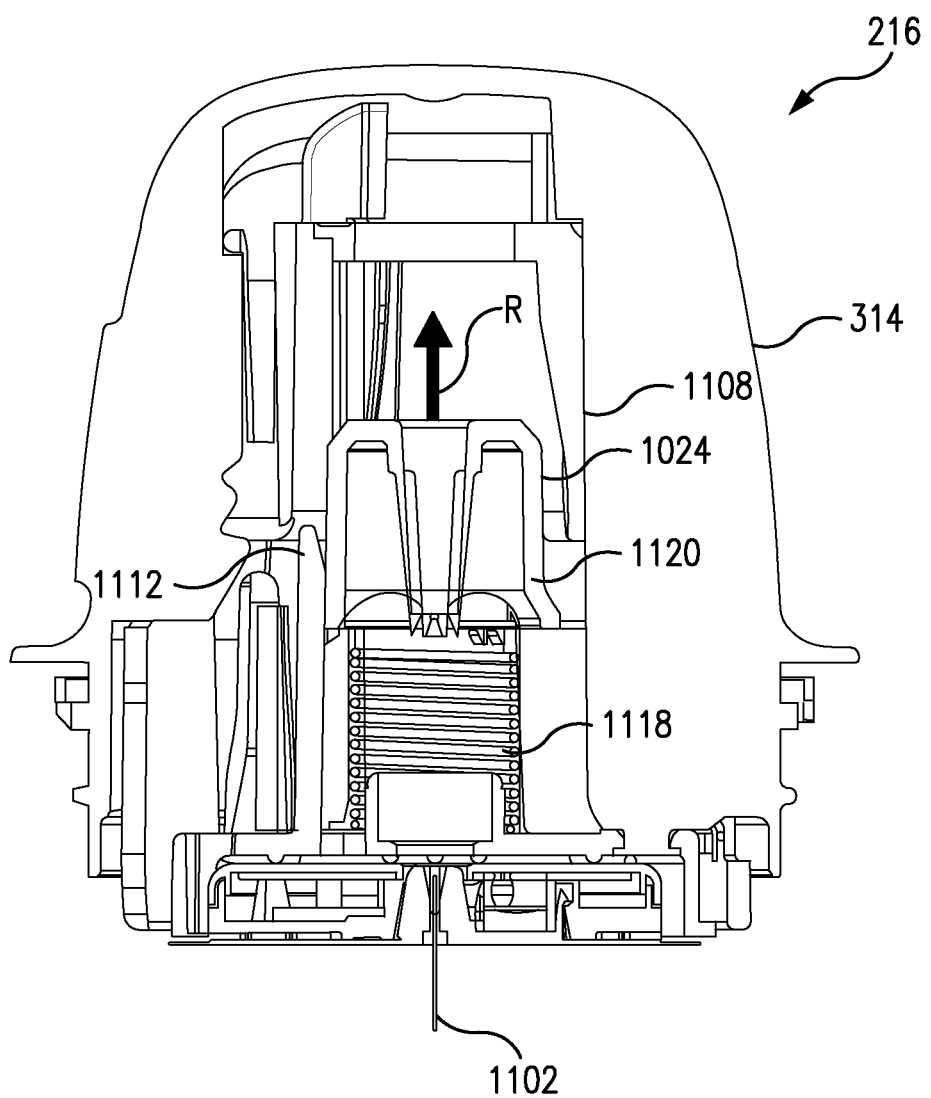

In FIG. 39C, sensor 1102 and sharp 1030 have reached full insertion depth. In so doing, the carrier arms 1112 clear the upper guide section 1108 inner diameter. Then, the compressed force of the coil return spring 1118 drives angled stop surfaces 1114 radially outward, releasing force to drive the sharp carrier 1102 of the sharp retraction assembly 1024 to pull the (slotted or otherwise configured) sharp 1030 out of the user and off of the sensor 1102 as indicated by the arrow R in FIG. 39D.

Figure 39E:
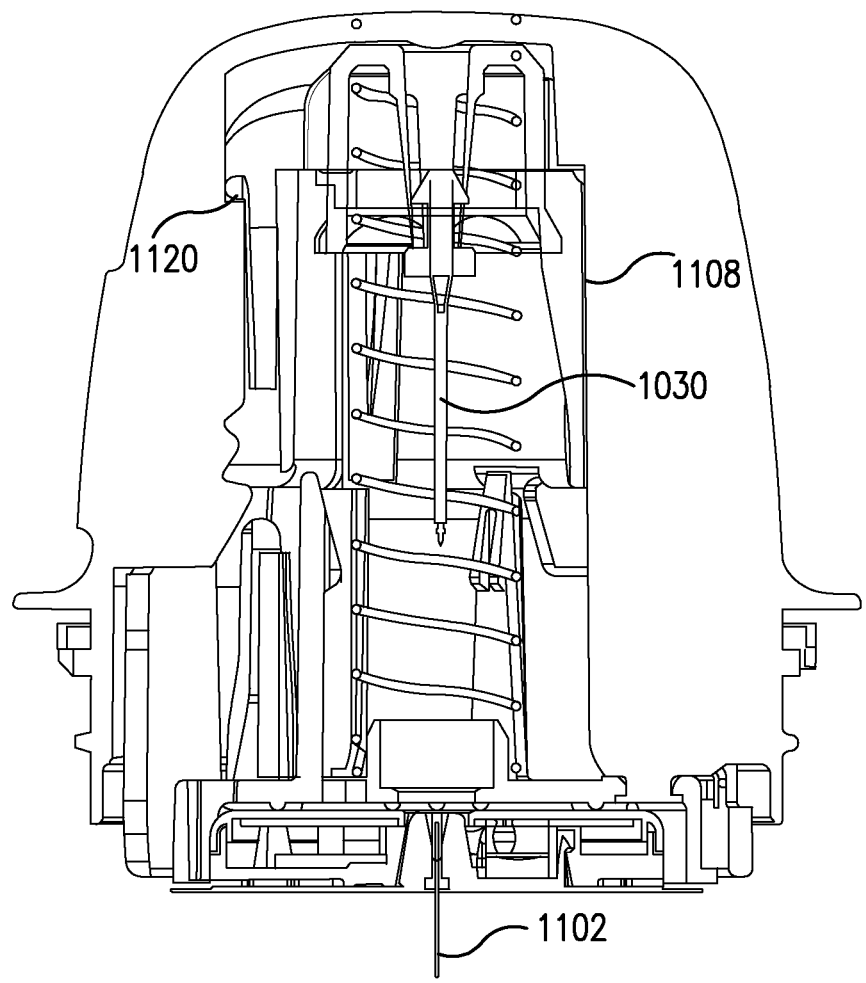
Figure 39F:
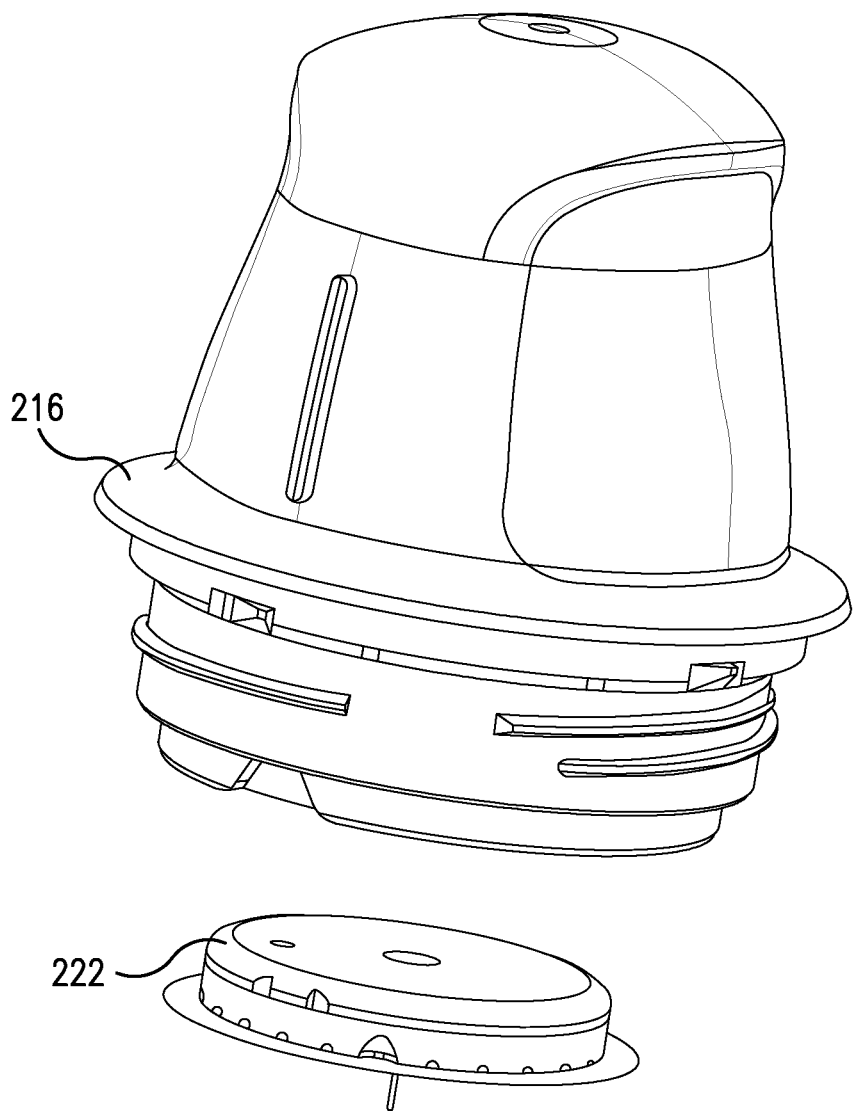

With the sharp 1030 fully retracted as shown in FIG. 39E, the upper guide section 1108 of the sheath 318 is set with a final locking feature 1120. As shown in FIG. 39F, the spent applicator assembly 216 is removed from the insertion site, leaving behind the sensor control device 222, and with the sharp 1030 secured safely inside the applicator assembly 216. The spent applicator assembly 216 is now ready for disposal.

Operation of the applicator 216 when applying the sensor control device 222 is designed to provide the user with a sensation that both the insertion and retraction of the sharp 1030 is performed automatically by the internal mechanisms of the applicator 216. In other words, the present invention avoids the user experiencing the sensation that he is manually driving the sharp 1030 into his skin. Thus, once the user applies sufficient force to overcome the resistance from the detent features of the applicator 216, the resulting actions of the applicator 216 are perceived to be an automated response to the applicator being "triggered." The user does not perceive that he is supplying additional force to drive the sharp 1030 to pierce his skin despite that all the driving force is provided by the user and no additional biasing/driving means are used to insert the sharp 1030. As detailed above in FIG. 39C, the retraction of the sharp 1030 is automated by the coil return spring 1118 of the applicator 216.

Exemplary Adhesive Patch for Improved Drainage and Breathability From Under Electronics Housing FIGS. 40A-40C, 41, and 42A-42C illustrate details of exemplary embodiments of an adhesive patch 9110, which can be similar to the adhesive patch 105 of FIG. 1. As illustrated, the sensor control device 9102 includes an electronics housing 9104, which can be generally disc-shaped. The electronics housing 9104 includes a shell 9106 and a mount 9108 that is matable with the shell 9106. The shell defines a top surface of the electronics housing 9104. The sensor control device can have any of the features described herein above. The exemplary adhesive patch can be arranged at the bottom of the electronics housing 9104. The adhesive patch can thus adhere the sensor control device 9102 to the user's skin for use.

Figure 40A:
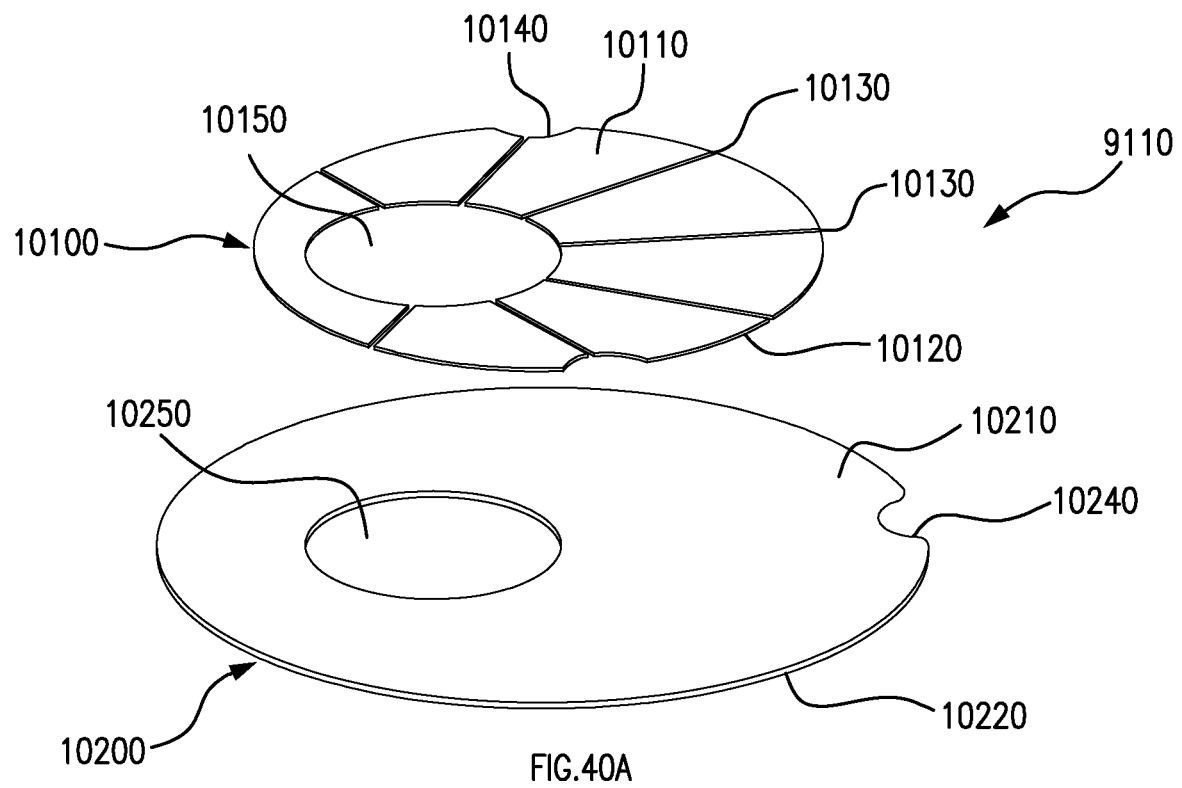
FIG. 40A is an exploded isometric top view of an exemplary adhesive patch.
Figure 40B:
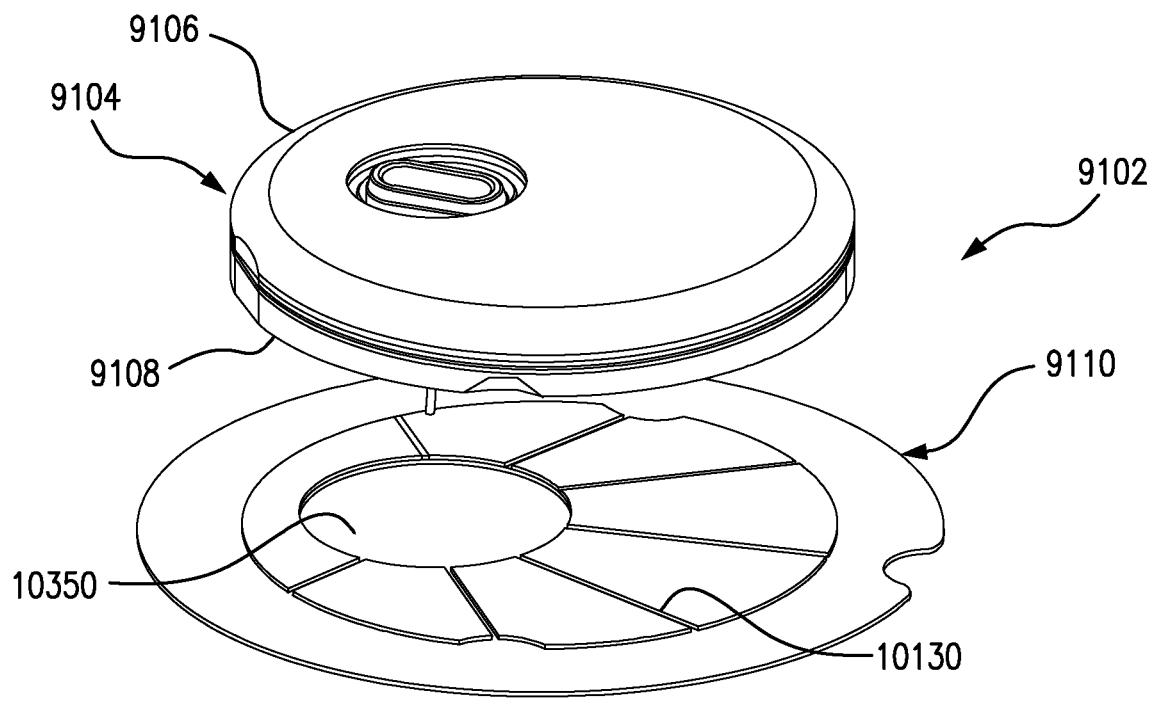
FIG. 40B is a top view of the exemplary adhesive patch and example sensor control device, according to one or more embodiments of the present disclosure.
Figure 41:
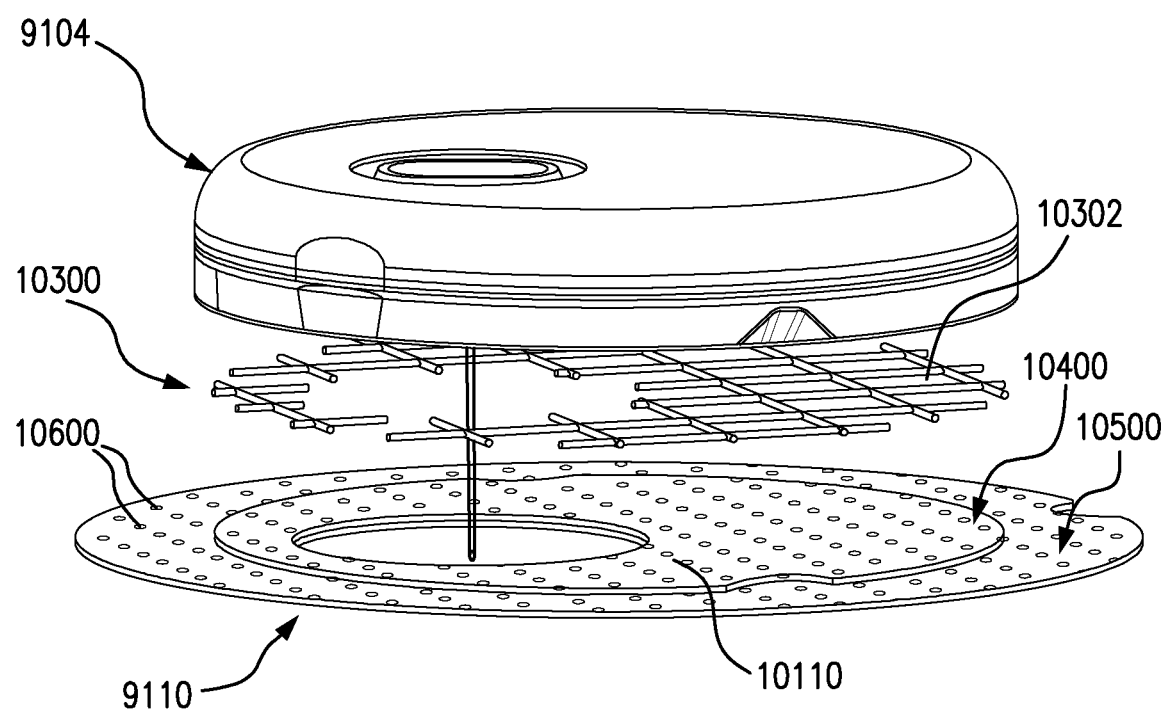
FIG. 41 is an isometric view of another exemplary adhesive patch and example sensor control device, according to one or more embodiments of the present disclosure.

Exemplary adhesive patch 9110 as shown in FIGS. 40A-40B can be used with electronics housing 9104 having mount 9108, wherein the underside of the alternatively shaped mount 9108 can be generally smooth. In some embodiments, the underside of mount can be entirely smooth and lack external grooves, protrusions, or other three-dimensional surface features. In FIGS. 40A-40B and FIG. 41, the smooth underside of mount 9108 serves to substantially lessen the overall thickness of mount 9108, which provides a benefit of contributing to an overall reduced height of the sensor control device.

In some embodiments, exemplary adhesive patch 9110 of FIGS. 40A-40B comprises a first layer 10100 and a second layer 10200, wherein the first layer 10100 faces the underside of mount 9108, and the second layer 10200 is configured to face and contact the skin of a patient. For example, exemplary adhesive patch 9110 of FIGS. 40A-40B can be manufactured from two rolls of tape, wherein a first roll of tape forms the first layer 10100 and a second roll of tape forms the second layer 10200.

The first roll of tape, and hence the first layer 10100, forms a sensor control device adhesive layer. First layer 10100, or sensor control device adhesive layer, can comprise three films: (i) a synthetic rubber adhesive blend 10101, (ii) a scrim 10102, and (iii) an acrylic adhesive 10103. The synthetic rubber adhesive blend 10101 forms a top surface 10110 of the first layer 10100, and serves to adhere the top surface 10110 of the first layer 10100 directly to a smooth underside of mount 9108. Thus, the synthetic rubber adhesive blend 10101 forms the top surface of the first layer 10100 of FIGS. 40A-40B thereby fixing the entire adhesive patch 9110 to the electronics housing 9104. The scrim 10102 can be a gauze or textile, and is sandwiched between the synthetic rubber adhesive blend 10101 of the top surface 10110 and the acrylic adhesive 10103 of a bottom surface 10120 of the first layer. The acrylic adhesive 10103 forms the bottom surface 10120 of the first layer 10100 and serves to adhere the bottom surface 10120 of the first layer 10100 directly to second layer 10200. The three films of the first layer 10100 are sandwiched together to create the first layer. First aperture 10150 is formed through all three films of the first layer 10100 using laser cutting, die cutting, or other means known to those skilled in the art.

Figure 40C:
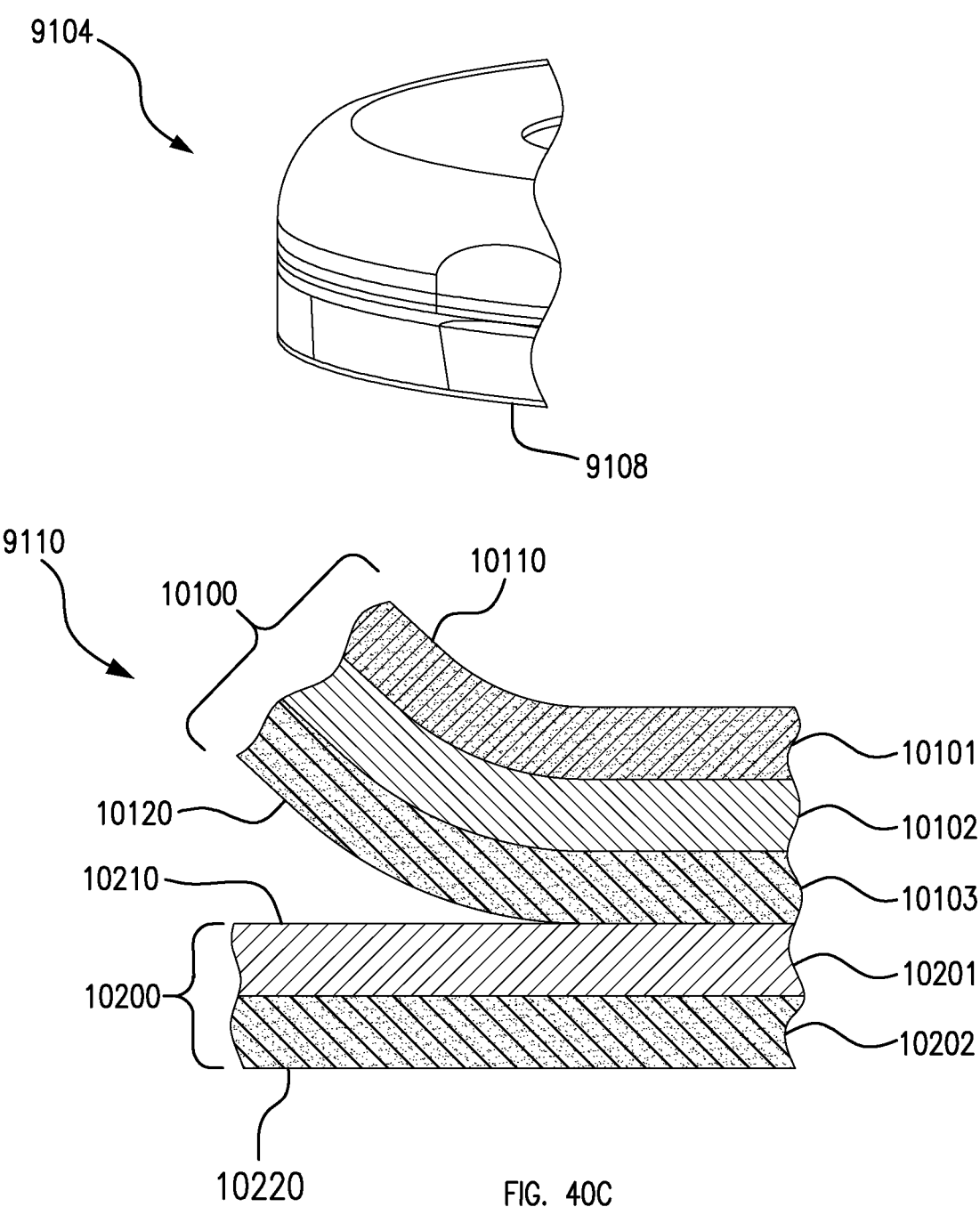
FIG. 40C is a side cross-sectional view of the exemplary adhesive patch and example sensor control device, according to one or more embodiments of the present disclosure.

As shown in FIGS. 40A-40C the first layer 10100 can include laser cut slots 10130 for fluid drainage and/or breathability of the skin. Laser cut slots 10130 can be formed during manufacturing of the adhesive patch 9110 by utilizing a laser to cut channels or slots into the first layer 10100, thereby providing a connection between the central opening 10350 and the external environment. To form laser cut slots 10130, a blank first layer 10100 can be provided on a separate backing (not shown) where the laser cutting occurs. Once slots 10130 are cut by the laser through the first layer 10100 on its backing, the first layer is flipped, transferred onto the top surface 10210 of the second layer 10200, and the backing removed. Water, sweat, or other fluids can flow through the laser cut channels or slots 10130 when the sensor control device 9102 is worn on the patient's skin for an extended period of time. In one example, laser cut slots can radiate or extend completely from the aperture 10150 to an outer periphery 10140 of the first layer 10100. During use, fluids which accumulate under the sensor control device can travel through the laser cut slots 1030 by capillary action, and into the external environment, where they are evaporated. The reduction of fluid under the sensor control device 9102 can reduce maceration of the skin in the area under the sensor control device, and provide increased comfort to the patient for extended wear time.

The first aperture 10150 of the first layer 10100 is configured to receive the sensor 9112 and the sharp 9114 when the electronics housing 9104 is attached to the adhesive patch 9110 to form the sensor control device 9102. The laser cut slots can be provided through all three films of the first layer 10100. Alternatively, the laser cut slots can be formed through only some of the films, such as only through the acrylic adhesive 10103 or through the acrylic adhesive 10103 and the scrim 10102.

In some embodiments, the second roll of tape, and hence the second layer 10200, forms a skin adhesive layer. Second layer 10200, or skin adhesive layer, can comprises two films: (i) a nonwoven fabric 10201, and (ii) an acrylic adhesive 10202. The nonwoven fabric 10201 forms a top surface 10210 of the second layer 10200, and serves as a point of attachment for the acrylic adhesive 10103 of the bottom surface 10120 of the first layer 10100. The acrylic adhesive 10202 of second layer 10200 forms a bottom surface 10220 of the second layer 10200 and serves to adhere the adhesive patch 9110 as well as the overall sensor control device 9102 to the skin of the patient. The two films of the second layer 10200 are sandwiched together to create the second layer. Second aperture 10250 is then formed through the both films of the second layer 10200 using laser cutting, die cutting, or other means known to those skilled in the art.

The first aperture 10150 is aligned with the second aperture 10250. When first layer 10100 and second layer 10200 are adhered together to form the adhesive patch 9110, first aperture 10150 of the first layer 10100 is aligned along a vertical axis of the electronics housing with second aperture 10250 of the second layer to form a central opening 10350. Thus first and second apertures 10150, 10250 are configured together to receive the sensor 9112 and the sharp 9114 when the electronics housing 9104 is attached to the adhesive patch 9110. The first and second apertures 10150, 10250 can be formed in the first and second layers individually, or alternatively first and second apertures can be formed simultaneously through both the first and second layers after the first and second layers are adhered together.

In certain embodiments, the acrylic adhesive 10103 of the first layer 10100 may be the same formulation as the acrylic adhesive 10202 of the second layer 10200 as shown in FIG. 40C. Alternatively, acrylic adhesive 10103 of the first layer 10100 may be a different formulation of acrylic adhesive than acrylic adhesive 10202 of the second layer 10200. Alternatively or additionally, the adhesive of the first layer 10100 and/or the second layer 10200 can be an adhesive that is free of IBOA, e.g., a UV-curable IBOA-free adhesive, as disclosed herein. In certain embodiments, the adhesive of first layer 10100 can be an adhesive that is free of IBOA, e.g., a UV-curable IBOA-free adhesive, as disclosed herein. In certain embodiments, the adhesive of second layer 10200 can be an adhesive that is free of IBOA, e.g., a UV-curable IBOA-free adhesive, as disclosed herein.

In some embodiments, an exemplary adhesive patch 9110 of FIG. 41 and FIGS. 42A-42C comprises a first layer 10400, a second layer 10500, and a mesh layer 10300. The mesh 10300 can be located between a top surface 10110 of the first layer 10400 and the underside of the mount 9108, which can be smooth. The top surface 10110 of first layer 10400 can adhere to the mesh 10300 and/or to the underside of the mount 9108. The first layer 10400 and the second layer 10500 can be formed of similar materials as described above in connection with FIGS. 40A-40B. As in the embodiment of FIGS. 40A-40B, the top surface 10110 can comprise a synthetic rubber adhesive blend. The synthetic rubber adhesive blend forms the top surface 10110 of the first layer 10400 in FIG. 41, and serves to adhere the top surface 10110 of the first layer 10400 directly to the mesh 10300. In certain embodiments, the top surface 10110 of the first layer 10400 can comprise an adhesive that is free of IBOA, e.g., a UV-curable IBOA-free adhesive, as disclosed herein. The first layer 10400 and/or the second layer 10500 can include laser cut holes 10600, as described in further detail below. In some embodiments, the mesh 10300 can be in direct contact with the underside of the mount such that mesh 10300 provides space, for example by forming gaps, between the adhesive patch 9110 and the electronics housing 9104, that can allow for air or liquid to move. For example in accordance with another aspect of the disclosed subject matter, the first layer 10400 or second layer 10500 can include laser cut holes 10600 configured so that fluid in an area of the skin underneath the adhesive patch can evaporate directly through the laser cut holes in the first layer or second layer.

Figure 42A:
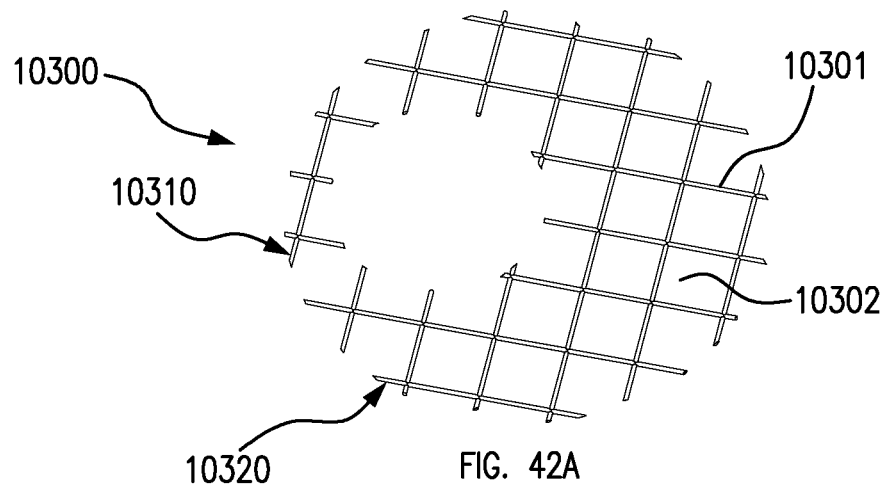
FIGS. 42A-42B illustrate isometric top views of components of the adhesive patch of FIG. 41.

In some embodiments, the mesh is formed from two arrays of hydrophobic threads 10301, wherein the two arrays of hydrophobic threads are arranged perpendicular to one other so as to create a grid as best shown in FIG. 42A. Suitable materials for threads may include flexible thermoplastics, elastomers, synthetic rubbers such as neoprene, low-density polyethylene (LDPE), high-density polyethylene (HDPE), polypropylene, polyvinyl chloride (PVC), polytetrafluoroethylene (PTFE), polyimide, nylon, polyester, polyurethane, or other hydrophobic polymers. Threads can include double or triple helical strands of a single material, or various materials threaded together in order to control their strength, flexibility, and/or hydrophobicity. Vents 10302 arranged between the arrays of hydrophobic threads 10301 allow water to escape off the skin, through the laser cut holes 10600 of breathable adhesive patch 9110, and out to the external environment. Due to the pattern of the mesh, the mesh can comprise a first mesh portion 10310 discontinuous from a second mesh portion 10320. The first mesh portion 10310 can be smaller than the second mesh portion 10320.

Figure 42B:
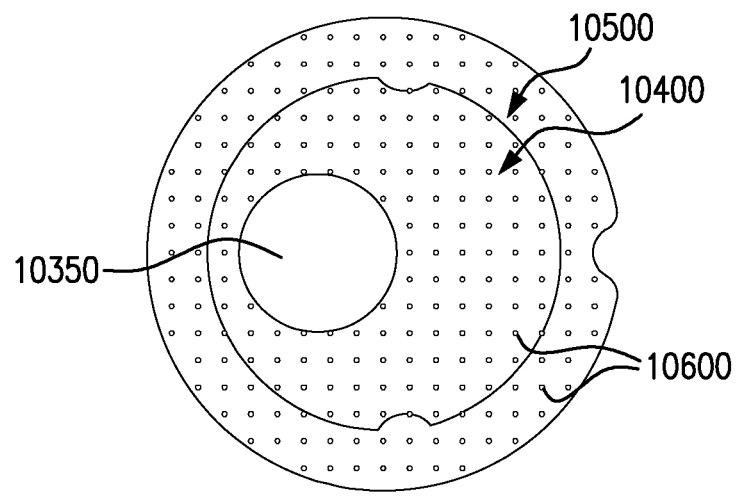

In the exemplary adhesive patch shown in FIG. 41, laser cut holes 10600 can be provided in the first layer, the second layer, or both and can provide breathability. For example, water or liquid present on the skin can breathe or evaporate directly through laser cut holes 10600 found in the first layer 10400 or second layer 10500 of the adhesive patch. Water can thus directly permeate the first and/or second layers, reach vents 10302, and escape out to the external environment via evaporation. In an exemplary arrangement as shown in FIG. 42B, the laser cut holes can be found evenly spaced over an entirety of the first layer 10400 and over an entirety of the second layer 10500. For example, laser cut holes 10600 can be found evenly spaced from the aperture 10350 to an outer periphery 10240 of the second layer 10500.

Figure 42C:
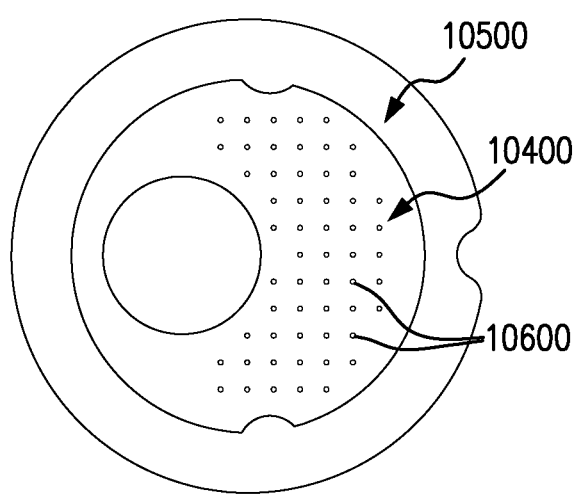
FIG. 42C is an isometric top view of an alternative arrangement of the adhesive patch of FIG. 42B.

In another exemplary arrangement as shown in FIG. 42C, the laser cut holes can be evenly spaced apart over only a portion of the first layer 10400, wherein the remaining portion of the first layer does not have any laser cut holes. Placement of laser cut holes can be used to selectively control evaporation from specific regions of the skin underneath the adhesive patch. In the arrangement of FIG. 42C, the second layer 10500 does not have any laser cut holes. In another exemplary arrangement (not shown), laser cut holes can be found evenly spaced apart over only a portion of the second layer 10500, wherein the remaining portion of the second layer does not have any laser cut holes. In this arrangement, the first layer 10400 can be free of laser cut holes. In another exemplary arrangement (not shown), the adhesive patch of FIGS. 40A and 40B likewise has laser cut holes in addition to laser cut slots 10130.

While the exemplary embodiments have been described herein with the mesh layer in combination with layers having laser cut holes, other combinations of features described herein are possible and will be apparent to one of skill in the art. For example, the mesh layer could be used in combination with one or more layers having laser cut slots described in connection with FIGS. 40A-40B above. Furthermore, some embodiments can include one or more layers including laser cut slots in combination with one or more layers having later cut holes. Additionally any layer described here above could include both laser cut holes and laser cut slots.

Figure 46:
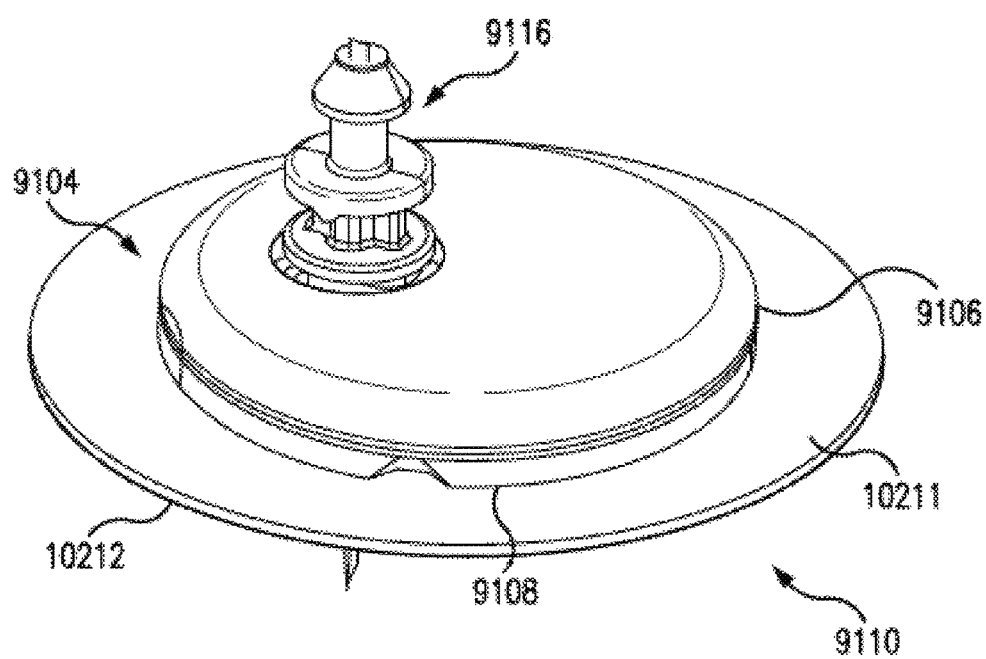
FIG. 46 is an isometric view of another exemplary adhesive patch and example sensor control device, according to one or more embodiments of the present disclosure.
Figure 47A:
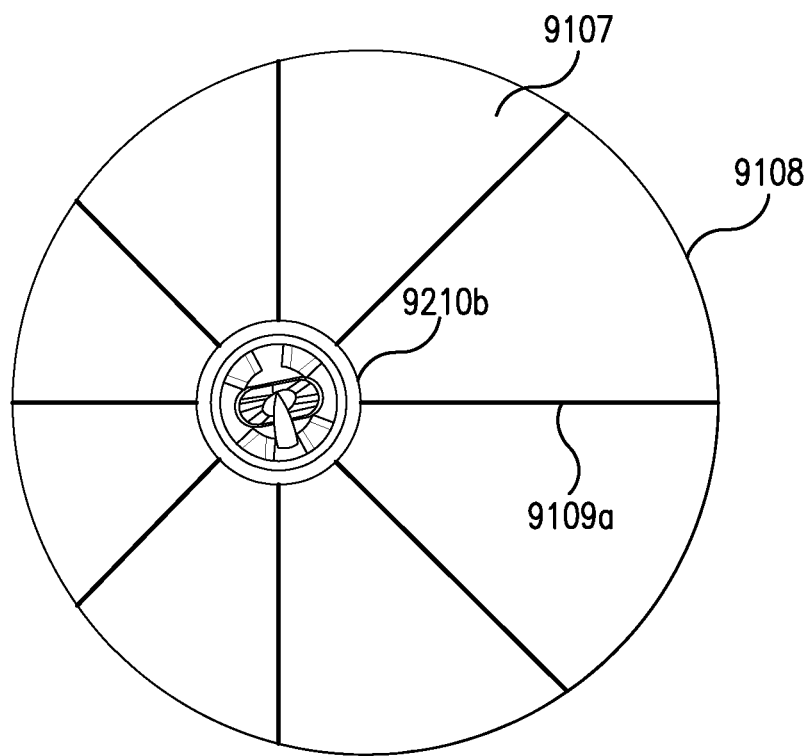
FIG. 47A is an isometric bottom view of the housing, according to one or more embodiments.
Figure 47B:
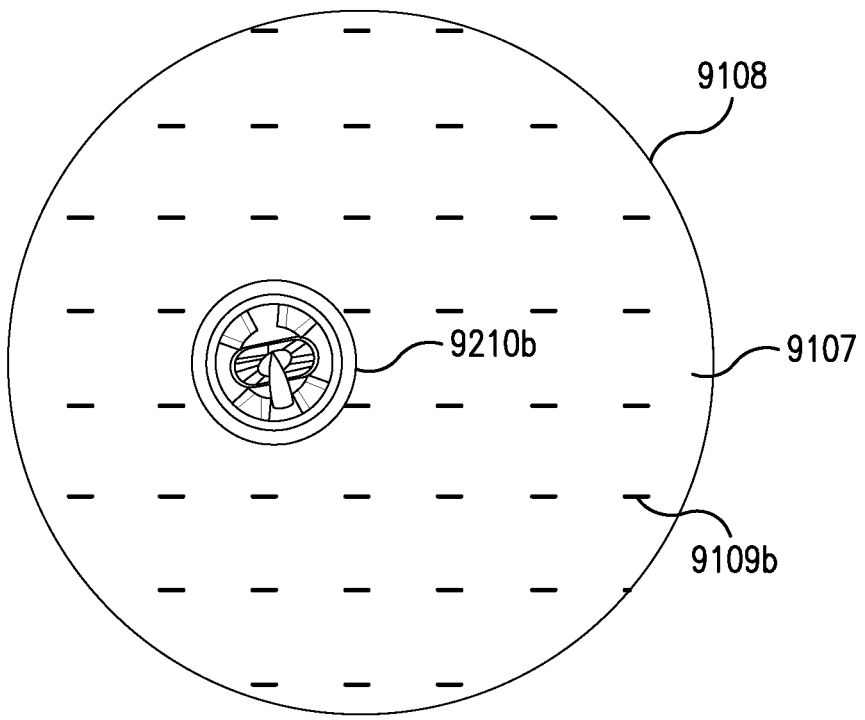
FIG. 47B is an isometric bottom view of an alternative arrangement of the housing, according to one or more embodiments.
Figure 48A:
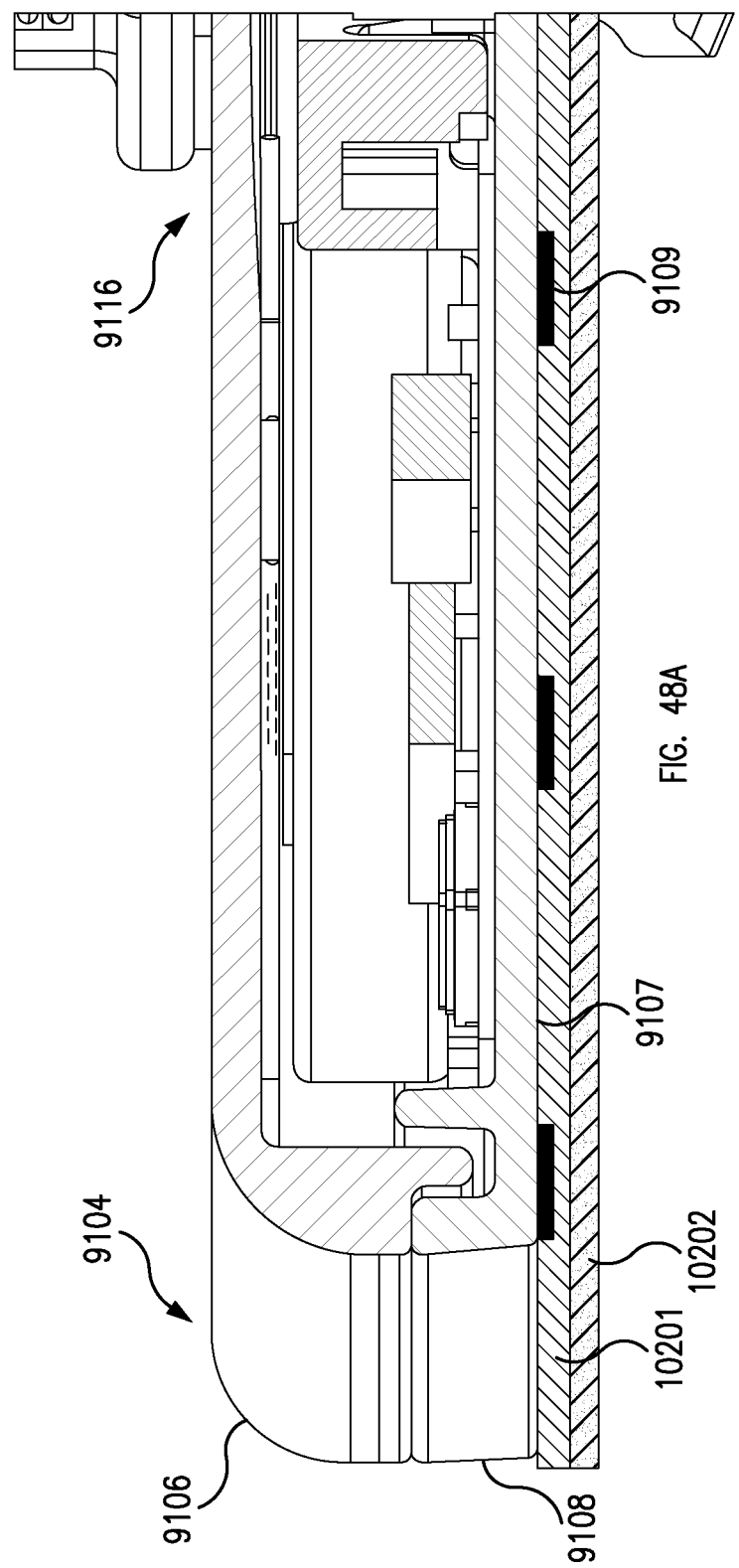
FIG. 48A is a side cross-sectional view of an exemplary adhesive patch and example sensor control device, according to one or more embodiments of the present disclosure.

FIGS. 46, 47A-47B, 48A-48C, 49A-49C, and 50A-50C illustrate details of exemplary adhesive patches 9110 in accordance with the disclosed subject matter. As illustrated, the sensor control device 9102 includes an electronics housing 9104, which can be generally disc-shaped. The electronics housing 9104 includes a shell 9106 and a mount 9108 that is matable with the shell 9106. The sensor control device can have any of the features described herein above. The exemplary adhesive patch 9110 can be arranged at the bottom of the electronics housing 9104. The adhesive patch 9110 can thus adhere the electronics housing 9104 to the user's skin for use. As shown in FIG. 46, for purpose of illustration and not limitation, adhesive patch 9110 can include a single layer with a top surface 10211 contacting an underside of the mount 9108, and a bottom surface 10212 contacting the user's skin. The single layer adhesive patch includes two films: (i) a nonwoven fabric 10201, and (ii) an acrylic adhesive 10202 (as shown in FIG. 48A). The nonwoven fabric 10201 forms the top surface 10211 of adhesive patch 9110, and the acrylic adhesive 10202 forms the bottom surface 10212 of adhesive patch 9110. For example, exemplary adhesive patch 9110 of FIGS. 46, 47A-47B and 48A-48C can be manufactured from a single roll of tape, wherein the single roll of tape includes the two films 10201 and 10202 forming the top surface 10211 and the bottom surface 10212 of the adhesive patch 9110.

Referring to FIGS. 47A and 47B, for purpose of illustration and not limitation, adhesive patch 9110 can be used with electronics housing 9104 having mount 9108, wherein the underside 9107 of the alternatively shaped mount 9108 can be patterned. In some embodiments, the underside 9107 of mount 9108 can have radial microchannels or grooves 9109a extending from a periphery of the mount 9108 to the second seal element 9210b on the underside of the mount 9108. For example, a number of microchannels or radial grooves 9109a in FIG. 47A extend from second seal element 9210b to the circumference of the mount. Radial grooves 9109a can contribute to the evaporation of water which accumulates in or on the adhesive patch 9110. In accordance with another aspect of the disclosed subject matter, the underside 9107 of the mount 9108 can be patterned with an array of dashed linear grooves 9109b comprising discrete undercuts. The dashed linear grooves 9109b as shown in FIG. 47B can intersect an exterior edge of the mount 9108, or the second seal element 9210b. For example, radial grooves 9109a or dashed linear grooves 9109b can serve to distribute water via capillary action away from portions of the adhesive patch 9110 which are imbibed with water. During this redistribution of water, water is drawn away from underneath the mount, towards the periphery of the mount 9108, and to the external environment as shown in FIG. 48C (wherein water can travel along the paths marked "E").

In accordance with the disclosed subject matter, an edge portion of the adhesive patch 9110 can be coated or imbued with a hydrophilic polymer, film or material to draw water to the periphery of the adhesive patch 9110. Alternatively, a central portion of the adhesive patch 9110 can be coated or imbued with a hydrophobic film, adhesive, or material to repel water away from the center of the adhesive patch 9110. As another example, the edge portion of the adhesive patch can be coated or imbued with a hydrophilic polymer, film or material, and the central portion of the adhesive patch can be coated or imbued with a hydrophobic polymer, film, adhesive, or material in order to redistribute water from beneath the mount 9108 to the periphery of the adhesive patch 9110 where it can evaporate. The hydrophobic film can be a water-repellent coating to prevent external water from seeping into the adhesive patch 9110 during immersion. Alternatively, the coating, film, or material imbued in or on the patch can be a surfactant.

In accordance with the disclosed subject matter, the hydrophobic and/or hydrophilic polymer, film or material can be impregnated in or coated on the nonwoven fabric layer 10201. Additionally, or alternatively, the hydrophobic and/or hydrophilic polymer, film or material can be impregnated in or coated on the acrylic adhesive 10202. The nonwoven fabric layer 10201 and acrylic adhesive 10202 can be impregnated or coated with a combination of hydrophobic and/or hydrophilic materials. For example, a central portion of acrylic adhesive 10202 underneath the mount can be imbued with a hydrophobic compound, while an edge portion of the nonwoven fabric layer can be coated with a hydrophilic film to draw water to the periphery of the adhesive patch 9110 and encourage evaporation.

Figure 49A:
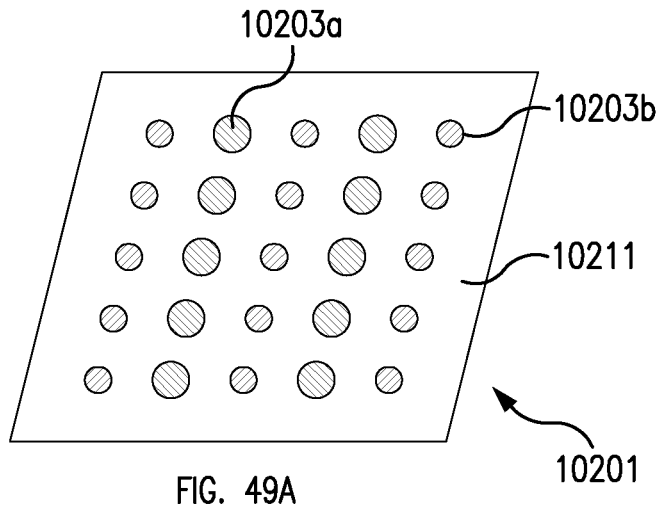
Figure 49B:
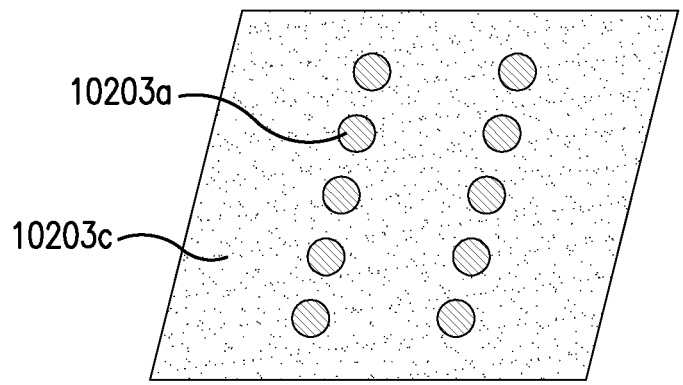
Figure 49C:
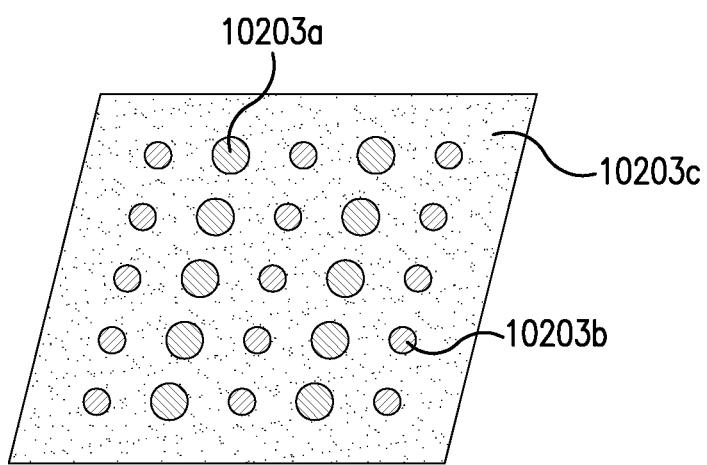

For example, in accordance with another aspect of the disclosed subject matter, adhesive patch 9110 can be manufactured from a single piece of single-sided tape. The single piece of single-sided tape can be adhered to the underside 9107 of mount 9108 via a series of adhesives. In an exemplary arrangement as shown in FIG. 49A, the top surface 10211 of the nonwoven fabric layer 10201 can be provided with two different adhesives 10203a, 10203b in a dot pattern. For example, but not way of limitation, the two different adhesives 10203a, 10203b can vary in strength or viscosity. In particular, adhesive 10203a can be relatively weak and watery, thus more prone to spreading over a greater surface area. Adhesive 10203b can be relatively strong and tacky, thus more apt to remain concentrated at a particular point. Various adhesives can be selected based on their strength and viscosity in order to achieve an optimal blend of surface area adhesion between the underside 9107 of the mount 9108 and the top surface 10211 of the nonwoven fabric layer 10201. In an exemplary arrangement as shown in FIG. 49B, the nonwoven fabric layer 10201 can be coated with a first adhesive 10203a in a dot pattern, and a second adhesive 10203c as a background coating. In particular, adhesive 10203c can be relatively weak, but cover a large portion of the surface area underneath the mount. Adhesive 10203a can be relatively strong, but cover relatively little surface area and is instead concentrated on adhering particular points of the nonwoven fabric layer 10201 to the underside 9107 of mount 9108. In an exemplary arrangement as shown in FIG. 49C, the nonwoven fabric layer 10201 can be coated with three different adhesives including adhesives 10203*a* and 10203*b* in a dot pattern, and adhesive 10203*c* as a background coating. Adhesive 10203*b* can have the greatest relative strength and tackiness, with adhesive 10203*a* having less strength than adhesive 10203*b* but covering greater surface area, and adhesive 10203*c* having the least strength but covering the greatest surface area of top surface 10211. The different adhesives 10203*a*-10203*c* can be prepared with varying degrees of hydrophobicity or hydrophilicity in order to influence the migration of water from underneath the mount.

Figure 50A:
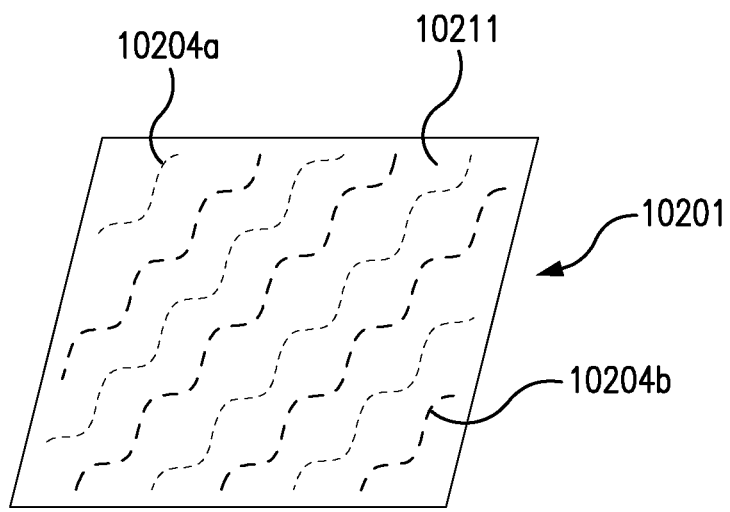
Figure 50B:
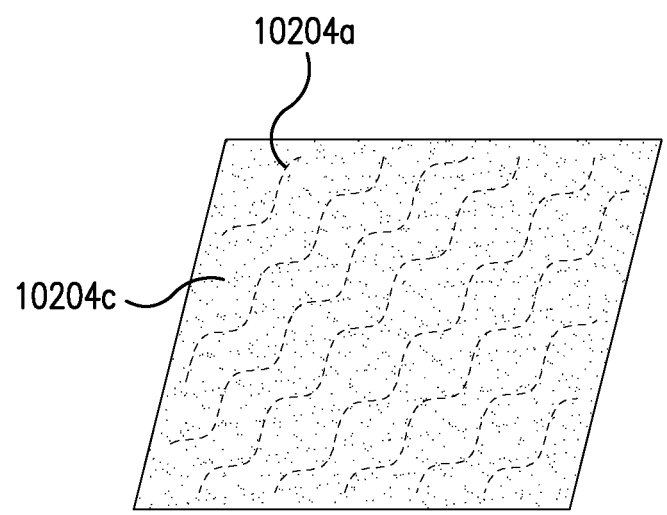
Figure 50C:
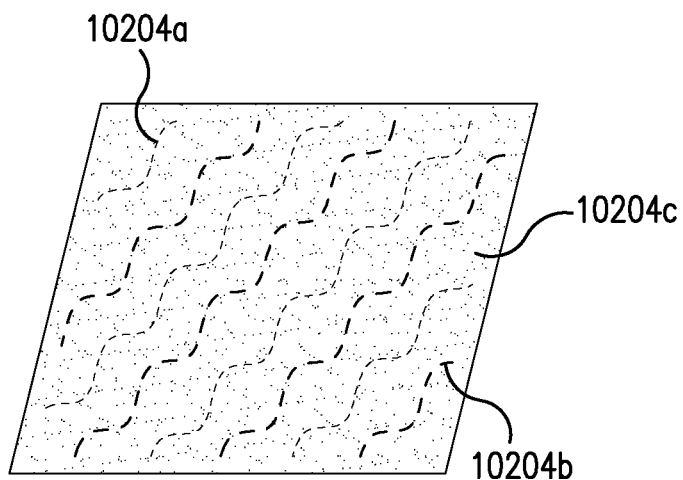

In accordance with another aspect of the disclosed subject matter, the nonwoven fabric layer 10201 can be coated with two different adhesives 10204*a*, 10204*b* each in a snake line pattern as shown in FIG. 50A. For example, the two different adhesives 10204*a*, 10204*b* can vary in strength or viscosity. In particular, adhesive 10204*a* can be relatively weak and watery, thus more prone to spreading over a greater surface area. Adhesive 10204*b* can be relatively strong and tacky, thus more apt to remain concentrated at a particular point. Various adhesives can be selected based on their strength and viscosity in order to achieve an optimal blend of surface area adhesion between the top surface 10211 of the nonwoven fabric layer 10201 and the underside 9107 of the mount 9108. In an exemplary arrangement as shown in FIG. 50B, the nonwoven fabric layer 10201 can be coated with a first adhesive 10204*a* in a snake line pattern, and a second adhesive 10204*c* as a background coating. In particular, adhesive 10204*c* can be relatively weak, but cover a large portion of the surface area underneath the mount. Adhesive 10204*a* can be relatively strong, but cover relatively little surface area and is instead concentrated on adhering particular points of the nonwoven fabric layer 10201 to the mount. In an exemplary arrangement as shown in FIG. 47C, the nonwoven fabric layer 10201 can be coated with three different adhesives including adhesives 10204*a* and 10204*b* in a snake line pattern, and adhesive 10204*c* as a background coating. Adhesive 10204*b* can have the greatest relative strength and tackiness, with adhesive 10204*a* having less strength than adhesive 10203*b* but spreading more readily on top surface 10211, and adhesive 10204*c* having the least relative strength but covering the greatest surface area. The different adhesives 10204*a*-10204*c* can be prepared with varying degrees of hydrophobicity or hydrophilicity in order to influence the migration of water from underneath the mount.

Figure 48B:
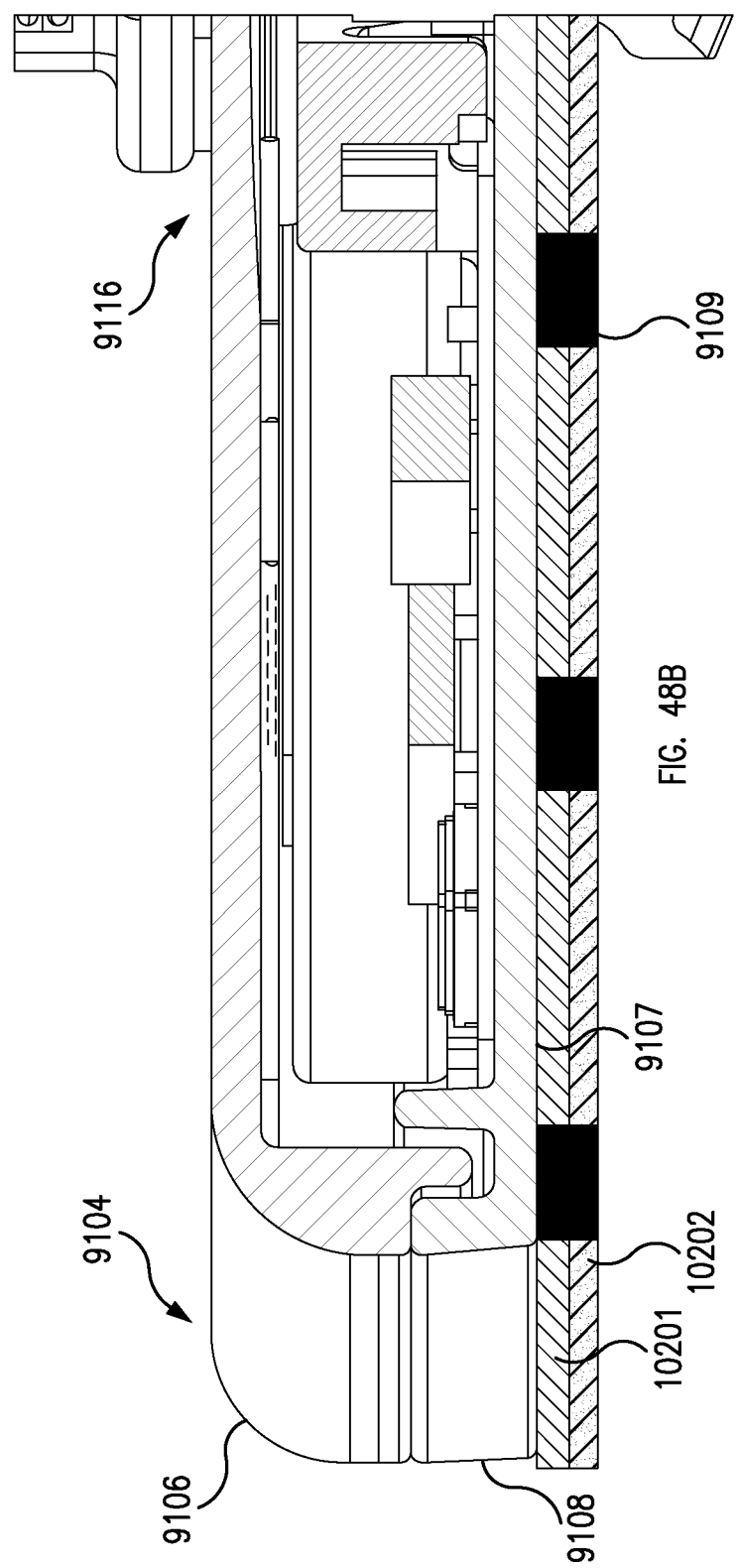
FIG. 48B is a side cross-sectional view of an alternative arrangement of the exemplary adhesive patch and example sensor control device, according to one or more embodiments of the present disclosure.

In accordance with the disclosed subject matter, the adhesives 10203*a*-10203*c* and 10204*a*-10204*c* of FIGS. 49-50 can be used for manufacturing the sensor control device as described herein. For example, but not by way of limitation, the top surface 10211 of single-sided tape including nonwoven fabric layer 10201 is first covered with adhesives 10203*a*, 10203*b*, and/or 10203*c* (or 10204*a*, 10204*b*, and/or 10204*c*), and next, underside 9107 of mount 9108 is fixed to said adhesives 10203*a*, 10203*b*, and/or 10203*c* on top surface 102011. In addition to providing breathability, radial microchannels or grooves 9109*a* and/or dashed linear grooves 9109*b* can become filled with adhesive and serve as attachment points 9109 between the mount 9108 and the nonwoven fabric layer 10201. For example, but not by way of limitation, during manufacturing, mount 9108 is press fit onto nonwoven fabric layer 10201 covered with adhesives 10203*a*, 10203*b*, and/or 10203*c* (or 10204*a*, 10204*b*, and/or 10204*c*) causing said adhesives to spread and fill in the radial grooves 9109*a* and/or dashed linear grooves 9109*b*. Alternatively, said adhesives can become sandwiched between the underside 9107 of mount 9108 and the nonwoven fabric layer 10201 as shown in FIG. 48A at attachment points 9109. In some embodiments, exemplary adhesive patch 9110 is attached to the mount 9108 via heat-staking, ultrasonic welding, etc. as shown in FIG. 48B. Such attachment can form an attachment point 9109 transcending both the nonwoven fabric layer 10201 and acrylic adhesive 10202 of the adhesive patch 9110 as shown in FIG. 48B.

In accordance with another aspect of the disclosed subject matter, the nonwoven fabric layer 10201 can include an antimicrobial fabric. For example, the nonwoven fabric layer can include an antimicrobial carbon cloth (e.g., ZORFLEX, MICROBAN ZPTECH). In certain embodiments, the nonwoven fabric layer 10201 can comprise a ZnO nanoparticle treated fabric to prevent the growth of bacteria in or on the adhesive patch 9110. Alternatively, or additionally, in certain embodiments the acrylic adhesive 10202 can be impregnated with antimicrobial elements or agents, such as ZnO nanoparticles. In certain embodiments, the nonwoven fabric layer 10201 can be coated and/or impregnated with an antimicrobial agent. During wear of the adhesive patch, biofilm formation and microbial growth including growth of fungi, mold or mildew can be inhibited by exposure to antimicrobial cloth fiber, antimicrobial agents, ZnO or zinc pyrithione on either surface of the single-sided tape.

In accordance with another aspect of the disclosed subject matter, the user's skin can be prepared for the application of the of the adhesive patch 9110 to the skin surface. For example, but not by way of limitation, the user's skin can be exfoliated before application of the adhesive patch 9110 to the skin surface. In certain embodiments, the user's skin can be scrubbed or brushed to remove dead skin cells before applying the bottom surface 10212 including an acrylic adhesive 10202 to the skin. Alternatively or additionally, the user's skin can be cleaned with soap and water and/or scrubbed with a soapy towel to remove skin cells and/or oils from the application area. In certain embodiments, the skin can be further cleaned with a solution, cleanser or disinfectant such as alcohol to remove any skin cells that were loosened during exfoliation. In certain embodiments, the skin can be dried, e.g., air dried, before application of the adhesive patch 9110 to the skin surface.

Exemplary Non-Isobornyl Acrylate (IBOA) adhesives

Certain components in adhesives used in particular layers (e.g., the skin adhesive layer, sensor control device adhesive layer or the electronics housing) can cause adverse skin reactions at the site of sensor placement. Continuous glucose monitors can be designed to contact the skin for 7-14 days, or longer, and must be affixed to the patient without reacting with the patient's skin. In particular, isobornyl acrylate (IBOA) has been identified as a skin sensitizer present in certain acrylic adhesives. Furthermore, other acrylates have been identified as causing similar adverse skin reactions. Accordingly, any adhesive disclosed herein does not include IBOA, also referred to herein as an IBOA-free adhesive.

In some embodiments, the adhesives, e.g., acrylic adhesives, described herein can be substituted with non-acrylic adhesives capable of fixing the sensor control device to the patch, and the patch to the skin, such as adhesives without IBOA or other acrylics, known to those skilled in the art. In certain embodiments, the adhesive can be a UV-curable adhesive that does not include IBOA.

In certain embodiments, an IBOA-free adhesive, e.g., a UV-curable IBOA-free adhesive, for use in the present disclosure can include one or more of the following components: one or more oligomers, one or more monomers, one or more photoinitiators and/or one or more additives. In certain embodiments, the IBOA-free adhesive, e.g., a UV-curable IBOA-free adhesive, can include two or more of the following components: one or more oligomers, one or more monomers, one or more photoinitiators and/or one or more additives. In certain embodiments, the IBOA-free adhesive, e.g., a UV-curable IBOA-free adhesive, can include three or more of the following components: one or more oligomers, one or more monomers, one or more photoinitiators and/or one or more additives. In certain embodiments, the IBOA-free adhesive, e.g., a UV-curable adhesive, can include four or more of the following components: one or more oligomers, one or more monomers, one or more photoinitiators and/or one or more additives.

In certain embodiments, the IBOA-free adhesive includes one or more oligomers. Any oligomer can be used in the adhesive of the present disclosure. For example, but not by way of limitation, the oligomer can include low molecular weight oligomers, aliphatic oligomers, acrylates, e.g., urethane acrylates, epoxy acrylates, polyester acrylates and polyether acrylates, and non-acrylic based oligomers.

In certain embodiments, the IBOA-free adhesive can include one or more monomers. In certain embodiments, the monomer can function in the adhesive as a diluent and/or a crosslinker. In certain embodiments, the monomer functions as a diluent. In certain embodiments, the monomer functions as a crosslinker. In certain embodiments, the monomer can be monofunctional or multifunctional. For example, but not by way of limitation, the monomer can be difunctional, trifunctional or polyfunctional.

In certain embodiments, the IBOA-free adhesive can include one or more photoinitiators. In certain embodiments, the photoinitiator is a UV initiator, e.g., a compound that produces radicals when exposed to UV light.

In certain embodiments, the IBOA-free adhesive can further include one or more additives. Non-limiting examples of additives include stabilizers, tackifiers, color pigments, dyes, defoamers, adhesion promoters, flatting agents, fillers, antioxidants, plasticizers, silane coupling agents, rheological control agents, wetting agents and slip aids. In certain embodiments, rheological control agents include fumed silica, talc, asbestos, modified bentonite, colloidal silica and hydrated magnesium aluminum silicates.

In certain embodiments, an IBOA-free adhesive for use in the present disclosure can include at least one oligomer, at least one monomer, at least one photoinitiator and at least one additive.

In certain embodiments, an IBOA-free adhesive for use in the present disclosure has a Glass Transition Temperature ($T_g$) of about 40° C. or greater. For example, but not by way of limitation, the adhesive can have a $T_g$ greater than about 40° C., greater than about 45° C., greater than about 50° C., greater than about 55° C., greater than about 60° C., greater than about 65° C., greater than about 70° C., greater than about 75° C., greater than about 80° C., greater than about 85° C., greater than about 90° C., greater than about 95° C. or greater than about 100° C.

In certain embodiments, an IBOA-free adhesive can be used for the adhesive patch 9110 described herein. For example, the skin adhesive layer and/or sensor control device adhesive layer can be free of IBOA. Additionally, adhesives used for the adhesive patch 9110 described herein above can be free of acrylics that cause adverse skin reactions in patients. In certain embodiments, the one or more layers of the adhesive patch can include an IBOA-free adhesive. For example, but not by way of limitation, at least one of the first layer and the second layer of the adhesive patch comprises an IBOA-free adhesive. In certain embodiments, one or more surfaces of the first layer of the adhesive patch, e.g., the top surface and/or bottom surface of the first layer, comprises an IBOA-free adhesive.

In certain embodiments, an IBOA-free adhesive can be used for the manufacturing of a sensor control device as described herein. For example, but not by way of limitation, an IBOA-free adhesive can be used for the manufacturing of an electronics housing as described herein. In certain embodiments, the first adhesive 4120 and/or second adhesive 4130 can be an IBOA-free adhesive, e.g., a UV-curable IBOA-free adhesive. In certain embodiments, the first adhesive 4120 for adhering the PCB 4100 to the sensor mount 5008 can be an IBOA-free adhesive, e.g., a UV-curable IBOA-free adhesive. In certain embodiments, the second adhesive 4135 for adhering the sensor mount 5008 and/or collar 5112 to the shell 5006 can be an IBOA-free adhesive, e.g., a UV-curable IBOA-free adhesive. In certain embodiments, the mount is mated to the shell with an IBOA-free adhesive, e.g., a UV-curable IBOA-free adhesive. In certain embodiments, the PCB is mated to the mount with an IBOA-free adhesive, e.g., a UV-curable IBOA-free adhesive. In certain embodiments, the PCB is mated to the electronic housing with an IBOA-free adhesive, e.g., a UV-curable IBOA-free adhesive. In certain embodiments, the PCB is mated to the shell with an IBOA-free adhesive, e.g., a UV-curable IBOA-free adhesive.

In certain embodiments, an IBOA-free adhesive can be used for the manufacturing of a sensor subassembly as described herein. For example, but not by way of limitation, an IBOA-free adhesive, e.g., a UV-curable IBOA-free adhesive, can be used for mating the collar 5112 to the sensor mount 5008, e.g., to the mount channel 4025 of the sensor mount 5008, as described herein. In certain embodiments, an IBOA-free adhesive, e.g., a UV-curable IBOA-free adhesive, can be used to mating the sharp hub 5014 to the sensor mount 5008 as described herein.

Exemplary Applicators and Sensor Control Devices for One Piece Architectures

Figure 51A:
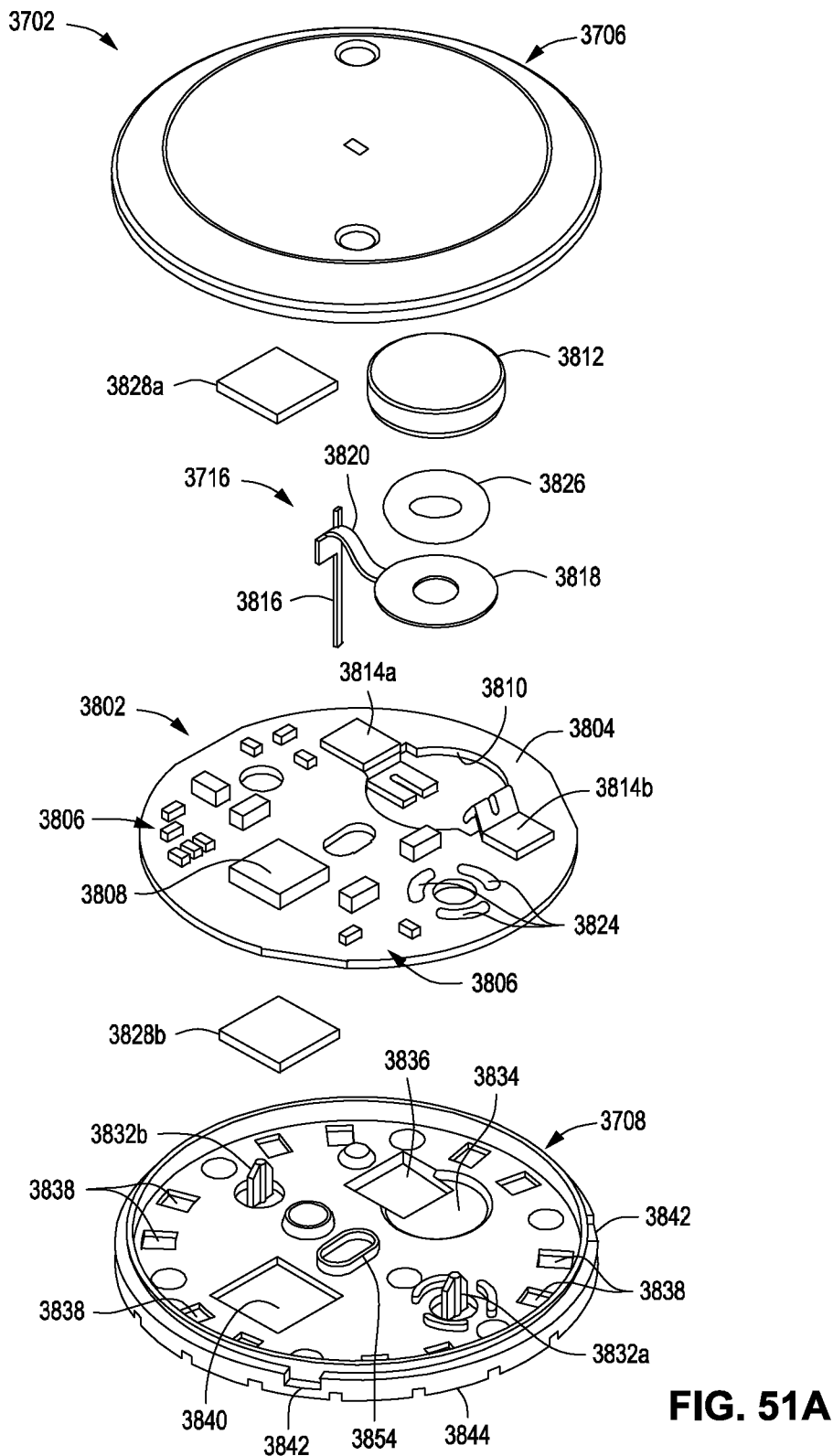
Figure 51B:
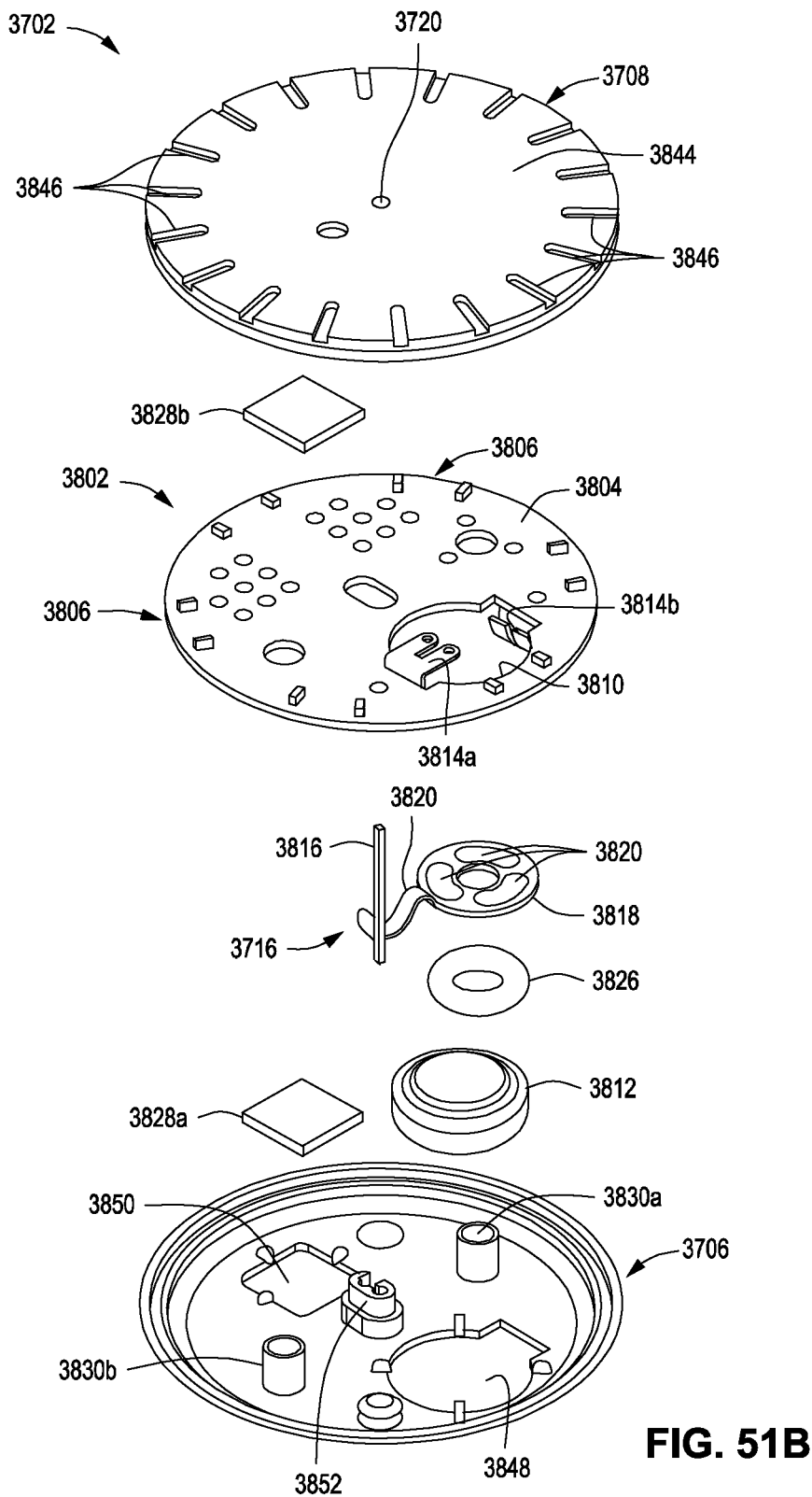

FIGS. 51A and 51B are exploded top and bottom views, respectively, of the sensor control device 3702, according to one or more embodiments. The shell 3706 and the mount 3708 operate as opposing clamshell halves that enclose or otherwise substantially encapsulate the various electronic components of the sensor control device 3702. As illustrated, the sensor control device 3702 may include a printed circuit board assembly (PCBA) 3802 that includes a printed circuit board (PCB) 3804 having a plurality of electronic modules 3806 coupled thereto. Example electronic modules 3806 include, but are not limited to, resistors, transistors, capacitors, inductors, diodes, and switches. Prior sensor control devices commonly stack PCB components on only one side of the PCB. In contrast, the PCB components 3806 in the sensor control device 3702 can be dispersed about the surface area of both sides (i.e., top and bottom surfaces) of the PCB 3804.

Besides the electronic modules 3806, the PCBA 3802 may also include a data processing unit 3808 mounted to the PCB 3804. The data processing unit 3808 may comprise, for example, an application specific integrated circuit (ASIC) configured to implement one or more functions or routines associated with operation of the sensor control device 3702. More specifically, the data processing unit 3808 may be configured to perform data processing functions, where such functions may include but are not limited to, filtering and encoding of data signals, each of which corresponds to a sampled analyte level of the user. The data processing unit 3808 may also include or otherwise communicate with an antenna for communicating with the reader device 106 (FIG. 1).

A battery aperture 3810 may be defined in the PCB 3804 and sized to receive and seat a battery 3812 configured to power the sensor control device 3702. An axial battery contact 3814*a* and a radial battery contact 3814*b* may be coupled to the PCB 3804 and extend into the battery aperture 3810 to facilitate transmission of electrical power from the battery 3812 to the PCB 3804. As their names suggest, the axial battery contact 3814*a* may be configured to provide an axial contact for the battery 3812, while the radial battery contact 3814*b* may provide a radial contact for the battery 3812. Locating the battery 3812 within the battery aperture 3810 with the battery contacts 3814*a, b* helps reduce the height H of the sensor control device 3702, which allows the PCB 3804 to be located centrally and its components to be dispersed on both sides (i.e., top and bottom surfaces). This also helps facilitate the chamfer 3718 provided on the electronics housing 3704.

The sensor 3716 may be centrally located relative to the PCB 3804 and include a tail 3816, a flag 3818, and a neck 3820 that interconnects the tail 3816 and the flag 3818. The tail 3816 may be configured to extend through the central aperture 3720 of the mount 3708 to be transcutaneously received beneath a user's skin. Moreover, the tail 3816 may have an enzyme or other chemistry included thereon to help facilitate analyte monitoring.

The flag 3818 may include a generally planar surface having one or more sensor contacts 3822 (three shown in FIG. 51B) arranged thereon. The sensor contact(s) 3822 may be configured to align with and engage a corresponding one or more circuitry contacts 3824 (three shown in FIG. 51A) provided on the PCB 3804. In some embodiments, the sensor contact(s) 3822 may comprise a carbon impregnated polymer printed or otherwise digitally applied to the flag 3818. Prior sensor control devices typically include a connector made of silicone rubber that encapsulates one or more compliant carbon impregnated polymer modules that serve as electrical conductive contacts between the sensor and the PCB. In contrast, the presently disclosed sensor contacts(s) 3822 provide a direct connection between the sensor 3716 and the PCB 3804 connection, which eliminates the need for the prior art connector and advantageously reduces the height H. Moreover, eliminating the compliant carbon impregnated polymer modules eliminates a significant circuit resistance and therefor improves circuit conductivity.

The sensor control device 3702 may further include a compliant member 3826, which may be arranged to interpose the flag 3818 and the inner surface of the shell 3706. More specifically, when the shell 3706 and the mount 3708 are assembled to one another, the compliant member 3826 may be configured to provide a passive biasing load against the flag 3818 that forces the sensor contact(s) 3822 into continuous engagement with the corresponding circuitry contact(s) 3824. In the illustrated embodiment, the compliant member 3826 is an elastomeric O-ring, but could alternatively comprise any other type of biasing device or mechanism, such as a compression spring or the like, without departing from the scope of the disclosure.

The sensor control device 3702 may further include one or more electromagnetic shields, shown as a first shield 3828*a* and a second shield The shell 3706 may provide or otherwise define a first clocking receptacle 3830*a* (FIG. 51B) and a second clocking receptacle 3830*b* (FIG. 51B), and the mount 3708 may provide or otherwise define a first clocking post 3832*a* (FIG. 51A) and a second clocking post 3832*b* (FIG. 51A). Mating the first and second clocking receptacles 3830*a,b* with the first and second clocking posts 3832*a,b*, respectively, will properly align the shell 3706 to the mount 3708.

Referring specifically to FIG. 51A, the inner surface of the mount 3708 may provide or otherwise define a plurality of pockets or depressions configured to accommodate various component parts of the sensor control device 3702 when the shell 3706 is mated to the mount 3708. For example, the inner surface of the mount 3708 may define a battery locator 3834 configured to accommodate a portion of the battery 3812 when the sensor control device 3702 is assembled. An adjacent contact pocket 3836 may be configured to accommodate a portion of the axial contact 3814*a*.

Moreover, a plurality of module pockets 3838 may be defined in the inner surface of the mount 3708 to accommodate the various electronic modules 3806 arranged on the bottom of the PCB 3804. Furthermore, a shield locator 3840 may be defined in the inner surface of the mount 3708 to accommodate at least a portion of the second shield 3828*b* when the sensor control device 3702 is assembled. The battery locator 3834, the contact pocket 3836, the module pockets 3838, and the shield locator 3840 all extend a short distance into the inner surface of the mount 3708 and, as a result, the overall height H of the sensor control device 3702 may be reduced as compared to prior sensor control devices. The module pockets 3838 may also help minimize the diameter of the PCB 3804 by allowing PCB components to be arranged on both sides (i.e., top and bottom surfaces).

Still referring to FIG. 51A, the mount 3708 may further include a plurality of carrier grip features 3842 (two shown) defined about the outer periphery of the mount 3708. The carrier grip features 3842 are axially offset from the bottom 3844 of the mount 3708, where a transfer adhesive (not shown) may be applied during assembly. In contrast to prior sensor control devices, which commonly include conical carrier grip features that intersect with the bottom of the mount, the presently disclosed carrier grip features 3842 are offset from the plane (i.e., the bottom 3844) where the transfer adhesive is applied. This may prove advantageous in helping ensure that the delivery system does not inadvertently stick to the transfer adhesive during assembly. Moreover, the presently disclosed carrier grip features 3842 eliminate the need for a scalloped transfer adhesive, which simplifies the manufacture of the transfer adhesive and eliminates the need to accurately clock the transfer adhesive relative to the mount 3708. This also increases the bond area and, therefore, the bond strength.

Referring to FIG. 51B, the bottom 3844 of the mount 3708 may provide or otherwise define a plurality of grooves 3846, which may be defined at or near the outer periphery of the mount 3708 and equidistantly spaced from each other. A transfer adhesive (not shown) may be coupled to the bottom 3844 and the grooves 3846 may be configured to help convey (transfer) moisture away from the sensor control device 3702 and toward the periphery of the mount 3708 during use. In some embodiments, the spacing of the grooves 3846 may interpose the module pockets 3838 (FIG. 51A) defined on the opposing side (inner surface) of the mount 3708. As will be appreciated, alternating the position of the grooves 3846 and the module pockets 3838 ensures that the opposing features on either side of the mount 3708 do not extend into each other. This may help maximize usage of the material for the mount 3708 and thereby help maintain a minimal height H of the sensor control device 3702. The module pockets 3838 may also significantly reduce mold sink, and improve the flatness of the bottom 3844 that the transfer adhesive bonds to.

Still referring to FIG. 51B, the inner surface of the shell 3706 may also provide or otherwise define a plurality of pockets or depressions configured to accommodate various component parts of the sensor control device 3702 when the shell 3706 is mated to the mount 3708. For example, the inner surface of the shell 3706 may define an opposing battery locator 3848 arrangeable opposite the battery locator 3834 (FIG. 51A) of the mount 3708 and configured to accommodate a portion of the battery 3812 when the sensor control device 3702 is assembled. The opposing battery locator 3848 extends a short distance into the inner surface of the shell 3706, which helps reduce the overall height H of the sensor control device 3702.

A sharp and sensor locator 3852 may also be provided by or otherwise defined on the inner surface of the shell 3706. The sharp and sensor locator 3852 may be configured to receive both the sharp (not shown) and a portion of the sensor 3716. Moreover, the sharp and sensor locator 3852 may be configured to align and/or mate with a corresponding sharp and sensor locator 2054 (FIG. 51A) provided on the inner surface of the mount 3708.

Figure 52A:
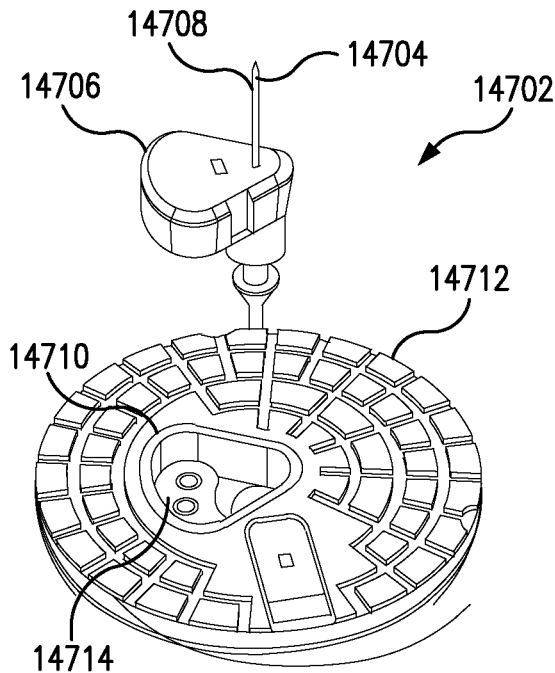
Figure 52B:
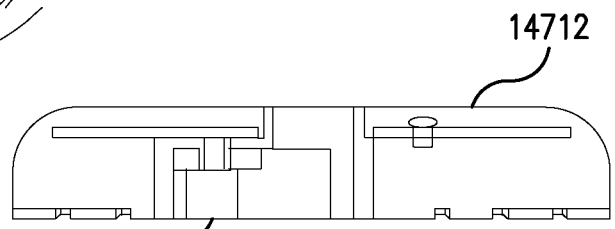
Figure 52C:
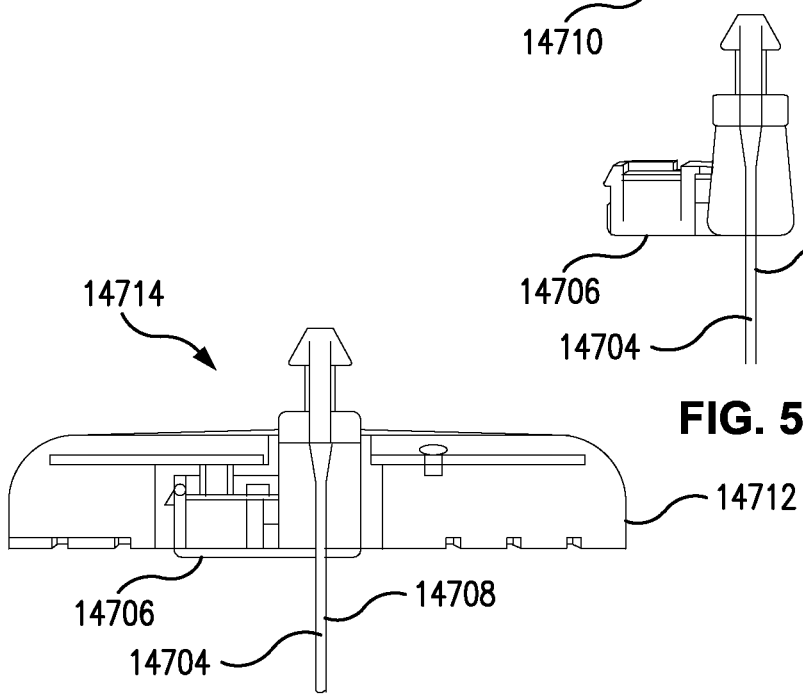

According to embodiments of the present disclosure, an alternative sensor assembly/electronics assembly connection approach is illustrated in FIGS. 52A to 52C. As shown, the sensor assembly 14702 includes sensor 14704, connector support 14706, and sharp 14708. Notably, a recess or receptacle 14710 may be defined in the bottom of the mount of the electronics assembly 14712 and provide a location where the sensor assembly 14702 may be received and coupled to the electronics assembly 14712, and thereby fully assemble the sensor control device. The profile of the sensor assembly 14702 may match or be shaped in complementary fashion to the receptacle 14710, which includes an elastomeric sealing member 14714 (including conductive material coupled to the circuit board and aligned with the electrical contacts of the sensor 14704). Thus, when the sensor assembly 14702 is snap fit or otherwise adhered to the electronics assembly 14712 by driving the sensor assembly 14702 into the integrally formed recess 14710 in the electronics assembly 14712, the on-body device 14714 depicted in FIG. 52C is formed. This embodiment provides an integrated connector for the sensor assembly 14702 within the electronics assembly 14712.

Additional information regarding sensor assemblies is provided in U.S. Publication No. 2013/0150691 and U.S. Publication No. 2021/0204841, each of which is incorporated by reference herein in its entirety.

Figure 53B:
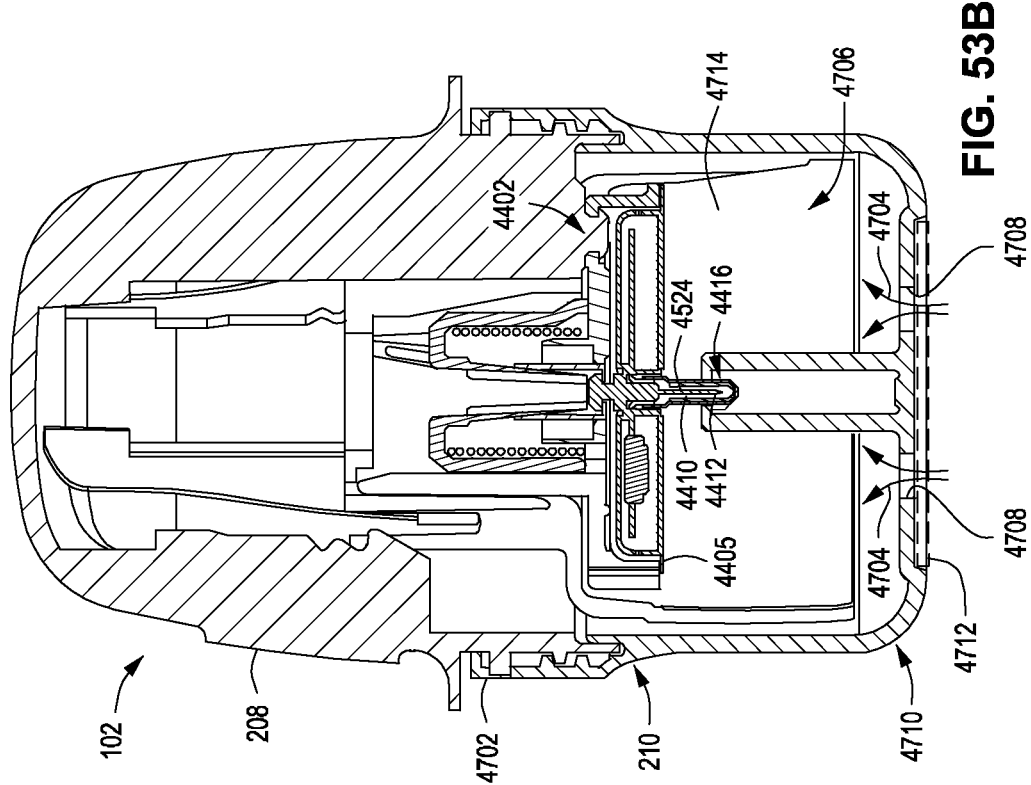
Figure 53A:
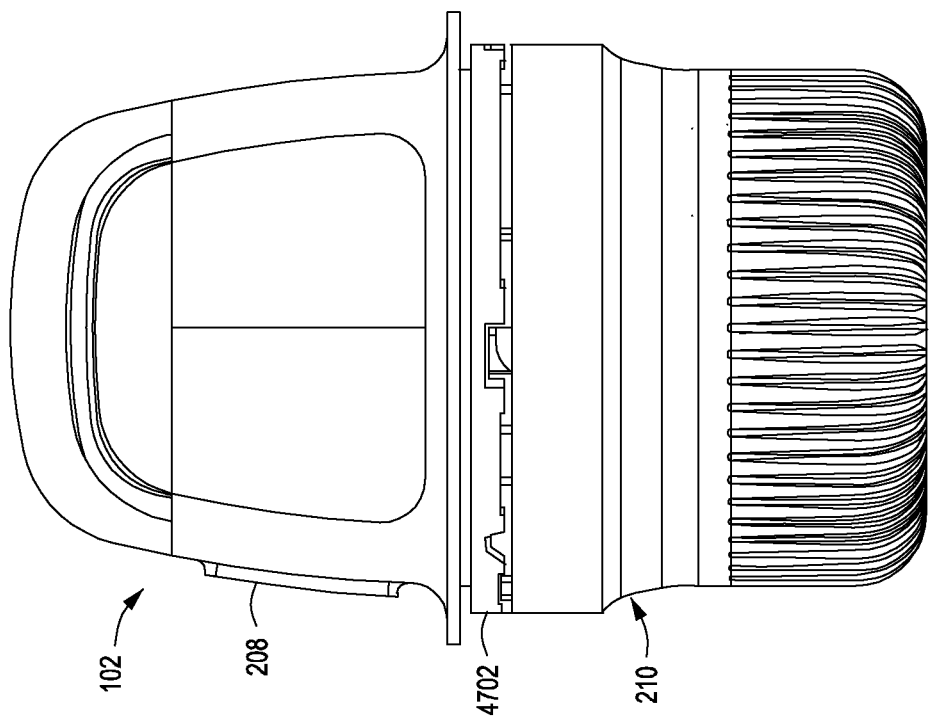

FIGS. 53A and 53B are side and cross-sectional side views, respectively, of an example embodiment of the sensor applicator 102 with the applicator cap 210 coupled thereto. More specifically, FIG. 53A depicts how the sensor applicator 102 might be shipped to and received by a user, and FIG. 53B depicts the sensor control device 4402 arranged within the sensor applicator 102. Accordingly, the fully assembled sensor control device 4402 may already be assembled and installed within the sensor applicator 102 prior to being delivered to the user, thus removing any additional assembly steps that a user would otherwise have to perform.

The fully assembled sensor control device 4402 may be loaded into the sensor applicator 102, and the applicator cap 210 may subsequently be coupled to the sensor applicator 102. In some embodiments, the applicator cap 210 may be threaded to the housing 208 and include a tamper ring 4702. Upon rotating (e.g., unscrewing) the applicator cap 210 relative to the housing 208, the tamper ring 4702 may shear and thereby free the applicator cap 210 from the sensor applicator 102.

According to the present disclosure, while loaded in the sensor applicator 102, the sensor control device 4402 may be subjected to gaseous chemical sterilization 4704 configured to sterilize the electronics housing 4404 and any other exposed portions of the sensor control device 4402. To accomplish this, a chemical may be injected into a sterilization chamber 4706 cooperatively defined by the sensor applicator 102 and the interconnected cap 210. In some applications, the chemical may be injected into the sterilization chamber 4706 via one or more vents 4708 defined in the applicator cap 210 at its proximal end 610. Example chemicals that may be used for the gaseous chemical sterilization 4704 include, but are not limited to, ethylene oxide, vaporized hydrogen peroxide, nitrogen oxide (e.g., nitrous oxide, nitrogen dioxide, etc.), and steam.

Since the distal portions of the sensor 4410 and the sharp 4412 are sealed within the sensor cap 4416, the chemicals used during the gaseous chemical sterilization process do not interact with the enzymes, chemistry, and biologics provided on the tail 4524 and other sensor components, such as membrane coatings that regulate analyte influx.

Once a desired sterility assurance level has been achieved within the sterilization chamber 4706, the gaseous solution may be removed and the sterilization chamber 4706 may be aerated. Aeration may be achieved by a series of vacuums and subsequently circulating a gas (e.g., nitrogen) or filtered air through the sterilization chamber 4706. Once the sterilization chamber 4706 is properly aerated, the vents 4708 may be occluded with a seal 4712 (shown in dashed lines).

In some embodiments, the seal 4712 may comprise two or more layers of different materials. The first layer may be made of a synthetic material (e.g., a flash-spun high-density polyethylene fiber), such as Tyvek® available from DuPont®. Tyvek® is highly durable and puncture resistant and allows the permeation of vapors. The Tyvek® layer can be applied before the gaseous chemical sterilization process, and following the gaseous chemical sterilization process, a foil or other vapor and moisture resistant material layer may be sealed (e.g., heat sealed) over the Tyvek® layer to prevent the ingress of contaminants and moisture into the sterilization chamber 4706. In other embodiments, the seal 4712 may comprise only a single protective layer applied to the applicator cap 210. In such embodiments, the single layer may be gas permeable for the sterilization process, but may also be capable of protection against moisture and other harmful elements once the sterilization process is complete.

With the seal 4712 in place, the applicator cap 210 provides a barrier against outside contamination, and thereby maintains a sterile environment for the assembled sensor control device 4402 until the user removes (unthreads) the applicator cap 210. The applicator cap 210 may also create a dust-free environment during shipping and storage that prevents the adhesive patch 4714 from becoming dirty.

Exemplary Methods of Calibrating Analyte Sensors

Biochemical sensors can be described by one or more sensing characteristics. A common sensing characteristic is referred to as the biochemical sensor's sensitivity, which is a measure of the sensor's responsiveness to the concentration of the chemical or composition it is designed to detect. For electrochemical sensors, this response can be in the form of an electrical current (amperometric) or electrical charge (coulometric). For other types of sensors, the response can be in a different form, such as a photonic intensity (e.g., optical light). The sensitivity of a biochemical analyte sensor can vary depending on a number of factors, including whether the sensor is in an in vitro state or an in vivo state.

Figure 54:
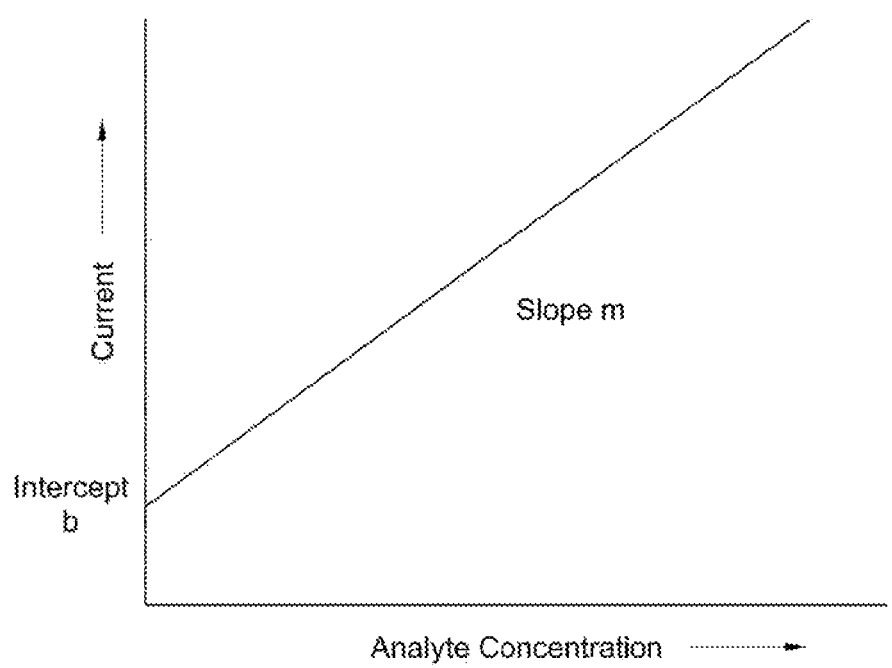

FIG. 54 is a graph depicting the in vitro sensitivity of an amperometric analyte sensor. The in vitro sensitivity can be obtained by in vitro testing the sensor at various analyte concentrations and then performing a regression (e.g., linear or non-linear) or other curve fitting on the resulting data. In this example, the analyte sensor's sensitivity is linear, or substantially linear, and can be modeled according to the equation y=mx+b, where y is the sensor's electrical output current, x is the analyte level (or concentration), m is the slope of the sensitivity and b is the intercept of the sensitivity, where the intercept generally corresponds to a background signal (e.g., noise). For sensors with a linear or substantially linear response, the analyte level that corresponds to a given current can be determined from the slope and intercept of the sensitivity. Sensors with a non-linear sensitivity require additional information to determine the analyte level resulting from the sensor's output current, and those of ordinary skill in the art are familiar with manners by which to model non-linear sensitivities. In certain embodiments of in vivo sensors, the in vitro sensitivity can be the same as the in vivo sensitivity, but in other embodiments a transfer (or conversion) function is used to translate the in vitro sensitivity into the in vivo sensitivity that is applicable to the sensor's intended in vivo use.

Calibration is a technique for improving or maintaining accuracy by adjusting a sensor's measured output to reduce the differences with the sensor's expected output. One or more parameters that describe the sensor's sensing characteristics, like its sensitivity, are established for use in the calibration adjustment.

Certain in vivo analyte monitoring systems require calibration to occur after implantation of the sensor into the user or patient, either by user interaction or by the system itself in an automated fashion. For example, when user interaction is required, the user performs an in vitro measurement (e.g., a blood glucose (BG) measurement using a finger stick and an in vitro test strip) and enters this into the system, while the analyte sensor is implanted. The system then compares the in vitro measurement with the in vivo signal and, using the differential, determines an estimate of the sensor's in vivo sensitivity. The in vivo sensitivity can then be used in an algorithmic process to transform the data collected with the sensor to a value that indicates the user's analyte level. This and other processes that require user action to perform calibration are referred to as "user calibration." Systems can require user calibration due to instability of the sensor's sensitivity, such that the sensitivity drifts or changes over time. Thus, multiple user calibrations (e.g., according to a periodic (e.g., daily) schedule, variable schedule, or on an as-needed basis) can be required to maintain accuracy. While the embodiments described herein can incorporate a degree of user calibration for a particular implementation, generally this is not preferred as it requires the user to perform a painful or otherwise burdensome BG measurement, and can introduce user error.

Some in vivo analyte monitoring systems can regularly adjust the calibration parameters through the use of automated measurements of characteristics of the sensor made by the system itself (e.g., processing circuitry executing software). The repeated adjustment of the sensor's sensitivity based on a variable measured by the system (and not the user) is referred to generally as "system" (or automated) calibration, and can be performed with user calibration, such as an early BG measurement, or without user calibration. Like the case with repeated user calibrations, repeated system calibrations are typically necessitated by drift in the sensor's sensitivity over time. Thus, while the embodiments described herein can be used with a degree of automated system calibration, preferably the sensor's sensitivity is relatively stable over time such that post-implantation calibration is not required.

Some In vivo analyte monitoring systems operate with a sensor that is factory calibrated. Factory calibration refers to the determination or estimation of the one or more calibration parameters prior to distribution to the user or healthcare professional (HCP). The calibration parameter can be determined by the sensor manufacturer (or the manufacturer of the other components of the sensor control device if the two entities are different). Many in vivo sensor manufacturing processes fabricate the sensors in groups or batches referred to as production lots, manufacturing stage lots, or simply lots. A single lot can include thousands of sensors.

Sensors can include a calibration code or parameter which can be derived or determined during one or more sensor manufacturing processes and coded or programmed, as part of the manufacturing process, in the data processing device of the analyte monitoring system or provided on the sensor itself, for example, as a bar code, a laser tag, an RFID tag, or other machine readable information provided on the sensor. User calibration during in vivo use of the sensor can be obviated, or the frequency of in vivo calibrations during sensor wear can be reduced if the code is provided to a receiver (or other data processing device). In embodiments where the calibration code or parameter is provided on the sensor itself, prior to or at the start of the sensor use, the calibration code or parameter can be automatically transmitted or provided to the data processing device in the analyte monitoring system.

Some In vivo analyte monitoring system operate with a sensor that can be one or more of factory calibrated, system calibrated, and/or user calibrated. For example, the sensor can be provided with a calibration code or parameter which can allow for factory calibration. If the information is provided to a receiver (for example, entered by a user), the sensor can operate as a factory calibrated sensor. If the information is not provided to a receiver, the sensor can operate as a user calibrated sensor and/or a system calibrated sensor.

In a further aspect, programming or executable instructions can be provided or stored in the data processing device of the analyte monitoring system, and/or the receiver/controller unit, to provide a time varying adjustment algorithm to the in vivo sensor during use. For example, based on a retrospective statistical analysis of analyte sensors used in vivo and the corresponding glucose level feedback, a pre-determined or analytical curve or a database can be generated which is time based, and configured to provide additional adjustment to the one or more in vivo sensor parameters to compensate for potential sensor drift in stability profile, or other factors.

In accordance with the disclosed subject matter, the analyte monitoring system can be configured to compensate or adjust for the sensor sensitivity based on a sensor drift profile. A time varying parameter $\beta(t)$ can be defined or determined based on analysis of sensor behavior during in vivo use, and a time varying drift profile can be determined. In certain aspects, the compensation or adjustment to the sensor sensitivity can be programmed in the receiver unit, the controller or data processor of the analyte monitoring system such that the compensation or the adjustment or both can be performed automatically and/or iteratively when sensor data is received from the analyte sensor. In accordance with the disclosed subject matter, the adjustment or compensation algorithm can be initiated or executed by the user (rather than self-initiating or executing) such that the adjustment or the compensation to the analyte sensor sensitivity profile is performed or executed upon user initiation or activation of the corresponding function or routine, or upon the user entering the sensor calibration code.

In accordance with the disclosed subject matter, each sensor in the sensor lot (in some instances not including sample sensors used for in vitro testing) can be examined non-destructively to determine or measure its characteristics such as membrane thickness at one or more points of the sensor, and other characteristics including physical characteristics such as the surface area/volume of the active area can be measured or determined. Such measurement or determination can be performed in an automated manner using, for example, optical scanners or other suitable measurement devices or systems, and the determined sensor characteristics for each sensor in the sensor lot is compared to the corresponding mean values based on the sample sensors for possible correction of the calibration parameter or code assigned to each sensor. For example, for a calibration parameter defined as the sensor sensitivity, the sensitivity is approximately inversely proportional to the membrane thickness, such that, for example, a sensor having a measured membrane thickness of approximately 4% greater than the mean membrane thickness for the sampled sensors from the same sensor lot as the sensor, the sensitivity assigned to that sensor in one embodiment is the mean sensitivity determined from the sampled sensors divided by 1.04. Likewise, since the sensitivity is approximately proportional to active area of the sensor, a sensor having measured active area of approximately 3% lower than the mean active area for the sampled sensors from the same sensor lot, the sensitivity assigned to that sensor is the mean sensitivity multiplied by 0.97. The assigned sensitivity can be determined from the mean sensitivity from the sampled sensors, by multiple successive adjustments for each examination or measurement of the sensor. In certain embodiments, examination or measurement of each sensor can additionally include measurement of membrane consistency or texture in addition to the membrane thickness and/or surface are or volume of the active sensing area.

Additional information regarding sensor calibration is provided in U.S. Publication No. 2010/00230285 and U.S. Publication No. 2019/0274598, each of which is incorporated by reference herein in its entirety.

Exemplary Bluetooth Communication Protocols

The storage memory 5030 of the sensor 110 can include the software blocks related to communication protocols of the communication module. For example, the storage memory 5030 can include a BLE services software block with functions to provide interfaces to make the BLE module 5041 available to the computing hardware of the sensor 110. These software functions can include a BLE logical interface and interface parser. BLE services offered by the communication module 5040 can include the generic access profile service, the generic attribute service, generic access service, device information service, data transmission services, and security services. The data transmission service can be a primary service used for transmitting data such as sensor control data, sensor status data, analyte measurement data (historical and current), and event log data. The sensor status data can include error data, current time active, and software state. The analyte measurement data can include information such as current and historical raw measurement values, current and historical values after processing using an appropriate algorithm or model, projections and trends of measurement levels, comparisons of other values to patient-specific averages, calls to action as determined by the algorithms or models and other similar types of data.

According to aspects of the disclosed subject matter, and as embodied herein, a sensor 110 can be configured to communicate with multiple devices concurrently by adapting the features of a communication protocol or medium supported by the hardware and radios of the sensor 110. As an example, the BLE module 5041 of the communication module 5040 can be provided with software or firmware to enable multiple concurrent connections between the sensor 110 as a central device and the other devices as peripheral devices, or as a peripheral device where another device is a central device.

Connections, and ensuing communication sessions, between two devices using a communication protocol such as BLE can be characterized by a similar physical channel operated between the two devices (e.g., a sensor 110 and data receiving device 120). The physical channel can include a single channel or a series of channels, including for example and without limitation using an agreed upon series of channels determined by a common clock and channel- or frequency-hopping sequence. Communication sessions can use a similar amount of the available communication spectrum, and multiple such communication sessions can exist in proximity. In certain embodiment, each collection of devices in a communication session uses a different physical channel or series of channels, to manage interference of devices in the same proximity.

For purpose of illustration and not limitation, reference is made to an exemplary embodiment of a procedure for a sensor-receiver connection for use with the disclosed subject matter. First, the sensor 110 repeatedly advertises its connection information to its environment in a search for a data receiving device 120. The sensor 110 can repeat advertising on a regular basis until a connection established. The data receiving device 120 detects the advertising packet and scans and filters for the sensor 120 to connect to through the data provided in the advertising packet. Next, data receiving device 120 sends a scan request command and the sensor 110 responds with a scan response packet providing additional details. Then, the data receiving device 120 sends a connection request using the Bluetooth device address associated with the data receiving device 120. The data receiving device 120 can also continuously request to establish a connection to a sensor 110 with a specific Bluetooth device address. Then, the devices establish an initial connection allowing them to begin to exchange data. The devices begin a process to initialize data exchange services and perform a mutual authentication procedure.

During a first connection between the sensor 110 and data receiving device 120, the data receiving device 120 can initialize a service, characteristic, and attribute discovery procedure. The data receiving device 120 can evaluate these features of the sensor 110 and store them for use during subsequent connections. Next, the devices enable a notification for a customized security service used for mutual authentication of the sensor 110 and data receiving device 120. The mutual authentication procedure can be automated and require no user interaction. Following the successful completion of the mutual authentication procedure, the sensor 110 sends a connection parameter update to request the data receiving device 120 to use connection parameter settings preferred by the sensor 110 and configured to maximum longevity.

The data receiving device 120 then performs sensor control procedures to backfill historical data, current data, event log, and factory data. As an example, for each type of data, the data receiving device 120 sends a request to initiate a backfill process. The request can specify a range of records defined based on, for example, the measurement value, timestamp, or similar, as appropriate. The sensor 110 responds with requested data until all previously unsent data in the memory of the sensor 110 is delivered to the data receiving device 120. The sensor 110 can respond to a backfill request from the data receiving device 120 that all data has already been sent. Once backfill is completed, the data receiving device 120 can notify sensor 110 that it is ready to receive regular measurement readings. The sensor 110 can send readings across multiple notifications result on a repeating basis. As embodied herein, the multiple notifications can be redundant notifications to ensure that data is transmitted correctly. Alternatively, multiple notifications can make up a single payload.

For purpose of illustration and not limitation, reference is made to an exemplary embodiment of a procedure to send a shutdown command to the sensor 110. The shutdown operation is executed if the sensor 110 is in, for example, an error state, insertion failed state, or sensor expired state. If the sensor 110 is not in those states, the sensor 110 can log the command and execute the shutdown when sensor 110 transitions into the error state or sensor expired state. The data receiving device 120 sends a properly formatted shutdown command to the sensor 110. If the sensor 110 is actively processing another command, the sensor 110 will respond with a standard error response indicating that the sensor 110 is busy. Otherwise, the sensor 110 sends a response as the command is received. Additionally, the sensor 110 sends a success notification through the sensor control characteristic to acknowledge the sensor 110 has received the command. The sensor 110 registers the shutdown command. At the next appropriate opportunity (e.g., depending on the current sensor state, as described herein), the sensor 110 will shut down.

Exemplary Sensor States and Activation

Figure 55:
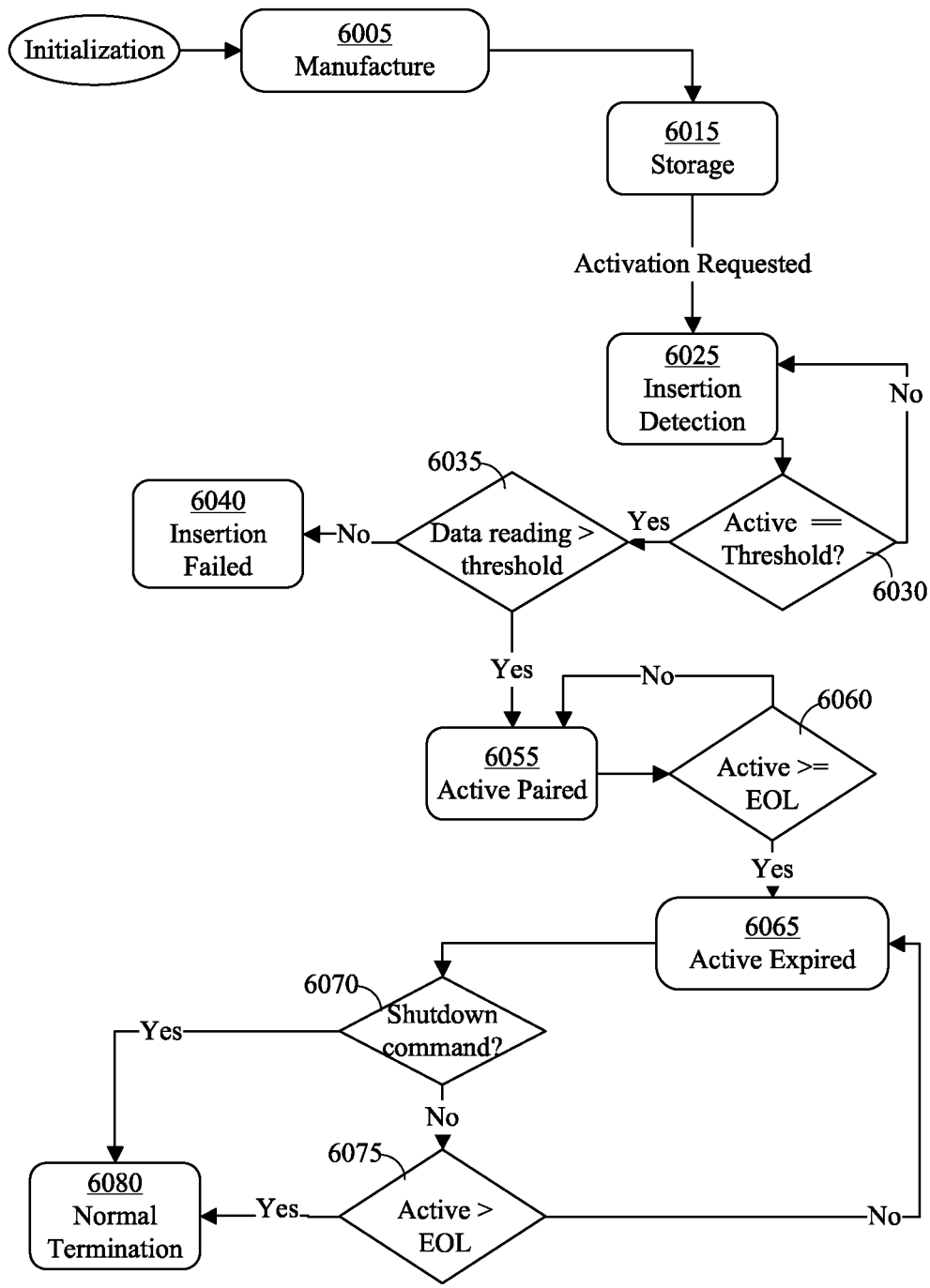

For purpose of illustration and not limitation, reference is made to the exemplary embodiment of a high-level depiction of a state machine representation 6000 of the actions that can be taken by the sensor 110 as shown in FIG. 55. After initialization, the sensor enters state 6005, which relates to the manufacture of the sensor 110. In the manufacture state 6005 the sensor 110 can be configured for operation, for example, the storage memory 5030 can be written. At various times while in state 6005, the sensor 110 checks for a received command to go to the storage state 6015. Upon entry to the storage state 6015, the sensor performs a software integrity check. While in the storage state 6015, the sensor can also receive an activation request command before advancing to the insertion detection state 6025.

Upon entry to state 6025, the sensor 110 can store information relating to devices authenticated to communicate with the sensor as set during activation or initialize algorithms related to conducting and interpreting measurements from the sensing hardware 5060. The sensor 110 can also initialize a lifecycle timer, responsible for maintaining an active count of the time of operation of the sensor 110 and begin communication with authenticated devices to transmit recorded data. While in the insertion detection state 6025, the sensor can enter state 6030, where the sensor 110 checks whether the time of operation is equal to a predetermined threshold. This time of operation threshold can correspond to a timeout function for determining whether an insertion has been successful. If the time of operation has reached the threshold, the sensor 110 advances to state 6035, in which the sensor 110 checks whether the average data reading is greater than a threshold amount corresponding to an expected data reading volume for triggering detection of a successful insertion. If the data reading volume is lower than the threshold while in state 6035, the sensor advances to state 6040, corresponding to a failed insertion. If the data reading volume satisfies the threshold, the sensor advances to the active paired state 6055.

The active paired state 6055 of the sensor 110 reflects the state while the sensor 110 is operating as normal by recording measurements, processing the measurements, and reporting them as appropriate. While in the active paired state 6055, the sensor 110 sends measurement results or attempts to establish a connection with a receiving device 120. The sensor 110 also increments the time of operation. Once the sensor 110 reaches a predetermined threshold time of operation (e.g., once the time of operation reaches a predetermined threshold), the sensor 110 transitions to the active expired state 6065. The active expired state 6065 of the sensor 110 reflects the state while the sensor 110 has operated for its maximum predetermined amount of time.

While in the active expired state 6065, the sensor 110 can generally perform operations relating to winding down operation and ensuring that the collected measurements have been securely transmitted to receiving devices as needed. For example, while in the active expired state 6065, the sensor 110 can transmit collected data and, if no connection is available, can increase efforts to discover authenticated devices nearby and establish and connection therewith. While in the active expired state 6065, the sensor 110 can receive a shutdown command at state 6070. If no shutdown command is received, the sensor 110 can also, at state 6075, check if the time of operation has exceeded a final operation threshold. The final operation threshold can be based on the battery life of the sensor 110. The normal termination state 6080 corresponds to the final operations of the sensor 110 and ultimately shutting down the sensor 110.

Before a sensor is activated, the ASIC 5000 resides in a low power storage mode state. The activation process can begin, for example, when an incoming RF field (e.g., NFC field) drives the voltage of the power supply to the ASIC 5000 above a reset threshold, which causes the sensor 110 to enter a wake-up state. While in the wake-up state, the ASIC 5000 enters an activation sequence state. The ASIC 5000 then wakes the communication module 5040. The communication module 5040 is initialized, triggering a power on self-test. The power on self-test can include the ASIC 5000 communicating with the communication module 5040 using a prescribed sequence of reading and writing data to verify the memory and one-time programmable memory are not corrupted.

When the ASIC 5000 enters the measurement mode for the first time, an insertion detection sequence is performed to verify that the sensor 110 has been properly installed onto the patient's body before a proper measurement can take place. First, the sensor 110 interprets a command to activate the measurement configuration process, causing the ASIC 5000 to enter measurement command mode. The sensor 110 then temporarily enters the measurement lifecycle state to run a number of consecutive measurements to test whether the insertion has been successful. The communication module 5040 or ASIC 5000 evaluates the measurement results to determine insertion success. When insertion is deemed successful, the sensor 110 enters a measurement state, in which the sensor 110 begins taking regular measurements using sensing hardware 5060. If the sensor 110 determines that the insertion was not successful, sensor 110 is triggered into an insertion failure mode, in which the ASIC 5000 is commanded back to storage mode while the communication module 5040 disables itself.

Exemplary Over-the-Air Updates

FIG. 1A further illustrates an example operating environment for providing over-the-air ("OTA") updates for use with the techniques described herein. An operator of the analyte monitoring system 100 can bundle updates for the data receiving device 120 or sensor 110 into updates for an application executing on the multi-purpose data receiving device 130. Using available communication channels between the data receiving device 120, the multi-purpose data receiving device 130, and the sensor 110, the multi-purpose data receiving device 130 can receive regular updates for the data receiving device 120 or sensor 110 and initiate installation of the updates on the data receiving device 120 or sensor 110. The multi-purpose data receiving device 130 acts as an installation or update platform for the data receiving device 120 or sensor 110 because the application that enables the multi-purpose data receiving device 130 to communicate with an analyte sensor 110, data receiving device 120 and/or remote application server 150 can update software or firmware on a data receiving device 120 or sensor 110 without wide-area networking capabilities.

As embodied herein, a remote application server 150 operated by the manufacturer of the analyte sensor 110 and/or the operator of the analyte monitoring system 100 can provide software and firmware updates to the devices of the analyte monitoring system 100. In particular embodiments, the remote application server 150 can provides the updated software and firmware to a user device 140 or directly to a multi-purpose data receiving device. As embodied herein, the remote application server 150 can also provide application software updates to an application storefront server 160 using interfaces provided by the application storefront. The multi-purpose data receiving device 130 can contact the application storefront server 160 periodically to download and install the updates.

After the multi-purpose data receiving device 130 downloads an application update including a firmware or software update for a data receiving device 120 or sensor 110, the data receiving device 120 or sensor 110 and multi-purpose data receiving device 130 establish a connection. The multi-purpose data receiving device 130 determines that a firmware or software update is available for the data receiving device 120 or sensor 110. The multi-purpose data receiving device 130 can prepare the software or firmware update for delivery to the data receiving device 120 or sensor 110. As an example, the multi-purpose data receiving device 130 can compress or segment the data associated with the software or firmware update, can encrypt or decrypt the firmware or software update, or can perform an integrity check of the firmware or software update. The multi-purpose data receiving device 130 sends the data for the firmware or software update to the data receiving device 120 or sensor 110. The multi-purpose data receiving device 130 can also send a command to the data receiving device 120 or sensor 110 to initiate the update. Additionally or alternatively, the multi-purpose data receiving device 130 can provide a notification to the user of the multi-purpose data receiving device 130 and include instructions for facilitating the update, such as instructions to keep the data receiving device 120 and the multi-purpose data receiving device 130 connected to a power source and in close proximity until the update is complete.

The data receiving device 120 or sensor 110 receives the data for the update and the command to initiate the update from the multi-purpose data receiving device 130. The data receiving device 120 can then install the firmware or software update. To install the update, the data receiving device 120 or sensor 110 can place or restart itself in a so-called "safe" mode with limited operational capabilities. Once the update is completed, the data receiving device 120 or sensor 110 re-enters or resets into a standard operational mode. The data receiving device 120 or sensor 110 can perform one or more self-tests to determine that the firmware or software update was installed successfully. The multi-purpose data receiving device 130 can receive the notification of the successful update. The multi-purpose data receiving device 130 can then report a confirmation of the successful update to the remote application server 150.

In particular embodiments, the storage memory 5030 of the sensor 110 includes one-time programmable (OTP) memory. The term OTP memory can refer to memory that includes access restrictions and security to facilitate writing to particular addresses or segments in the memory a predetermined number of times. The memory 5030 can be pre-arranged into multiple pre-allocated memory blocks or containers. The containers are pre-allocated into a fixed size. If storage memory 5030 is one-time programming memory, the containers can be considered to be in a non-programmable state. Additional containers which have not yet been written to can be placed into a programmable or writable state. Containerizing the storage memory 5030 in this fashion can improve the transportability of code and data to be written to the storage memory 5030. Updating the software of a device (e.g., the sensor device described herein) stored in an OTP memory can be performed by superseding only the code in a particular previously-written container or containers with updated code written to a new container or containers, rather than replacing the entire code in the memory. In a second embodiment, the memory is not prearranged. Instead, the space allocated for data is dynamically allocated or determined as needed. Incremental updates can be issued, as containers of varying sizes can be defined where updates are anticipated.

Figure 56:
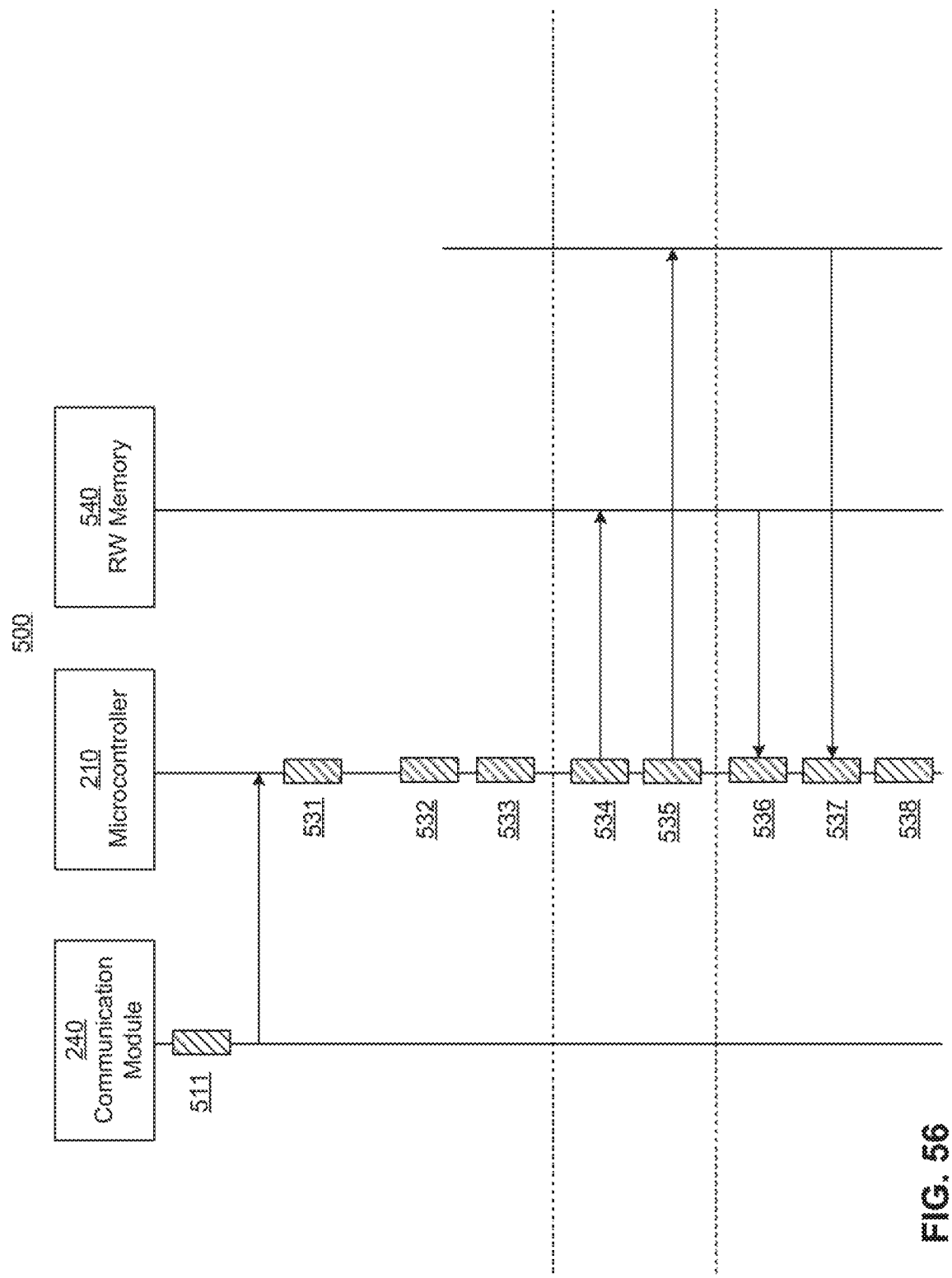

FIG. 56 is a diagram illustrating an example operational and data flow for over-the-air (OTA) programming of a storage memory 5030 in a sensor device 100 as well as use of the memory after the OTA programming in execution of processes by the sensor device 110 according to the disclosed subject matter. In the example OTA programming 500 illustrated in FIG. 56, a request is sent from an external device (e.g., the data receiving device 130) to initiate OTA programming (or re-programming). At 511, a communication module 5040 of a sensor device 110 receives an OTA programming command. The communication module 5040 sends the OTA programming command to the microcontroller 5010 of the sensor device 110.

At 531, after receiving the OTA programming command, the microcontroller 5010 validates the OTA programming command. The microcontroller 5010 can determine, for example, whether the OTA programming command is signed with an appropriate digital signature token. Upon determining that the OTA programming command is valid, the microcontroller 5010 can set the sensor device into an OTA programming mode. At 532, the microcontroller 5010 can validate the OTA programming data. At 533, The microcontroller 5010 can reset the sensor device 110 to re-initialize the sensor device 110 in a programming state. Once the sensor device 110 has transitioned into the OTA programming state, the microcontroller 5010 can begin to write data to the rewriteable memory 540 (e.g., memory 5020) of the sensor device at 534 and write data to the OTP memory 550 of the sensor device at 535 (e.g., storage memory 5030). The data written by the microcontroller 5010 can be based on the validated OTA programming data. The microcontroller 5010 can write data to cause one or more programming blocks or regions of the OTP memory 550 to be marked invalid or inaccessible. The data written to the free or unused portion of the OTP memory can be used to replace invalidated or inaccessible programming blocks of the OTP memory 550. After the microcontroller 5010 writes the data to the respective memories at 534 and 535, the microcontroller 5010 can perform one or more software integrity checks to ensure that errors were not introduced into the programming blocks during the writing process. Once the microcontroller 5010 is able to determine that the data has been written without errors, the microcontroller 5010 can resume standard operations of the sensor device.

In execution mode, at 536, the microcontroller 5010 can retrieve a programming manifest or profile from the rewriteable memory 540. The programming manifest or profile can include a listing of the valid software programming blocks and can include a guide to program execution for the sensor 110. By following the programming manifest or profile, the microcontroller 5010 can determine which memory blocks of the OTP memory 550 are appropriate to execute and avoid execution of out-of-date or invalidated programming blocks or reference to out-of-date data. At 537, the microcontroller 5010 can selectively retrieve memory blocks from the OTP memory 550. At 538, the microcontroller 5010 can use the retrieved memory blocks, by executing programming code stored or using variable stored in the memory.

Exemplary Security and Other Architecture Features

As embodied herein a first layer of security for communications between the analyte sensor 110 and other devices can be established based on security protocols specified by and integrated in the communication protocols used for the communication. Another layer of security can be based on communication protocols that necessitate close proximity of communicating devices. Furthermore certain packets and/or certain data included within packets can be encrypted while other packets and/or data within packets is otherwise encrypted or not encrypted. Additionally or alternatively, application layer encryption can be used with one or more block ciphers or stream ciphers to establish mutual authentication and communication encryption with other devices in the analyte monitoring system 100.

The ASIC 5000 of the analyte sensor 110 can be configured to dynamically generate authentication and encryption keys using data retained within the storage memory 5030. The storage memory 5030 can also be pre-programmed with a set of valid authentication and encryption keys to use with particular classes of devices. The ASIC 5000 can be further configured to perform authentication procedures with other devices using received data and apply the generated key to sensitive data prior to transmitting the sensitive data. The generated key can be unique to the analyte sensor 110, unique to a pair of devices, unique to a communication session between an analyte sensor 110 and other device, unique to a message sent during a communication session, or unique to a block of data contained within a message.

Both the sensor 110 and a data receiving device 120 can ensure the authorization of the other party in a communication session to, for example, issue a command or receive data. In particular embodiments, identity authentication can be performed through two features. First, the party asserting its identity provides a validated certificate signed by the manufacturer of the device or the operator of the analyte monitoring system 100. Second, authentication can be enforced through the use of public keys and private keys, and shared secrets derived therefrom, established by the devices of the analyte monitoring system 100 or established by the operator of the analyte monitoring system 100. To confirm the identity of the other party, the party can provide proof that the party has control of its private key.

The manufacturer of the analyte sensor 110, data receiving device 120, or provider of the application for multipurpose data receiving device 130 can provide information and programming necessary for the devices to securely communicate through secured programming and updates. For example, the manufacturer can provide information that can be used to generate encryption keys for each device, including secured root keys for the analyte sensor 110 and optionally for the data receiving device 120 that can be used in combination with device-specific information and operational data (e.g., entropy-based random values) to generate encryption values unique to the device, session, or data transmission as need.

Analyte data associated with a user is sensitive data at least in part because this information can be used for a variety of purposes, including for health monitoring and medication dosing decisions. In addition to user data, the analyte monitoring system 100 can enforce security hardening against efforts by outside parties to reverse-engineering. Communication connections can be encrypted using a device-unique or session-unique encryption key. Encrypted communications or unencrypted communications between any two devices can be verified with transmission integrity checks built into the communications. Analyte sensor 110 operations can be protected from tampering by restricting access to read and write functions to the memory 5020 via a communication interface. The sensor can be configured to grant access only to known or "trusted" devices, provided in a "whitelist" or only to devices that can provide a predetermined code associated with the manufacturer or an otherwise authenticated user. A whitelist can represent an exclusive range, meaning that no connection identifiers besides those included in the whitelist will be used, or a preferred range, in which the whitelist is searched first, but other devices can still be used. The sensor 110 can further deny and shut down connection requests if the requestor cannot complete a login procedure over a communication interface within a predetermined period of time (e.g., within four seconds). These characteristics safeguard against specific denial of service attacks, and in particular against denial of service attacks on a BLE interface.

As embodied herein, the analyte monitoring system 100 can employ periodic key rotation to further reduce the likelihood of key compromise and exploitation. A key rotation strategy employed by the analyte monitoring system 100 can be designed to support backward compatibility of field-deployed or distributed devices. As an example, the analyte monitoring system 100 can employ keys for downstream devices (e.g., devices that are in the field or cannot be feasibly provided updates) that are designed to be compatible with multiple generations of keys used by upstream devices.

Figure 57:
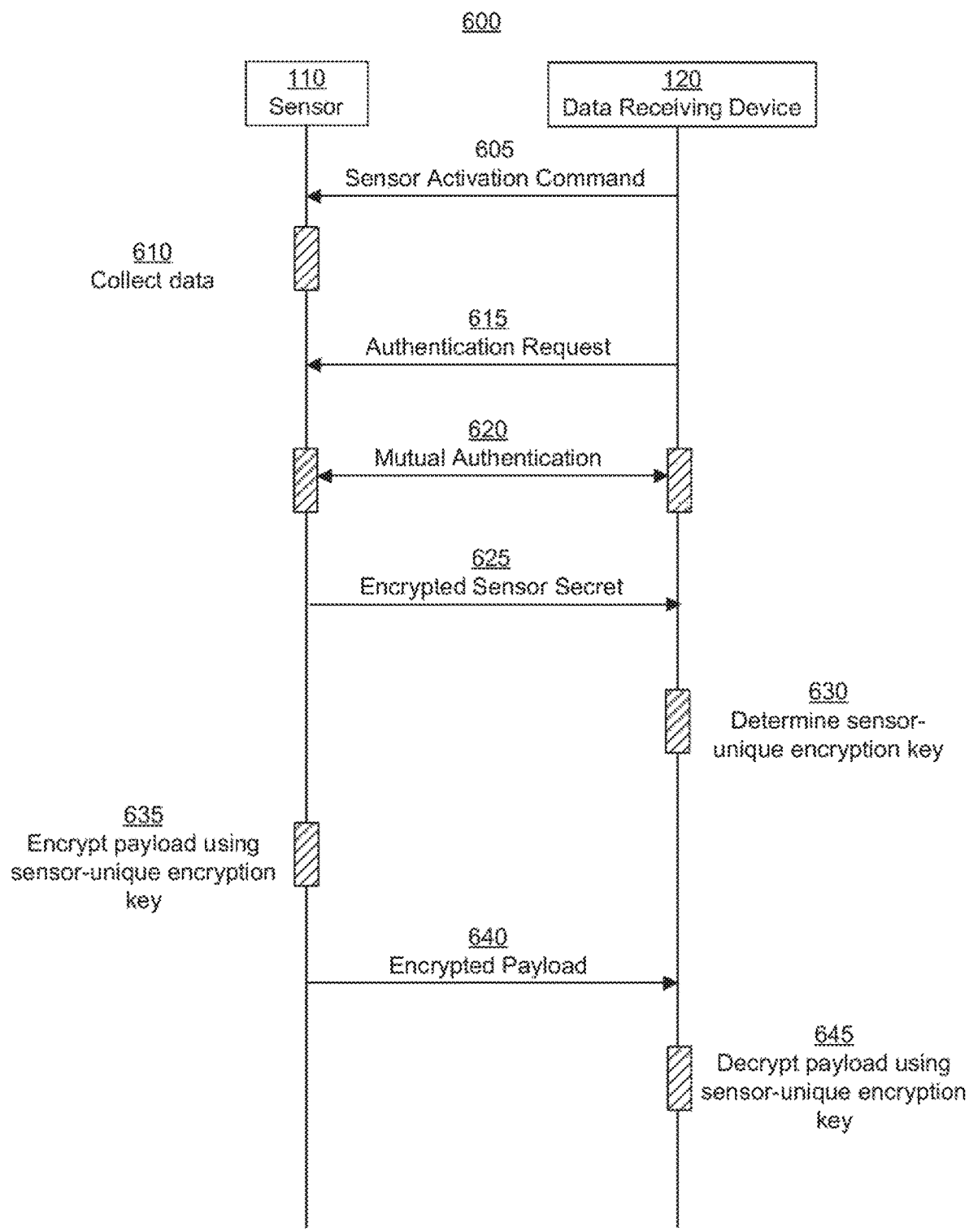

For purpose of illustration and not limitation, reference is made to the exemplary embodiment of a message sequence diagram 600 for use with the disclosed subject matter as shown in FIG. 57 and demonstrating an example exchange of data between a pair of devices, particularly a sensor 110 and a data receiving device 120. The data receiving device 120 can, as embodied herein, be a data receiving device 120 or a multi-purpose data receiving device 130. At step 605, the data receiving device 120 can transmit a sensor activation command 605 to the sensor 110, for example via a short-range communication protocol. The sensor 110 can, prior to step 605 be in a primarily dormant state, preserving its battery until full activation is needed. After activation during step 610, the sensor 110 can collect data or perform other operations as appropriate to the sensing hardware 5060 of the sensor 110. At step 615 the data receiving device 120 can initiate an authentication request command 615. In response to the authentication request command 615, both the sensor 110 and data receiving device 120 can engage in a mutual authentication process 620. The mutual authentication process 620 can involve the transfer of data, including challenge parameters that allow the sensor 110 and data receiving device 120 to ensure that the other device is sufficiently capable of adhering to an agreed-upon security framework described herein. Mutual authentication can be based on mechanisms for authentication of two or more entities to each other with or without on-line trusted third parties to verify establishment of a secret key via challenge-response. Mutual authentication can be performed using two-, three-, four-, or five-pass authentication, or similar versions thereof.

Following a successful mutual authentication process 620, at step 625 the sensor 110 can provide the data receiving device 120 with a sensor secret 625. The sensor secret can contain sensor-unique values and be derived from random values generated during manufacture. The sensor secret can be encrypted prior to or during transmission to prevent third-parties from accessing the secret. The sensor secret 625 can be encrypted via one or more of the keys generated by or in response to the mutual authentication process 620. At step 630, the data receiving device 120 can derive a sensor-unique encryption key from the sensor secret. The sensor-unique encryption key can further be session-unique. As such, the sensor-unique encryption key can be determined by each device without being transmitted between the sensor 110 or data receiving device 120. At step 635, the sensor 110 can encrypt data to be included in payload. At step 640, the sensor 110 can transmit the encrypted payload 640 to the data receiving device 120 using the communication link established between the appropriate communication models of the sensor 110 and data receiving device 120. At step 645, the data receiving device 120 can decrypt the payload using the sensor-unique encryption key derived during step 630. Following step 645, the sensor 110 can deliver additional (including newly collected) data and the data receiving device 120 can process the received data appropriately.

As discussed herein, the sensor 110 can be a device with restricted processing power, battery supply, and storage. The encryption techniques used by the sensor 110 (e.g., the cipher algorithm or the choice of implementation of the algorithm) can be selected based at least in part on these restrictions. The data receiving device 120 can be a more powerful device with fewer restrictions of this nature. Therefore, the data receiving device 120 can employ more sophisticated, computationally intense encryption techniques, such as cipher algorithms and implementations.

Exemplary Payload/Communication Frequencies

The analyte sensor 110 can be configured to alter its discoverability behavior to attempt to increase the probability of the receiving device receiving an appropriate data packet and/or provide an acknowledgement signal or otherwise reduce restrictions that can be causing an inability to receive an acknowledgement signal. Altering the discoverability behavior of the analyte sensor 110 can include, for example and without limitation, altering the frequency at which connection data is included in a data packet, altering how frequently data packets are transmitted generally, lengthening or shortening the broadcast window for data packets, altering the amount of time that the analyte sensor 110 listens for acknowledgement or scan signals after broadcasting, including directed transmissions to one or more devices (e.g., through one or more attempted transmissions) that have previously communicated with the analyte sensor 110 and/or to one or more devices on a whitelist, altering a transmission power associated with the communication module when broadcasting the data packets (e.g., to increase the range of the broadcast or decrease energy consumed and extend the life of the battery of the analyte sensor), altering the rate of preparing and broadcasting data packets, or a combination of one or more other alterations. Additionally, or alternatively, the receiving device can similarly adjust parameters relating to the listening behavior of the device to increase the likelihood of receiving a data packet including connection data.

As embodied herein, the analyte sensor 110 can be configured to broadcast data packets using two types of windows. The first window refers to the rate at which the analyte sensor 110 is configured to operate the communication hardware. The second window refers to the rate at which the analyte sensor 110 is configured to be actively transmitting data packets (e.g., broadcasting). As an example, the first window can indicate that the analyte sensor 110 operates the communication hardware to send and/or receive data packets (including connection data) during the first 2 seconds of each 60 second period. The second window can indicate that, during each 2 second window, the analyte sensor 110 transmits a data packet every 60 milliseconds. The rest of the time during the 2 second window, the analyte sensor 110 is scanning. The analyte sensor 110 can lengthen or shorten either window to modify the discoverability behavior of the analyte sensor 110.

In particular embodiments, the discoverability behavior of the analyte sensor can be stored in a discoverability profile, and alterations can be made based on one or more factors, such as the status of the analyte sensor 110 and/or by applying rules based on the status of the analyte sensor 110. For example, when the battery level of the analyte sensor 110 is below a certain amount, the rules can cause the analyte sensor 110 to decrease the power consumed by the broadcast process. As another example, configuration settings associated with broadcasting or otherwise transmitting packets can be adjusted based on the ambient temperature, the temperature of the analyte sensor 110, or the temperature of certain components of communication hardware of the analyte sensor 110. In addition to modifying the transmission power, other parameters associated with the transmission capabilities or processes of the communication hardware of the analyte sensor 110 can be modified, including, but not limited to, transmission rate, frequency, and timing. As another example, when the analyte data indicates that the subject is, or is about to be, experiencing a negative health event, the rules can cause the analyte sensor 110 to increase its discoverability to alert the receiving device of the negative health event.

Exemplary Sensor Sensitivity Initialization/Adjustment Features

As embodied herein, certain calibration features for the sensing hardware 5060 of the analyte sensor 110 can be adjusted based on external or interval environment features as well as to compensate for the decay of the sensing hardware 5060 during expended period of disuse (e.g., a "shelf time" prior to use). The calibration features of the sensing hardware 5060 can be autonomously adjusted by the sensor 110 (e.g., by operation of the ASIC 5000 to modify features in the memory 5020 or storage 5030) or can be adjusted by other devices of the analyte monitoring system 100.

As an example, sensor sensitivity of the sensing hardware 5060 can be adjusted based on external temperature data or the time since manufacture. When external temperatures are monitored during the storage of the sensors, the disclosed subject matter can adaptively change the compensation to sensor sensitivity over time when the device experiences changing storage conditions. For purpose of illustration not limitations, adaptive sensitivity adjustment can be performed in an "active" storage mode where the analyte sensor 110 wakes up periodically to measure temperature. These features can save the battery of the analyte device and extend the lifespan of the analyte sensors. At each temperature measurement, the analyte sensor 110 can calculate a sensitivity adjustment for that time period based on the measured temperature. Then, the temperature-weighted adjustments can be accumulated over the active storage mode period to calculate a total sensor sensitivity adjustment value at the end of the active storage mode (e.g., at insertion). Similarly, at insertion, the sensor 110 can determine the time difference between manufacture of the sensor 110 (which can be written to the storage 5030 of the ASIC 5000) or the sensing hardware 5060 and modify sensor sensitivity or other calibration features according to one or more known decay rates or formulas.

Additionally, for purpose of illustration and not limitation, as embodied herein, sensor sensitivity adjustments can account for other sensor conditions, such as sensor drift. Sensor sensitivity adjustments can be hardcoded into the sensor 110 during manufacture, for example in the case of sensor drift, based on an estimate of how much an average sensor would drift. Sensor 110 can use a calibration function that has time-varying functions for sensor offset and gain, which can account for drift over a wear period of the sensor. Thus, sensor 110 can utilize a function used to transform an interstitial current to interstitial glucose utilizing device-dependent functions describing sensor 110 drift over time, and which can represent sensor sensitivity, and can be device specific, combined with a baseline of the glucose profile. Such functions to account for sensor sensitivity and drift can improve sensor 110 accuracy over a wear period and without involving user calibration.

Exemplary Model-based Analyte Measurements

The sensor 110 detects raw measurement values from sensing hardware 5060. On-sensor processing can be performed, such as by one or more models trained to interpret the raw measurement values. Models can be machine learned models trained off-device to detect, predict, or interpret the raw measurement values to detect, predict, or interpret the levels of one or more analytes. Additional trained models can operate on the output of the machine learning models trained to interact with raw measurement values. As an example, models can be used to detect, predict, or recommend events based on the raw measurements and type of analyte(s) detected by the sensing hardware 5060. Events can include, initiation or completion of physical activity, meals, application of medical treatment or medication, emergent health events, and other events of a similar nature.

Models can be provided to the sensor 110, data receiving device 120, or multi-purpose data receiving device 130 during manufacture or during firmware or software updates. Models can be periodically refined, such as by the manufacturer of the sensor 110 or the operator of the analyte monitoring system 100, based on data received from the sensor 110 and data receiving devices of an individual user or multiple users collectively. In certain embodiments, the sensor 110 includes sufficient computational components to assist with further training or refinement of the machine learned models, such as based on unique features of the user to which the sensor 110 is attached. Machine learning models can include, by way of example and not limitation, models trained using or encompassing decision tree analysis, gradient boosting, ada boosting, artificial neural networks or variants thereof, linear discriminant analysis, nearest neighbor analysis, support vector machines, supervised or unsupervised classification, and others. The models can also include algorithmic or rules-based models in addition to machine learned models. Model-based processing can be performed by other devices, including the data receiving device 120 or multi-purpose data receiving device 130, upon receiving data from the sensor 110 (or other downstream devices).

Exemplary Alarm Features

Data transmitted between the sensor 110 and a data receiving device 120 can include raw or processed measurement values. Data transmitted between the sensor 110 and data receiving device 120 can further include alarms or notification for display to a user. The data receiving device 120 can display or otherwise convey notifications to the user based on the raw or processed measurement values or can display alarms when received from the sensor 110. Alarms that may be triggered for display to the user include alarms based on direct analyte values (e.g., one-time reading exceeding a threshold or failing to satisfy a threshold), analyte value trends (e.g., average reading over a set period of time exceeding a threshold or failing to satisfy a threshold; slope); analyte value predictions (e.g., algorithmic calculation based on analyte values exceeds a threshold or fails to satisfy a threshold), sensor alerts (e.g., suspected malfunction detected), communication alerts (e.g., no communication between sensor 110 and data receiving device 120 for a threshold period of time; unknown device attempting or failing to initiate a communication session with the sensor 110), reminders (e.g., reminder to charge data receiving device 120; reminder to take a medication or perform other activity), and other alerts of a similar nature. For purpose of illustration and not limitation, as embodied herein, the alarm parameters described herein can be configurable by a user or can be fixed during manufacture, or combinations of user-settable and non-user-settable parameters.

With respect to any of the applicator embodiments described herein, as well as any of the components thereof, including but not limited to the sharp, sharp module and sensor module embodiments, those of skill in the art will understand that said embodiments can be dimensioned and configured for use with sensors configured to sense an analyte level in a bodily fluid in the epidermis, dermis, or subcutaneous tissue of a subject. In some embodiments, for example, sharps and distal portions of analyte sensors disclosed herein can both be dimensioned and configured to be positioned at a particular end-depth (i.e., the furthest point of penetration in a tissue or layer of the subject's body, e.g., in the epidermis, dermis, or subcutaneous tissue). With respect to some applicator embodiments, those of skill in the art will appreciate that certain embodiments of sharps can be dimensioned and configured to be positioned at a different end-depth in the subject's body relative to the final end-depth of the analyte sensor. In some embodiments, for example, a sharp can be positioned at a first end-depth in the subject's epidermis prior to retraction, while a distal portion of an analyte sensor can be positioned at a second end-depth in the subject's dermis. In other embodiments, a sharp can be positioned at a first end-depth in the subject's dermis prior to retraction, while a distal portion of an analyte sensor can be positioned at a second end-depth in the subject's subcutaneous tissue. In still other embodiments, a sharp can be positioned at a first end-depth prior to retraction and the analyte sensor can be positioned at a second end-depth, wherein the first end-depth and second end-depths are both in the same layer or tissue of the subject's body.

Additionally, with respect to any of the applicator embodiments described herein, those of skill in the art will understand that an analyte sensor, as well as one or more structural components coupled thereto, including but not limited to one or more spring-mechanisms, can be disposed within the applicator in an off-center position relative to one or more axes of the applicator. In some applicator embodiments, for example, an analyte sensor and a spring mechanism can be disposed in a first off-center position relative to an axis of the applicator on a first side of the applicator, and the sensor electronics can be disposed in a second off-center position relative to the axis of the applicator on a second side of the applicator. In other applicator embodiments, the analyte sensor, spring mechanism, and sensor electronics can be disposed in an off-center position relative to an axis of the applicator on the same side. Those of skill in the art will appreciate that other permutations and configurations in which any or all of the analyte sensor, spring mechanism, sensor electronics, and other components of the applicator are disposed in a centered or off-centered position relative to one or more axes of the applicator are possible and fully within the scope of the present disclosure.

A number of deflectable structures are described herein, including but not limited to deflectable detent snaps 1402, deflectable locking arms 1412, sharp carrier lock arms 1524, sharp retention arms 1618, and module snaps 2202. These deflectable structures are composed of a resilient material such as plastic or metal (or others) and operate in a manner well known to those of ordinary skill in the art. The deflectable structures each has a resting state or position that the resilient material is biased towards. If a force is applied that causes the structure to deflect or move from this resting state or position, then the bias of the resilient material will cause the structure to return to the resting state or position once the force is removed (or lessened). In many instances these structures are configured as arms with detents, or snaps, but other structures or configurations can be used that retain the same characteristics of deflectability and ability to return to a resting position, including but not limited to a leg, a clip, a catch, an abutment on a deflectable member, and the like.

Additional details of suitable devices, systems, methods, components and the operation thereof along with related features are set forth in International Publication No. WO2018/136898 to Rao et. al., International Publication No. WO2019/236850 to Thomas et. al., International Publication No. WO2019/236859 to Thomas et. al., International Publication No. WO2019/236876 to Thomas et. al., and U.S. Patent Publication No. 2020/0196919, filed Jun. 6, 2019, each of which is incorporated by reference in its entirety herein. Further details regarding embodiments of applicators, their components, and variants thereof, are described in U.S. Patent Publication Nos. 2013/0150691, 2016/0331283, and 2018/0235520, all of which are incorporated by reference herein in their entireties and for all purposes. Further details regarding embodiments of sharp modules, sharps, their components, and variants thereof, are described in U.S. Patent Publication No. 2014/0171771, which is incorporated by reference herein in its entirety and for all purposes.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Thus, the foregoing description of specific embodiments of the disclosed subject matter has been presented for purposes of illustration and description. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents. Furthermore, any features, functions, steps, or elements of the embodiments may be recited in or added to the claims, as well as negative limitations that define the inventive scope of the claims by features, functions, steps, or elements that are not within that scope.

What is claimed is:

1. A sensor control device for analyte monitoring, the sensor control device comprising:
an electronics housing having a shell defining a top surface of the electronics housing and a mount defining a bottom surface of the electronics housing; and
an adhesive patch defining a central opening and coupled to the bottom surface of the electronics housing;

a mesh layer configured between an underside of the mount and the adhesive patch, wherein the mesh layer provides one or more gaps between the mount and the adhesive patch;

wherein the adhesive patch comprises a first layer facing the mount and a second layer configured to face a skin of a user, the first layer having a first aperture, the second layer having a second aperture, the first aperture aligned with the second aperture forming the central opening along a vertical axis of the sensor control device; and wherein the first layer or second layer includes slots or holes configured for drainage of fluid or breathability of the skin.

2. The sensor control device of claim 1, wherein the first layer of the adhesive patch has a top surface directly in contact with an underside of the mount of the electronics housing, and wherein the underside of the mount is generally smooth.

3. The sensor control device of claim 1, wherein the second layer comprises two films, the two films being an adhesive and a nonwoven material.

4. The sensor control device of claim 1, wherein the first aperture, second aperture and central opening are configured to receive a sharp protruding from the electronics housing.

5. The sensor control device of claim 1, wherein the first aperture, second aperture and central opening are configured to receive an analyte sensor protruding from the electronics housing.

6. The sensor control device of claim 1, wherein the slots are laser cut slots and the holes are laser cut holes.

7. The sensor control device of claim 1, wherein at least one of the first layer and the second layer comprise an adhesive.

8. The sensor control device of claim 7, wherein the adhesive does not include isobornyl acrylate or an acrylate.

9. The sensor control device of claim 8, wherein the adhesive has a glass transition temperature of about 40° C. or greater.

10. The sensor control device of claim 8, wherein the adhesive comprises (i) an oligomer, (ii) a monomer, (iii) a photoinitiator and (iv) an additive.

11. The sensor control device of claim 10, wherein the additive is selected from the group consisting of a stabilizer, a tackifier, a color pigment, a dye, a defoamer, an adhesion promoter, a flatting agent, a filler, an antioxidant, a plasticizer, a silane coupling agent, a rheological control agent, a wetting agent, a slip aid and a combination thereof.

12. The sensor control device of claim 1, wherein the first layer includes a top surface and a bottom surface each comprising an adhesive.

13. The sensor control device of claim 12, wherein the first layer comprises three films including a synthetic rubber adhesive blend, a scrim, and an acrylic adhesive;

the top surface of the first layer including the synthetic rubber adhesive blend, the bottom surface of the first layer including the acrylic adhesive, and the scrim sandwiched between the synthetic rubber adhesive blend and the acrylic adhesive.

14. The sensor control device of claim 1, wherein the first layer includes the slots extending from the first aperture to an outer periphery of the first layer.

15. The sensor control device of claim 14, wherein the slots penetrate completely through the first layer and are continuous with the first aperture in the first layer.

16. The sensor control device of claim 1, wherein the first layer or second layer includes the holes configured so that fluid in an area of the skin underneath the adhesive patch evaporates directly through the holes provided in the first layer or second layer.

17. The sensor control device of claim 16, wherein the holes are evenly spaced apart over an entirety of the first layer and an entirety of the second layer.

18. The sensor control device of claim 16, wherein the holes are evenly spaced apart over only a portion of the first layer, and a remaining portion of the first layer does not include holes.

19. The sensor control device of claim 16, wherein the holes are evenly spaced apart over only a portion of the first layer between the first aperture and an outer periphery of the first layer.

20. The sensor control device of claim 1, wherein the one or more gaps provided by the mesh layer allow fluid in an area of the skin underneath the adhesive patch to evaporate.

21. The sensor control device of claim 1, wherein the first layer or second layer includes the holes.

22. The sensor control device of claim 1, wherein mesh layer includes a first mesh portion and a second mesh portion, the first mesh portion discontinuous from the second mesh portion.

23. The sensor control device of claim 1, wherein the mesh layer includes a first array of hydrophobic threads and a second array of hydrophobic threads.

24. The sensor control device of claim 23, wherein the first array of hydrophobic threads is perpendicular to the second array of hydrophobic threads.

* * * * *